US011992848B2

(12) United States Patent
Conrad

(10) Patent No.: US 11,992,848 B2
(45) Date of Patent: *May 28, 2024

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,167

(22) Filed: Jul. 10, 2023

(65) Prior Publication Data

US 2024/0009685 A1 Jan. 11, 2024

Related U.S. Application Data

(63) Continuation of application No. 17/694,362, filed on Mar. 14, 2022, now Pat. No. 11,745,190, which is a (Continued)

(51) Int. Cl.

| | |
|---|---|
| ***B04C 5/08*** | (2006.01) |
| ***A47L 9/16*** | (2006.01) |
| ***B04C 5/187*** | (2006.01) |
| ***B04C 9/00*** | (2006.01) |
| *A47L 9/10* | (2006.01) |

(Continued)

(52) U.S. Cl.

CPC .............. *B04C 5/08* (2013.01); *A47L 9/1608* (2013.01); *A47L 9/1691* (2013.01); *B04C 5/187* (2013.01); *B04C 9/00* (2013.01); *A47L 9/106* (2013.01); *A47L 9/122* (2013.01); *A47L 9/1625* (2013.01); *A47L 9/165* (2013.01); *A47L 9/1675* (2013.01); *A47L 9/1683* (2013.01); *A47L 9/20* (2013.01);

(Continued)

(58) Field of Classification Search

CPC .. B04C 5/08; B04C 5/187; B04C 9/00; B04C 2009/005; A47L 9/1608; A47L 9/1691; A47L 9/106; A47L 9/122; A47L 9/1625; A47L 9/165; A47L 9/1675; A47L 9/1683; A47L 9/20; A47L 9/325; A47L 5/28

See application file for complete search history.

(56) References Cited

U.S. PATENT DOCUMENTS

| | | | |
|---|---|---|---|
| 280,033 | A | 6/1883 | Hadley |
| 303,173 | A | 8/1884 | Mark |

(Continued)

FOREIGN PATENT DOCUMENTS

| | | | |
|---|---|---|---|
| CA | 2658014 | A1 | 9/2010 |
| CN | 1434688 | A | 8/2003 |

(Continued)

OTHER PUBLICATIONS

English machine translation of KR1020060008365, published on Jan. 26, 2006.

(Continued)

*Primary Examiner* — Dung H Bui

(74) *Attorney, Agent, or Firm* — Philip C. Mendes da Costa; BERESKIN & PARR LLP/S.E.N.C.R.L., s.r.l.

(57) ABSTRACT

A surface cleaning apparatus comprises a cyclone chamber having a cyclone axis of rotation and an openable portion wherein the openable portion is rotatably mounted about an opening axis that is parallel to the cyclone axis of rotation.

20 Claims, 91 Drawing Sheets

Related U.S. Application Data continuation-in-part of application No. 17/471,041, filed on Sep. 9, 2021, now Pat. No. 11,524,306, which is a continuation of application No. 16/806,726, filed on Mar. 2, 2020, now Pat. No. 11,219,906, which is a continuation-in-part of application No. 16/447,308, filed on Jun. 20, 2019, now Pat. No. 10,966,583, which is a continuation-in-part of application No. 16/254,918, filed on Jan. 23, 2019, now Pat. No. 10,828,649.

(51) Int. Cl.
*A47L 9/12* (2006.01)
*A47L 9/20* (2006.01)
*A47L 9/32* (2006.01)

(52) U.S. Cl.
CPC ......... *A47L 9/325* (2013.01); *B04C 2009/005* (2013.01)

(56) References Cited

U.S. PATENT DOCUMENTS 394,240 A * 12/1888 Allington ............... B01D 45/16 209/722
2,071,975 A 2/1937 Holm-Hansen et al.
2,534,702 A * 12/1950 Driessen ................. B04C 5/081 210/512.1
2,542,634 A 2/1951 Davis et al.
2,754,968 A * 7/1956 Hage ......................... B04C 9/00 210/197
2,913,111 A 11/1959 Rogers
2,937,713 A 5/1960 Stephenson et al.
2,942,691 A 6/1960 Dillon
3,130,157 A 4/1964 Kelsall et al.
3,200,568 A 8/1965 Mcneil
3,320,727 A 5/1967 Farley et al.
3,349,548 A * 10/1967 Boyen ..................... B04C 5/103 210/512.1
3,425,192 A 2/1969 Davis
3,530,649 A 9/1970 Porsch et al.
3,543,325 A 12/1970 Hamrick
3,822,533 A 7/1974 Oranje
3,898,068 A 8/1975 McNeil
3,969,096 A 7/1976 Richard
3,988,132 A 10/1976 Oranje
3,988,133 A 10/1976 Schady
4,187,088 A 2/1980 Hodgson
4,236,903 A 12/1980 Malmsten
4,523,936 A 6/1985 Disanza, Jr.
D280,033 S 8/1985 Miyamoto et al.
D290,894 S 7/1987 Miyamoto et al.
D298,875 S 12/1988 Nakamura
D303,173 S 8/1989 Miyamoto et al.
5,035,024 A 7/1991 Steiner et al.
5,078,761 A 1/1992 Dyson
5,145,499 A 9/1992 Dyson
5,267,371 A 12/1993 Soler et al.
5,287,591 A 2/1994 Rench et al.
5,307,538 A 5/1994 Rench et al.
5,363,535 A 11/1994 Rench et al.
D353,917 S 12/1994 Hoekstra et al.
5,379,483 A 1/1995 Pino
5,815,881 A 10/1998 Sjoegreen
6,080,217 A * 6/2000 Gobl ......................... B04C 5/28 55/385.2
D436,699 S 1/2001 Makihara et al.
6,228,260 B1 5/2001 Conrad et al.
6,238,451 B1 5/2001 Conrad et al.
6,406,505 B1 6/2002 Oh et al.
6,434,785 B1 8/2002 Vandenbelt et al.
6,502,278 B2 1/2003 Oh et al.
6,599,348 B2 7/2003 Chosnek et al.
6,599,350 B1 7/2003 Rockwell et al.
6,613,116 B2 9/2003 Oh
6,613,129 B2 9/2003 Gen
6,623,539 B2 9/2003 Lee et al.
6,648,934 B2 11/2003 Choi et al.
6,740,144 B2 5/2004 Conrad et al.
D498,027 S 11/2004 Alsruh et al.
6,810,558 B2 11/2004 Lee
6,833,015 B2 12/2004 Oh et al.
6,835,222 B2 12/2004 Gammack
6,868,578 B1 3/2005 Kasper et al.
6,883,202 B2 4/2005 Steffen et al.
6,896,719 B2 5/2005 Coates et al.
6,896,720 B1 5/2005 Arnold et al.
6,928,692 B2 * 8/2005 Oh ........................ A47L 9/1666 55/299
6,968,596 B2 11/2005 Oh et al.
6,974,488 B2 12/2005 Dyson
7,022,154 B2 * 4/2006 Oh .......................... B04C 5/187 55/459.1
7,028,369 B2 4/2006 Park et al.
7,160,346 B2 1/2007 Park
7,354,468 B2 4/2008 Arnold et al.
7,370,387 B2 5/2008 Walker et al.
7,377,953 B2 5/2008 Oh
7,419,520 B2 * 9/2008 Lee ........................... A47L 9/20 15/352
7,449,040 B2 11/2008 Conrad et al.
7,485,164 B2 2/2009 Jeong et al.
D591,466 S 4/2009 Crawley
7,544,224 B2 6/2009 Tanner et al.
D598,616 S 8/2009 Crawley
7,662,201 B2 2/2010 Lee
7,691,161 B2 4/2010 Oh et al.
7,717,973 B2 5/2010 Oh et al.
7,771,499 B2 8/2010 Oh et al.
7,789,922 B1 * 9/2010 Wai ...................... B01D 46/521 55/420
7,811,345 B2 10/2010 Conrad
7,867,308 B2 1/2011 Conrad
7,882,593 B2 2/2011 Beskow et al.
7,887,612 B2 2/2011 Conrad
D635,728 S 4/2011 Fjellman
7,922,794 B2 4/2011 Morphey
7,931,716 B2 4/2011 Oakham
7,958,598 B2 6/2011 Yun et al.
7,996,956 B2 8/2011 Wood et al.
8,083,824 B2 12/2011 Fujiyama et al.
8,100,999 B2 1/2012 Ashbee et al.
8,101,001 B2 1/2012 Qian
8,117,712 B2 2/2012 Dyson et al.
8,146,201 B2 4/2012 Conrad
8,151,407 B2 4/2012 Conrad
8,156,609 B2 4/2012 Milne et al.
8,236,077 B2 8/2012 Gomiciaga-Pereda et al.
8,250,702 B2 8/2012 Conrad
8,296,900 B2 10/2012 Conrad
8,302,250 B2 11/2012 Dyson et al.
8,347,455 B2 1/2013 Dyson et al.
8,387,204 B2 3/2013 Dyson
8,444,731 B2 5/2013 Gomiciaga-Pereda et al.
8,510,907 B2 8/2013 Conrad
8,549,703 B2 10/2013 Smith
8,590,102 B2 11/2013 Conrad
8,607,407 B2 12/2013 Conrad
8,707,513 B2 4/2014 Ivarsson et al.
9,078,549 B2 7/2015 Conrad
9,826,868 B2 11/2017 Conrad
11,432,690 B2 9/2022 Paulla et al.
11,723,501 B2 8/2023 Reeder et al.
2001/0023517 A1 9/2001 Onishi et al.
2002/0020154 A1 2/2002 Yang
2002/0043055 A1 4/2002 Conrad
2002/0178535 A1 12/2002 Oh et al.
2002/0178698 A1 12/2002 Oh et al.
2002/0178702 A1 12/2002 Oh
2003/0046910 A1 3/2003 Lee et al.
2003/0106182 A1 * 6/2003 Lee ......................... A47L 9/165 15/353

(56) References Cited

U.S. PATENT DOCUMENTS

2003/0159235 A1* 8/2003 Oh ........................... A47L 9/20 15/352
2003/0159238 A1 8/2003 Oh
2003/0182756 A1 10/2003 Duggan
2003/0200736 A1 10/2003 Ni
2004/0010885 A1 1/2004 Hitzelberger et al.
2004/0020005 A1 2/2004 Odachi et al.
2004/0244139 A1 12/2004 Lee
2005/0177974 A1 8/2005 Conrad et al.
2005/0229554 A1 10/2005 Oh et al.
2006/0037172 A1 2/2006 Choi
2006/0042038 A1 3/2006 Arnold et al.
2006/0042206 A1 3/2006 Arnold et al.
2006/0090290 A1 5/2006 Lau
2006/0090428 A1 5/2006 Park et al.
2006/0117723 A1 6/2006 Yoo
2006/0123590 A1 6/2006 Fester et al.
2006/0130448 A1 6/2006 Han et al.
2006/0137306 A1 6/2006 Jeong et al.
2006/0137309 A1 6/2006 Jeong et al.
2006/0137314 A1 6/2006 Conrad et al.
2006/0156508 A1* 7/2006 Khalil .................. A47L 9/1666 15/353
2006/0162299 A1 7/2006 North
2006/0168923 A1 8/2006 Lee et al.
2006/0179801 A1 8/2006 Ivarsson
2006/0207055 A1 9/2006 Ivarsson et al.
2006/0207231 A1 9/2006 Arnold
2006/0230715 A1 10/2006 Oh et al.
2006/0230721 A1 10/2006 Oh et al.
2006/0230724 A1 10/2006 Han et al.
2006/0278081 A1 12/2006 Han et al.
2007/0067943 A1 3/2007 Makarov
2007/0084161 A1* 4/2007 Yoo ...................... A47L 9/1625 55/345
2007/0095029 A1 5/2007 Min et al.
2007/0199284 A1 8/2007 Yoo et al.
2007/0234687 A1 10/2007 Ni
2007/0271724 A1 11/2007 Hakan et al.
2008/0040883 A1 2/2008 Beskow et al.
2008/0047091 A1 2/2008 Nguyen
2008/0104795 A1 5/2008 Lang
2008/0134462 A1 6/2008 Jansen et al.
2008/0172992 A1 7/2008 Conrad
2008/0172995 A1 7/2008 Conrad
2008/0190080 A1 8/2008 Oh et al.
2008/0256744 A1 10/2008 Rowntreer et al.
2008/0264016 A1 10/2008 Oh et al.
2009/0113663 A1 5/2009 Follows et al.
2009/0165242 A1 7/2009 Lee et al.
2009/0173365 A1 7/2009 Conrad
2009/0197753 A1 8/2009 Lajtonyi
2009/0223183 A1* 9/2009 Lin ..................... B01D 46/521 55/296
2009/0265883 A1 10/2009 Reed, Jr. et al.
2009/0282639 A1 11/2009 Dyson et al.
2009/0282791 A1 11/2009 Lang
2009/0307864 A1 12/2009 Dyson
2009/0313958 A1 12/2009 Gomiciaga-Pereda et al.
2010/0045215 A1 2/2010 Hawker et al.
2010/0139033 A1 6/2010 Makarov et al.
2010/0154150 A1 6/2010 Mcleod
2010/0229328 A1 9/2010 Conrad
2011/0214250 A1 9/2011 McLeod et al.
2011/0219566 A1 9/2011 Dyson et al.
2011/0219571 A1 9/2011 Dyson et al.
2011/0219574 A1 9/2011 Conrad
2011/0219577 A1 9/2011 Conrad
2011/0289720 A1* 12/2011 Han ......................... A47L 5/24 55/337
2011/0314630 A1 12/2011 Conrad
2012/0030896 A1 2/2012 Crouch et al.
2012/0036675 A1 2/2012 Conrad
2012/0222252 A1 9/2012 Conrad
2013/0091655 A1 4/2013 Smith
2013/0091660 A1 4/2013 Smith
2013/0091661 A1 4/2013 Smith
2013/0091812 A1 4/2013 Smith
2013/0091813 A1 4/2013 Smith
2013/0269146 A1 10/2013 Conrad
2013/0269147 A1 10/2013 Conrad
2014/0090341 A1 4/2014 Chen
2014/0237757 A1 8/2014 Conrad
2014/0237758 A1 8/2014 Conrad
2014/0366310 A1* 12/2014 Conrad .................. A47L 5/225 15/329
2014/0366314 A1 12/2014 Conrad
2015/0000077 A1 1/2015 Conrad
2015/0059118 A1 3/2015 Lim et al.
2015/0257616 A1 9/2015 Bassett et al.
2016/0015230 A1 1/2016 Conrad et al.
2016/0174786 A1 6/2016 Conrad
2016/0198914 A1 7/2016 Conrad
2017/0156559 A1 6/2017 Krebs et al.
2017/0215663 A1 8/2017 Conrad et al.
2017/0290479 A1 10/2017 Conrad
2017/0290481 A1 10/2017 Conrad
2018/0055318 A1* 3/2018 Gottschall ............... A47L 9/325
2018/0177354 A1* 6/2018 Conrad ................. A47L 9/1641
2018/0177366 A1 6/2018 Conrad
2018/0242804 A1 8/2018 Pan et al.
2018/0263439 A1 9/2018 Dimbylow et al.
2019/0008342 A1* 1/2019 Conrad ................. A47L 9/2889
2019/0008346 A1 1/2019 Conrad et al.
2019/0134647 A1* 5/2019 Hayamitsu ............ A47L 9/1683
2019/0200829 A1 7/2019 Conrad
2019/0254493 A1* 8/2019 Conrad .................. A47L 9/322
2019/0343356 A1* 11/2019 Kim .......................... A47L 5/24
2019/0357745 A1 11/2019 Zhu et al.
2019/0365174 A1* 12/2019 Conrad .................. A47L 9/127
2020/0008636 A1 1/2020 Lee et al.
2020/0170466 A1* 6/2020 Percy-Raine ......... A47L 9/1675
2021/0016298 A1* 1/2021 Swintak ................ B01D 45/16
2021/0145231 A1* 5/2021 Conrad ..................... A47L 5/24
2021/0145233 A1 5/2021 Conrad

FOREIGN PATENT DOCUMENTS

CN 1875846 A 12/2006
CN 1875855 A 12/2006
CN 100998484 A 7/2007
CN 101015436 A 8/2007
CN 101095604 A 1/2008
CN 101108081 A 1/2008
CN 101108106 A 1/2008
CN 101108110 A 1/2008
CN 101288572 A 10/2008
CN 201131706 Y 10/2008
CN 101489455 A 7/2009
CN 101489457 A 7/2009
CN 101489461 A 7/2009
CN 201523596 U1 7/2010
CN 1626025 B 4/2011
CN 102188208 A 9/2011
CN 103040412 A 4/2013
CN 103040413 A 4/2013
CN 203724037 U 7/2014
CN 205671986 U 11/2016
DE 69110424 T2 2/1996
DE 69309275 T3 6/2002
DE 10110581 C2 11/2003
DE 69816009 T2 3/2004
DE 202005020767 U 8/2006
DE 69834473 T2 11/2006
DE 10356156 B4 8/2007
DE 102004028678 B4 9/2007
DE 102006027456 A1 12/2007
DE 102004028677 B4 1/2008
DE 102005015004 B4 2/2008
DE 102006055099 A1 5/2008
DE 112006003479 T5 12/2008
DE 112007001314 T5 4/2009
DE 602006000726 T2 4/2009

(56) References Cited

FOREIGN PATENT DOCUMENTS

| | | | |
|---|---|---|---|
| DE | 112010001135 | T5 | 8/2012 |
| DE | 202012101457 | U1 | 8/2012 |
| DE | 112011104642 | T5 | 10/2013 |
| DE | 112012000251 | T5 | 10/2013 |
| DE | 202010018047 | U1 | 11/2013 |
| DE | 102012211246 | A1 | 1/2014 |
| DE | 202010018084 | U1 | 2/2014 |
| DE | 202010018085 | U1 | 2/2014 |
| DE | 102012110765 | A1 | 5/2014 |
| DE | 102012223983 | A1 | 6/2014 |
| EM | D000780341 | | 9/2007 |
| EM | D000915269 | | 10/2010 |
| EP | 0489468 | A1 | 6/1992 |
| EP | 1356755 | A2 | 10/2003 |
| EP | 1356755 | B1 | 5/2012 |
| EP | 2142064 | B1 | 4/2016 |
| GB | 2035787 | B | 6/1980 |
| GB | D038414 | | 8/1987 |
| GB | 2251178 | A | 7/1992 |
| GB | 2268875 | A | 1/1994 |
| GB | 2377880 | A | 1/2003 |
| GB | D3017095 | | 5/2004 |
| GB | 2409404 | B | 11/2005 |
| GB | 2424603 | A | 10/2006 |
| GB | 2441962 | A | 3/2008 |
| GB | 2466290 | A | 6/2010 |
| GB | 2478599 | A | 9/2011 |
| GB | 2478614 | B | 2/2012 |
| GB | 2484146 | S | 2/2013 |
| JP | D609203 | S | 9/1983 |
| JP | D745201 | S | 10/1983 |
| JP | D649078 | S | 4/1985 |
| JP | D649084 | S | 4/1985 |
| JP | 60220027 | A | 11/1985 |
| JP | D679295 | S | 5/1986 |
| JP | D679390 | S | 5/1986 |
| JP | D679426 | S | 5/1986 |
| JP | D679806 | S | 5/1986 |
| JP | 61131720 | A | 6/1986 |
| JP | D706192 | S | 5/1987 |
| JP | D706193 | S | 5/1987 |
| JP | D725983 | S | 2/1988 |
| JP | D679426 | S | 3/1988 |
| JP | D726042 | S | 3/1988 |
| JP | D726318 | S | 3/1988 |
| JP | D743059 | S | 9/1988 |
| JP | D743445 | S | 9/1988 |
| JP | D743603 | S | 9/1988 |
| JP | D743618 | S | 9/1988 |
| JP | D743619 | S | 9/1988 |
| JP | 63246116 | A | 10/1988 |
| JP | D745200 | S | 10/1988 |
| JP | D943287 | S | 11/1988 |
| JP | 6415020 | A | 1/1989 |
| JP | D787941 | S | 5/1990 |
| JP | D788426 | S | 5/1990 |
| JP | D788427 | S | 5/1990 |
| JP | 8289861 | A | 11/1996 |
| JP | 2000083879 | A | 3/2000 |
| JP | D1115813 | S | 7/2001 |
| JP | 2003135335 | A | 5/2003 |
| JP | 2005211350 | A | 8/2005 |
| JP | D1310024 | S | 9/2007 |
| JP | D1370915 | S | 10/2009 |
| JP | 2010081968 | A | 4/2010 |
| KR | 300360565 | S | 9/2004 |
| KR | 1020060008365 | A | 1/2006 |
| KR | 1020080039105 | A | 5/2008 |
| WO | 0074548 | A1 | 12/2000 |
| WO | 02067750 | A1 | 9/2002 |
| WO | 02069778 | A1 | 9/2002 |
| WO | 2004069021 | A1 | 8/2004 |
| WO | 2008009883 | A1 | 1/2008 |
| WO | 2008009888 | A1 | 1/2008 |
| WO | 2008009890 | A1 | 1/2008 |
| WO | 2008034325 | A1 | 3/2008 |
| WO | 2008035032 | A2 | 3/2008 |
| WO | 2008065168 | A1 | 6/2008 |
| WO | 2010102394 | A1 | 9/2010 |
| WO | 2010102396 | A1 | 9/2010 |
| WO | 2012042240 | A1 | 4/2012 |
| WO | 2012129774 | A1 | 10/2012 |
| WO | 2016197546 | A1 | 12/2016 |
| WO | 2017046557 | A1 | 3/2017 |
| WO | 2017046558 | A1 | 3/2017 |
| WO | 2017046559 | A1 | 3/2017 |
| WO | 2017046560 | A1 | 3/2017 |

OTHER PUBLICATIONS

English machine translation of KR1020080039105, published on May 7, 2008.
English machine translation of CN205671986, published on Nov. 9, 2016.
International Search Report and Written Opinion received in connection to co-pending patent application No. PCT/CA2017/051459, dated Mar. 12, 2018.
TotalPatent: English machine translation of DE602006000726, published on Apr. 16, 2009.
TotalPatent: English machine translation of DE202012101457, published on Aug. 16, 2012.
TotalPatent: English machine translation of DE202010018085, published on Feb. 27, 2014.
TotalPatent: English machine translation of DE202010018084, published on Feb. 27, 2014.
TotalPatent: English machine translation of DE202010018047, published on Nov. 14, 2013.
TotalPatent: English machine translation of DE112012000251, published on Oct. 17, 2013.
TotalPatent: English machine translation of DE112011104642, published on Oct. 2, 2013.
TotalPatent: English machine translation of DE112010001135, published on Aug. 2, 2012.
TotalPatent: English machine translation of DE112007001314, published on Apr. 23, 2009.
TotalPatent: English machine translation of DE112006003479, published on Dec. 18, 2008.
TotalPatent: English machine translation of DE102012223983, published on Jun. 26, 2014.
TotalPatent: English machine translation of DE102012211246, published on Jan. 2, 2014.
TotalPatent: English machine translation of DE102012110765, published on May 15, 2014.
TotalPatent: English machine translation of DE102006055099, published on May 29, 2008.
TotalPatent: English machine translation of DE102006027456, published on Dec. 13, 2007.
TotalPatent: English machine translation of DE102005015004, published on Feb. 7, 2008.
TotalPatent: English machine translation of DE102004028678, published on Sep. 6, 2007.
TotalPatent: English machine translation of DE102004028677, published on Jan. 10, 2008.
TotalPatent: English machine translation of JP2010081968; published on Apr. 15, 2010.
TotalPatent: English machine translation of WO2008035032, published on Mar. 27, 2008.
TotalPatent: English machine translation of JP2003135335A, published on May 13, 2003.
TotalPatent: English machine translation of CN203724037U, published on Jul. 23, 2014.
TotalPatent: English machine translation of CN201131706Y, published on Oct. 15, 2008.
TotalPatent: English machine translation of CN103040413A, published on Apr. 17, 2013.
TotalPatent: English machine translation of CN103040412A, published on Apr. 17, 2013.

(56) References Cited

OTHER PUBLICATIONS

TotalPatent: English machine translation of CN102188208A, published on Sep. 21, 2013.
TotalPatent: English machine translation of CN101489461A, published on Jul. 22, 2009.
TotalPatent: English machine translation of CN1434688A, published on Aug. 6, 2003.
TotalPatent: English machine translation of CN1626025B, published on Apr. 13, 2011.
TotalPatent: English machine translation of CN1875846A, published on Dec. 13, 2006.
TotalPatent: English machine translation of CN1875855A, published on Dec. 13, 2006.
TotalPatent: English machine translation of DE10110581C2, published on Nov. 13, 2003.
TotalPatent: English machine translation of DE10356156B4, published on Aug. 2, 2007.
TotalPatent: English machine translation of DE69110424T2, published on Feb. 1, 1996.
TotalPatent: English machine translation of DE69309275T3, published on Jun. 27, 2002.
TotalPatent: English machine translation of DE69816009T2, published on Mar. 18, 2004.
TotalPatent: English machine translation of DE69834473T2, published on Nov. 30, 2006.
TotalPatent: English machine translation of CN100998484A, published on Jul. 18, 2007.
TotalPatent: English machine translation of CN101015436A, published on Aug. 15, 2007.
TotalPatent: English machine translation of CN101095604A, published on Jan. 2, 2008.
TotalPatent: English machine translation of CN101108081A, published on Jan. 23, 2008.
TotalPatent: English machine translation of CN101108106A, published on Jan. 23, 2008.
TotalPatent: English machine translation of CN101108110A, published on Jan. 23, 2008.
TotalPatent: English machine translation of CN101288572A, published on Oct. 22, 2008.
TotalPatent: English machine translation of CN101489455A, published on Jul. 22, 2009.
TotalPatent: English machine translation of CN101489457A, published on Jul. 22, 2009.
English machine translation of DE202005020767U1 published on Aug. 10, 2006.
English machine translation of CN201523596Y published on Jul. 14, 2010.
English machine translation of JP60220027A published on Nov. 2, 1985.
English machine translation of JP61131720A published on Jun. 19, 1986.
English machine translation of JP63246116A published on Oct. 13, 1988.
English machine translation of JP6415020A published on Jan. 19, 1989.
English machine translation of JP8289861A published on Nov. 5, 1996.
English machine translation of JP2000083879A published on Mar. 28, 2000.
English machine translation of KR300360565S published on Sep. 1, 2004.
European search report, dated Jun. 16, 2009, received on the corresponding EP application No. 07710712.6.
Particulars of Claim for Claim IP14M01753 in re: *Euro-Pro Operating LLC* vs. *Dyson Technology Limited*, dated Apr. 29, 2014, 37 pages.
International Preliminary Report on Patentability received in connection to international Patent Application No. PCT/CA2007/002211, dated Jun. 16, 2009.
What's the Best vacuum.com Forum discussion Dyson DC16 Root 6 Hand Held Vacuum Cleaner; http://www.abbysguide.com/vacuum/legacy/cgi-bin/yabb/2618-YaBB.html; dated Oct. 21, 2006.

* cited by examiner

SURFACE CLEANING APPARATUS

CROSS-REFERENCE TO RELATED APPLICATIONS

This application is a continuation of U.S. patent application Ser. No. 17/694,362, filed on Mar. 14, 2022, now allowed, which is a continuation-in-part of U.S. patent application Ser. No. 17/471,041, filed on Sep. 9, 2021 and issued as U.S. Pat. No. 11,524,306 on Dec. 13, 2022, which is a continuation of U.S. patent application Ser. No. 16/806,726, filed on Mar. 2, 2020, and issued as U.S. Pat. No. 11,219,906 on Jan. 11, 2022, which itself is a continuation-in-part of U.S. patent application Ser. No. 16/447,308, filed on Jun. 20, 2019 and issued as U.S. Pat. No. 10,966,583 on Apr. 6, 2021, which itself is a continuation-in-part of U.S. patent application Ser. No. 16/254,918, filed on Jan. 23, 2019 and issued as U.S. Pat. No. 10,828,649 on Nov. 10, 2020, the entirety of which is incorporated herein by reference.

FIELD

This disclosure relates generally to surface cleaning apparatuses.

INTRODUCTION

The following is not an admission that anything discussed below is part of the prior art or part of the common general knowledge of a person skilled in the art.

Various constructions for surface cleaning apparatuses, such as vacuum cleaners, are known. Air may be drawn into the surface cleaning apparatus through a dirty air inlet and conveyed to an air treatment member, such as, for example, a cyclonic air treatment member. Within the air treatment member, some of the particulate matter (i.e., debris) captured within the air flow may be disentrained from the air flow. This disentrained debris may then be collected in a dirt collection chamber. When the dirt collection chamber is full of debris, a user of the surface cleaning apparatus may empty the dirt collection chamber into, for example, a garbage bin.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one aspect of this disclosure, which may be used by itself or in combination with one or more other aspects disclosed herein, a cyclone, such as a cyclone for a hand vac, has an openable door wherein the hinge extends generally in the direction of the cyclone axis of rotation. An advantage of this aspect is that part, essentially all or all of the cyclone may be opened along its axial length.

In accordance with this aspect, a hand vacuum cleaner is provided which comprises:

(a) an air flow path extending from a dirty air inlet to a clean air outlet;

(b) a cyclone chamber having a cyclone axis of rotation, a first end, an axially spaced apart second end, a cyclone chamber sidewall extending between the first end and the second end, a cyclone air inlet, a cyclone air outlet, and an openable portion wherein the cyclone axis of rotation intersects the first end and the second end and wherein the openable portion is rotatably mounted about an opening axis that is parallel to the cyclone axis of rotation; and, (c) a motor and fan assembly provided in the air flow path.

In accordance with this aspect, there is also provided a vacuum cleaner comprising:

(a) an air flow path extending from a dirty air inlet to a clean air outlet;

(b) an air treatment chamber having a first end, an axial spaced apart second end, an air treatment chamber sidewall extending between the first end and the second end, an air treatment chamber air inlet, an air treatment chamber air outlet provided at the second end of the air treatment chamber, an air treatment chamber axis intersecting the first end of the air treatment chamber and the second end of the air treatment chamber and defining an axial direction, and an openable portion that is rotatably mounted about an opening axis that is parallel to the air treatment chamber axis; and, (c) a motor and fan assembly provided in the air flow path.

In accordance with another aspect of this disclosure, which may be used by itself or in combination with one or more other aspects disclosed herein, a hand vacuum cleaner, which is powered by an on board energy storage member(s), e.g., one or more batteries or capacitors, may have the energy storage member(s) positioned such that they are accessible when a front end or front door of the hand vacuum cleaner is opened. An advantage of this aspect is that it may provide easy access to the energy storage member(s). For example, one or more energy storage member may be positioned radially outwardly of an air treatment member chamber, such as a cyclone chamber. Accordingly, an energy storage member chamber may be positioned on an exterior surface of the air treatment member chamber and may be located below the air treatment member chamber and optionally laterally beside a dirt collection chamber of the air treatment member chamber.

In accordance with this aspect, a hand vacuum cleaner is provided which comprises:

(a) an air flow path extending from a dirty air inlet to a clean air outlet;

(b) a cyclone chamber having a cyclone axis of rotation, an openable first end, an axially spaced apart second end, a cyclone chamber sidewall extending between the first end and the second end, a cyclone air inlet and a cyclone air outlet, wherein the cyclone axis of rotation intersects the openable first end and the second end;

(c) an energy storage member in an energy storage chamber wherein the energy storage chamber is positioned radially outward of the cyclone chamber; and, (d) a motor and fan assembly provided in the air flow path, wherein, when the openable first end is opened, the energy storage chamber is concurrently opened.

In accordance with this aspect, there is also provided a vacuum cleaner comprising:

(a) an air flow path extending from a dirty air inlet to a clean air outlet;

(b) an air treatment chamber having an openable first end, an axial spaced apart second end, an air treatment chamber sidewall extending between the first end and the second end, an air treatment chamber air inlet, an air treatment chamber air outlet provided at the second end of the air treatment chamber and an air treatment chamber axis intersecting the first end of the air treatment chamber and the second end of the air treatment chamber and defining an axial direction;

(c) an energy storage member in an energy storage chamber wherein the energy storage chamber is positioned outward of the air treatment chamber whereby a plane that is transverse to the air treatment chamber axis intersects the air treatment chamber and the energy storage chamber; and, (d) a motor and fan assembly provided in the air flow path, wherein, when the openable first end is opened, the energy storage chamber is concurrently opened.

In accordance with this aspect, there is also provided a vacuum cleaner comprising:

(a) an air flow path extending from a dirty air inlet to a clean air outlet;

(b) an air treatment chamber having an openable first end, an axial spaced apart second end, an air treatment chamber sidewall extending between the first end and the second end, an air treatment chamber air inlet, an air treatment chamber air outlet provided at the second end of the air treatment chamber and an air treatment chamber axis intersecting the first end of the air treatment chamber and the second end of the air treatment chamber and defining an axial direction;

(c) an energy storage member in an energy storage chamber; and, (d) a motor and fan assembly provided in the air flow path, wherein, when the openable first end is opened, the energy storage chamber is concurrently opened.

In accordance with another aspect of this disclosure, which may be used by itself or in combination with one or more other aspects disclosed herein, a surface cleaning apparatus, such as a hand vacuum cleaner, has an air treatment chamber, such as a cyclone chamber, which has an associated dirt collection chamber. The an air treatment chamber has a dirt outlet whereby the an air treatment chamber is in flow communication with the dirt collection chamber. When the air treatment chamber is opened, part of the wall that defines the dirt outlet moves whereby the dirt outlet is opened. Accordingly, dirt that is bridging the dirt outlet may be dislodged.

In accordance with this aspect, a hand vacuum cleaner is provided which comprises:

(a) an air flow path extending from a dirty air inlet to a clean air outlet;

(b) a motor and fan assembly provided in the air flow path;

(c) a main body comprising a handle and the suction motor; and, (d) a cyclone bin assembly comprising a cyclone chamber positioned in the air flow path and a dirt collection chamber, the cyclone chamber has a cyclone air inlet, a cyclone air outlet, a dirt outlet, a cyclone chamber front end having a cyclone chamber front end wall, a cyclone chamber rear end having a cyclone chamber rear end wall and cyclone axis of rotation that intersects the cyclone chamber front end wall and the cyclone chamber rear end wall, the dirt collection chamber having a dirt collection chamber front end having a dirt collection chamber front end wall and an axially spaced apart dirt collection chamber rear end having a dirt collection chamber rear end wall, a portion of the dirt collection chamber is spaced from the cyclone chamber in a direction transverse to the cyclone axis of rotation whereby the portion is separated from the cyclone chamber by a sidewall, wherein the rear end of the cyclone bin assembly is rotationally mounted between a closed position and an open position in which the front end of the cyclone chamber and the front end of the dirt collection chamber are opened and, wherein the dirt outlet comprises an opening that has a perimeter, the perimeter having a first portion and a second portion and only the first portion of the perimeter is moved when the rear end of the cyclone bin assembly is moved to the open position.

In accordance with another aspect of this disclosure, which may be used by itself or in combination with one or more other aspects disclosed herein, a surface cleaning apparatus, such as a hand vacuum cleaner, has an air treatment chamber, such as a cyclone chamber, which may have an associated dirt collection chamber. The air treatment chamber has two portions, e.g., a front end or front wall and/or a rear end or a rear wall that is openable as well as portion of an axially extending sidewall. For example, a front wall of an air treatment chamber may be pivotally mounted to an air treatment bin assembly and a bottom portion of a sidewall of the air treatment chamber may be pivotally mounted to an air treatment bin assembly.

In accordance with this aspect, a hand vacuum cleaner is provided which comprises:

(a) an air flow path extending from a dirty air inlet to a clean air outlet;

(b) a motor and fan assembly provided in the air flow path; and, (c) a cyclone bin assembly comprising a cyclone chamber positioned in the air flow path and a dirt collection chamber, the cyclone chamber has a cyclone air inlet, a cyclone air outlet, a dirt outlet, a cyclone chamber first end having a cyclone chamber first end wall, a cyclone chamber second end having a cyclone chamber second end wall, a cyclone chamber sidewall extending between the first and second end walls of the cyclone chamber and a cyclone axis of rotation that intersects the cyclone chamber first end wall and the cyclone chamber second end wall, the dirt collection chamber having a dirt collection chamber first end having a dirt collection chamber first end wall, an axially spaced apart dirt collection chamber second end having a dirt collection chamber second end wall and a dirt collection chamber sidewall extending between the first and second end walls of the dirt collection chamber, a portion of the dirt collection chamber is spaced from the cyclone chamber in a direction transverse to the cyclone axis of rotation whereby the portion is separated from the cyclone chamber by the cyclone chamber sidewall, wherein the cyclone bin assembly has a first openable portion comprising the first end wall of the dirt collection chamber that is moveably mounted to the hand vacuum cleaner at a first location and a moveable portion that is moveably mounted to the hand vacuum cleaner at a second location, wherein the moveable portion comprises a portion of at least one of the cyclone chamber sidewall and the dirt collection chamber sidewall.

In accordance with this aspect, there is also provided a vacuum cleaner comprising:

(a) an air flow path extending from a dirty air inlet to a clean air outlet;

(b) a motor and fan assembly provided in the air flow path; and, (c) an air treatment bin assembly comprising an air treatment chamber positioned in the air flow path and a dirt collection chamber, the air treatment chamber has an air treatment air inlet, an air treatment air outlet, a dirt outlet, an air treatment chamber first end having an air treatment chamber first end wall, an air treatment chamber second end having an air treatment chamber second end wall, an air treatment chamber sidewall extending between the first and second end walls of the air treatment chamber and a central air treatment axis that intersects the air treatment chamber first end wall and the air treatment chamber second end wall, the dirt collection chamber having a dirt collection chamber first end having a dirt collection chamber first end wall, an axially spaced apart dirt collection chamber second end having a dirt collection chamber second end wall and a dirt collection chamber sidewall extending between the first and second end walls of the dirt collection chamber, a portion of the dirt collection chamber is spaced from the air treatment chamber in a direction transverse to the central air treatment axis whereby the portion is separated from the air treatment chamber by the air treatment chamber sidewall, wherein the air treatment bin assembly has a first openable portion comprising the first end wall of the dirt collection chamber that is moveably mounted to the vacuum cleaner at a first location and a moveable portion that is moveably mounted to the vacuum cleaner at a second location, wherein the moveable portion comprises a portion of at least one of the air treatment chamber sidewall and the dirt collection chamber sidewall.

In accordance with another aspect of this disclosure, which may be used by itself or in combination with one or more other aspects disclosed herein, a surface cleaning apparatus, such as a hand vacuum cleaner, has an air treatment chamber, such as a cyclone chamber, which may have an associated dirt collection chamber. The air treatment chamber is narrower at the front end (e.g., the front end of a hand vacuum cleaner) or air inlet end of the air treatment chamber. An advantage of this aspect is that a hand vacuum cleaner may be able to clean closer to a corner or an edge without the need of an accessory, such as an extension wand.

In accordance with this aspect, a hand vacuum cleaner is provided which comprises:

(a) an air flow path extending from a dirty air inlet provided at an upper portion of a front end of the hand vacuum cleaner to a clean air outlet;
(b) a motor and fan assembly provided in the air flow path; and,
(c) a cyclone bin assembly comprising a cyclone chamber positioned in the air flow path, the cyclone chamber has a cyclone air inlet, a cyclone air outlet, a cyclone chamber front end, a cyclone chamber rear end, a cyclone chamber sidewall extending between the front and rear ends of the cyclone chamber and a cyclone axis of rotation that extends in a forward/rearwards direction, wherein the front end of the cyclone chamber has a front height in a direction transverse to the cyclone axis of rotation that is less than a rear height of the cyclone chamber in the direction transverse to the cyclone axis of rotation.

In accordance with another aspect of this disclosure, which may be used by itself or in combination with one or more other aspects disclosed herein, a surface cleaning apparatus, such as a hand vacuum cleaner, which is powered by on board energy storage members may have the energy storage members divided into two or more groups or packs which may be located at different locations. For example, a portable surface cleaning apparatus may have the on board energy storage members provided along a length of two or more portions of an exterior surface of the portable surface cleaning apparatus. An advantage of this aspect is that the energy storage members may be provided in two or more locations, which may enable a hand vacuum cleaner to have better hand weight and/or may enable a surface cleaning apparatus to have more on board power without increasing or substantially increasing the size of the surface cleaning apparatus.

In accordance with this aspect, a hand vacuum cleaner is provided which comprises:

(a) an air flow path extending from a dirty air inlet provided at a front end of the hand vacuum cleaner to a clean air outlet;
(b) an air treatment bin assembly comprising an air treatment chamber positioned in the air flow path,
(c) a main body housing a motor and fan assembly, which is provided in the air flow path;
(d) a handle;
(e) a first energy storage pack provided at a first location in the hand vacuum cleaner; and,
(f) a second energy storage pack provided at a second location in the hand vacuum cleaner which is different to the first location.

In accordance with this aspect, there is also provided a hand vacuum cleaner comprising:

(a) an air flow path extending from a dirty air inlet provided at a front end of the hand vacuum cleaner to a clean air outlet;
(b) an air treatment bin assembly comprising an air treatment chamber positioned in the air flow path,
(c) a main body housing a motor and fan assembly, which is provided in the air flow path;
(d) a handle;
(e) a first removable energy storage pack; and,
(f) a second removable energy storage pack wherein the first and second removable energy storage packs are separately removable.

In accordance with another aspect of this disclosure, which may be used by itself or in combination with one or more other aspects disclosed herein, a surface cleaning apparatus, such as a hand vacuum cleaner, which is powered by an on board energy storage member(s) that are provided along at least a portion of an outer surface of the surface cleaning apparatus. The energy storage member(s) may comprise one or more prismatic or pouch cells which have a short height. An advantage of this aspect is that the energy storage member(s) may be provided on an outer component of the surface cleaning apparatus without increasing or substantially increasing the size of the surface cleaning apparatus.

In accordance with this aspect, there is provided a hand vacuum cleaner having a front end, a longitudinally spaced apart rear end, an upper end extending between the front and rear ends and a lower end extending between the front and rear ends, the hand vacuum cleaner comprising:

(a) an air flow path extending from a dirty air inlet to a clean air outlet;
(b) an air treatment bin assembly comprising an air treatment chamber positioned in the air flow path,
(c) a main body housing a motor and fan assembly, which is provided in the air flow path;
(d) a handle; and, (e) a plurality of energy storage members wherein the energy storage members comprise a plurality of prismatic or pouch cells and the plurality of prismatic or pouch cells or a housing for the plurality of prismatic or pouch cells form part of the exterior surface of the hand vacuum cleaner.

In accordance with this aspect, there is also provided a hand vacuum cleaner having a front end, a longitudinally spaced apart rear end, a central longitudinal axis, an upper end extending between the front and rear ends and a lower end extending between the front and rear ends, the hand vacuum cleaner comprising:

(a) an air flow path extending from a dirty air inlet to a clean air outlet;

(b) an air treatment bin assembly comprising an air treatment chamber positioned in the air flow path, (c) a motor and fan assembly, which is provided in the air flow path; and, (d) a plurality of energy storage members wherein the energy storage members comprise prismatic or pouch cells.

In accordance with another aspect of this disclosure, which may be used by itself or in combination with one or more other aspects disclosed herein, a hand vacuum cleaner has a portion with a reduced width. The width may be reduced to a diameter which enables the reduced width portion to function as a handle. Energy storage member(s) may be provided forward and/or rearward of the portion having the reduced width on an exterior surface of a component of the hand vacuum cleaner, and an energy storage member(s) compartment may form part of the exterior surface of the hand vacuum cleaner forward and/or rearward of the portion having the reduced width. An advantage of this aspect is that a portion of the main body may therefore function as the handle.

In accordance with this aspect, there is provided a hand vacuum cleaner having a front end, a longitudinally spaced apart rear end, a central longitudinal axis, an upper end extending between the front and rear ends and a lower end extending between the front and rear ends, the hand vacuum cleaner comprising:

(a) an air flow path extending from a dirty air inlet to a clean air outlet;

(b) an air treatment bin assembly comprising an air treatment chamber positioned in the air flow path, (c) a main body housing a motor and fan assembly, which is provided in the air flow path; and, (d) a handle wherein the handle is longitudinally positioned between the air treatment bin assembly and the main body.

In accordance with another aspect of this disclosure, which may be used by itself or in combination with one or more other aspects disclosed herein, a cyclone, which may be used in a surface cleaning apparatus such as a hand vacuum cleaner, may have a region that is contiguous with the cyclone chamber and which is located, in the direction of flow of air exiting the cyclone chamber, axially rearward of the screen or other porous air outlet member and/or radially outwardly a non-porous portion of the air outlet conduit of the cyclone chamber.

In accordance with this aspect, a surface cleaning apparatus is provided which comprises:

(a) an air flow path extending from a dirty air inlet to a clean air outlet;

(b) an air treatment chamber positioned in the air flow path, the air treatment chamber having a first end comprising a first end wall, an axially spaced apart second end comprising a second end wall, a sidewall extending between the first and second end walls, an air treatment chamber air inlet and an air treatment chamber air outlet provided at the second end;

(c) a first dirt collection region which is contiguous with the air treatment chamber and is positioned axially from the first and second end walls and is closer to the second end wall than the first end wall; and, (d) a motor and fan assembly, which is provided in the air flow path.

In accordance with this aspect, there is also provided a surface cleaning apparatus comprising:

(a) an air flow path extending from a dirty air inlet to a clean air outlet;

(b) an air treatment chamber positioned in the air flow path, the air treatment chamber having a first end comprising a first end wall, an axially spaced apart second end comprising a second end wall, a sidewall extending between the first and second end walls, an air treatment chamber air inlet provided at the second end and an air treatment chamber air outlet provided at the second end;

(c) a first dirt collection region which is contiguous with the air treatment chamber and is positioned axially from the first and second end walls and is closer to the first end wall than the second end wall; and, (d) a motor and fan assembly, which is provided in the air flow path.

In accordance with another aspect of this disclosure, which may be used by itself or in combination with one or more other aspects disclosed herein, an axially extending screen or other porous member of an air treatment chamber has recesses that extend axially along part or all of the way along the axial length of the screen or porous member. The screen may be thin walled, e.g., the porous section of the porous member or the screen may have a wall thickness of 0.001 to 0.06 inches, 0.002 to 0.03 inches, or 0.005 to 0.015 inches. Such a cyclone outlet may be used in a cyclone that has a diameter as small as between 0.5-4 inches, or 0.5-2.5 inches. An advantage of this aspect is that a thin walled screen or porous member may be provided that is self supporting.

In accordance with this aspect, a surface cleaning apparatus is provided which comprises:

(a) an air flow path extending from a dirty air inlet to a clean air outlet;

(b) an air treatment chamber positioned in the air flow path, the air treatment chamber having a first end comprising a first end wall, an axially spaced apart second end comprising a second end wall, a central longitudinal axis extending between the first and second and walls, a sidewall extending between the first and second end walls, an air treatment chamber air inlet and an air treatment chamber air outlet provided at the second end and extending inwardly from the second end wall, the air outlet comprising an axially extending porous member wherein the axially extending porous member has at least one axially extending dimple; and, (c) a motor and fan assembly, which is provided in the air flow path.

In accordance with another aspect of this disclosure, which may be used by itself or in combination with one or more other aspects disclosed herein, the surface cleaning apparatus has a cyclone wherein the dirt outlet comprises an opening in the sidewall of the cyclone chamber. The dirt outlet has an upstream side in a direction of rotation of air in the cyclone chamber and a downstream side in the direction of rotation. The upstream side comprises a curved (e.g., tangential) portion. Accordingly, air that is rotating in the cyclone chamber may travel along the curved portion and pass over the dirt outlet while dirt, which is denser, will tend to fall through the dirt outlet into a dirt collection chamber. An advantage of this aspect is that the dirt separation efficiency of the cyclone may be increased.

In accordance with this aspect, a surface cleaning apparatus is provided which comprises:

(a) an air flow path extending from a dirty air inlet to a clean air outlet;

(b) a cyclone chamber positioned in the air flow path, the cyclone chamber having a cyclone axis of rotation, an axially extending sidewall, a cyclone chamber air inlet, a cyclone chamber air outlet and a dirt outlet, the dirt outlet comprising an axially extending slot in the sidewall;

(c) a dirt collection chamber exterior to the cyclone chamber, the dirt collection chamber having first and second opposed walls wherein the first opposed wall is an extension of the sidewall; and, (d) a motor and fan assembly, which is provided in the air flow path.

In accordance with this aspect, there is also provided a surface cleaning apparatus comprising:

(a) an air flow path extending from a dirty air inlet to a clean air outlet;

(b) a cyclone chamber positioned in the air flow path, the cyclone chamber having a first end comprising a first end wall, an axially spaced apart second end comprising a second end wall, a cyclone axis of rotation extending between the first and second and walls, a sidewall extending between the first and second end walls, a cyclone chamber air inlet and a cyclone chamber air outlet provided at the second end and extending inwardly from the second end wall;

(c) a dirt collection chamber exterior to the cyclone chamber and in communication with the cyclone chamber via a dirt outlet; and, (d) a motor and fan assembly, which is provided in the air flow path, wherein the dirt outlet comprises an opening in the sidewall, the dirt outlet has an upstream side in a direction of rotation of air in the cyclone chamber and a downstream side in the direction of rotation, and wherein the dirt collection chamber comprises a curved wall that extends from the downstream side of the dirt outlet.

In accordance with another aspect of this disclosure, which may be used by itself or in combination with one or more other aspects disclosed herein, an air outlet of a cyclone chamber comprises a porous section that extends in the axial direction. An air impermeable wall is positioned inside the air outlet and faces at least a portion of the porous section. The air impermeable wall inhibits dirt entering the air outlet via the porous section. An advantage of this aspect is that the dirt separation efficiency of the cyclone may be increased.

In accordance with this aspect, a surface cleaning apparatus is provided which comprises:

(a) an air flow path extending from a dirty air inlet to a clean air outlet;

(b) a cyclone chamber positioned in the air flow path, the cyclone chamber having a first end comprising a first end wall, an axially spaced apart second end comprising a second end wall, a cyclone axis of rotation extending between the first and second and walls, a sidewall extending between the first and second end walls, a cyclone chamber air inlet and a cyclone chamber air outlet provided at the second end and extending inwardly from the second end wall;

(c) a dirt collection chamber exterior to the cyclone chamber and in communication with the cyclone chamber via a dirt outlet; and, (d) a motor and fan assembly, which is provided in the air flow path, wherein the dirt outlet comprises an opening positioned radially outwardly and facing a portion of the cyclone chamber air outlet, and wherein the portion of the cyclone chamber air outlet comprises a porous section and, wherein an air impermeable member is positioned interior the cyclone air chamber air outlet and the air impermeable member faces the porous section whereby a plane that is transverse to the cyclone axis of rotation intersects the dirt outlet, the porous section and the air impermeable member.

In accordance with this aspect, there is also provided a surface cleaning apparatus comprising:

(a) an air flow path extending from a dirty air inlet to a clean air outlet;

a cyclone chamber positioned in the air flow path, the cyclone chamber having a cyclone axis of rotation, a cyclone chamber air inlet, a cyclone chamber air outlet and a dirt outlet;

a dirt collection chamber; and, a motor and fan assembly, which is provided in the air flow path, wherein a plane that is transverse to the cyclone axis of rotation intersects the dirt collection chamber, the dirt outlet, a porous section of the cyclone chamber air outlet that faces the dirt outlet and an air impermeable member that is positioned interior the cyclone air chamber air outlet.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
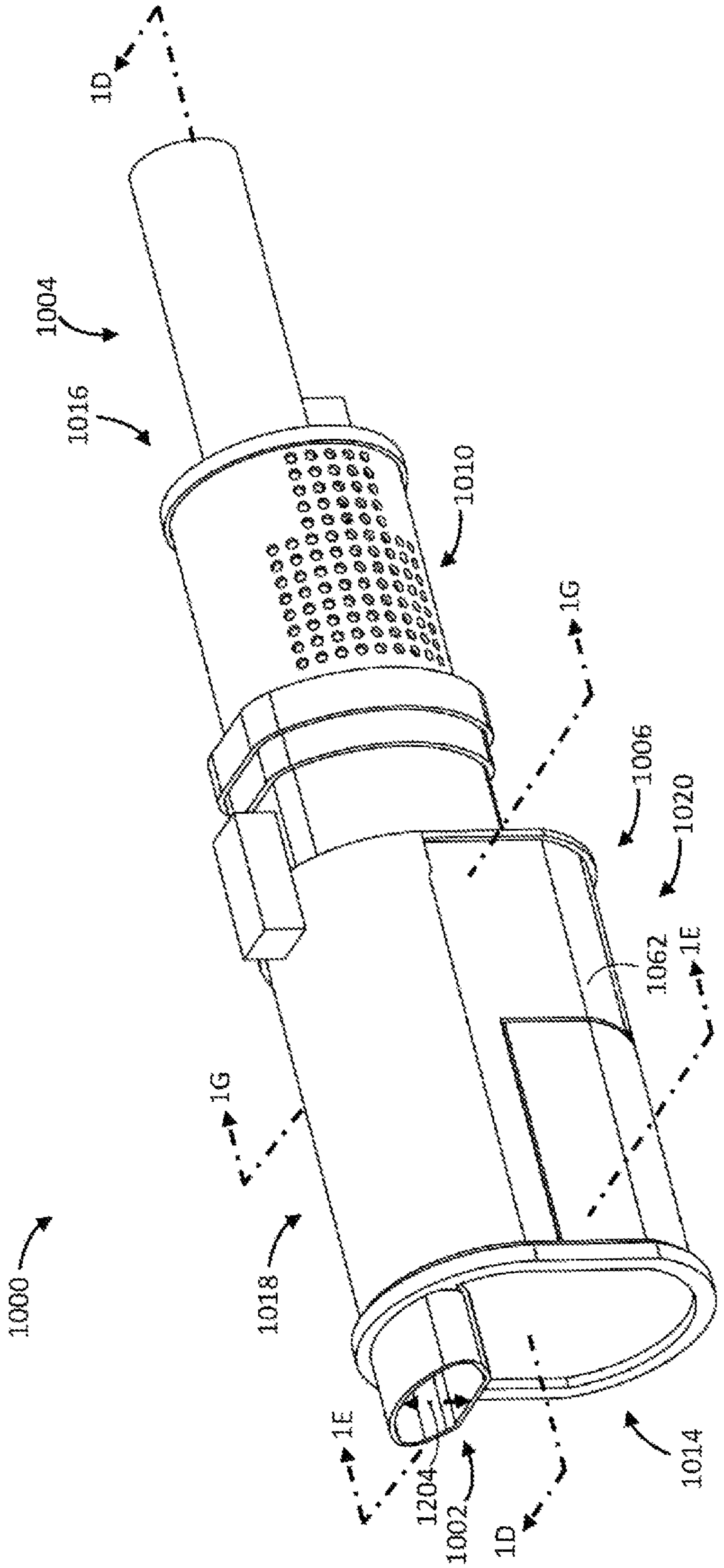
FIG. 1A is a front perspective view of a hand vacuum cleaner.
Figure 1B:
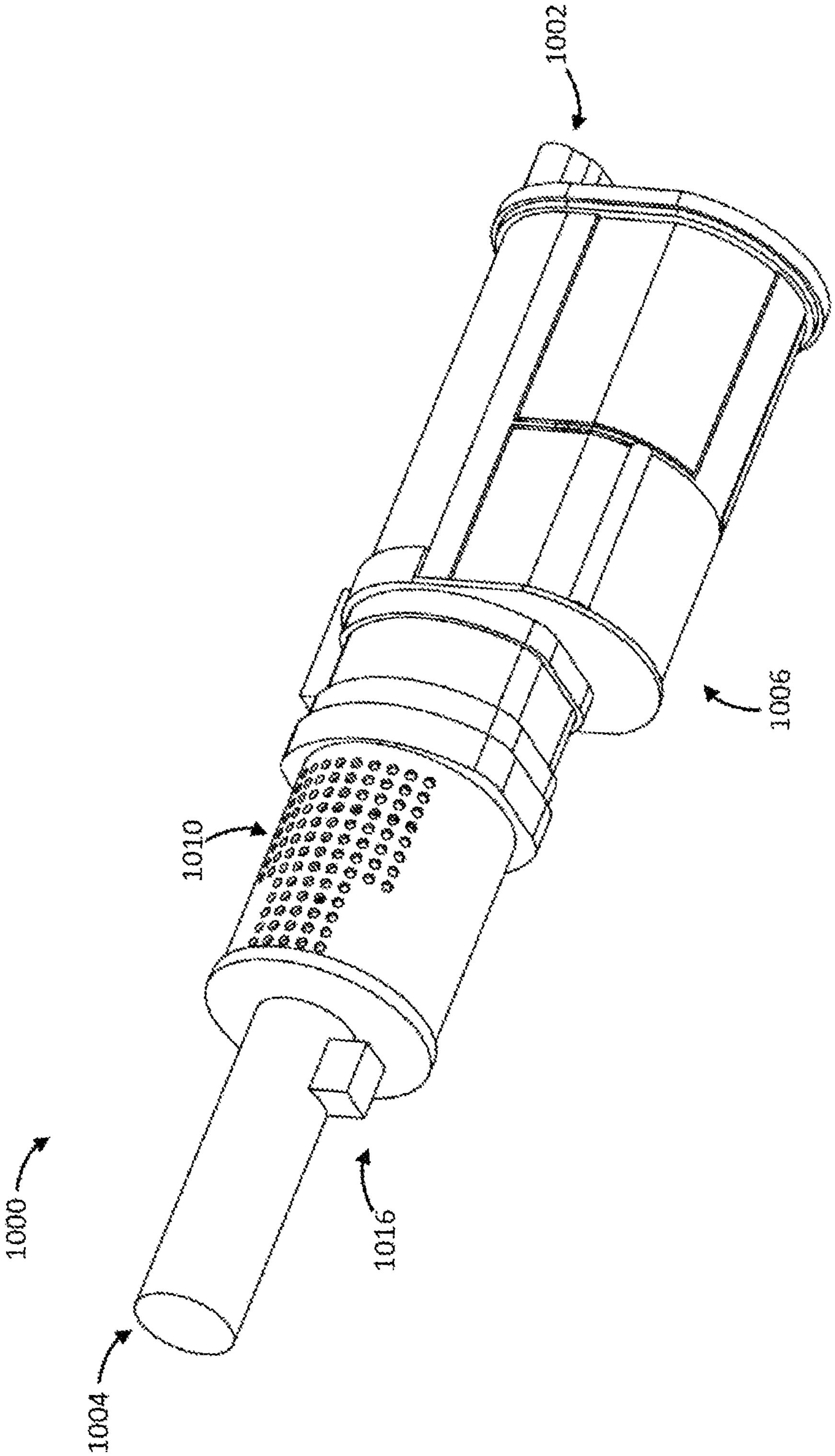
FIG. 1B is a rear perspective view of the hand vacuum cleaner of FIG. 1A.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments" "one or more embodiments" "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of a Surface Cleaning Apparatus

Referring to the Figures, exemplary embodiments of a surface cleaning apparatuses are shown. The following is a general discussion of surface cleaning apparatuses which provides a basis for understanding several of the features which are discussed herein. As discussed subsequently, each of the features may be used individually or in any particular combination or sub-combination in this or in other embodiments disclosed herein.

In the illustrated embodiments, the surface cleaning apparatus is a hand vacuum cleaner 1000, which may also be referred to also as a "handvac" or "hand-held vacuum cleaner". As used herein, a hand vacuum cleaner 1000 is a surface cleaning apparatus that can be operated to clean a surface generally one-handedly. That is, the entire weight of the hand vacuum cleaner 1000 may be held by the same one hand used to direct a dirty air inlet 1002 of the hand vacuum cleaner 1000 with respect to a surface to be cleaned. For example, the handle 1004 and the dirty air inlet 1002 may be rigidly coupled to each other (directly or indirectly) so as to move as one while maintaining a constant orientation relative to each other. This is to be contrasted with, for example, canister and upright vacuum cleaners, whose weight is typically supported by a surface (e.g., a floor) during use.

While the illustrated embodiments depict examples hand vacuum cleaners 1000, it is to be understood that many of the features described herein may relate to, and be used with non-hand vacuum cleaners, such as, for example, canister vacuum cleaners, upright vacuum cleaners, stick vacuum cleaners, all-in-head vacuum cleaners, carpet extractors, wet/dry vacuum cleaner, etc.

As exemplified in FIGS. 1A-1H, a surface cleaning apparatus may include a main body 1006, a handle 1004, an air treatment member 1008, a dirty air inlet 1002, a clean air outlet 1010, and an air flow path extending between the dirty air inlet 1002 and the clean air outlet 1010. The air treatment member 1008 is positioned in the air flow path between the dirty air inlet 1002 and the clean air outlet 1010.

As shown, the main body 1006 of the surface cleaning apparatus has a front end 1014, a rear end 1016, an upper end 1018 (i.e., top end), and a lower end 1020 (i.e., bottom end). As exemplified in the embodiment shown in FIG. 1A, the dirty air inlet 1002 may be at the upper end 1018 of the front end 1014 of the main body 1006 and the clean air outlet 1010 may be positioned intermediate the front end 1014 and the rear end 1016, or alternately at the rear end. It will be appreciated that the dirty air inlet 1002 and the clean air outlet 1010 may be provided in different locations.

A suction motor 1022 (i.e., motor and fan assembly) (see e.g., FIG. 1D) is provided within the main body 1006 to generate vacuum suction through the air flow path and may be positioned within a motor housing 1024. In the example illustrated, the suction motor 1022 is positioned downstream from the air treatment member 1008, although it may be positioned upstream of the air treatment member 1008 (e.g., a dirty air motor) in alternative embodiments. As exemplified, the motor housing 1024 may form part of the exterior surface of the hand vacuum cleaner.

The air treatment member 1008 is configured to remove particles of dirt and other debris from the airflow and/or otherwise treat the airflow. Any air treatment member 1008 known in the art may be used. As exemplified, the air treatment member 1008 may include an air treatment chamber 1044 and a dirt collection chamber 1032 that is external to the air treatment chamber 1044. Dirty air may enter the air treatment chamber 1044 via an air treatment chamber air inlet 1046 and exit the air treatment chamber 1044 as relatively cleaner air via an air treatment chamber air outlet 1048.

Figure 1C:
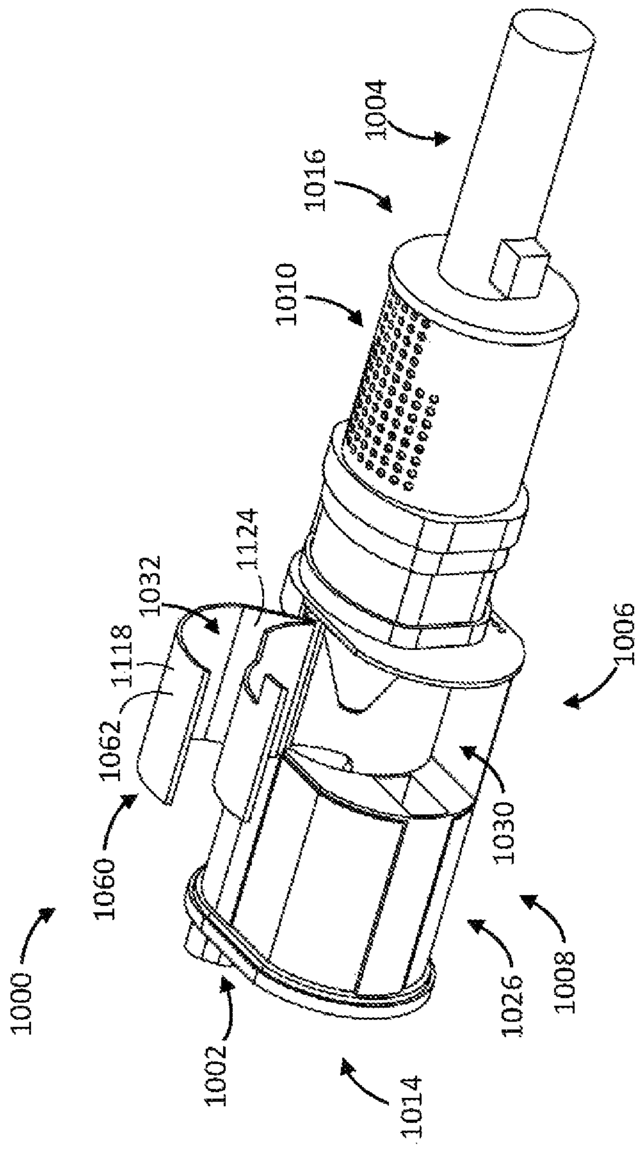
FIG. 1C is a bottom perspective view of the hand vacuum cleaner of FIG. 1A, shown with an openable portion in an open position.
Figure 1D:
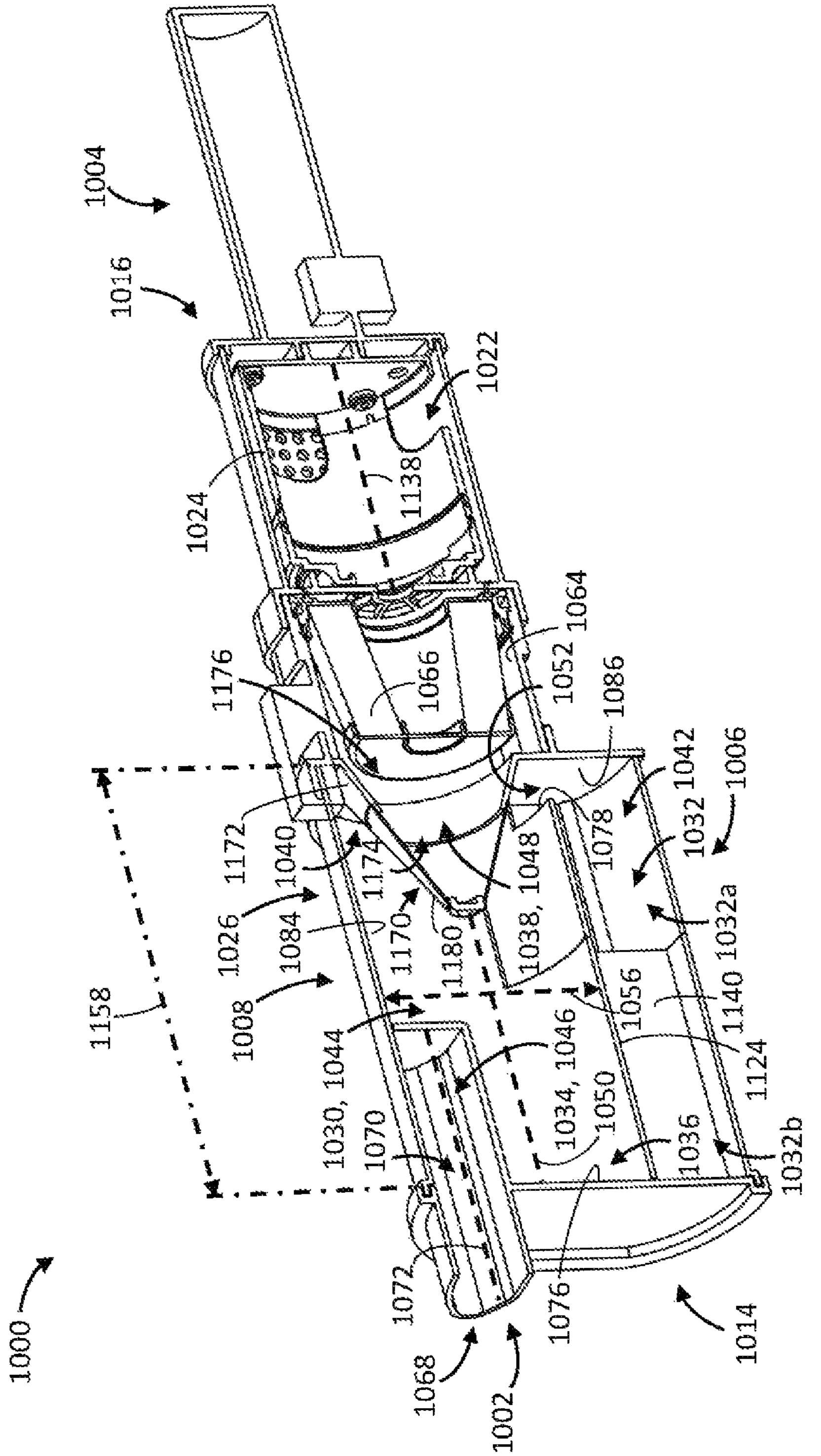
FIG. 1D is a cross-sectional view of the hand vacuum cleaner of FIG. 1A, taken along line 1D-1D.

In the example illustrated in FIG. 1D, the air treatment member 1008 is a cyclone assembly 1026 having a single cyclone chamber 1032 and a dirt collection chamber 1032 external to the cyclone chamber 1030 (i.e., a single cyclonic cleaning stage). The cyclone chamber 1030 and dirt collection chamber 1032 may be of any configuration suitable for separating debris from an air flow and collecting the separated debris, respectively. In the example shown in FIG. 1D, the cyclone chamber 1030 is a uniflow cyclone (i.e., a cyclone with a unidirectional flow of air). As exemplified, a uniflow cyclone may have a cyclone air inlet 1034 at a first end (front end 1036 in the example illustrated) of the cyclone chamber 1030 and a cyclone chamber air outlet 1038 at an opposite end (rear end 1040 in the example illustrated) of the cyclone chamber 1030. In other examples, the cyclone chamber 1030 may not be a uniflow, and the cyclone air inlet 1034 and the cyclone chamber air outlet 1038 may be provided at the same end of the cyclone chamber 1030. It will also be appreciated that separated dirt may be collected in a dirt collection region that is contiguous with the cyclone chamber.

The cyclone chamber 1030 may be oriented in any direction. For example, when surface cleaning apparatus is oriented with the upper end 1018 above the lower end 1020, e.g., positioned generally parallel to a horizontal surface, a central axis 1050, or axis of rotation, of the cyclone chamber 1030 may be oriented horizontally, as exemplified in FIG. 1D. In alternative embodiments, the cyclone chamber 1030 may be oriented vertically, or at any angle between horizontal and vertical.

In alternative embodiments, the cyclone assembly 1026 may include two or more cyclonic cleaning stages arranged in series with each other. Each cyclonic cleaning stage may include one or more cyclone chambers 1030 (arranged in parallel or series with each other) and one or more dirt collection chambers 1032 of any suitable configuration. The dirt collection chamber(s) 1032 may be external to the cyclone chamber(s) 1030 or may be internal the cyclone chamber(s) 1030 (i.e., configured as a dirt collection area or region 1032 within the cyclone chamber(s)). It will be appreciated that an air treatment assembly may have two or more stages, each of which may use one or more air treatment chambers.

Optionally, the external dirt collection chamber(s) 1042 may be positioned radially outward from the air treatment chamber 1044 of the air treatment member 1008. A dirt outlet may connect the air treatment chamber 1044 to the dirt collection chamber 1032. In the example illustrated in FIG. 1D, the external dirt collection chamber 1042 is positioned radially outward from the cyclone chamber 1030. As shown, when the dirt collection chamber(s) 1032 are external to the cyclone chamber(s) 1042, a dirt outlet 1052 or dirt outlets may fluidically connect the cyclone chamber(s) 1030 with the external dirt collection chamber(s) 1042.

Alternatively, the air treatment chamber 1044 of the air treatment member 1008 may not be a cyclonic cleaning stage. Such a non-cyclonic stage may be a non-cyclonic air treatment chamber or it may incorporate a bag, a porous physical filter media (such as foam or felt), or other air treating means. A combination of non-cyclonic and cyclonic treatment members may be used.

The air treatment member 1008 may include an openable portion 1060 that is moveable between an open position and a closed position. The openable portion 1060 may, when in the open position, facilitate discharge of debris separated from the air flow by the air treatment member therefrom; and/or urge debris that may be compacted within the air treatment member 1008 to dislodge therefrom when moving from the closed position to the open position. The openable portion 1060 may include a portion of an exterior surface 1062 of the main body 1006 of the surface cleaning apparatus so opening the openable portion 1060 may facilitate discharge of debris from the surface cleaning apparatus. Various configurations of the openable portion 1060 are described in more detail subsequently.

As exemplified in FIG. 1D, the hand vacuum cleaner 1000 may include a pre-motor filter 1066. The pre-motor filter may be provided in a pre-motor filter housing 1064 provided in the air flow path downstream of the air treatment member 1008 and upstream of the suction motor 1022. The pre-motor filter housing 1064 may be of any suitable construction known in the art. A pre-motor filter 1066 may be positioned within the pre-motor filter housing 1064. The pre-motor filter 1066 may have a front end 1054 and a rear end 1058. The pre-motor filter 1066 may be formed from any suitable physical, porous filter media and have any suitable shape. For example, the pre-motor filter 1066 may be one or more of a foam filter, felt filter, HEPA filter, other physical filter media, electrostatic filter, and the like.

Optionally, the pre-motor filter housing 1064 may be openable to provide access to the interior of the pre-motor filter housing 1064.

The hand vacuum cleaner 1000 may also include a post-motor filter (not shown) provided in the air flow path downstream of the suction motor 1022 and upstream of the clean air outlet 1010. The post-motor filter may be formed from any suitable physical, porous filter media and having any suitable shape. The post-motor filter may be any suitable type of filter such as one or more of a foam filter, felt filter, HEPA filter, other physical filter media, electrostatic filter, and the like.

Still referring to FIG. 1D, in the example illustrated, the dirty air inlet 1002 of the surface cleaning apparatus is the inlet end 1068 of an inlet conduit 1070 provided at the front end 1014 of the surface cleaning apparatus. Optionally, inlet end 1068 of the inlet conduit 1070 can be used as a nozzle to directly clean a surface. The inlet conduit 1070 is, in this example, a generally linear hollow conduit that extends along an inlet conduit axis 1072 that is oriented in a longitudinal forward/backward direction and is generally horizontal when the hand vacuum cleaner 1000 is oriented with the upper end 1018 above the lower end 1020. Alternatively, or in addition to functioning as a nozzle, the inlet conduit 1070 may be connected or directly connected to the downstream end of any suitable accessory tool such as, for example, a rigid air flow conduit (e.g., an above floor cleaning wand), a crevice tool, a mini brush, and the like. As shown, the dirty air inlet 1002 is positioned forward of the air treatment member 1008, although this need not be the case.

As exemplified, power may be supplied to the suction motor 1022 and other electrical components of the hand vacuum cleaner 1000 from an onboard energy storage member 1074 which may include, for example, one or more batteries, capacitors or other energy storage devices. Optional battery positions and types are described subsequently in further detail herein. In alternative embodiments, in addition to the energy storage member 1074 or instead of the energy storage member 1074, power may be supplied to the hand vacuum cleaner 1000 by an electrical cord connected to the hand vacuum cleaner 1000 (not shown) and that can be connected to a standard wall electrical outlet.

A power switch (not shown) may be provided to selectively control the operation of the motor and fan assembly 1022 (e.g., either on/off or variable power levels or both), for example by establishing a power connection between the energy storage member 1074 and the motor and fan assembly 1022. The power switch may be provided in any suitable configuration and location, including a button, rotary switch, sliding switch, trigger-type actuator and the like. The power switch or an alternate controller may also be configured to control other aspects of the hand vacuum cleaner 1000 (brush motor on/off, etc.).

The Openable Portion

In accordance with this aspect of this disclosure, which may be used by itself or in combination with one or more other aspects of this disclosure, the air treatment member 1008 of the surface cleaning apparatus may include an openable portion 1060.

The openable portion 1060 is movable between a first position (i.e., an open position) and a second position (i.e., a closed or operating or cleaning position). In some examples, when the openable portion 1060 is in the open position, debris separated from the air flow by the air treatment member 1008 may be discharged out from the air treatment member 1008 through the openable portion 1060. In the closed position, the openable portion 1060 may close the air treatment member 1008 for efficient operation of the air treatment member 1008. Optionally, the openable portion 1060 includes a portion of the exterior surface 1062 of the main body 1006 so that opening of the openable portion 1060 may facilitate discharge of debris from the surface cleaning apparatus and into, for example, a garbage bin.

Movement of the openable portion 1060 from the closed position to the open position may urge debris, which may have collected and may have compacted within corners and small openings within the air treatment member 1008, to dislodge by moving one of the walls that forms the corner with respect to another wall that forms the corner and/or moving one portion of the perimeter of an opening (e.g., dirt outlet) with respect to another portion of the opening. By separating walls that form a corner and/or moving a portion of a wall that defines a dirt outlet, compacted dirt, such as dirt that partially or fully bridges a dirt outlet, may be loosened and may therefore fall out under the influence of gravity when the openable portion is opened. In contrast, in known devices, operators may often be required to repeatably strike the surface cleaning apparatus, in particular the dirt collection chamber, to loosen and discharge the compacted collected debris.

An advantage of this aspect is that compacted debris which may impede air flow through the air treatment member 1008, and which may therefore lead to a decrease in cleaning efficiency (i.e., the ability to separate debris from an airflow and/or energy required to operate the surface cleaning apparatus), may be more easily removed.

For example, over time, the dirt outlet 1052 or an air treatment chamber may tend to clog with compacted debris. Movement of the openable portion 1060 from the closed position to the open position may cause a wall forming part, but not all, of the perimeter of the dirt outlet 1052 to move with respect to the rest of the perimeter of the dirt outlet, thereby opening the dirt outlet 1052, which may urge the compacted debris which may partially bridge the dirt outlet 1052 to be dislodged from the dirt outlet 1052.

It will be appreciated that a cleaning member may be provided which may moveable, e.g., axially or towards the opening when the openable portion 1060 is open, to assist is removing debris from the air treatment member 1008.

Operation of the Openable Portion

In accordance with this aspect of this disclosure, which may be used by itself or in combination with one or more other aspects of this disclosure, if an openable portion is provided, then the openable portion 1060 may move between the closed position and the open position by any means known in the art.

For example, to open the dirt outlet 1052, the perimeter 1078 of the dirt outlet 1052 may be increased in size; and/or a wall defining a portion of the perimeter 1078 may be displaced, thereby opening the perimeter 1078.

Figure 1E:
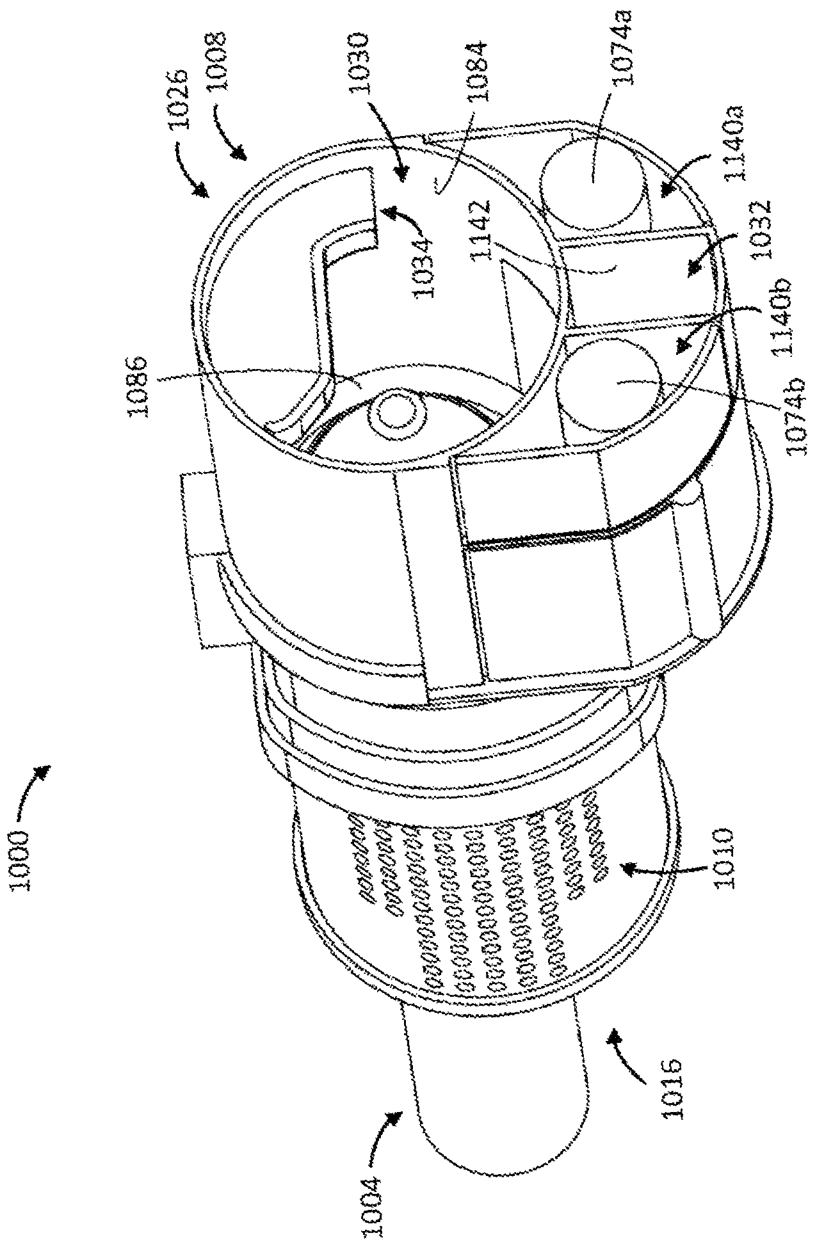
FIG. 1E is a cross-sectional view of the hand vacuum cleaner of FIG. 1A, taken along line 1E-1E, shown with an openable portion in a closed position.
Figure 5A:
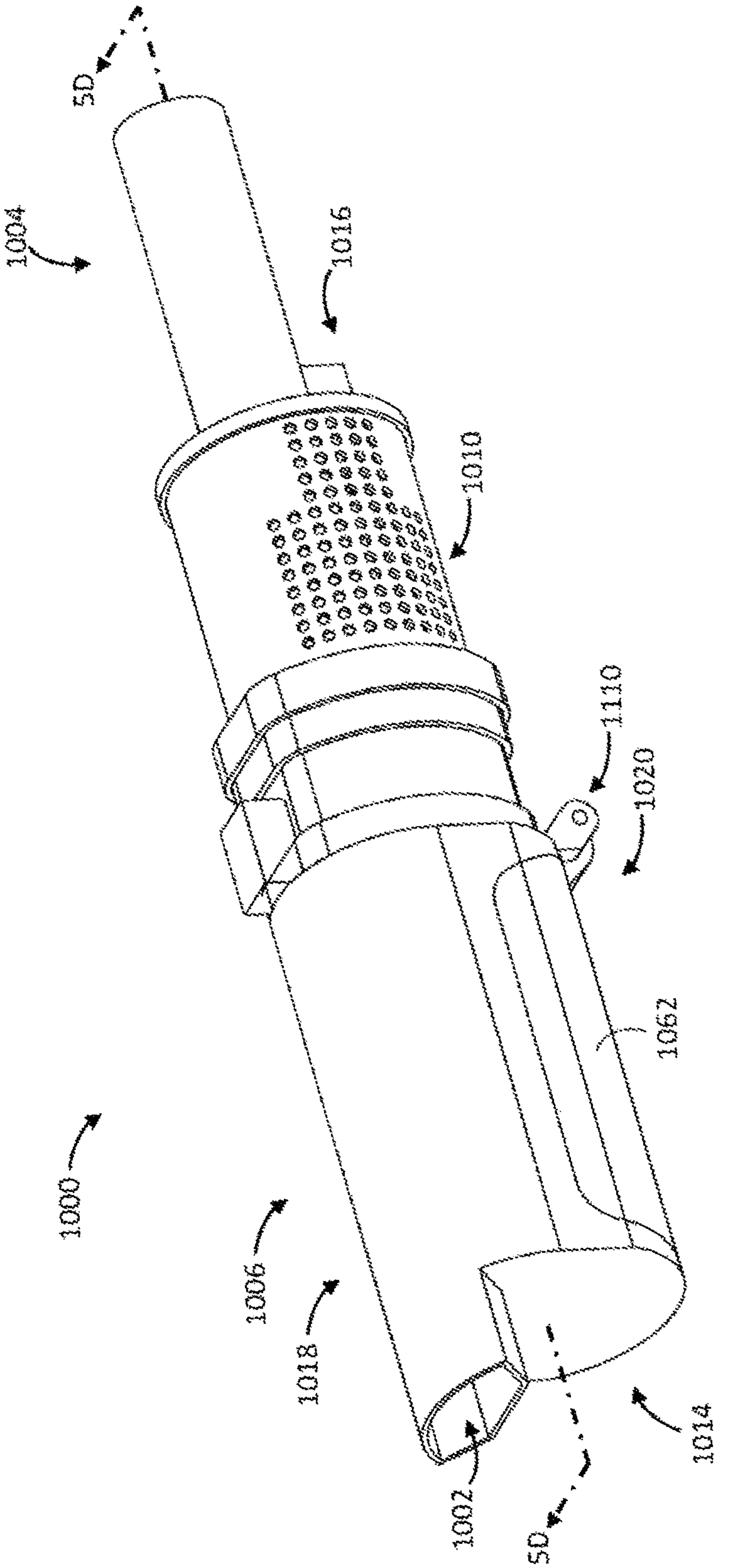
FIG. 5A is a front perspective view of another example of a hand vacuum cleaner.
Figure 5B:
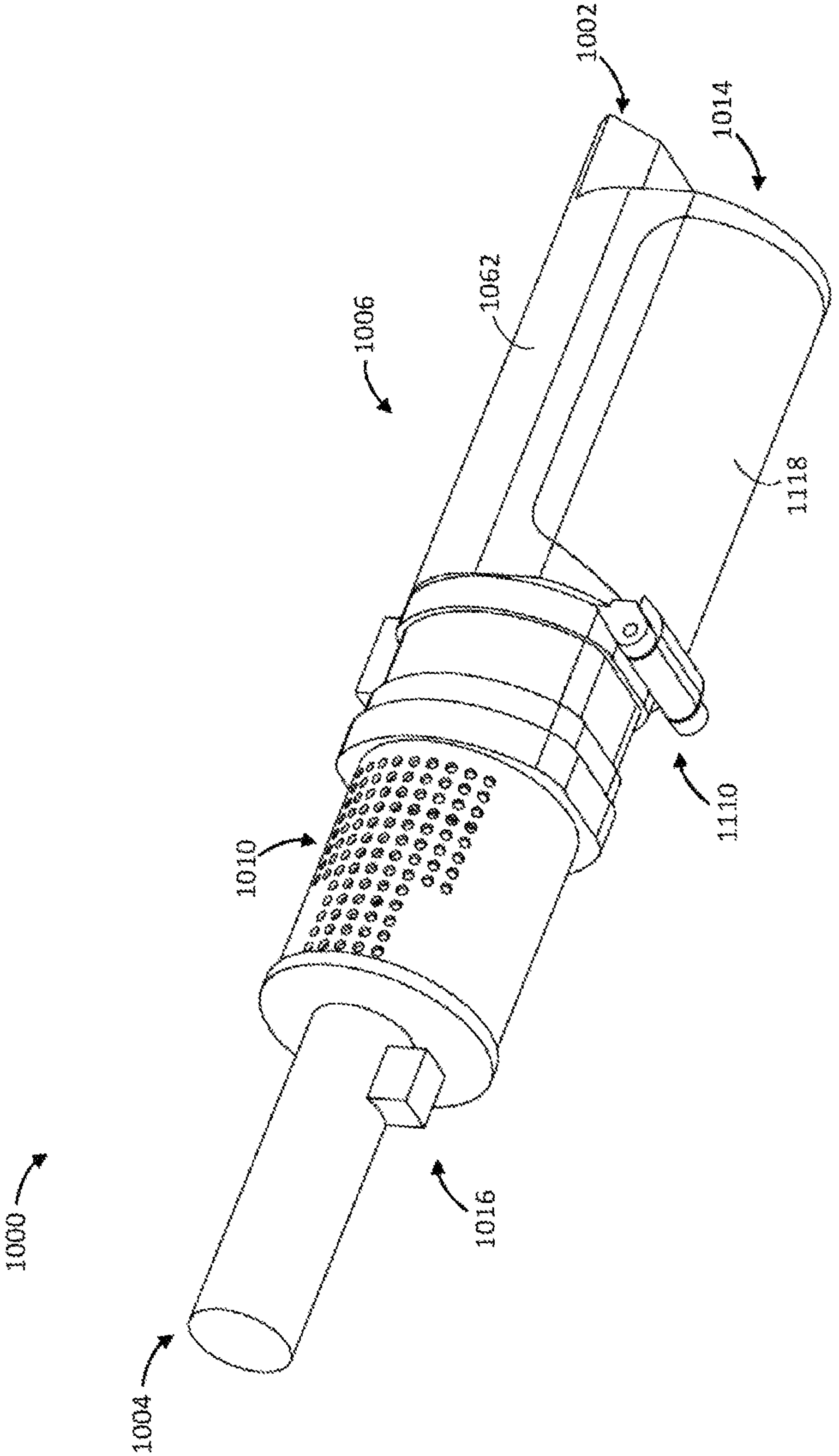
FIG. 5B is a rear perspective view of the hand vacuum cleaner of FIG. 5A.
Figure 5C:
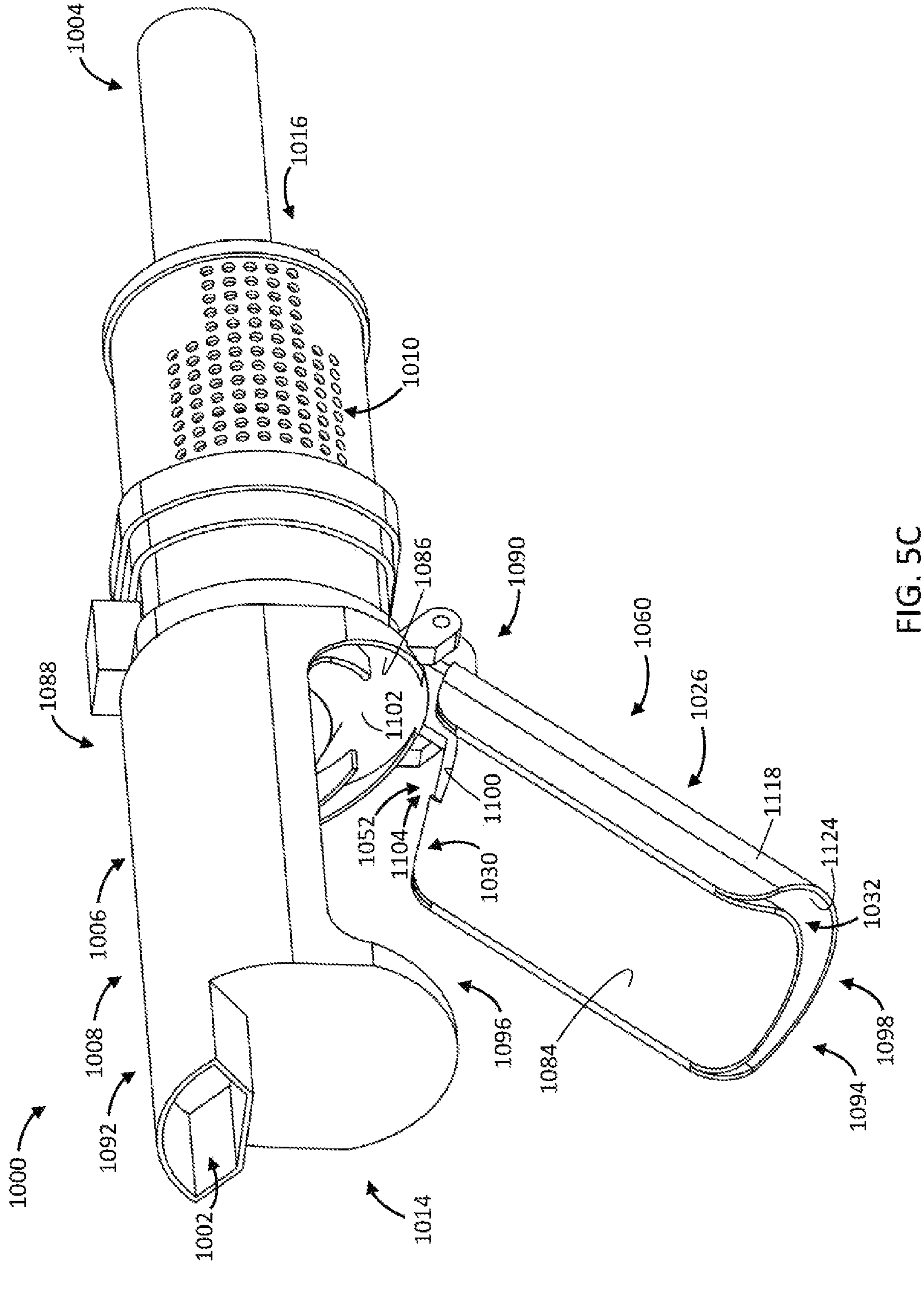
FIG. 5C is a perspective view of the hand vacuum cleaner of FIG. 5A, shown with an openable portion in an open position.
Figure 5D:
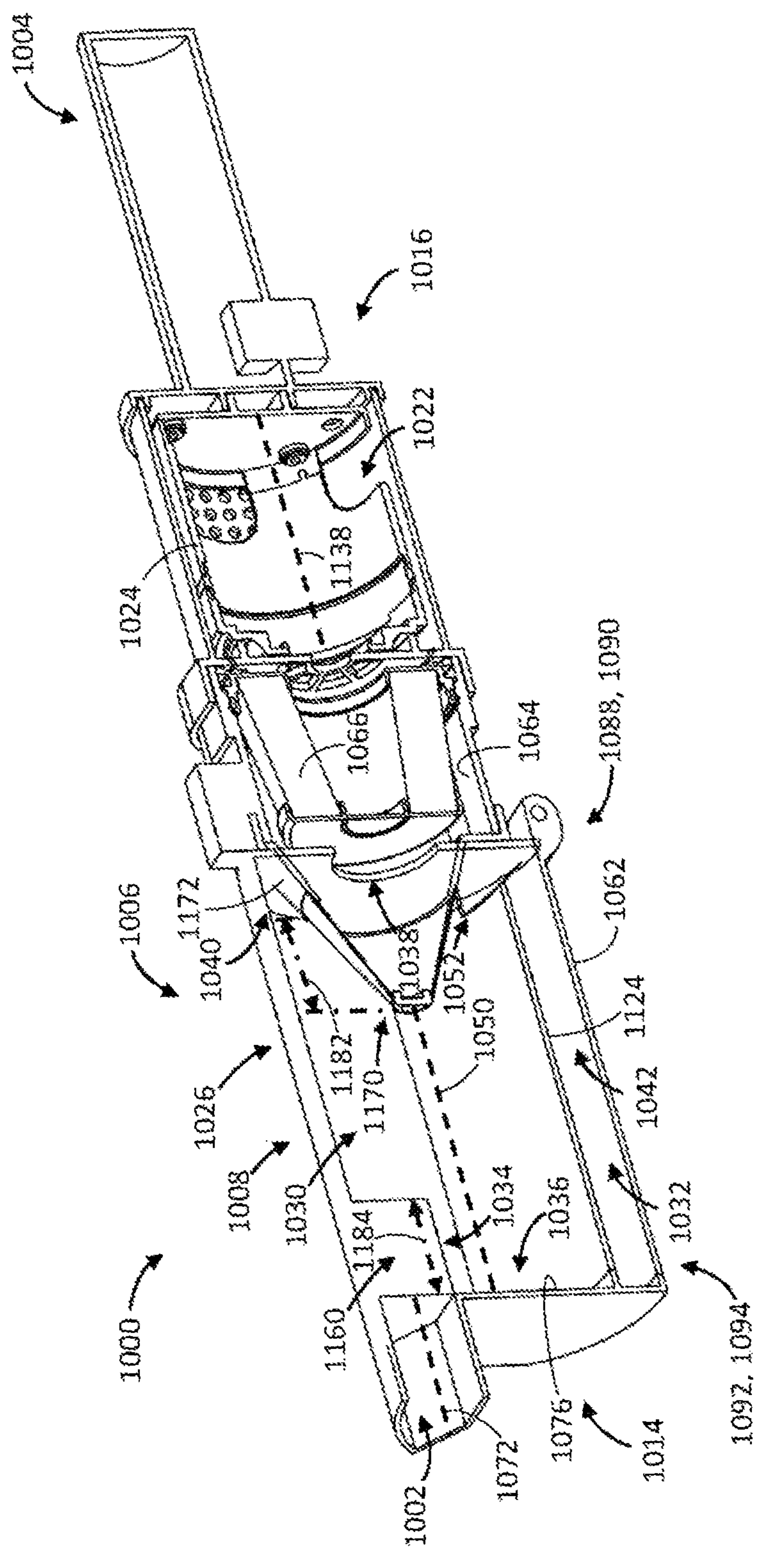
FIG. 5D is a cross-sectional view of the hand vacuum cleaner of FIG. 5A, taken along line 5D-5D, shown with an openable portion in a closed position.
Figure 5E:
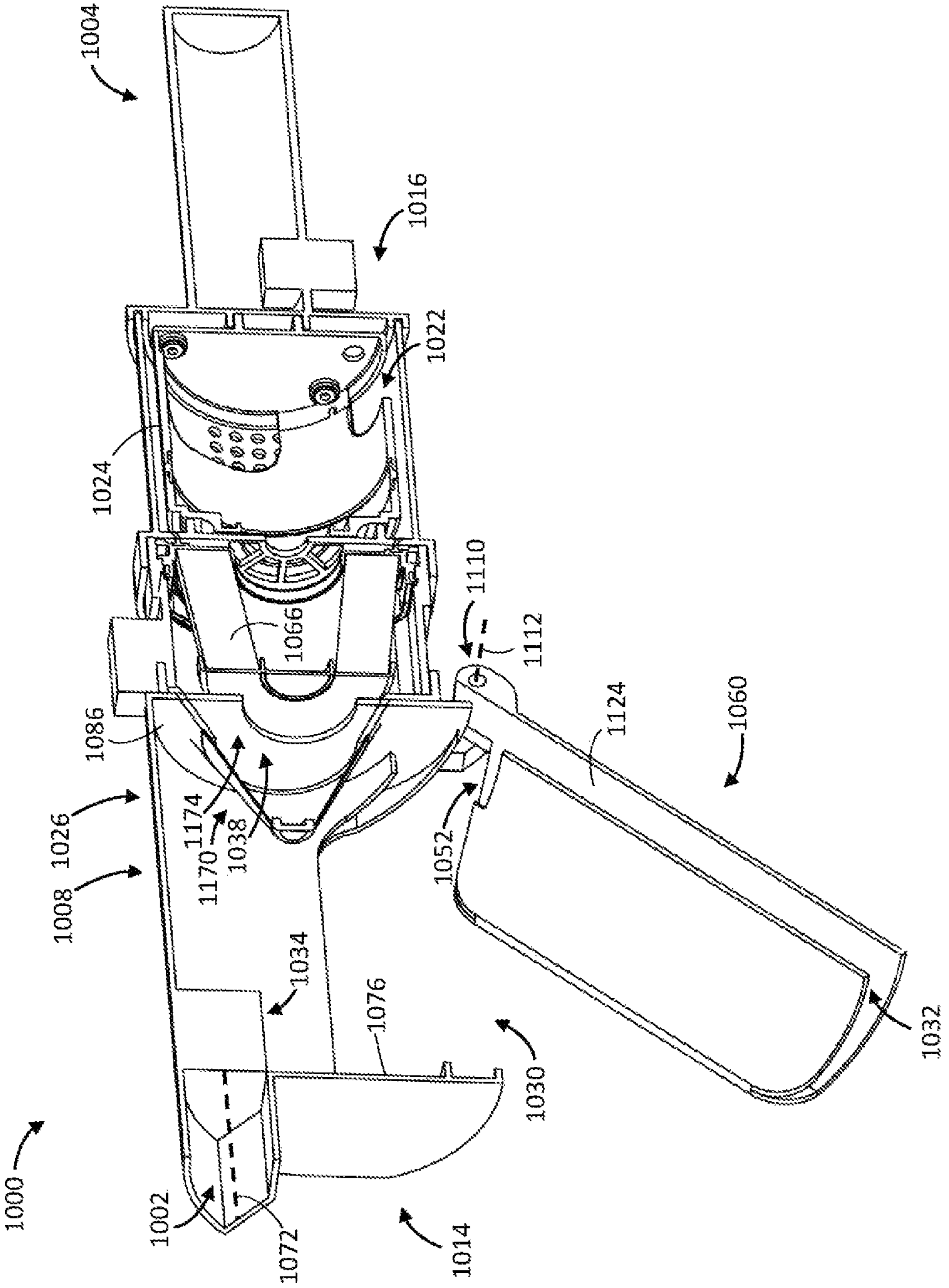
FIG. 5E is a cross-sectional view of the hand vacuum cleaner of FIG. 5A, taken along line 5D-5D, shown with an openable portion in an open position.
Figure 6A:
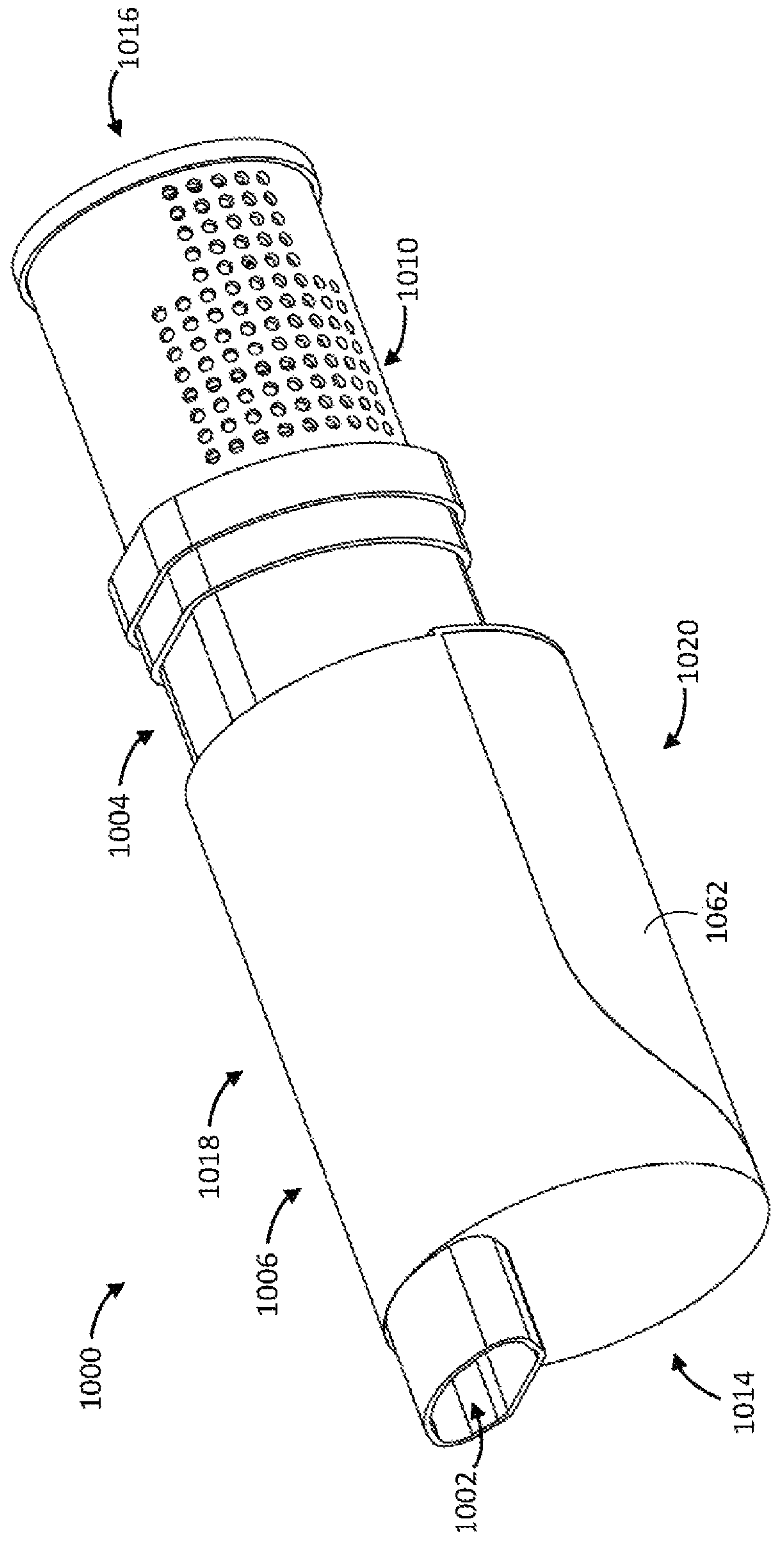
FIG. 6A is a front perspective view of another example of a hand vacuum cleaner.
Figure 6B:
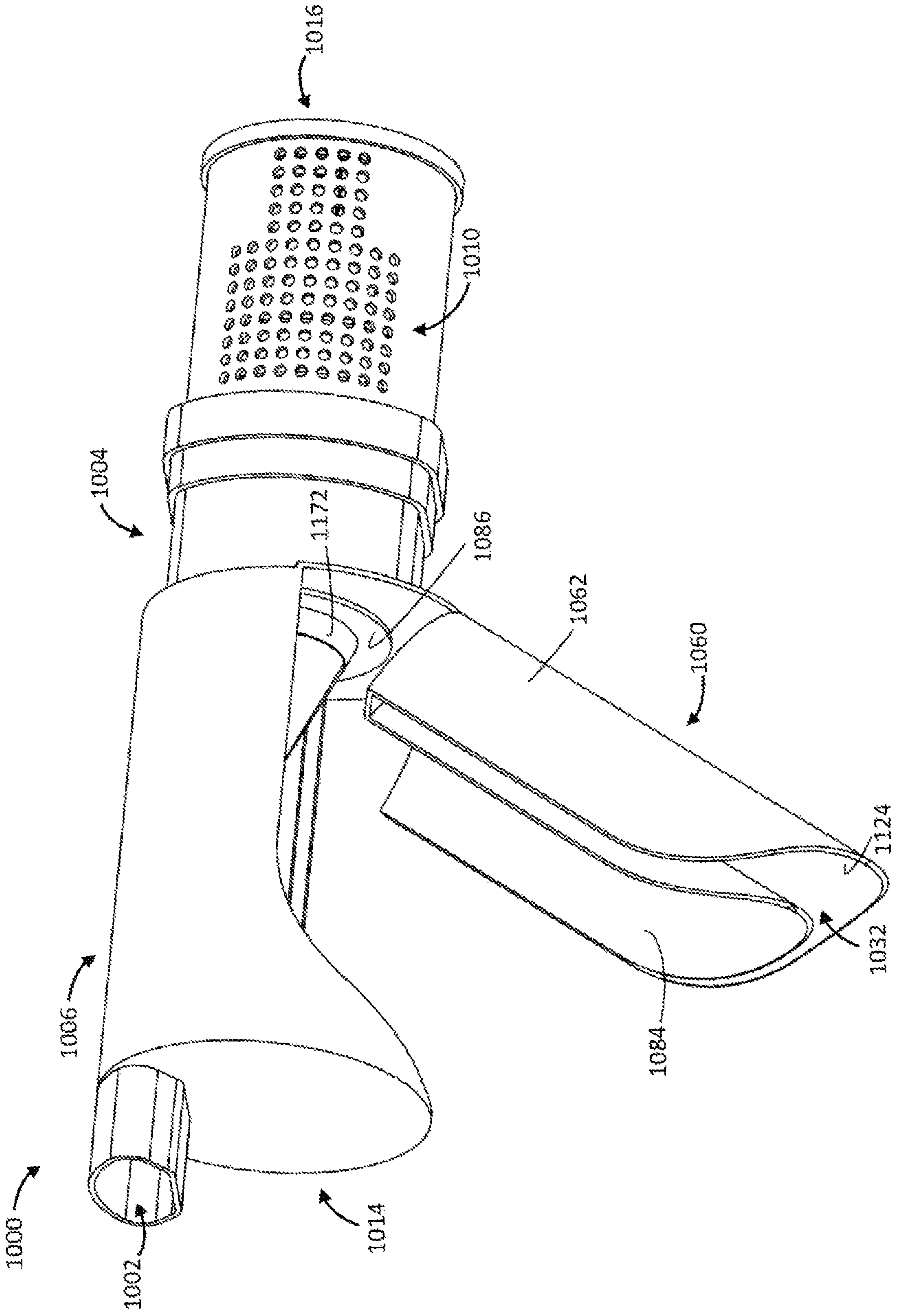
FIG. 6B is a front perspective view of the hand vacuum cleaner of FIG. 6A, shown with an openable portion in an open position.
Figure 6C:
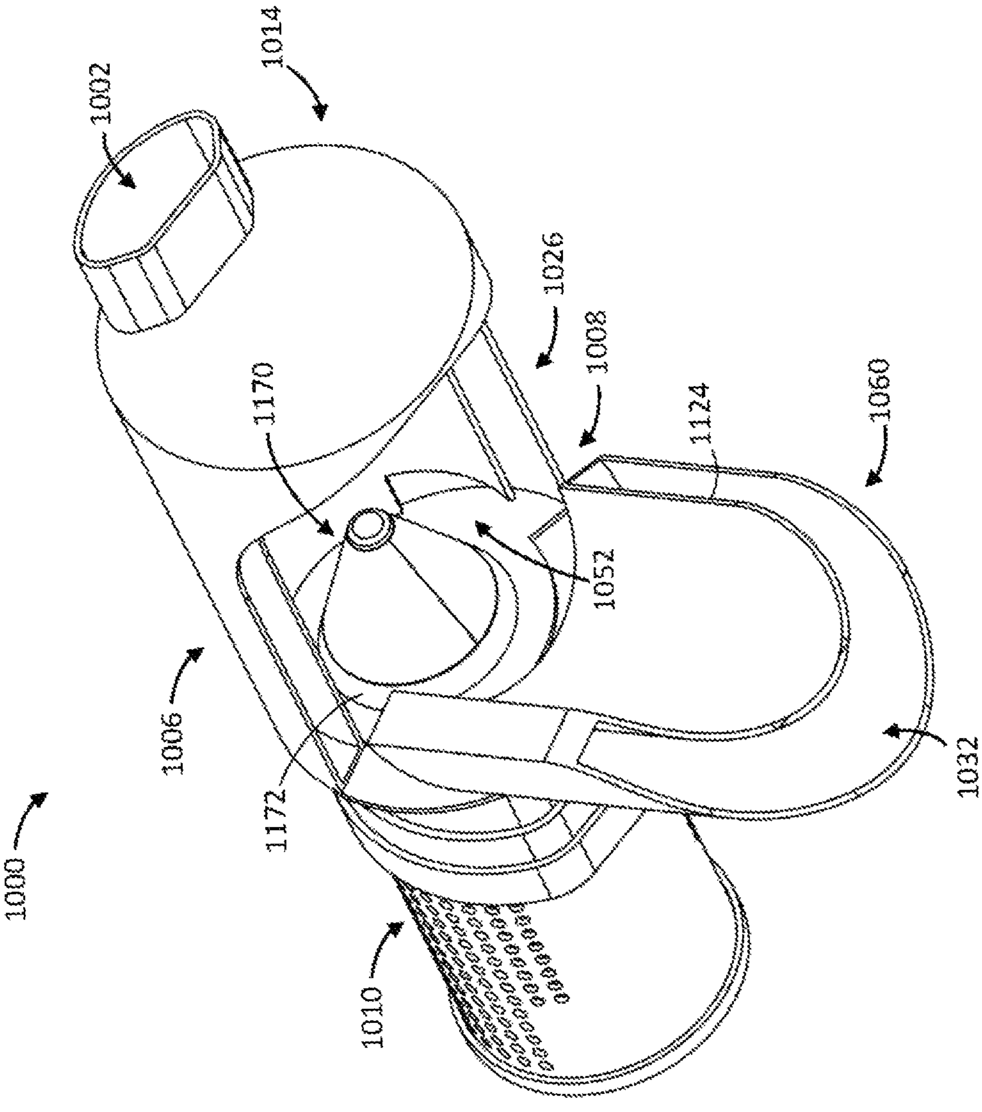
FIG. 6C is a front bottom perspective view of the hand vacuum cleaner of FIG. 6A, shown with an openable portion in an open position.
Figure 8A:
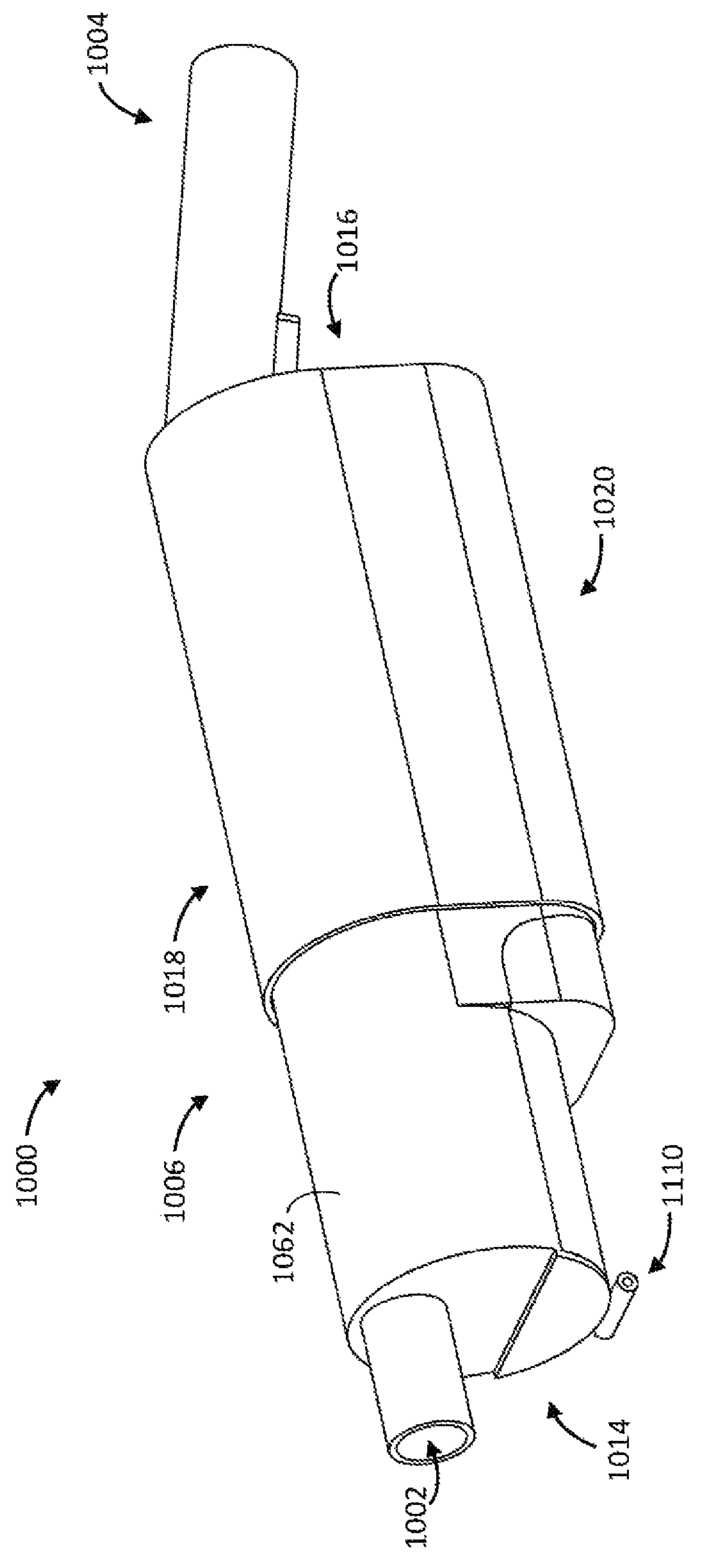
FIG. 8A is a front perspective view of another example of a hand vacuum cleaner.
Figure 8B:
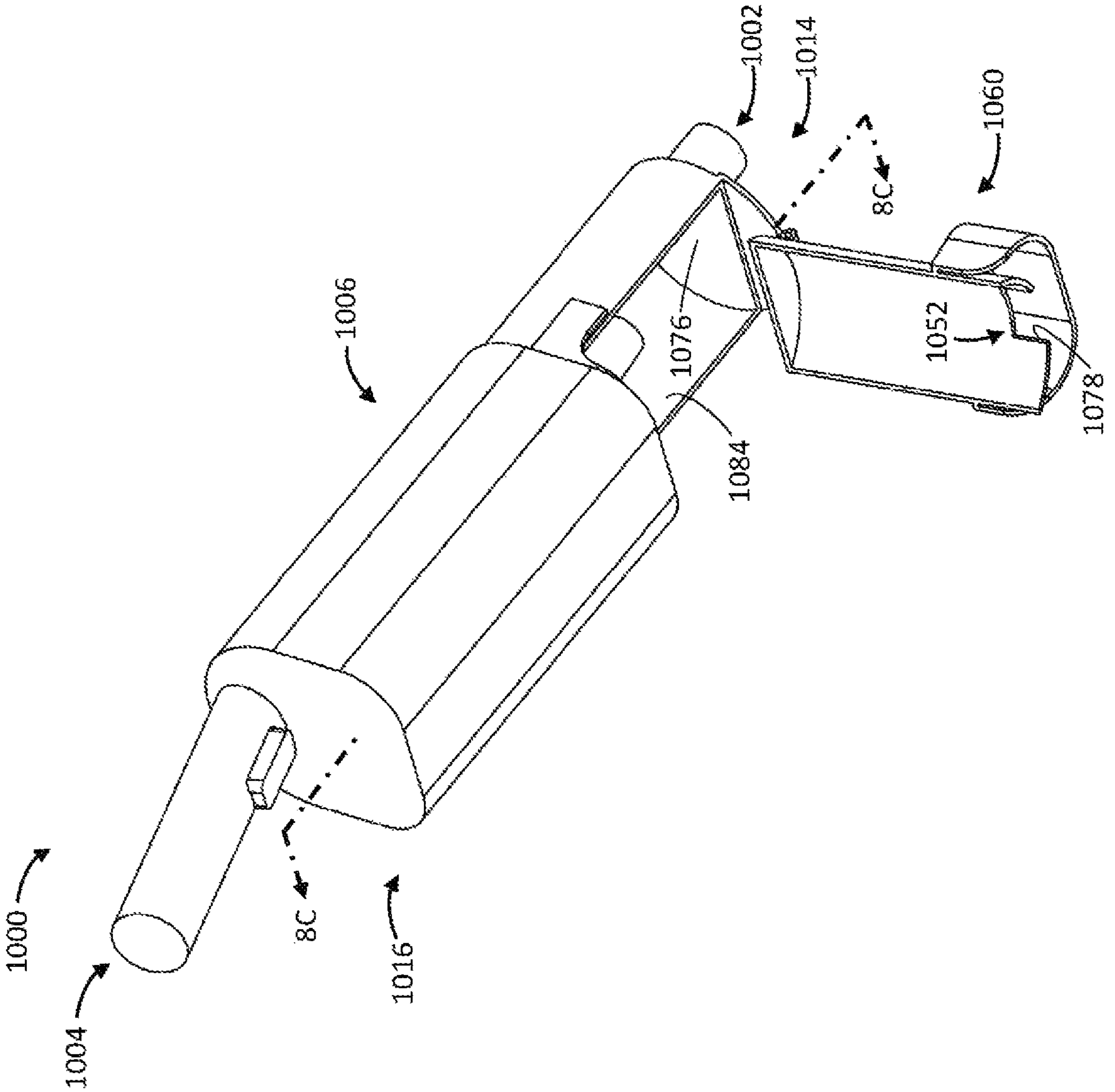
FIG. 8B is a perspective view of the hand vacuum of FIG. 8A, shown with an openable portion in an open position.
Figure 8C:
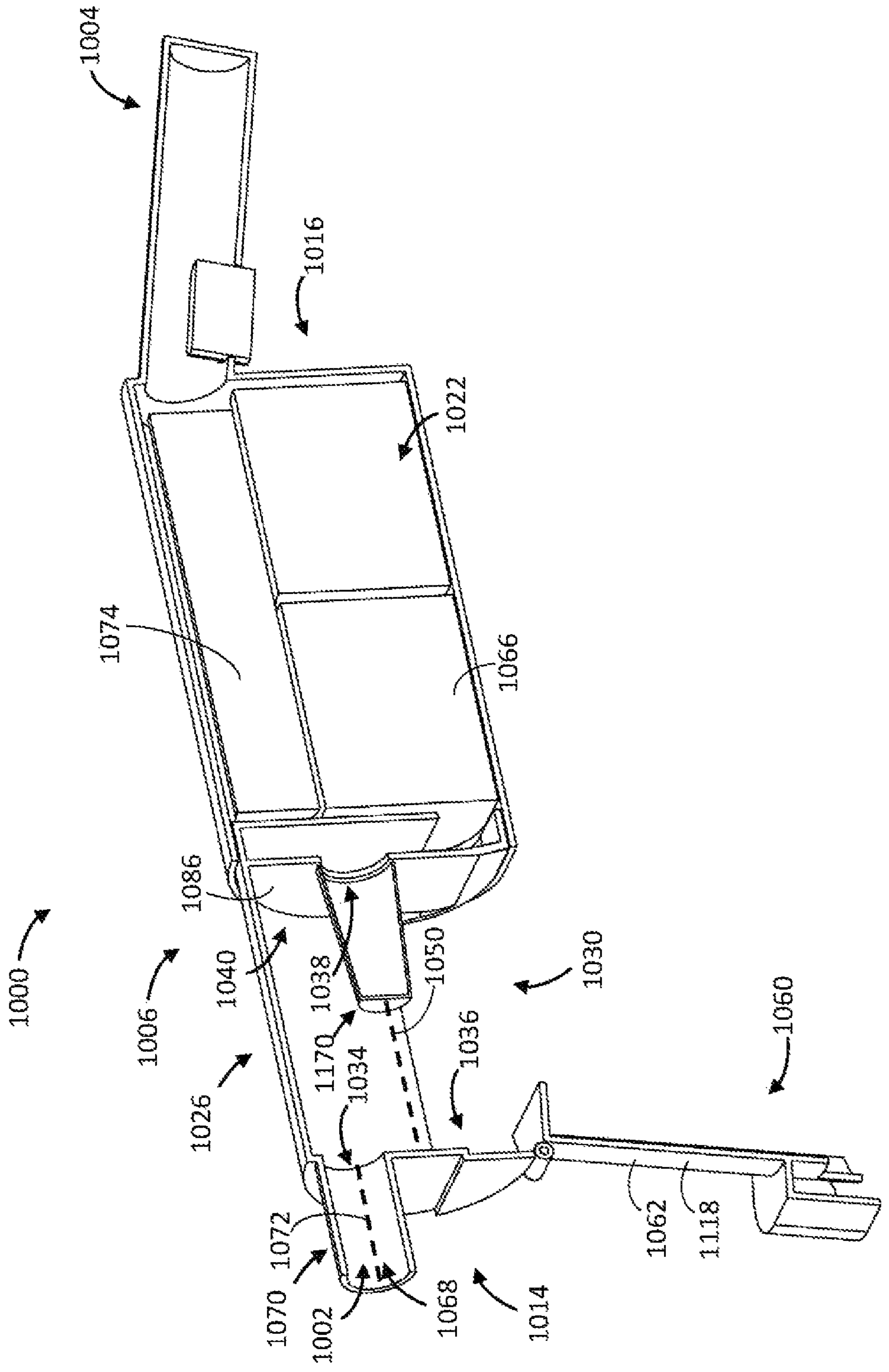
FIG. 8C is a cross-sectional view of the hand vacuum cleaner of FIG. 8B, taken along line 8C-8C.
Figure 9:
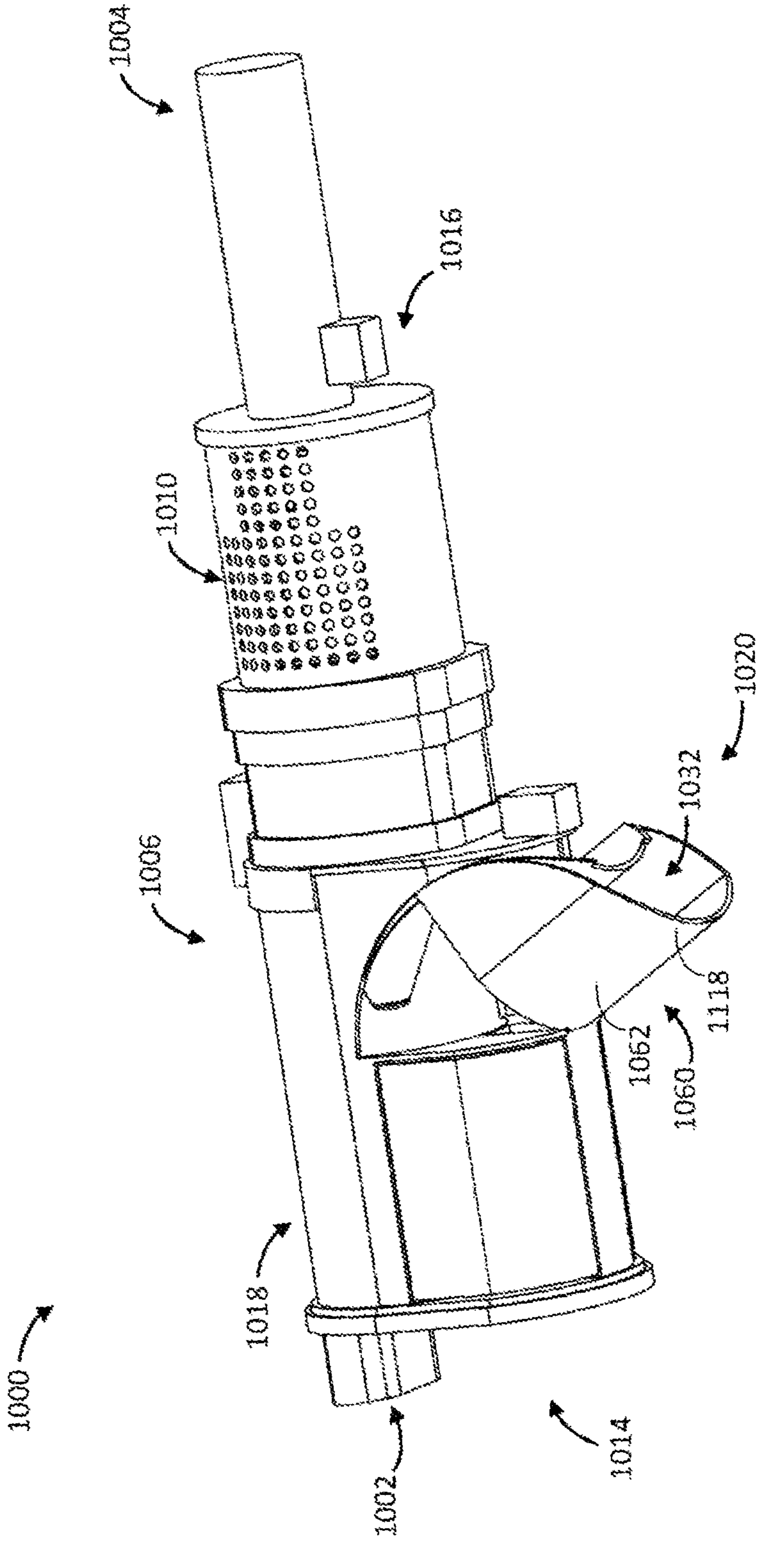
FIG. 9 is a perspective view of another example of a hand vacuum cleaner, shown with an openable portion in an open position.

FIGS. 5D and 8C exemplify a first example wherein the dirt outlet 1052 may have a perimeter 1078 defined by a portion of the cyclone sidewall 1084 and a portion of the cyclone chamber rear end wall 1086 (it is to be understood that a portion of the perimeter 1078 of the dirt outlet 1052 is not shown as this is a cross-sectional view). As exemplified, the cyclone chamber rear end wall 1086 is a rear end wall of the air treatment member. As exemplified, the dirt outlet 1052 may be an opening in the cyclone chamber sidewall 1084, the dirt outlet 1052 may have a perimeter 1078, and the cyclone chamber sidewall 1084 may only include part of the perimeter 1078 of the dirt outlet 1052. As shown in FIGS. 1C and 1H, when the openable portion 1060 is moved to the open position, the dirt outlet 1052 is opened. More specifically, a portion the cyclone chamber sidewall 1084 (i.e., sidewall 1084 of the air treatment chamber 1044) containing the dirt outlet 1052 rotates away from the rear end wall 1086 which, when the openable portion 1060 is closed, defines a portion of the perimeter 1078 of the dirt outlet 1052. Accordingly, as shown, the dirt outlet 1052 may be opened when the openable portion 1060 is moved to the open position.

As a second example, referring now to FIGS. 5A-5E, a rear end 1088 of a portion of the air treatment member 1008 (specifically, a rear end 1090 of the lower portion of the cyclone assembly 1026) is rotationally mounted between a closed position and an open position, thereby defining an openable portion 1060. As shown in FIG. 5C, when in the open position, a front end 1092 of the air treatment member 1008 (specifically, a front end 1094 of the cyclone assembly 1026) may be opened. In the example shown, opening the front end 1094 of the cyclone assembly 1026 opens the front end 1096 (and the lower end) of the cyclone chamber 1030 and a front end 1098 of the dirt collection chamber 1032. Still referring to FIG. 5C, the dirt outlet 1052 shown is an opening that has a perimeter 1078 with a first portion 1100 and a second portion 1102. In the example illustrated, the first portion 1100 of the perimeter 1078 is defined by a moveable portion of the air treatment chamber sidewall 1084 (i.e., the generally U-shaped portion 1104) and the second portion 1102 is defined in part by a stationary portion of the air treatment chamber rear end wall 1086. As shown in FIG. 5C, only the first portion 1100 of the perimeter 1078 may be moved when cyclone assembly 1026 is moved to the open position to thereby open the dirt outlet 1052.

It will be appreciated that any portion of the perimeter 1078 may be moveable and this portion may be any part of the air treatment member 1008. Accordingly, as exemplified, one portion of the perimeter 1078 may be moveable and one portion stationary. Accordingly, for example, the dirt outlet 1052 may be defined only by the sidewall 1084 of the air treatment chamber and that the openable portion may comprise only part of the sidewall 1084. This part of the sidewall may have the first portion 1100 of the perimeter 1078 while a second, non-moveable portion of the sidewall 1084 that has the second portion 1102 of the perimeter 1078. Accordingly, moving the openable portion may open the dirt outlet 1052.

It will also be appreciated that two or more portions of the perimeter 1078 may be moveable and the moveable portions may define part or all of the perimeter 1078. Accordingly, for example, two portions of the perimeter 1078 may be moveable and these portions may be any part of the air treatment member 1008.

Figure 7A:
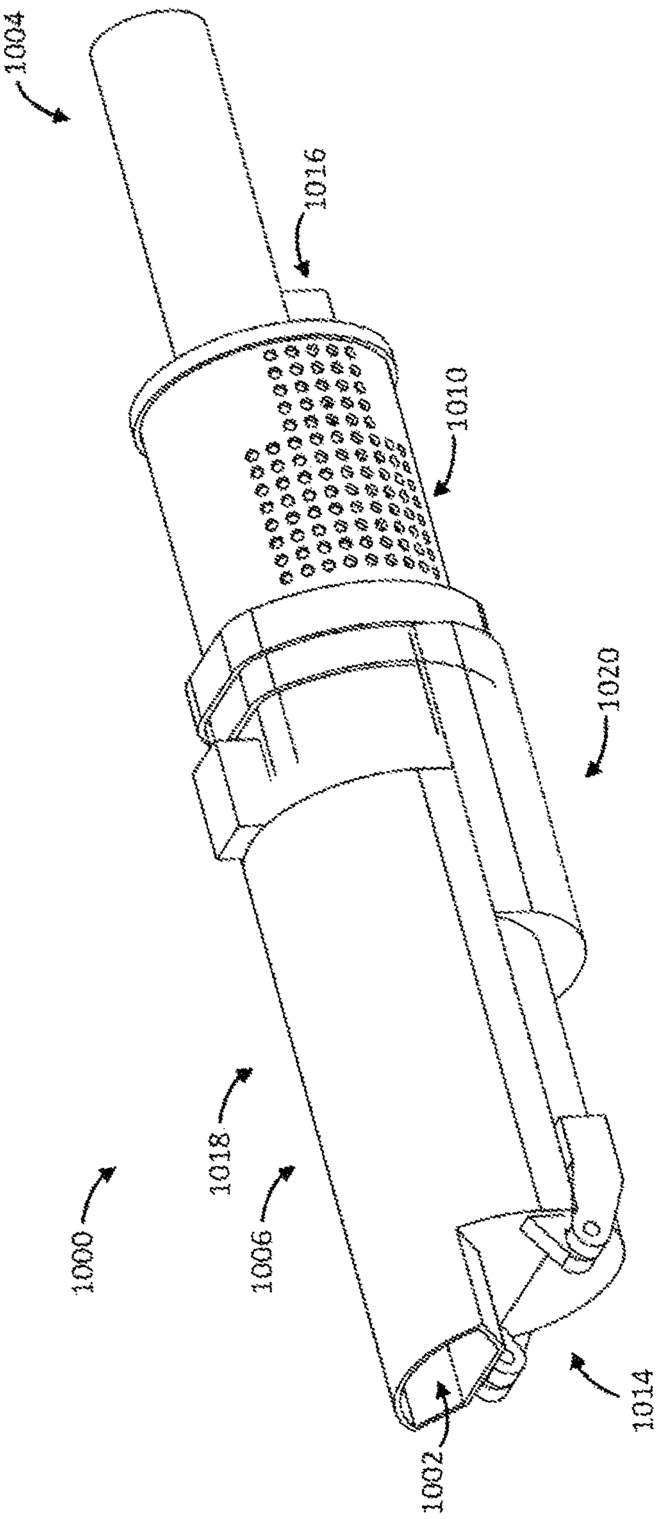
FIG. 7A is a front perspective view of another example of a hand vacuum cleaner.
Figure 7B:
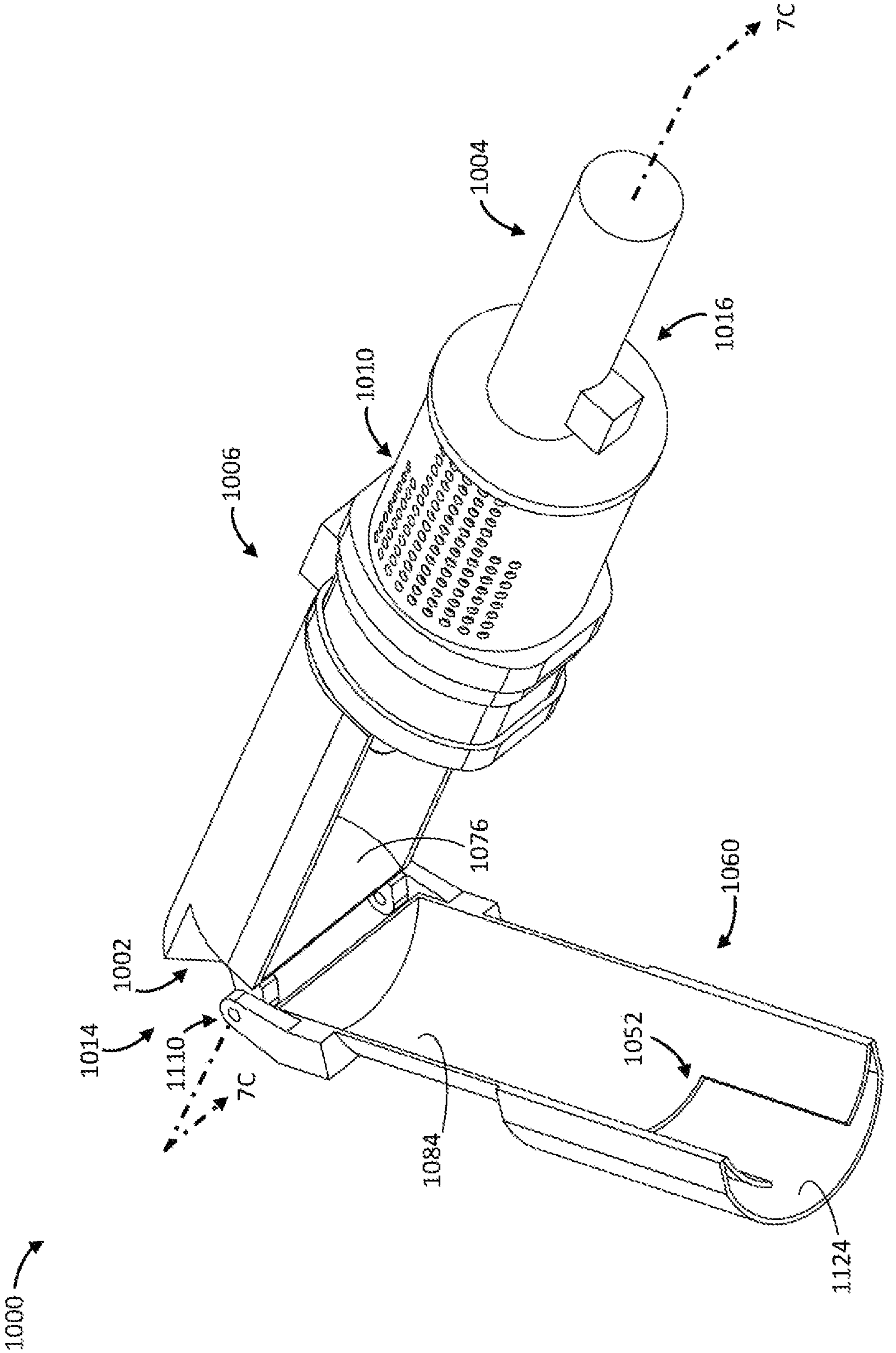
FIG. 7B is a rear perspective view of the hand vacuum cleaner of FIG. 7A, shown with an openable portion in an open position.
Figure 7C:
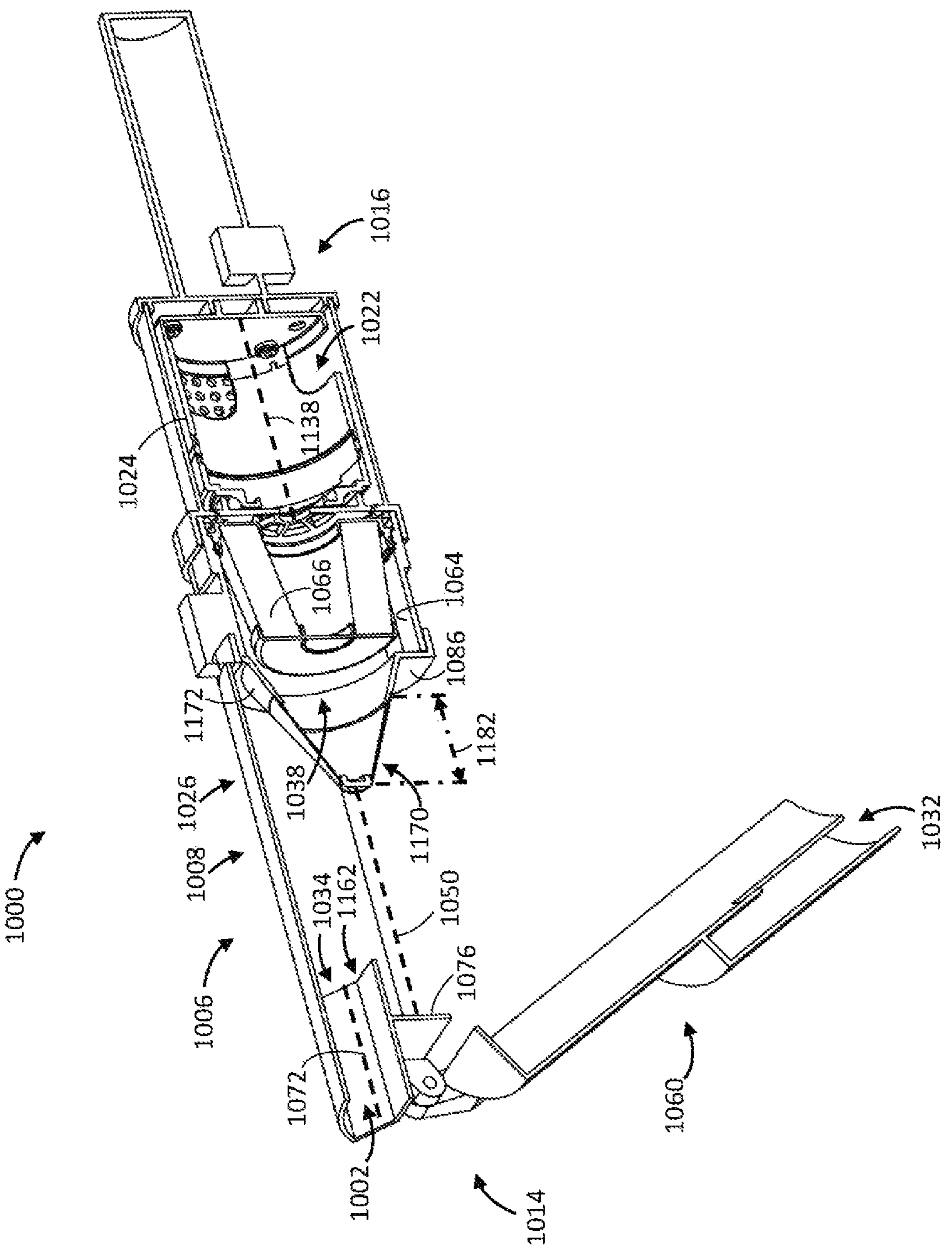
FIG. 7C is a cross-sectional view of the hand vacuum cleaner of FIG. 7B, taken along line 7C-7C.

Optionally, as shown in the example illustrated in FIGS. 1C, 1H and 5C, the openable portion 1060 may be rotatable. More specifically, in the examples illustrated, the openable portion 1060 is pivotable about a hinge 1110. When the openable portion 1060 is rotatable, it may rotate in any direction relative to the main body 1006 of the surface cleaning apparatus. For example, the hinge 1110 may extend transverse to the axis 1050 and the hinge 1110 may be located at the rear end of the openable portion 1060 and the openable portion may rotate downwardly (see, e.g., FIG. 5C), the hinge 1110 may extend transverse to the axis 1050 and the hinge 1110 may be located at the front end of the openable portion 1060 and the openable portion 1060 may rotate downwardly (see, e.g., FIG. 7B), and/or the hinge 1110 may extend parallel to the axis 1050 and the hinge 1110 may be located at one lateral side of the openable portion 1060 and the openable portion 1060 may rotate laterally (see, e.g., FIG. 1H). As a specific example, in the example illustrated in FIG. 1H, the openable portion 1060 is rotatably mounted about an opening axis 1112 that is parallel to the axis of rotation 1050 of the cyclone chamber 1030. More specifically, in the example illustrated in FIG. 1H, the hand vacuum cleaner 1000 has a front end 1014 having the dirty air inlet 1002, a rear end 1016 and first and second laterally opposed sides 1114, 1116 extending in a forward/rearward direction and the opening axis 1112 is located on one of the laterally opposed sides 1114, 1116.

Figure 10A:
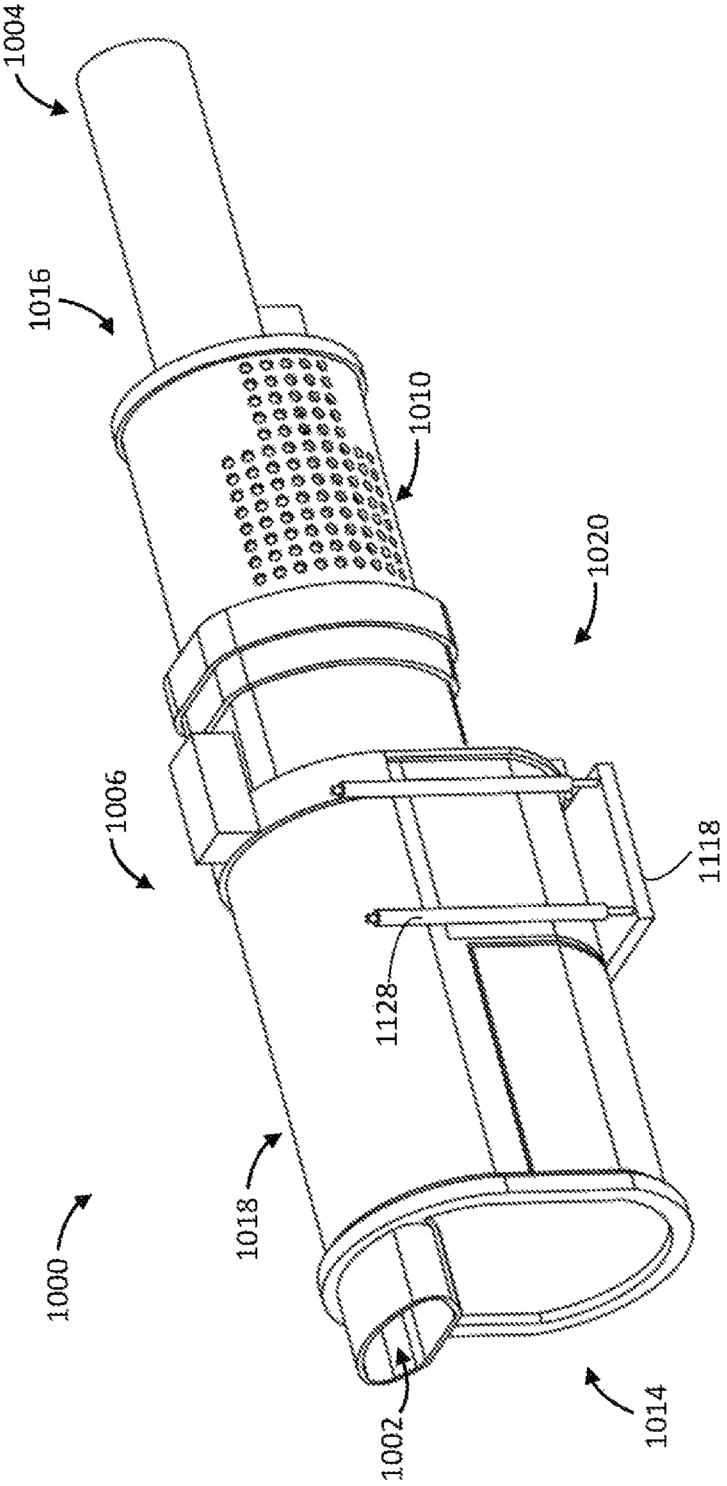
FIG. 10A is a front perspective view of another example of a hand vacuum cleaner.
Figure 10B:
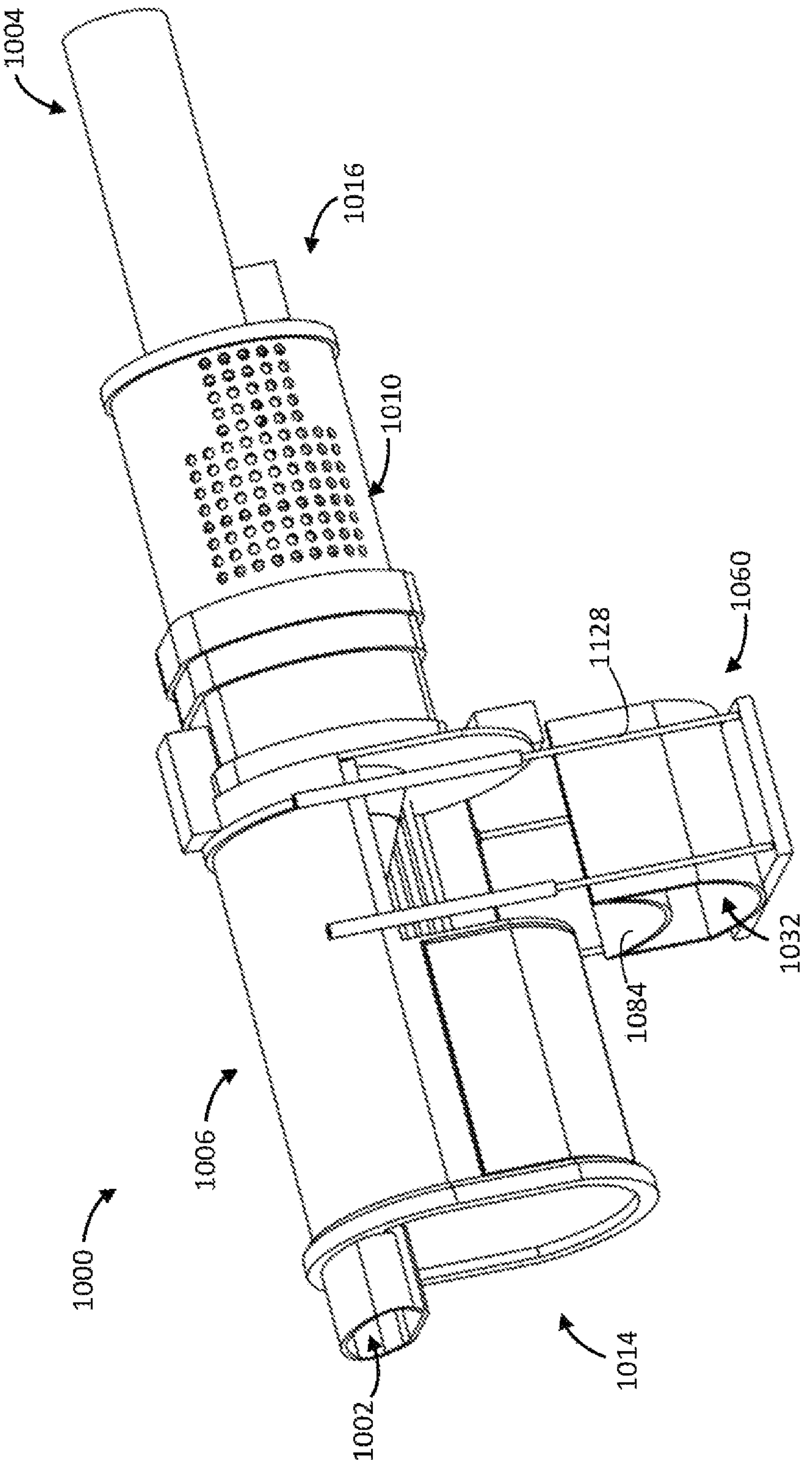
FIG. 10B is a perspective view of the hand vacuum cleaner of FIG. 10A, shown with an openable portion in an open position.

Alternatively, as shown in FIG. 10A, the openable portion 1060 may be translatably mounted to the main body 1006. Specifically, in the example illustrated, the openable portion 1060 slides along rails 1128 that are joined to the main body 1006 of the surface cleaning apparatus. When the openable portion 1060 is translatably mounted to the main body 1006, the openable portion 1060 may translate in any direction known in the art. For example, the openable portion 1060 may translate upwardly, downwardly (see, e.g., FIG. 10B), forwardly (see, e.g., FIG. 11A), rearwardly, and/or laterally.

It is to be understood that the openable portion 1060 may both rotate and translate or move in any other direction.

Movement of the openable portion 1060 from the closed position to the open position, and vice versa, may be controlled by any means known in the art. For example, there may be a handle (not shown) on an exterior surface 1118 of the openable portion 1060 for a user to grip. Alternatively, the openable portion 1060 may open when an actuator 1120 is actuated. The actuator 1120 may be mechanical or electromechanical.

Optionally, the openable portion 1060 may include a stop to limit the motion of the openable portion. For example, part of the openable portion 1060 may engage a portion of the main body 1006 of the surface cleaning apparatus to limit rotation of the openable portion 1060.

The openable portion 1060 may be held in the closed position by any means known in the art. For example, the openable portion 1060 may be held in the closed position by interengaging male and female engagement members (not shown). More specifically, the openable portion 1060 may include a tab which engages with a recess located on the main body in a friction fit to hold the openable portion 1060 in the closed position. In some examples, a mechanical lock or electromechanical lock may be used to hold the openable portion 1060 in the closed position. Optionally, the openable portion 1060 may be biased to the closed position. Any locking means known in the art may be used.

Location of the Openable Portion

In accordance with this aspect of this disclosure, which may be used by itself or in combination with one or more other aspects of this disclosure, in an openable portion is provided, then the openable portion 1060 may be located at any position along the air treatment member 1008.

Figure 12A:
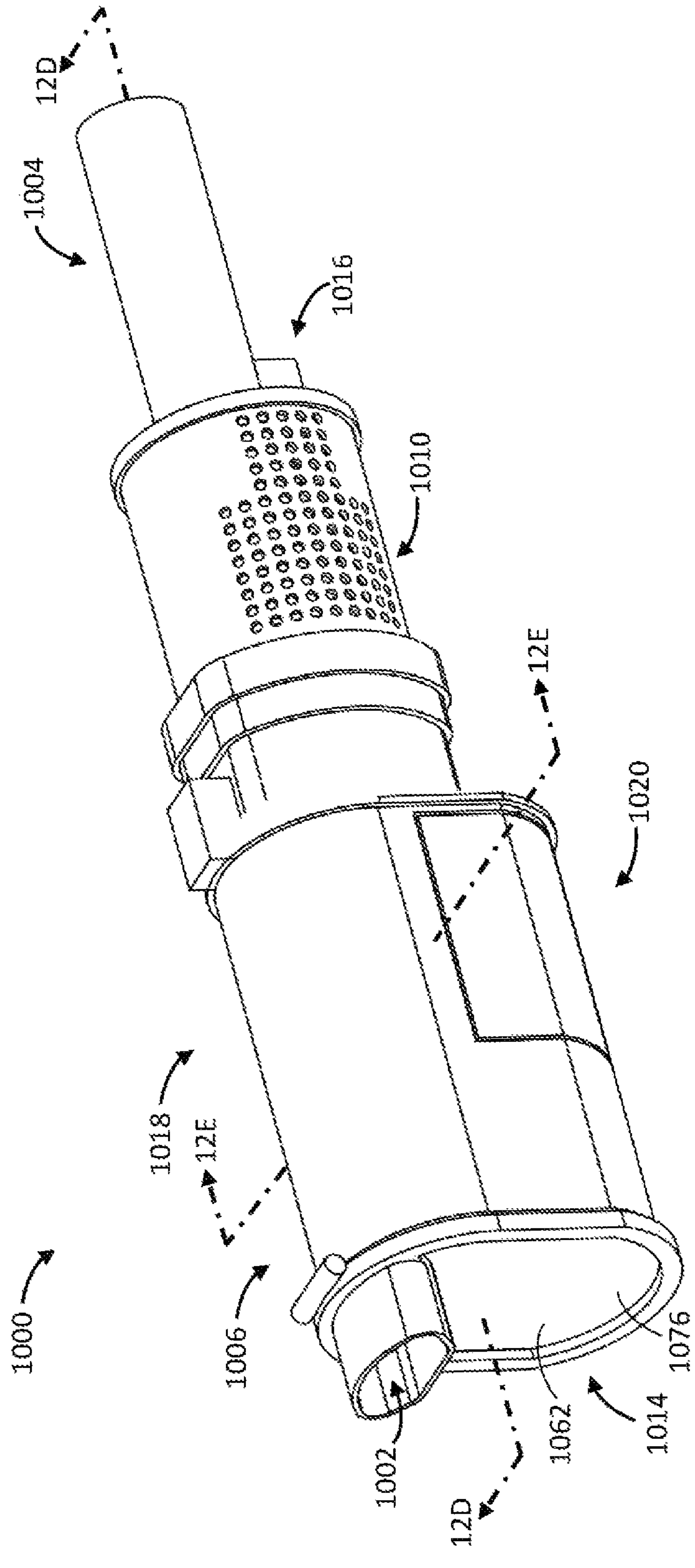
FIG. 12A is a front perspective view of another example of a hand vacuum cleaner.
Figure 12B:
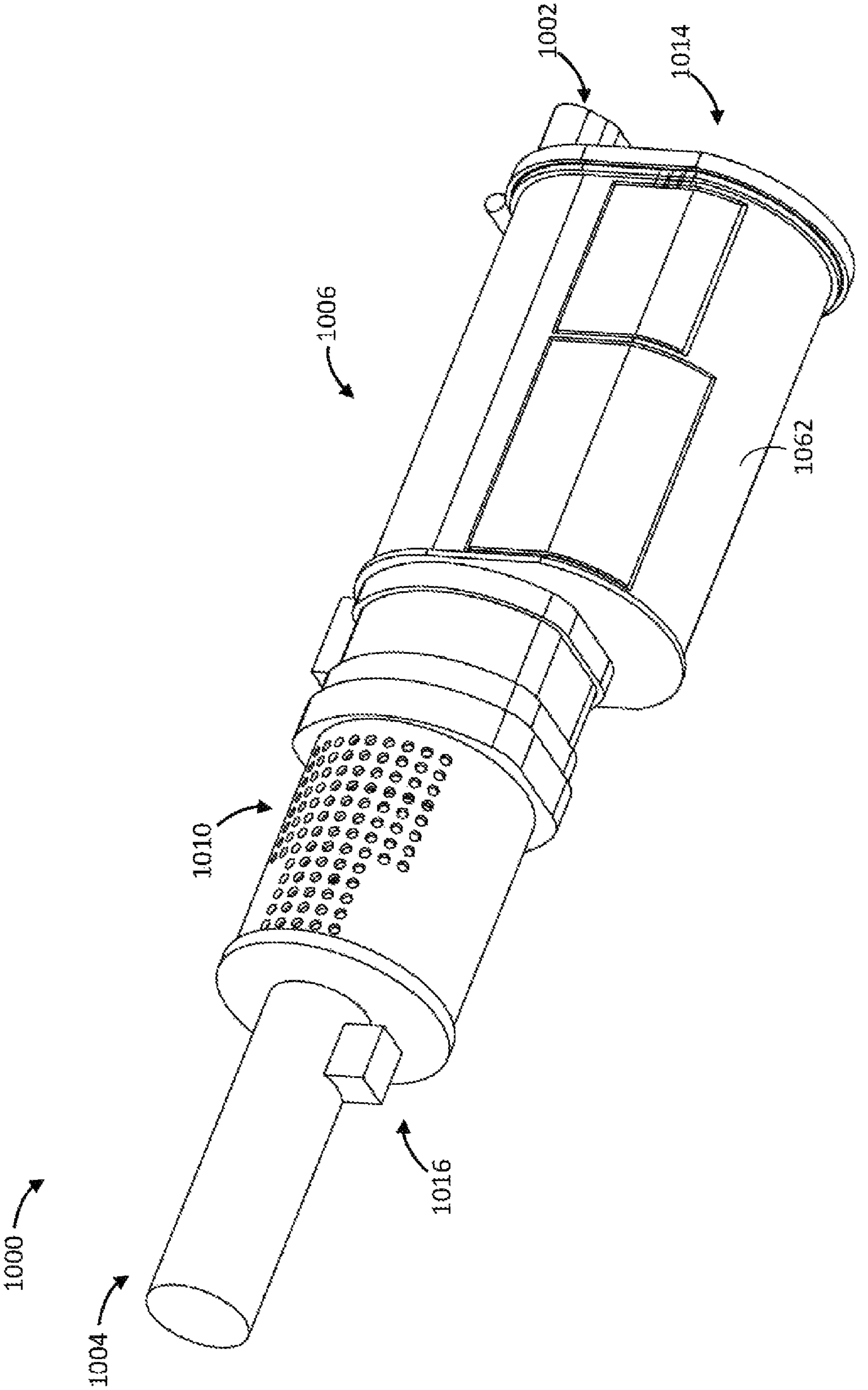
FIG. 12B is a rear perspective view of the hand vacuum cleaner of FIG. 12A.
Figure 12C:
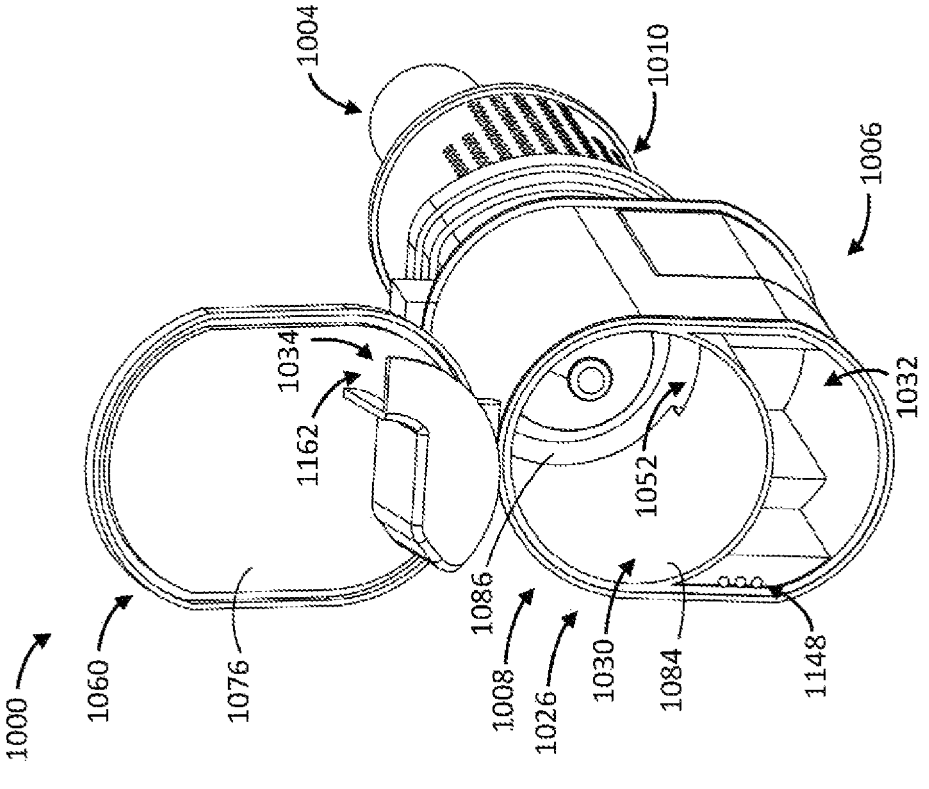
FIG. 12C is a front perspective view of the hand vacuum cleaner of FIG. 12A, shown with an openable portion in an open position.
Figure 12D:
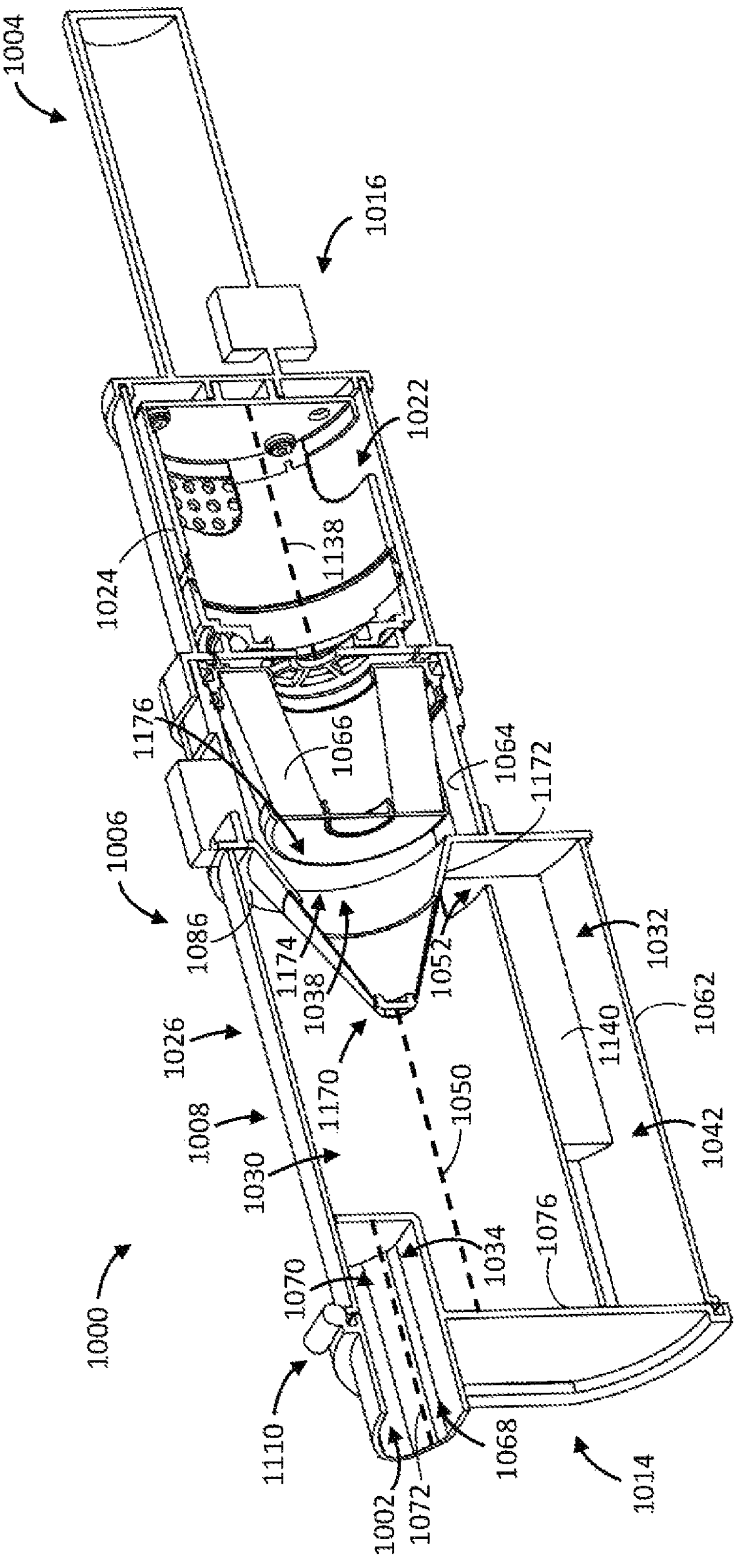
FIG. 12D is a cross-sectional view of the hand vacuum cleaner of FIG. 12A, taken along line 12D-12D.
Figure 12E:
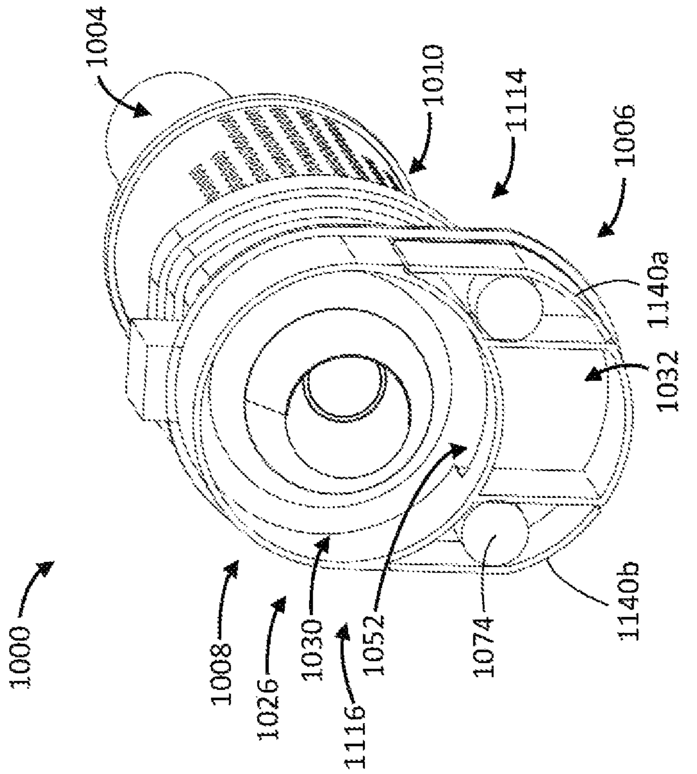
FIG. 12E is a cross-sectional view of the hand vacuum cleaner of FIG. 12A, taken along line 12E-12E.

For example, the openable portion 1060 may be part or all of the sidewall 1084 of the air treatment member 1008 as shown in FIG. 1H. Alternatively, the openable portion 1060 may be part or all of a front end wall 1076 of the air treatment member 1008 as shown in FIG. 12C. It will be appreciated that the openable portion 1060 may be part or all of a rear end wall 1086 of the air treatment member 1008. In any such case, the openable portion 1060 may be at least partially located at an upper end 1018, a lower end 1020, and/or intermediate the upper and lower end 1018, 1020 of the surface cleaning apparatus.

It will be appreciated that if the openable portion 1060 is part or all of a front end wall 1076 and/or a rear end wall 1086, then the openable portion may also include a portion of the sidewall 1124 and/or 1184. Accordingly, the openable portion 1060 may open a front end and/or a rear end of the air treatment chamber and/or dirt collection chamber.

Not only may the openable portion 1060 be located at any position along the air treatment member 1008, but the openable portion 1060 may also include any portion of the air treatment member 1008. That is, the openable portion 1060 may include only a portion of the air treatment chamber 1044, only a portion of the dirt collection chamber 1032, or may include a portion of the air treatment chamber 1044 and a portion of the dirt collection chamber 1032. The openable portion 1060 may also include a portion of the exterior surface 1062 of the surface cleaning apparatus.

The openable portion 1060 may open both the air treatment chamber 1044 and the dirt collection chamber 1032. For example, in the example illustrated in FIG. 1H, the dirt collection chamber 1032 is an external dirt collection chamber 1042, the openable portion 1060 includes a portion of the sidewall 1084 of the air treatment chamber 1044 and a portion of the sidewall 1124 of the dirt collection chamber 1032. Accordingly, when the openable portion 1060 is moved to the open position, the openable portion 1060 opens both the air treatment chamber 1044 and the dirt collection chamber 1032. More specifically, in the example illustrated in FIG. 1H, the dirt collection chamber 1032 has a dirt collection chamber sidewall 1124 that is spaced from the cyclone chamber sidewall 1084. As shown, a portion of the dirt collection chamber 1032 may be positioned between the cyclone chamber sidewall 1084 and the dirt collection chamber sidewall 1124, and the openable portion 1060 comprises at least a portion of the dirt collection chamber sidewall 1124 and a portion of the cyclone chamber sidewall 1084.

Figure 11:
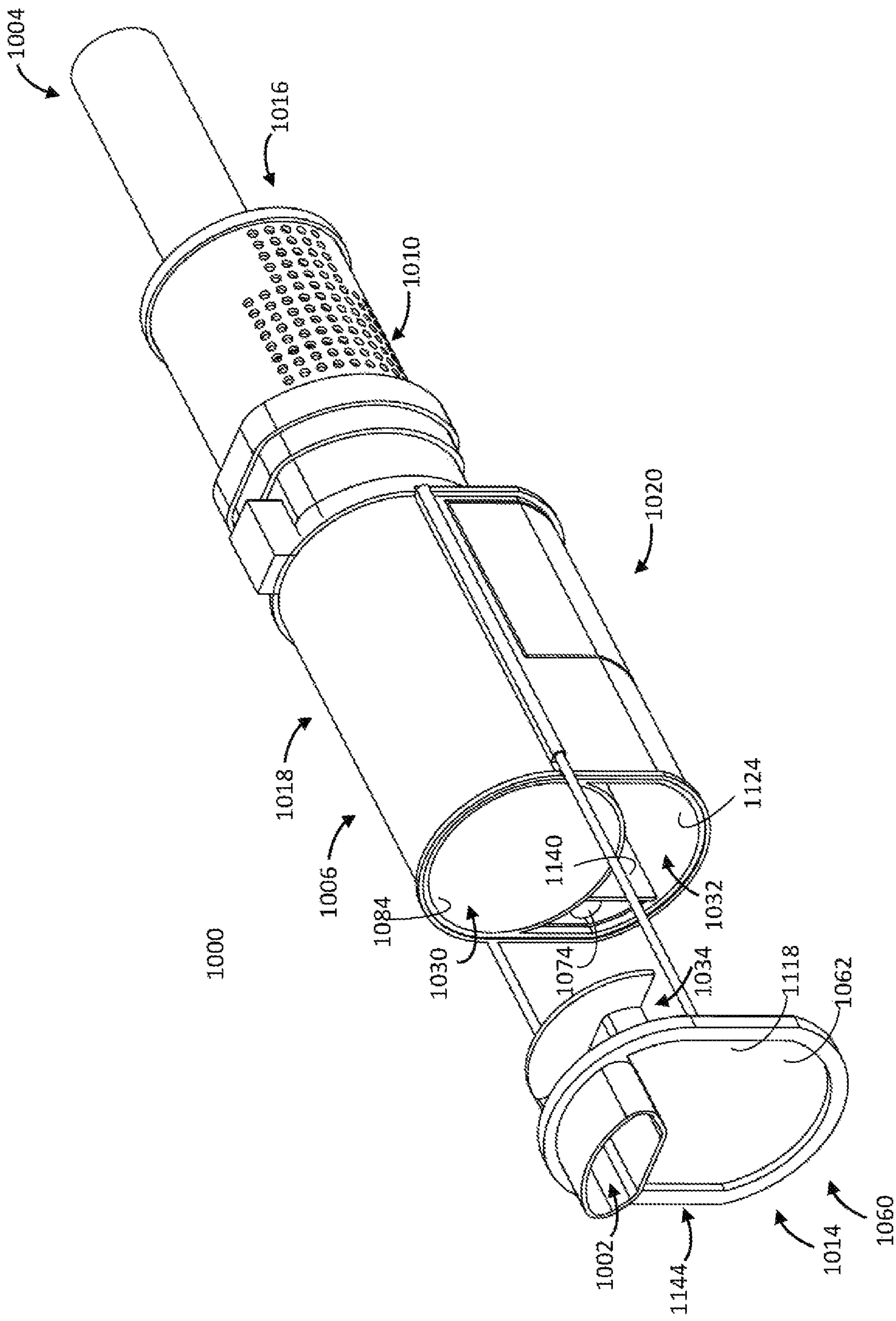
FIG. 11 is a front perspective view of another example of a hand vacuum cleaner, shown with an openable portion in an open position.

Optionally, as is discussed in more detail subsequently, and as shown in FIG. 11, the openable portion 1060 may also open an energy storage chamber 1140 of the surface cleaning apparatus when moved from the closed position to the open position.

Multiple Openable Portions

In accordance with this aspect of this disclosure, which may be used by itself or in combination with one or more other aspects of this disclosure, the air treatment member 1008 or air treatment chamber 1044 of the surface cleaning apparatus may include multiple openable portions 1060.

The two or more openable portions 1060 may open concurrently, sequentially (the second openable portion automatically opening after the first openable portion has partially or fully opened), or a user may select whether to open one or both of the first and second openable portions.

It will be appreciated that each openable portion 1060 may have its own handle or actuator. Alternately, a single handle or actuator may be operable to open each of the of the openable portions 1060. That is, operation of a single actuator 1120 may open multiple openable portions 1060. For example, a first openable portion 1060*a* may be drivingly connected to a second openable portion 1060*b*, and therefore, opening the first openable portion 1060*a* may drive the second openable portion 1060*b* towards or to the open position.

In some examples, when the first openable portion 1060*a* is in the closed position, the first openable portion 1060*a* may hold the second openable portion 1060*b* in the closed position. That is, an actuator 1120 may be operatively connected to the first openable portion 1060*a* and the first openable portion 1060*a* may be operatively connected to the second openable portion 1060*b* such that when the actuator 1120 is moved to an open position, the first openable portion 1060*a* is opened and opening the first openable portion 1060*a* opens the second openable portion 1060*b*.

Figure 4:
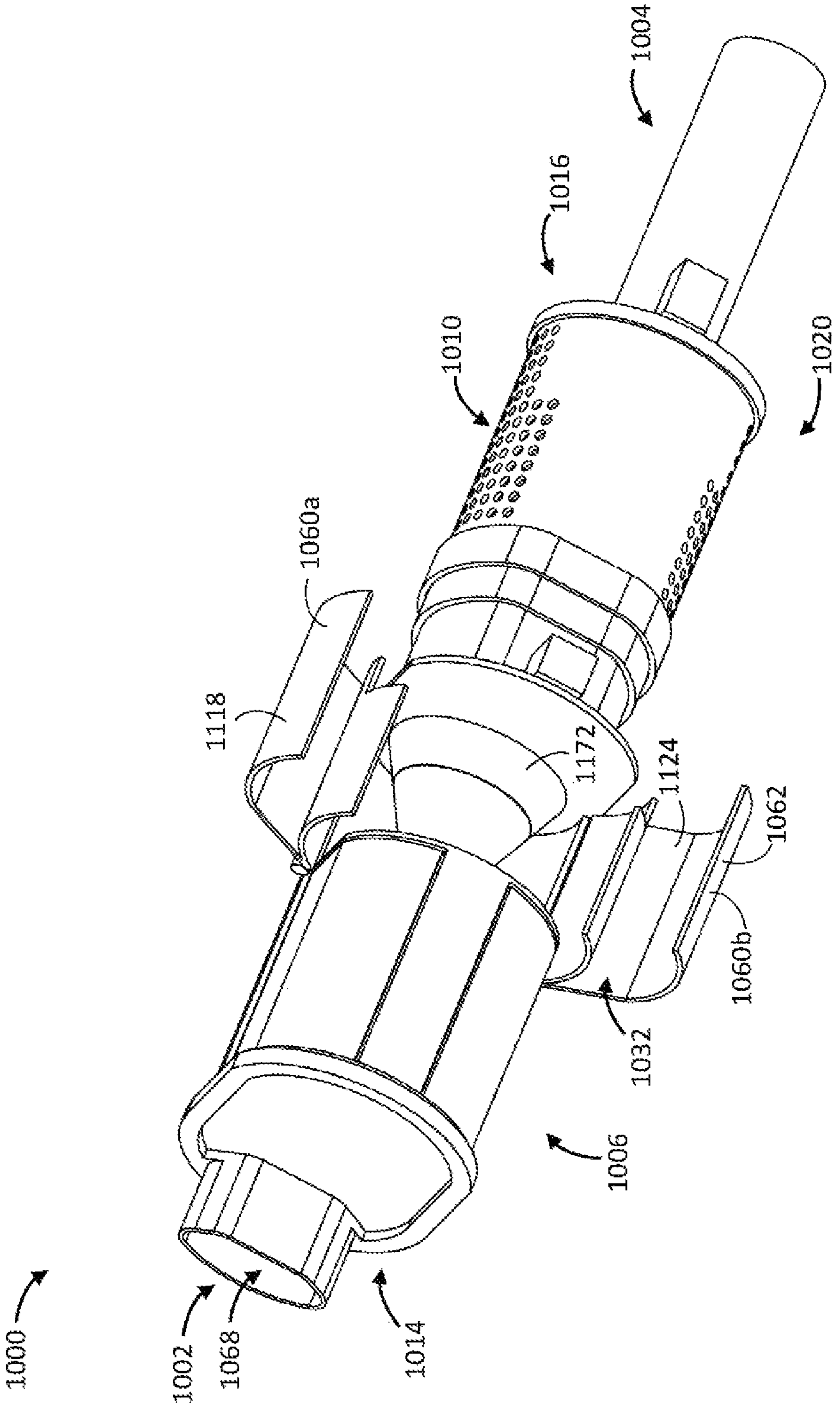
FIG. 4 is a perspective view of another example of a hand vacuum cleaner; shown with an openable portion in an open position.

For example, as shown in FIG. 4, the surface cleaning apparatus illustrated has a first openable portion 1060*a* and a second openable portion 1060*b*. The first openable portion 1060*a* and the second openable portion 1060*b* move like bomb bay doors (i.e., which rotate away from each other when moving from the closed position to the open position). In the example illustrated in FIG. 4, each of the first and second movable portions 1060*a* and 1060*b* are concurrently openable. It will be appreciated that a first portion (e.g., a male portion) of a locking member may be provided on first moveable portion 1060*a* and a second portion (e.g., a female portion) of a locking member may be provided on second moveable portion 10606. Therefore, unlocking the locking member will enable both openable portions 1060*a*, 1060*b* to open concurrently. One or both of the openable portions 1060*a*, 1060*b* may be biased to the open position by a biasing member, e.g., a spring.

As discussed above, the openable portion 1060 can be moved to an open position to facilitate the discharge of debris from the air treatment member 1008 (i.e., from the air treatment chamber 1044 and/or the dirt collection chamber 1032); and/or (b) be moved to an open position to urge compacted debris within the air treatment member 1008 to be dislodged.

Accordingly, a surface cleaning apparatus may have a first openable portion 1060*a* which may facilitate the discharge of debris from the air treatment member 1008 and/or an external dirt collection chamber and a second openable portion 1060*b* which may urge or enable compacted debris (e.g., compacted debris in a corner or blocking a dirt outlet 1052) to dislodge when moved from the closed position to the open position.

Figure 15A:
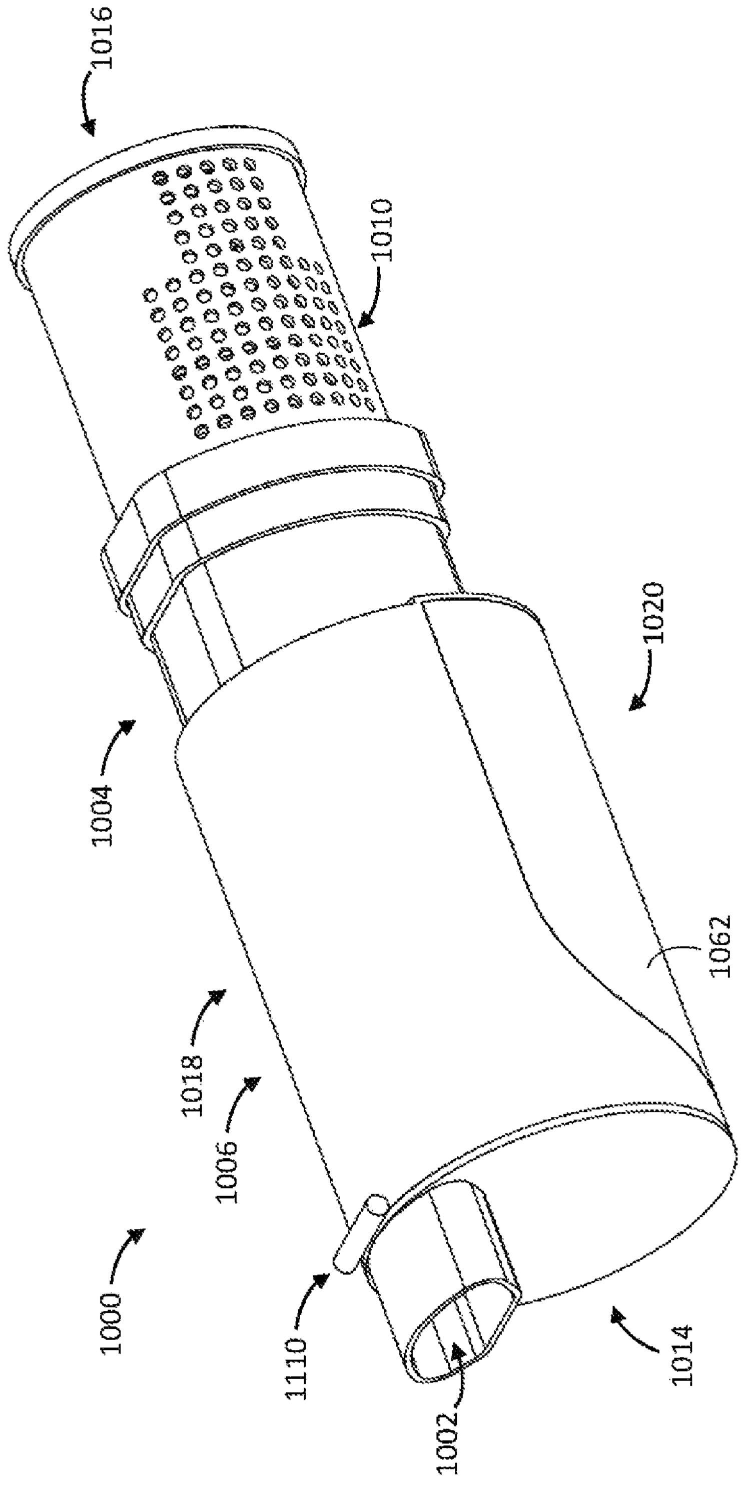
FIG. 15A is a front perspective view of another example of a hand vacuum cleaner.
Figure 15B:
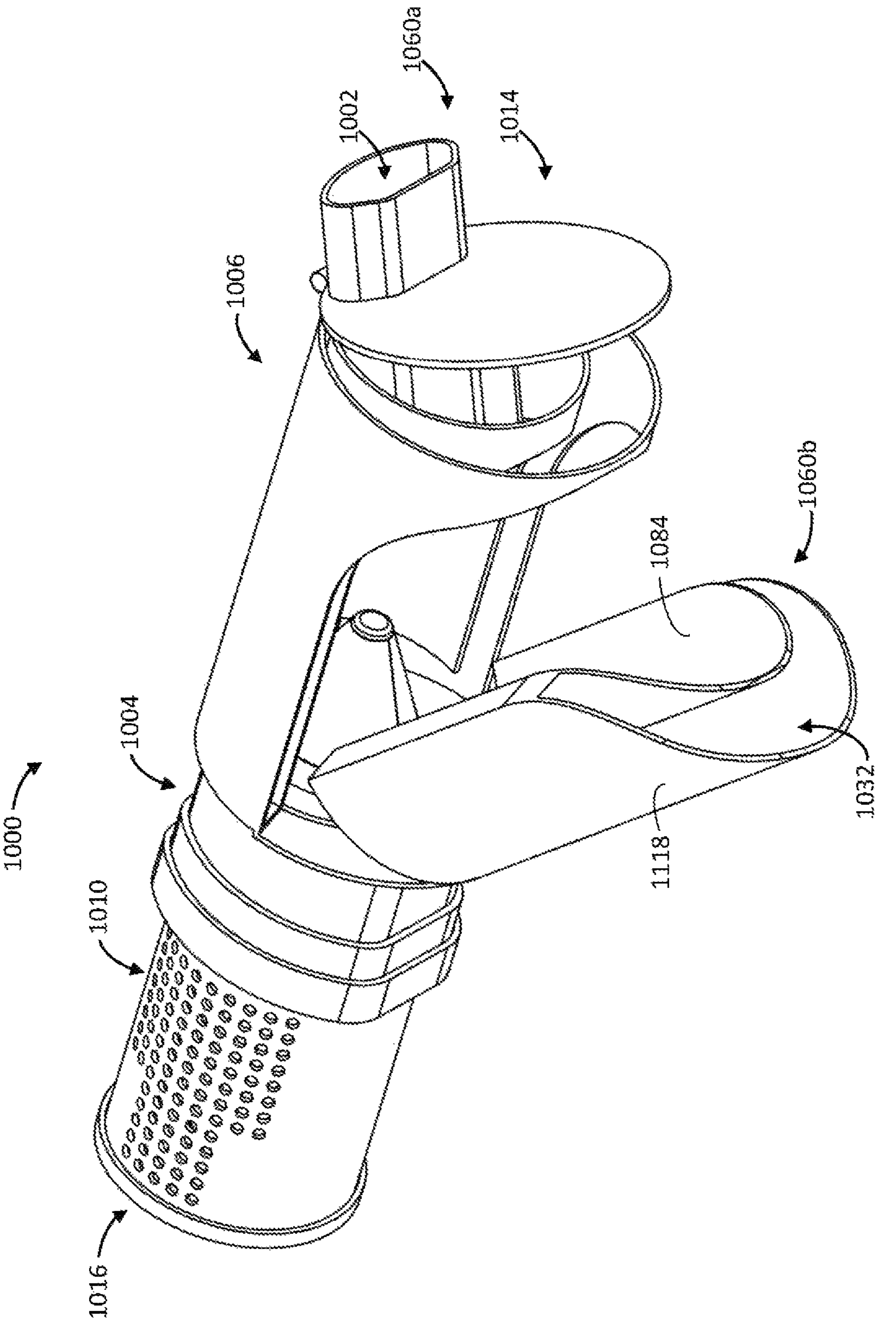
FIG. 15B is a perspective view of the hand vacuum cleaner of FIG. 15A, shown with an openable portion in an open position.

An example of a surface cleaning apparatus with a first openable portion 1060*a* that facilitates the discharge of debris from the air treatment member 1008 and a second openable portion 1060*b*, which comprises part of the perimeter 1078, that opens a dirt outlet 1052 thereby urging compacted debris to be dislodged when moving from the closed position to the open position is shown in FIGS. 15A and 15B.

In the example illustrated in FIGS. 15A and 15B, each of the first openable portion 1060*a* and the second openable portion 1060*b* are independently operable. That is, the first openable portion 1060*a* may be opened and the second openable portion 1060*b* may be left in the closed position. Optionally, as discussed previously with respect to the embodiment of FIG. 4 or subsequently with respect to the embodiment of FIGS. 18A-G, the first openable portion 1060*a* and the second openable portion 1060*b* may be opened concurrently or, alternately, they may be opened sequentially (e.g., once one of the openable portions is opened, the other of the openable portions may be unlocked so it may be opened or one of the openable portions may be drivingly connected to the other of the openable portions such that opening one of the openable portions drives the other of the openable portions to the open position. More specifically, the cyclone assembly 1026 has a first openable portion 1060*a* that includes the front end wall 1076 of the dirt collection chamber 1032 and the air treatment chamber 1044. The cyclone assembly 1026 illustrated has a second openable portion 1060*b* that includes a portion (the lower end as exemplified) of the sidewall 1124 of the dirt collection chamber 1032 and the sidewall 1084 of the air treatment chamber 1044. As shown, the first openable portion 1060*a* is moveably mounted to the hand vacuum cleaner 1000 at a first location and the second openable portion 1060*b* is moveably mounted to the hand vacuum cleaner 1000 at a second location. Optionally, as shown, the first location may be spaced from the second location in a direction that is transverse to the cyclone axis of rotation 1050. Optionally, as shown, the first location may be axially spaced from the second location. Optionally, as exemplified in FIG. 14C, the first and second openable portions 1060*a*, 1060*b* may be located at the same portion (e.g., same end) of the air treatment member 1008.

Figure 16A:
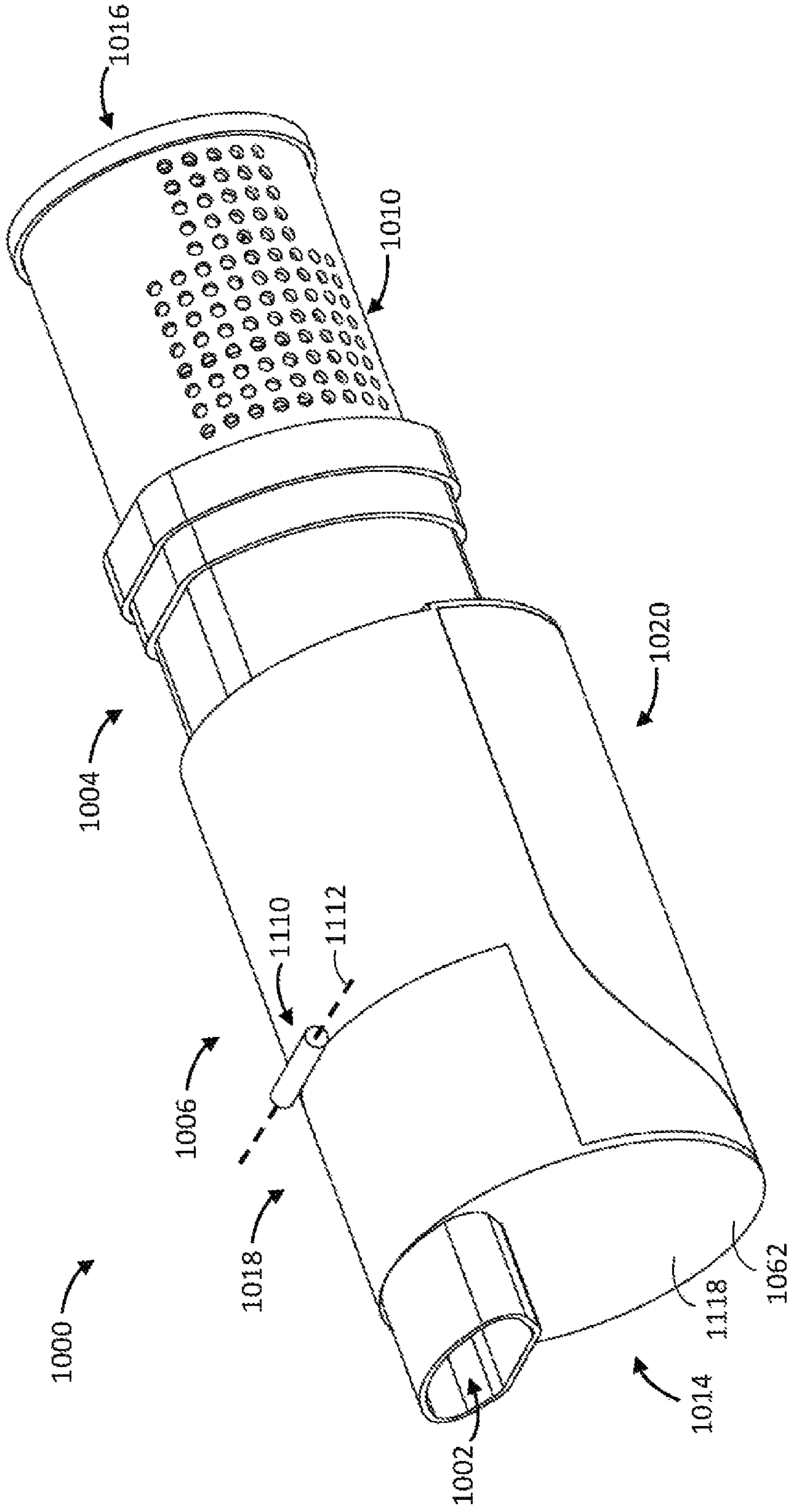
FIG. 16A is a front perspective view of another example of a hand vacuum cleaner.
Figure 16B:
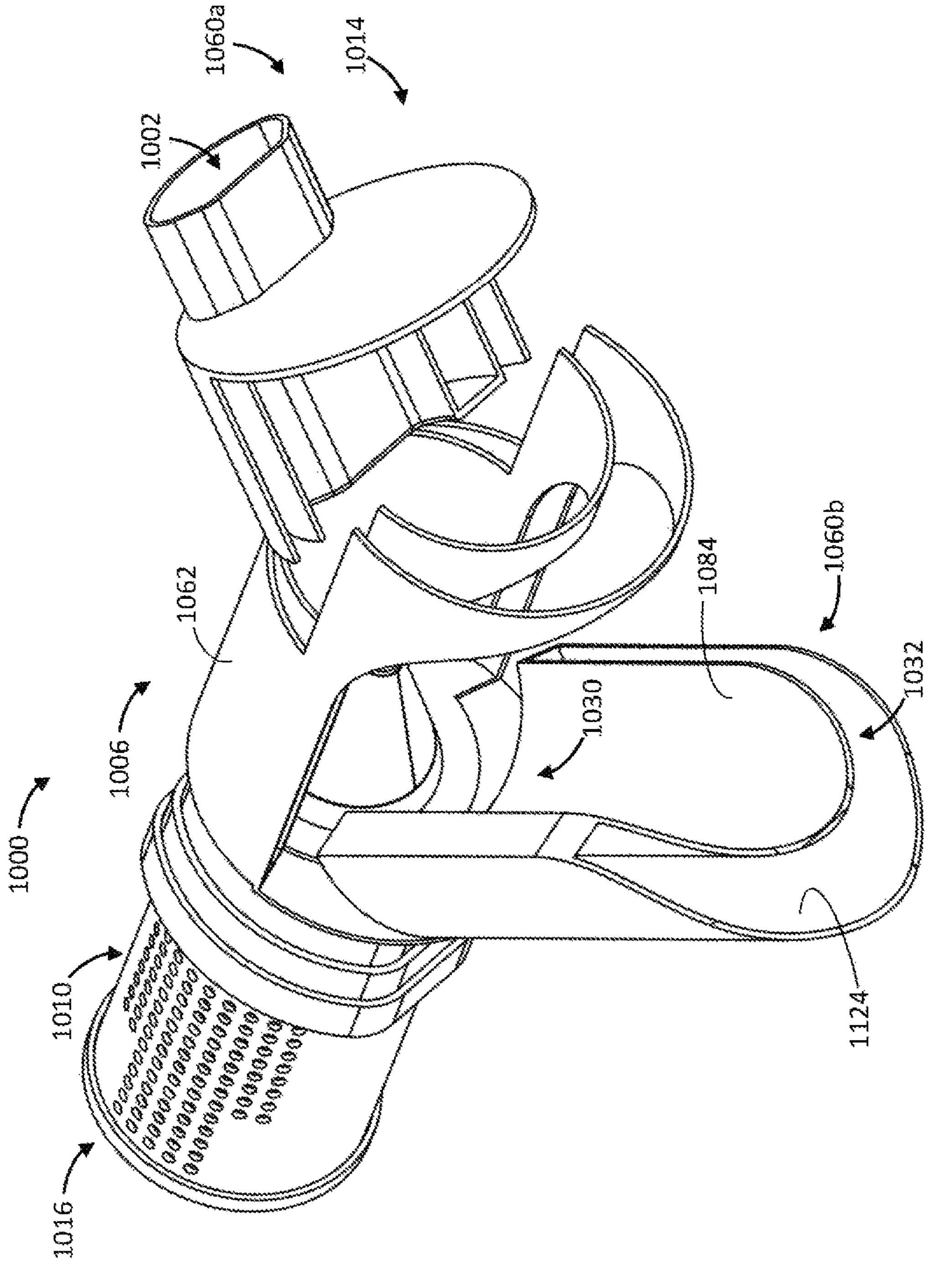
FIG. 16B is a perspective view of the hand vacuum cleaner of FIG. 16A, shown with an openable portion in an open position.

In the example illustrated in FIG. 15B, the first openable portion 1060*a* is moveably mounted to the main body 1006 at the front end 1014 thereof. Specifically, the first openable portion 1060*a* is moveably mounted to the main body 1006 at the front end 1014 thereof so that the first openable portion 1060*a* only includes the front end wall 1076 of the air treatment chamber 1044 and the dirt collection chamber 1032. Alternately, the first openable portion 1060*a* may be moveably mounted along at least one of the first and second laterally opposed sides 1114, 1116 of the main body 1006, or an upper end thereof as shown in FIG. 16B. Accordingly, the first openable portion 1060*a* may include a portion of the sidewall 1084 of the air treatment chamber 1044 and the rear end wall 1086 of the air treatment chamber 1044 and the dirt collection chamber 1032.

Figure 14A:
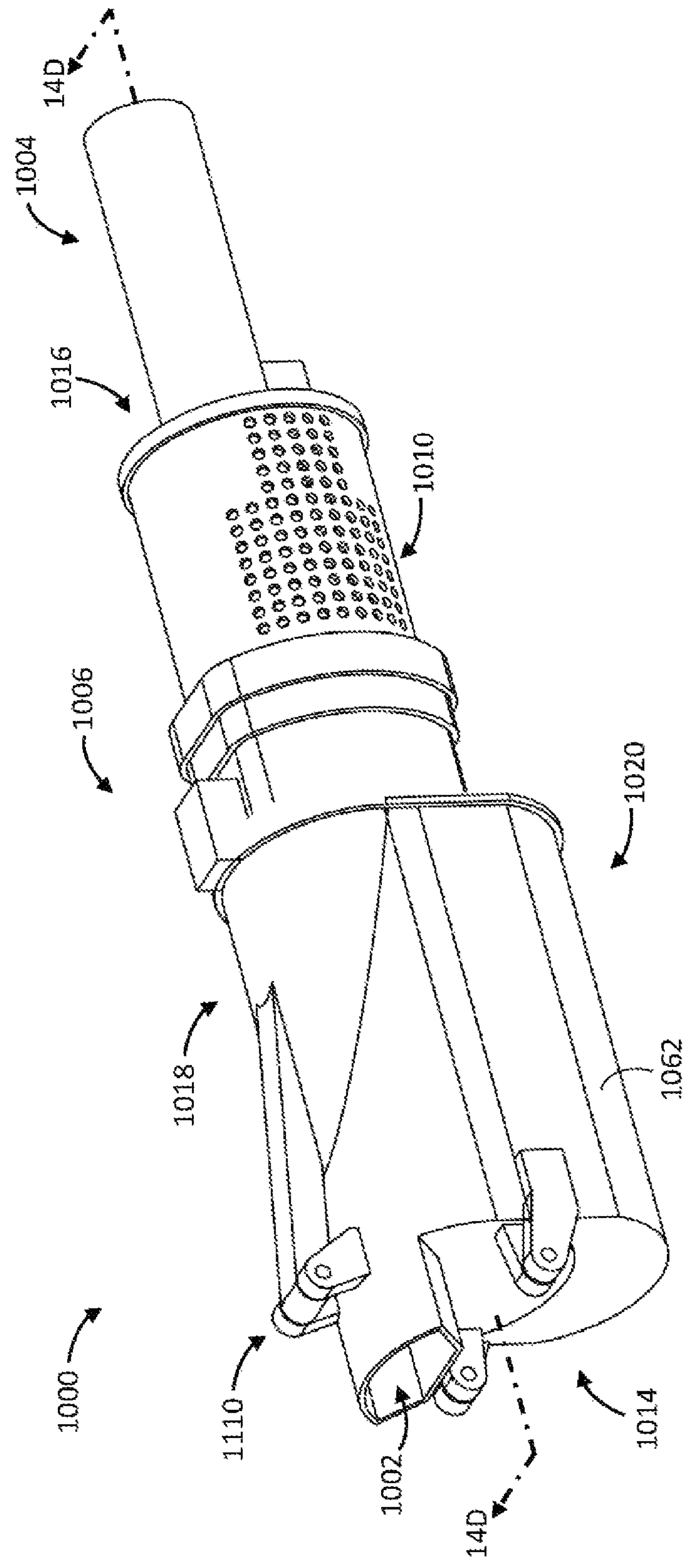
FIG. 14A is a front perspective view of another example of a hand vacuum cleaner.
Figure 14B:
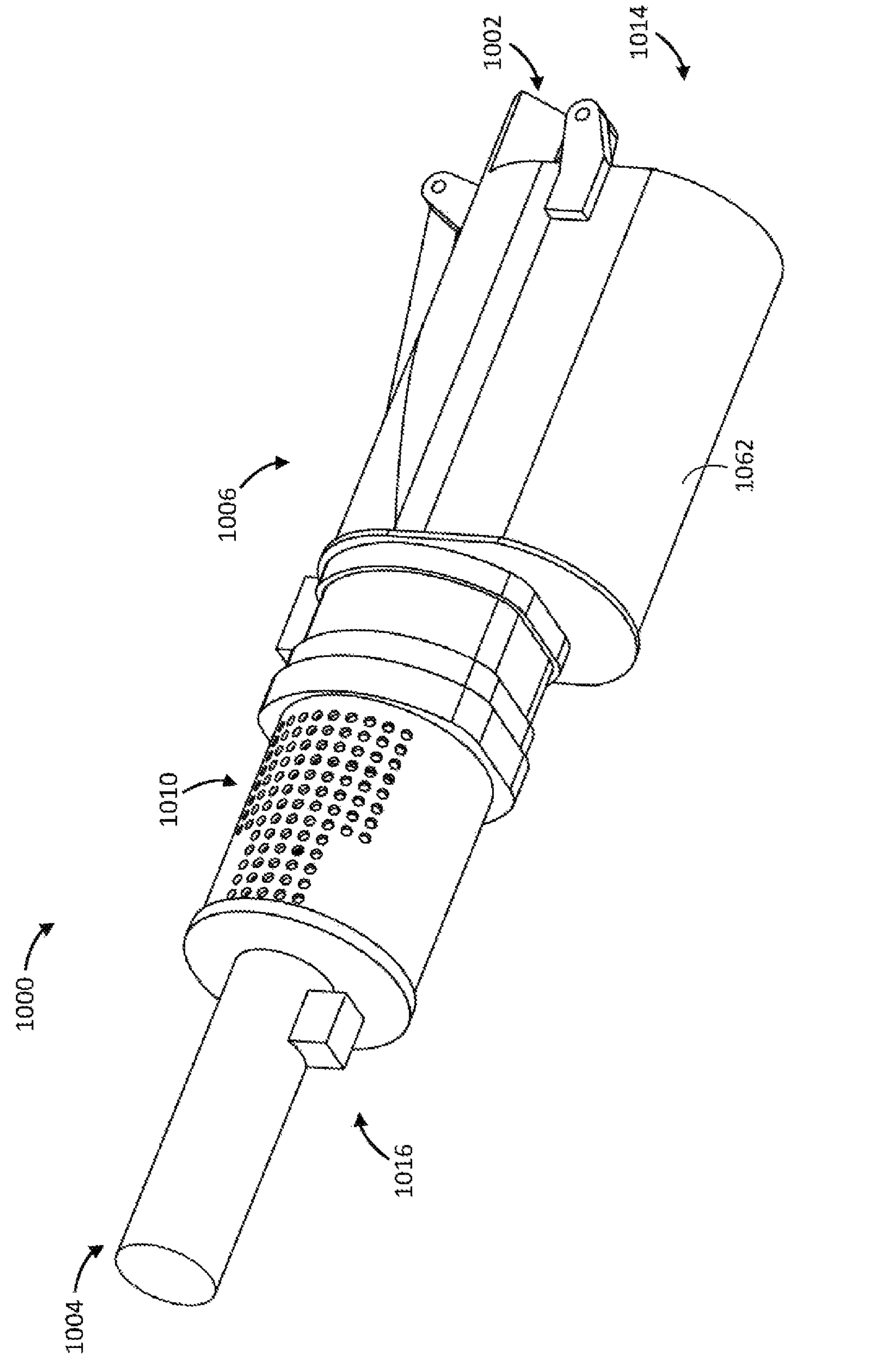
FIG. 14B is a rear perspective view of the hand vacuum cleaner of FIG. 14A.
Figure 14C:
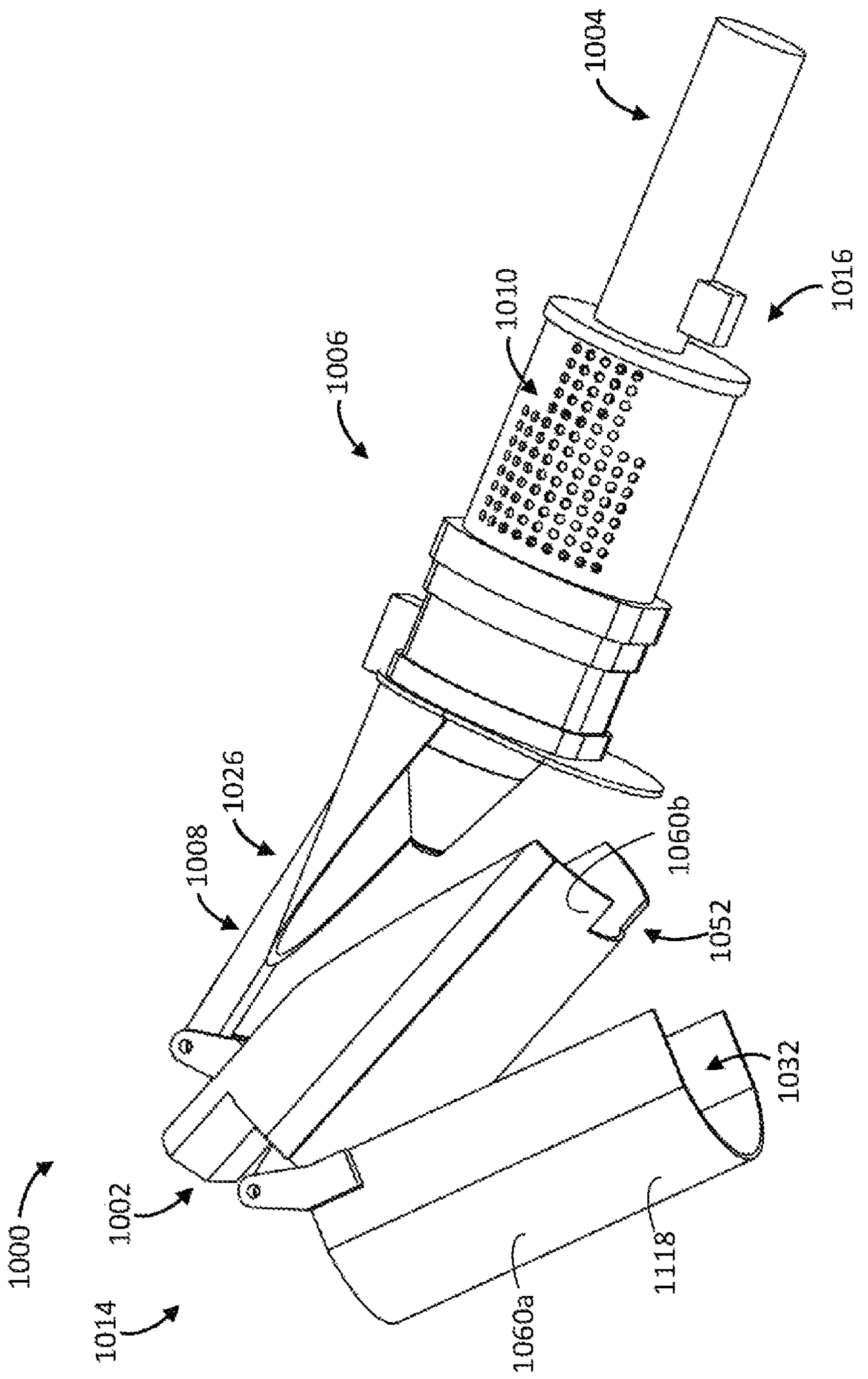
FIG. 14C is a perspective view of the hand vacuum cleaner of FIG. 14A, shown with an openable portion in an open position.
Figure 14D:
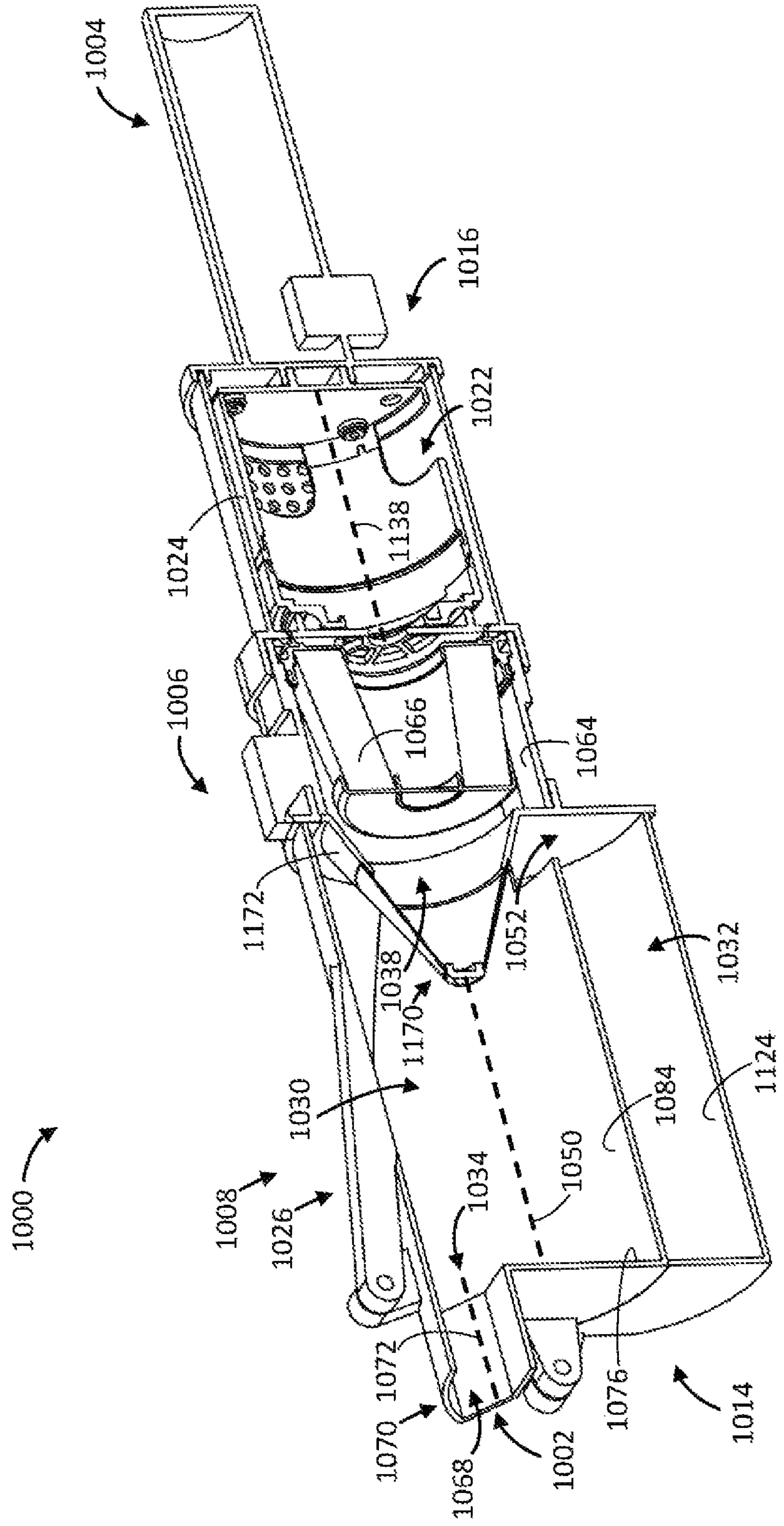
FIG. 14D is a cross-sectional view of the hand vacuum cleaner of FIG. 14A, taken along line 14D-14D.

Another example is shown in FIGS. 14A-14D. As shown in FIG. 14C, when the first openable portion 1060*a* is in the open position, debris may be discharged from the dirt collection chamber 1032. When the second openable portion 1060*b* is in the open position, the dirt outlet 1052 of the air treatment member 1008 is opened and debris may be discharged from the air treatment chamber 1044.

It has been found that the rate at which debris collects in the dirt collection chamber 1032 may be greater than that of which debris compacts and collects within the air treatment chamber 1044 and/or the dirt outlet 1052. Accordingly, it may not be necessary to open the air treatment chamber 1044 and/or the dirt outlet 1052 every time the dirt collection chamber 1032 is opened to empty debris therefrom. It may be desirable to not open the air treatment chamber 1044 and/or the dirt outlet 1052 every time the dirt collection chamber 1032 is opened to reduce wear on the components used when opening the air treatment chamber 1044 and/or the dirt outlet 1052. Accordingly, instead of a single actuator that opens both openable portions 106*a*, 106*b*, two actuators may be provided, one for each openable portion 1060*a*, 1060*b*. Alternately, a single actuator may be provided which has two positions. When move to the first position, one openable portion 1060*a* is opened and when moved further to the second position, the other openable portion 1060*a*, 1060*b* is opened.

The Openable Portion is Flexible

In accordance with this aspect of this disclosure, which may be used by itself or in combination with one or more other aspects of this disclosure the openable portion 1060 may be made of any material known in the art. In some examples, one or more of the openable portions 1060 may be made of the same material as the main body 1006 and/or the air treatment member 1008. In other examples, the openable portion 1060 may be, for example, a flexible membrane 1130.

Figure 18A:
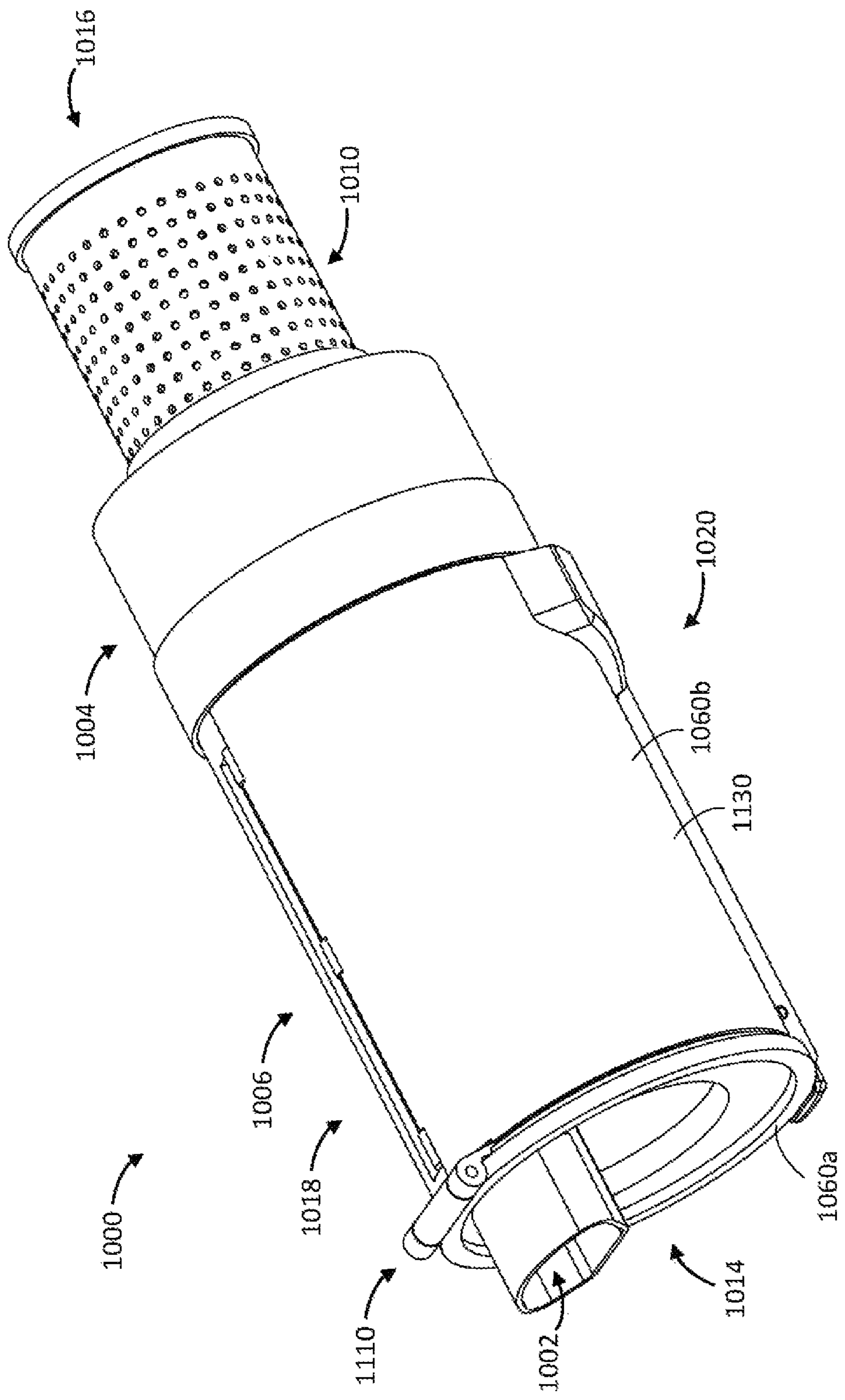
FIG. 18A is a front perspective view of another example of a hand vacuum cleaner.
Figure 18B:
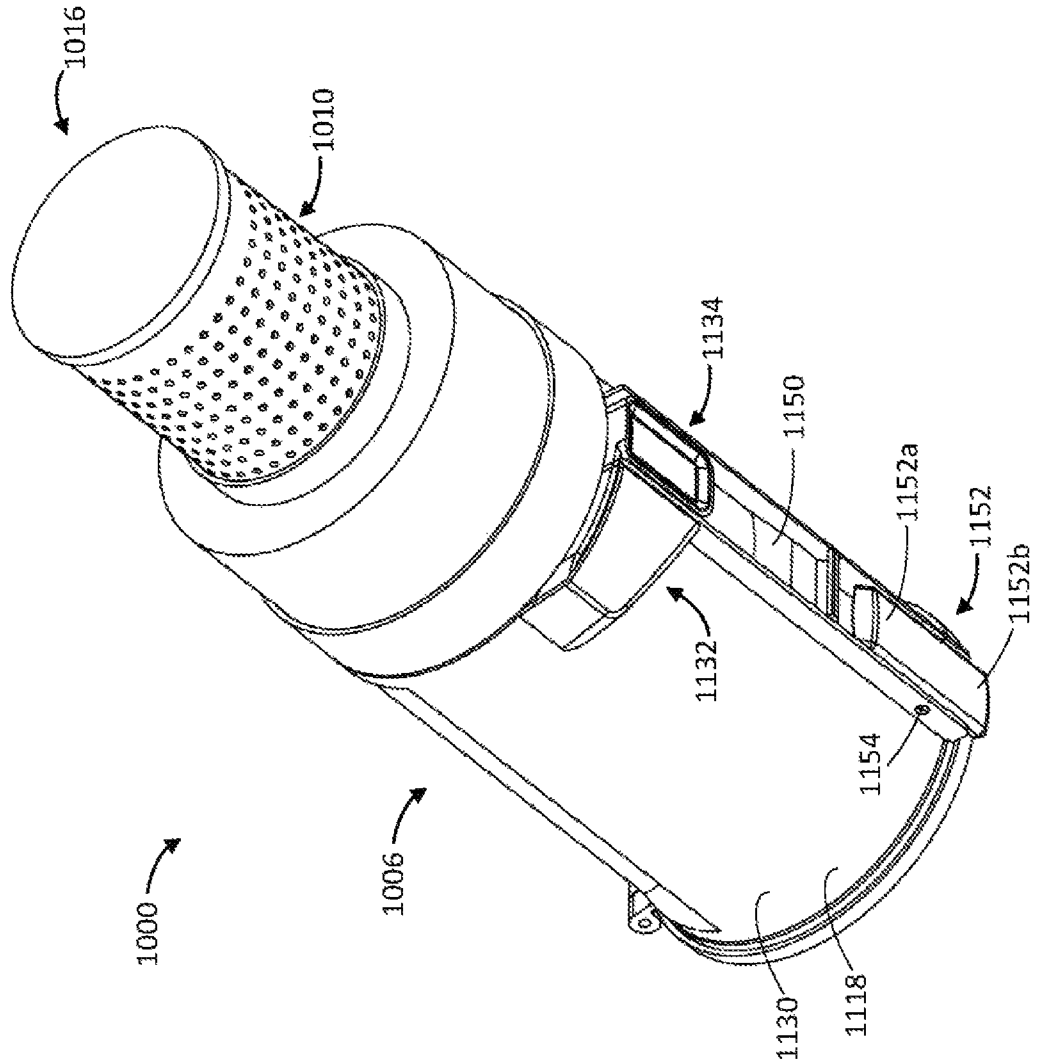
FIG. 18B is a rear perspective view of the hand vacuum cleaner of FIG. 18A, shown with a first openable portion in a closed position and a second openable portion in a closed position.
Figure 18C:
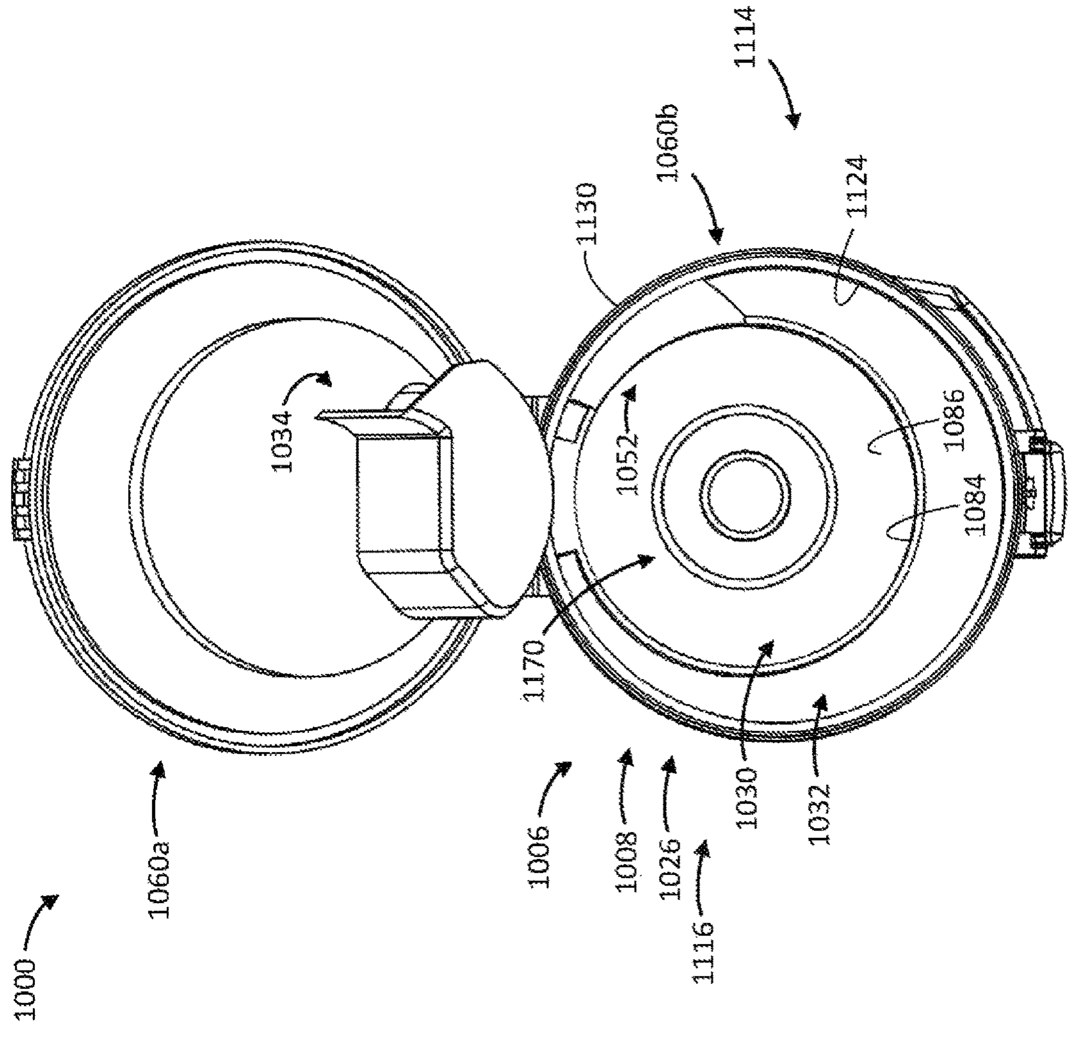
FIG. 18C is a front view of the hand vacuum cleaner of FIG. 18A shown with a first openable portion in an open position and a second openable portion in a closed position.
Figure 18D:
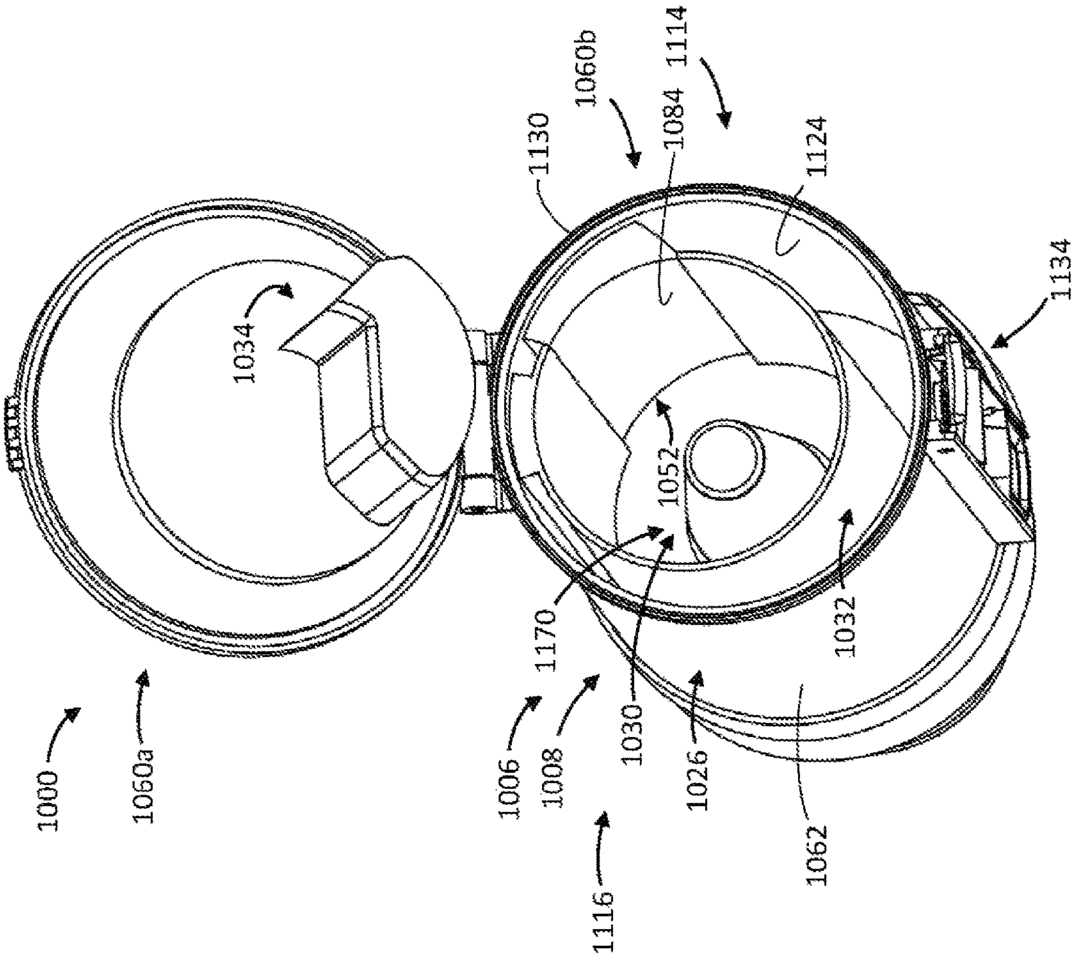
FIG. 18D is a front perspective view of the hand vacuum cleaner of FIG. 18C.
Figure 18E:
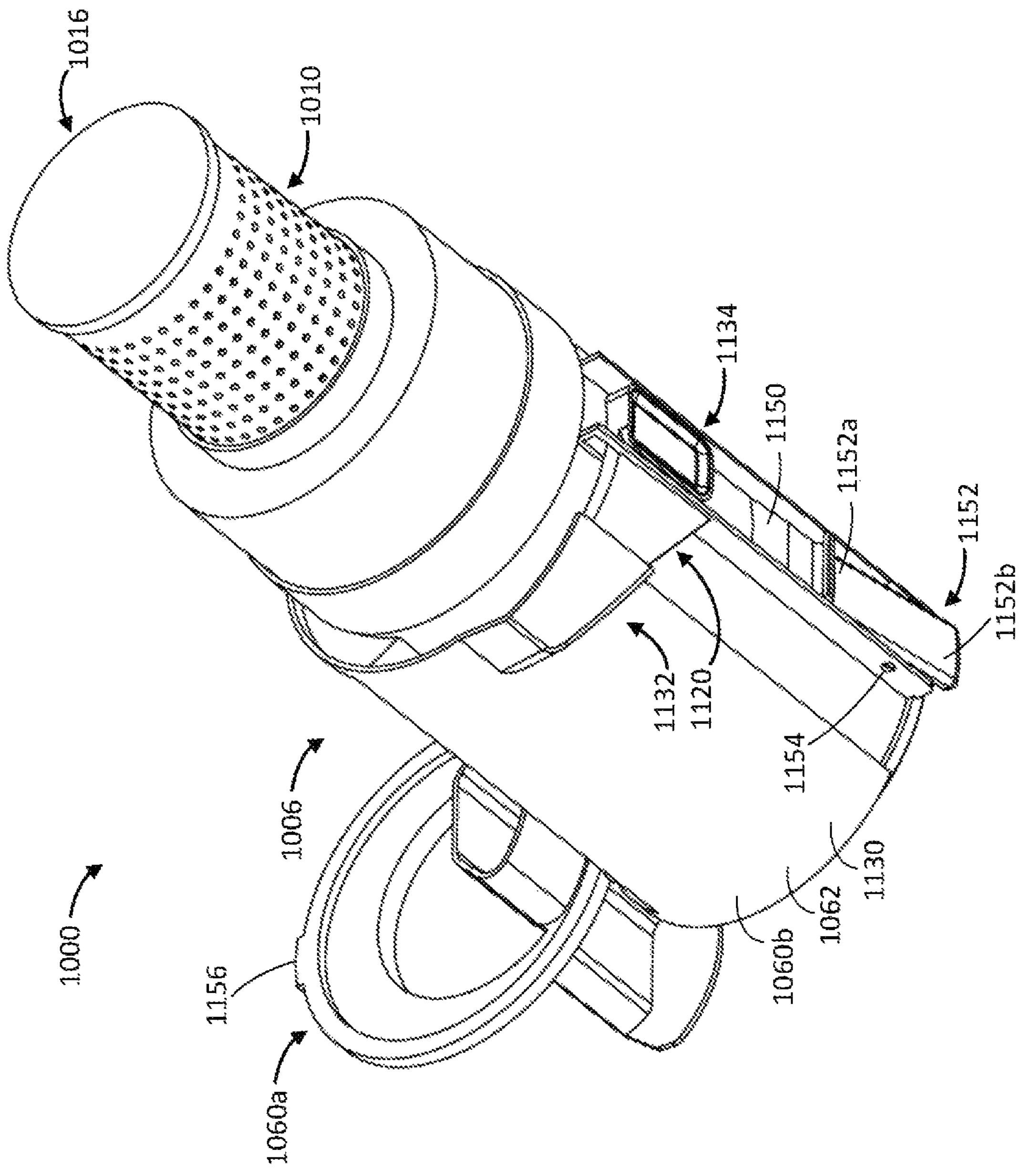
FIG. 18E is a rear perspective view of the hand vacuum cleaner of FIG. 18A, shown with a first openable portion in an open position and a second openable portion in an open position.
Figure 18F:
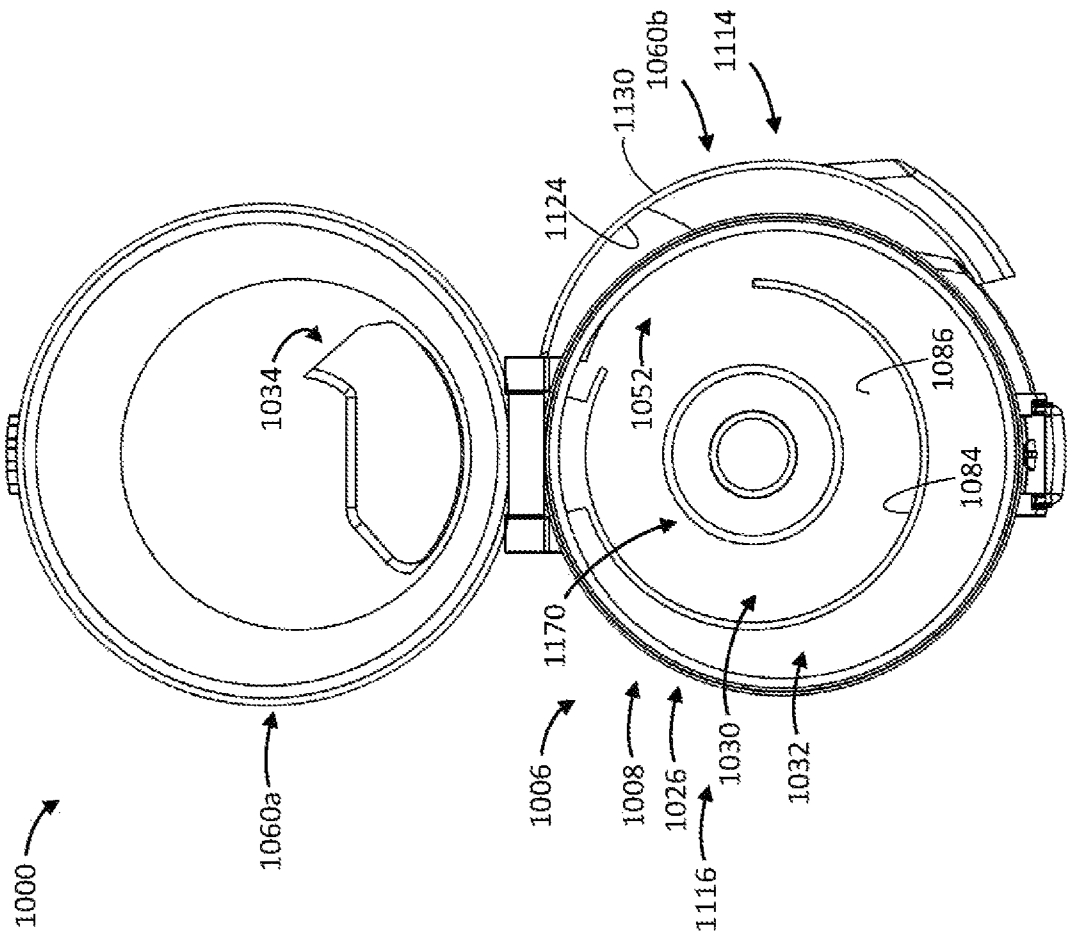
FIG. 18F is a front view of the hand vacuum cleaner of FIG. 18E.
Figure 18G:
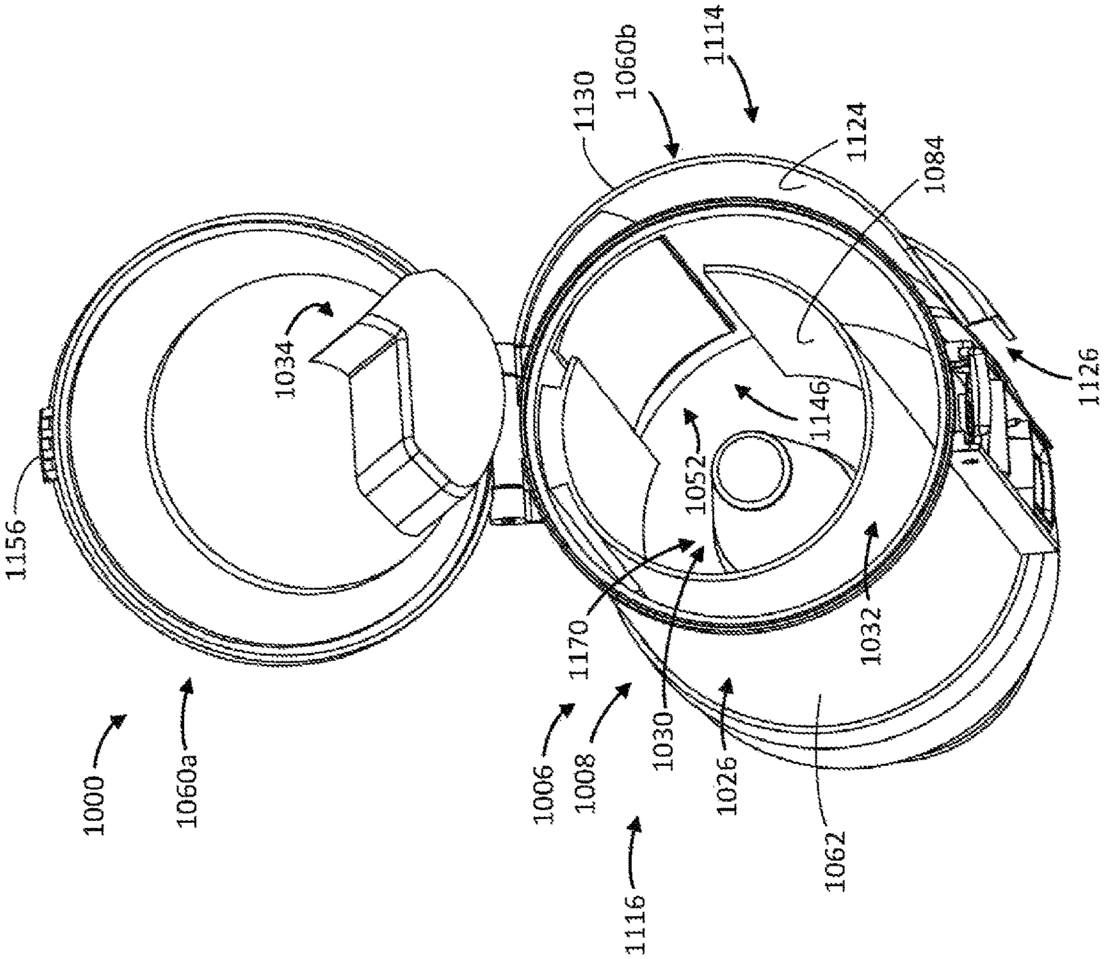
FIG. 18G is a front perspective view of the hand vacuum cleaner of FIG. 18E.

Referring now to FIGS. 18A-18G, shown therein is an example of a hand vacuum cleaner 1000 in which the openable portion 1060*b* is or comprises a flexible membrane 1130 (e.g., an elastomeric material). As shown in FIGS. 18D and 18G, when the openable portion 1060*b* is in the open position, a portion of the air treatment chamber sidewall 1084 (the portion optionally including the dirt outlet 1052) and a portion of the dirt collection chamber sidewall 1124 are translated outwardly from their operating positions forming an opening 1126 in the exterior surface 1062 of the surface cleaning apparatus. Accordingly, in the example illustrated, when the openable portion 1060*b* is in the open position, debris from within the air treatment chamber 1044 and/or the dirt collection chamber 1032 may be discharged from the surface cleaning apparatus via the opening 1146 (FIG. 18G) left in the air treatment chamber sidewall 1084 and dirt collection chamber sidewall 1124 from moving the openable portion 1060*b*. In the example illustrated, moving the openable portion 1060*b* from the closed position to the open position also loosens debris that may have compacted within the air treatment chamber 1044, the dirt collection chamber 1032, and/or the dirt outlet 1052 connecting the air treatment chamber 1044 to the dirt collection chamber 1032.

Alternately, when the openable portion 1060*b* is in the open position, a portion of the air treatment chamber sidewall 1084 (the portion optionally including the dirt outlet 1052) is translated outwardly from its operating position enlarging the dirt outlet and If part or all of the openable portion is flexible, then the openable portion may deform as an actuator acts thereon. The actuator may be moveable, e.g., axially as discussed subsequently or angularly around a portion of the outer perimeter of the hand vacuum cleaner.

Referring to FIGS. 18B and 18E, in the example illustrated, the openable portion 1060*b* includes a cammed surface 1132 and a user activated button 1134 that is drivingly connected to the actuator 1120 (e.g., a wedge—See FIG. 18E). As shown, the actuator 1120 may abut the cammed surface 1132 whereby movement of the actuator 1120 axially with the button 1134 may cause the cam surface 1132 to travel angularly along the actuator 1120 (i.e., upwardly in FIG. 8E) thereby driving the second openable portion 1060*b* from the closed position (FIG. 18B) to the open position (FIG. 18E) when the button 1134 is translated axially forwardly by a user of the hand vacuum cleaner 1000. Optionally, the button 1134 (and therefore actuator 1120) may be biased to the closed position. In the example illustrated, a spring (not shown) is used to bias the user activated button 1134 to the closed position of the openable portion 1060*b*. It will be appreciated that, if the openable portion 1060*b* is flexible, then the openable portion 1060*b* may provide some or all of the biasing force. Alternatively, there may be a handle on an exterior surface 1118 of the openable portion 1060 for a user to grip and pull the openable portion 1060 from the closed position to the open position.

As shown, the button 1134 may be driving connected by, e.g., linking member 1150 to the locking member 1152 of he first openable portion 1060*a*. As exemplified, the locking member 1152 may be in the from of a rocker switch and be pivotally mounted about a pivot 1154. When button 1134 is moved axially forwardly, the linking member 1150 may drive the rearward end 1152*a* of the locking member 1152 inwardly and the forward end 1152*b* of the locking member 1152 may be rotated outwardly, thereby disengaging lip 1156 and unlocking the first openable portion 1060A and enable the first openable portion 1060*a* to move from the closed position (FIG. 18A) to the open position (FIG. 18D), e.g., by a biasing spring provided as part of the pivot 1110 when the button 1134 is translated axially forwardly by a user of the hand vacuum cleaner 1000.

The Energy Storage Member

In accordance with this aspect of this disclosure, which may be used by itself or in combination with one or more other aspects of this disclosure, power may be supplied to the surface cleaning apparatus by the energy storage member 1074 which may be any suitable device, including, for example one or more batteries, capacitors, which may be provided as part of a pack.

Optionally, the energy storage member may be rechargeable, optionally when installed in the hand vacuum cleaner, or may be replaceable, non-rechargeable batteries. Alternatively, or in addition to having power supplied by the energy storage member 1074, power may be supplied to the surface cleaning apparatus by an electrical cord connected thereto that can be connected to a standard wall electrical outlet.

Type of Energy Storage Member

The energy storage member 1074 may include any suitable number of cells, and may include, for example, lithium ion battery cells, lithium polymer cells, and/or prismatic or pouch cells. Optionally, the energy storage member 1074 may include a plurality of prismatic or pouch cells that may be arranged in one or more longitudinally extending rows. A row of prismatic or pouch cells may include a plurality of layers of prismatic or pouch cells.

Any number of cells may be used to create a power source having a desired voltage and current, and any type of energy storage member 1074 may be used, including NiMH, alkaline, and the like. The energy storage member 1074 may be of any known design and may be electrically connected to the hand vacuum cleaner 1000 by any means known in the art.

Location of Energy Storage Member the energy storage member 1074 may be located within the surface cleaning apparatus at any position.

The energy storage member 1074 may be contained within an energy storage chamber 1140. Accordingly, the energy storage chamber 1140 may be positioned within the surface cleaning apparatus at any location.

More than one energy storage member 1074 may be contained within a single energy storage chamber 1140. It may be desirable to contain the energy storage member 1074 within an energy storage chamber 1140 to separate the energy storage member 1074 from any debris that may pass through the surface cleaning apparatus. The energy storage chamber 1140 may also protect the energy storage member 1074 from accidental damage, such as, for example, a puncture.

Figure 1F:
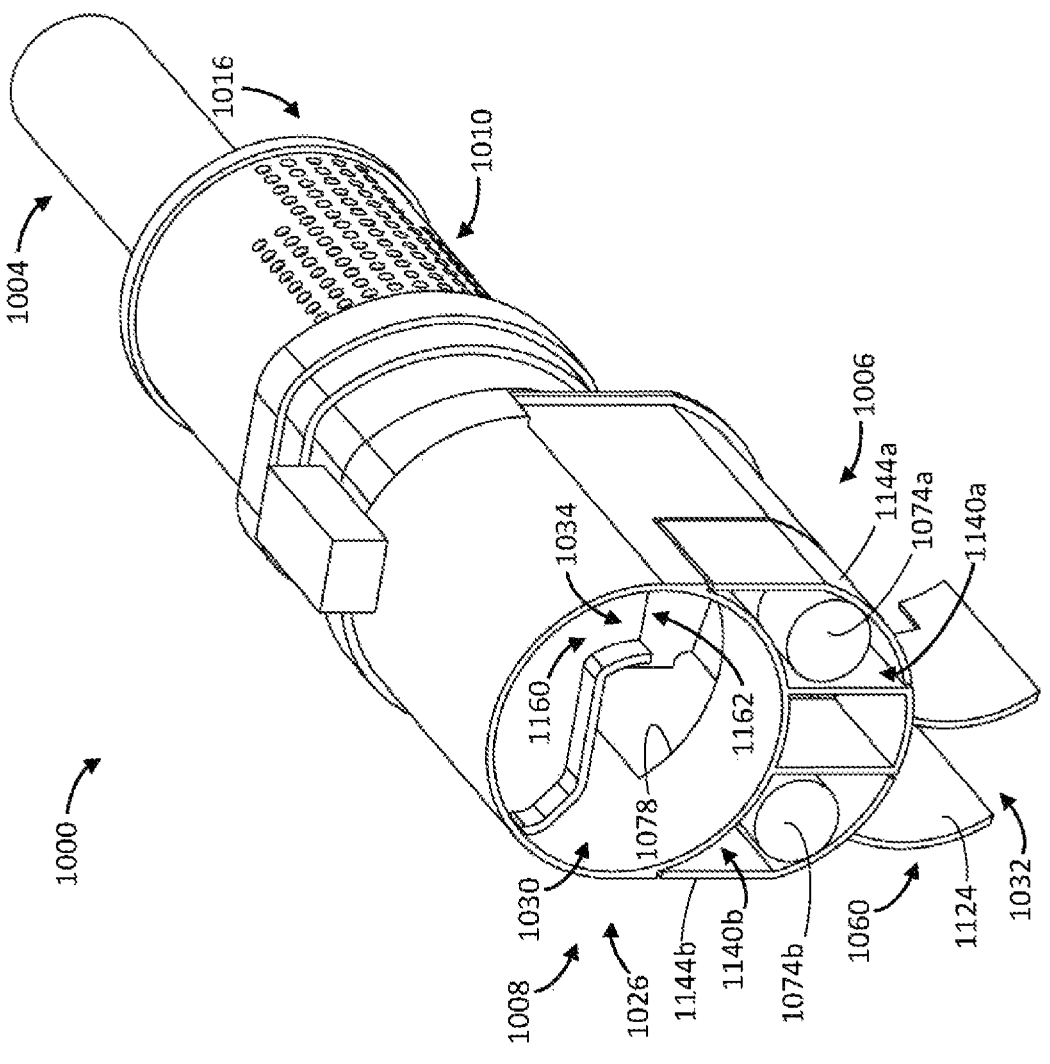
FIG. 1F is a cross-sectional view of the hand vacuum cleaner of FIG. 1A, taken along line 1E-1E, shown with an openable portion in an open position.
Figure 1G:
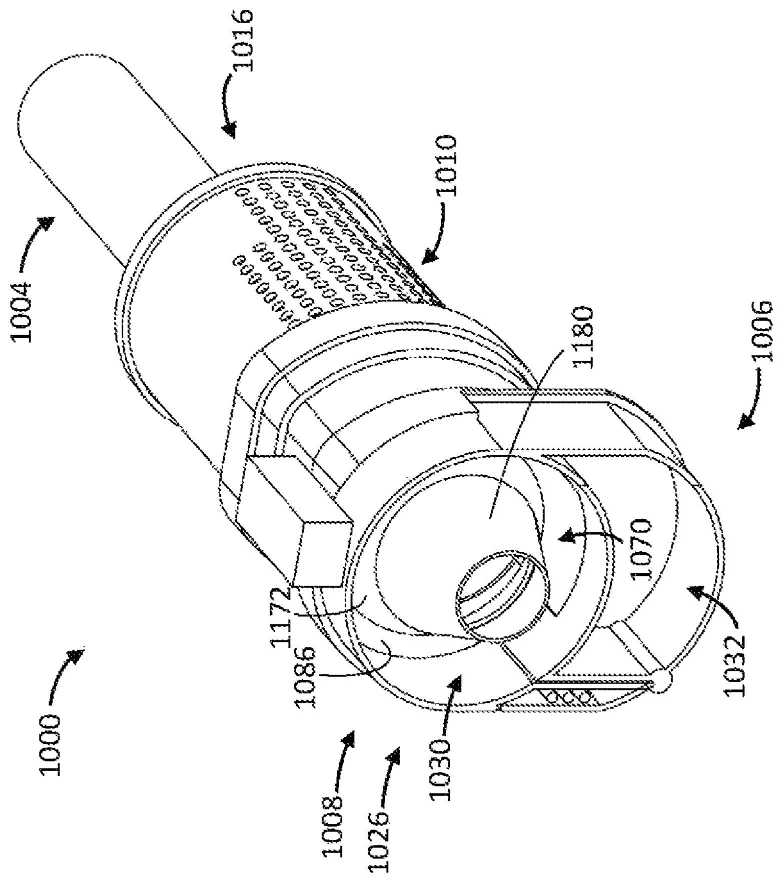
FIG. 1G is a cross-sectional view of the hand vacuum cleaner of FIG. 1A, taken along line 1G-1G, shown with an openable portion shown in a closed position.
Figure 1H:
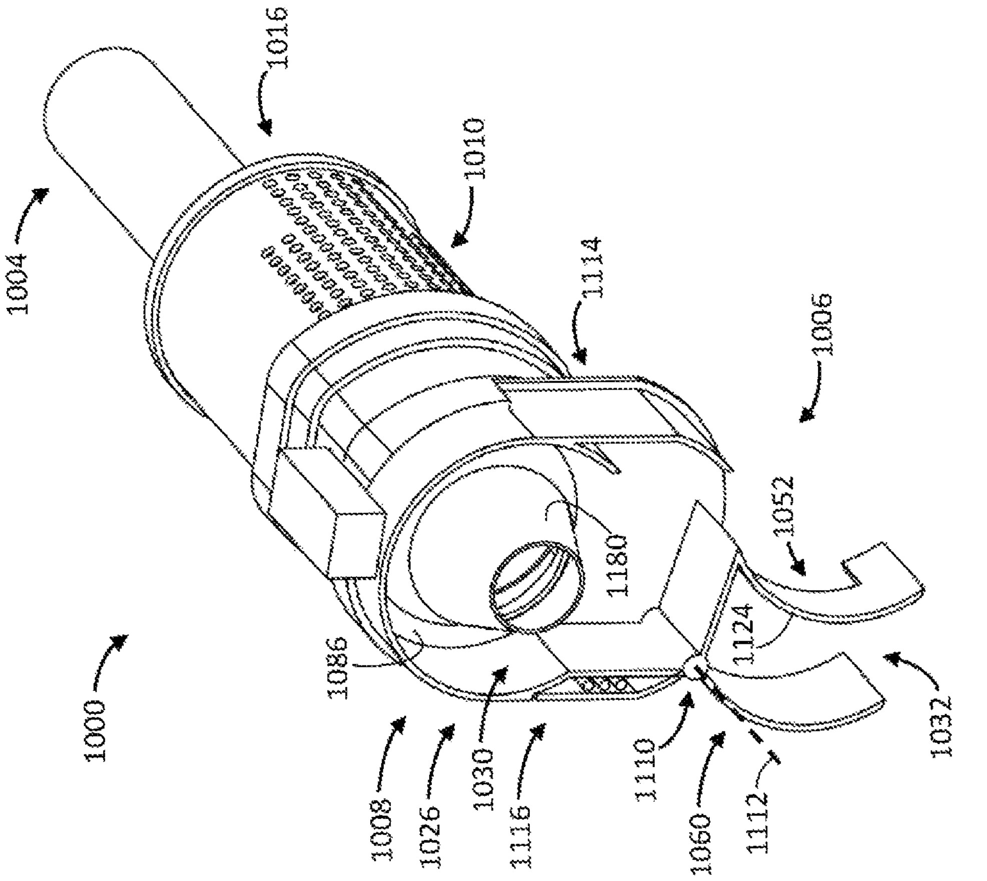
FIG. 1H is a cross-sectional view of the hand vacuum cleaner of FIG. 1A, taken along line 1G-1G, shown with an openable portion shown in an open position.
Figure 2A:
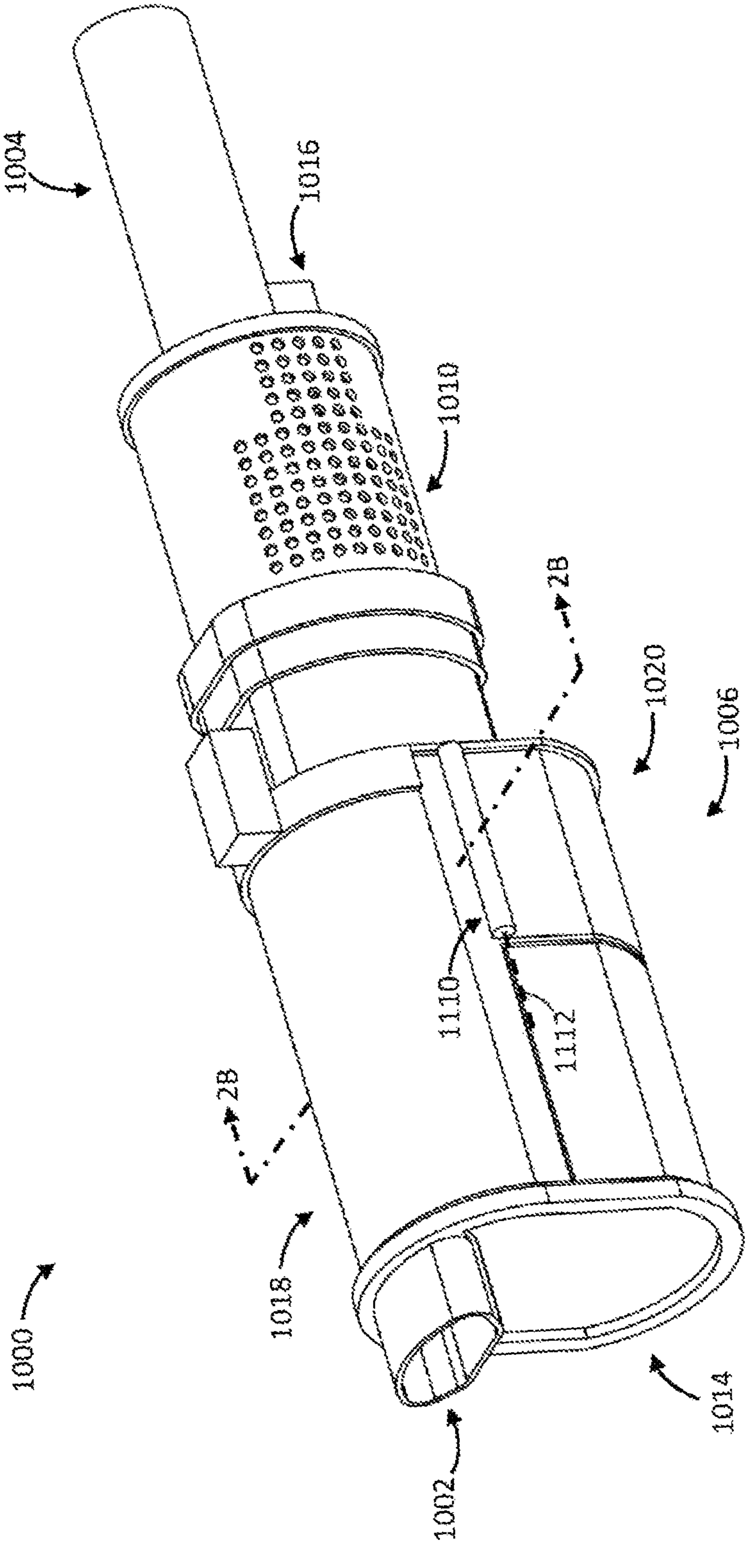
FIG. 2A is a front perspective view of another example of a hand vacuum cleaner.
Figure 2B:
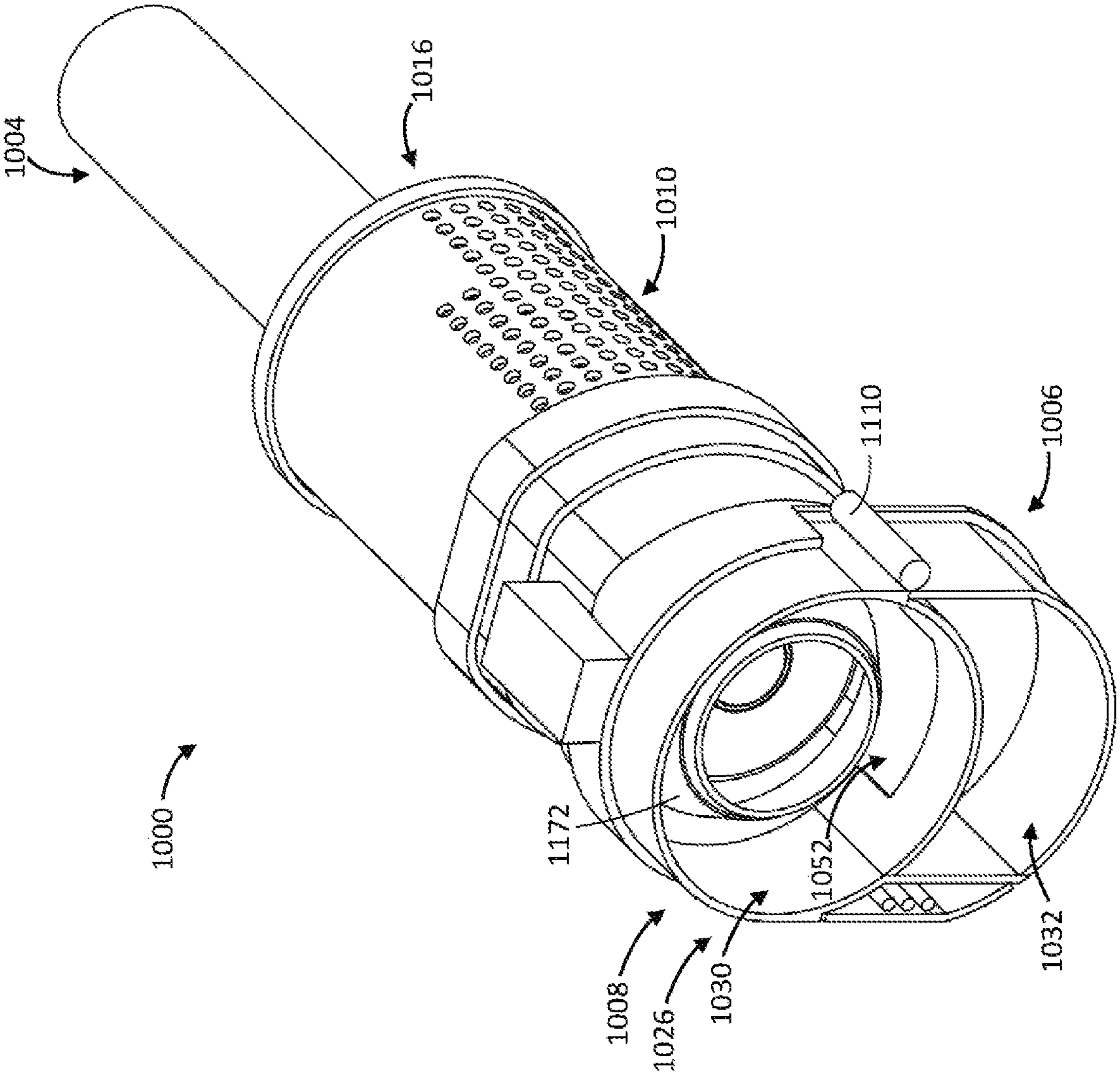
FIG. 2B is a cross-sectional view of the hand vacuum cleaner of FIG. 2A, taken along line 2B-2B, shown with an openable portion in a closed position.
Figure 2C:
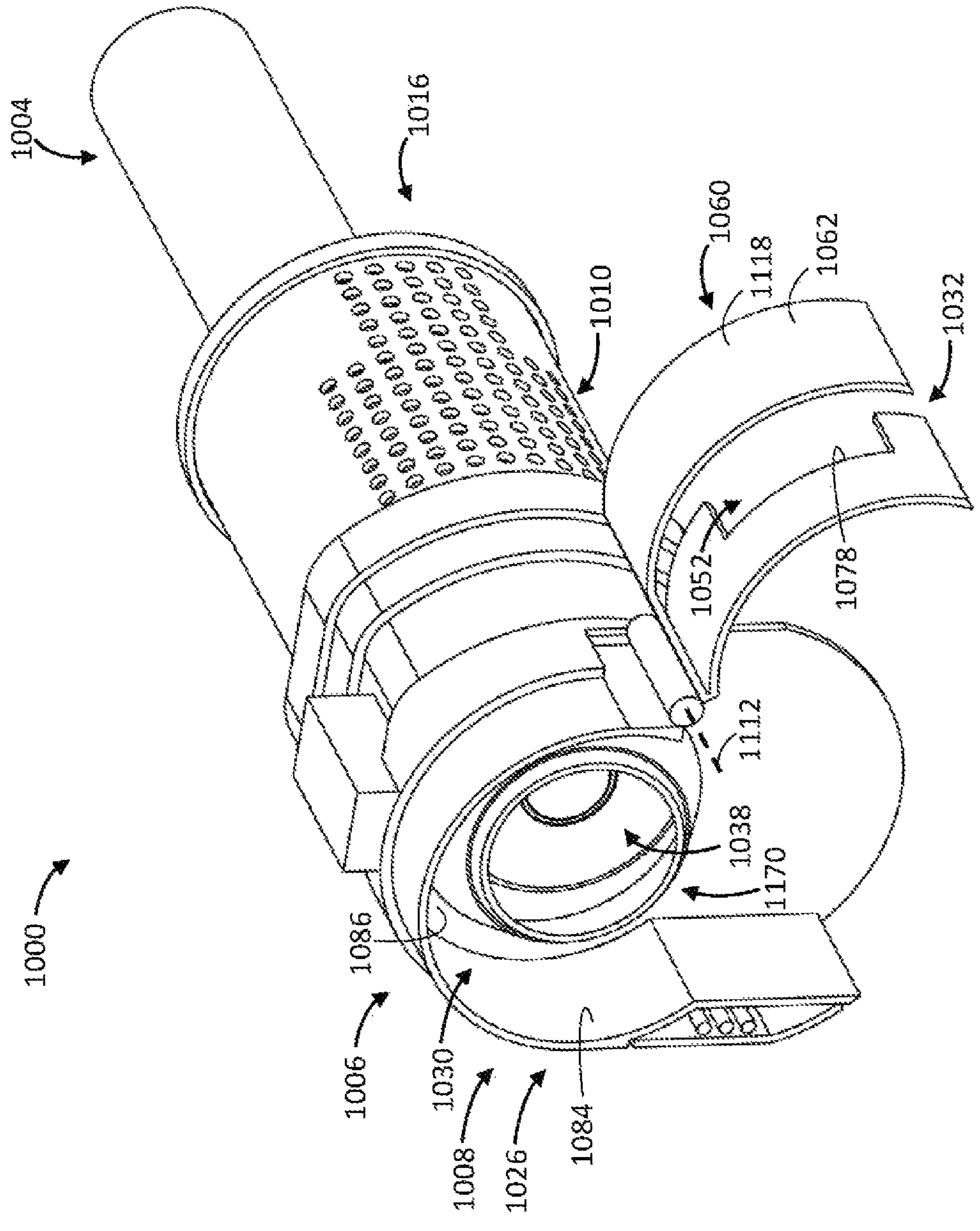
FIG. 2C is a cross-sectional view of the hand vacuum cleaner of FIG. 2A, taken along line 2B-2B, shown with an openable portion in an open position.
Figure 3A:
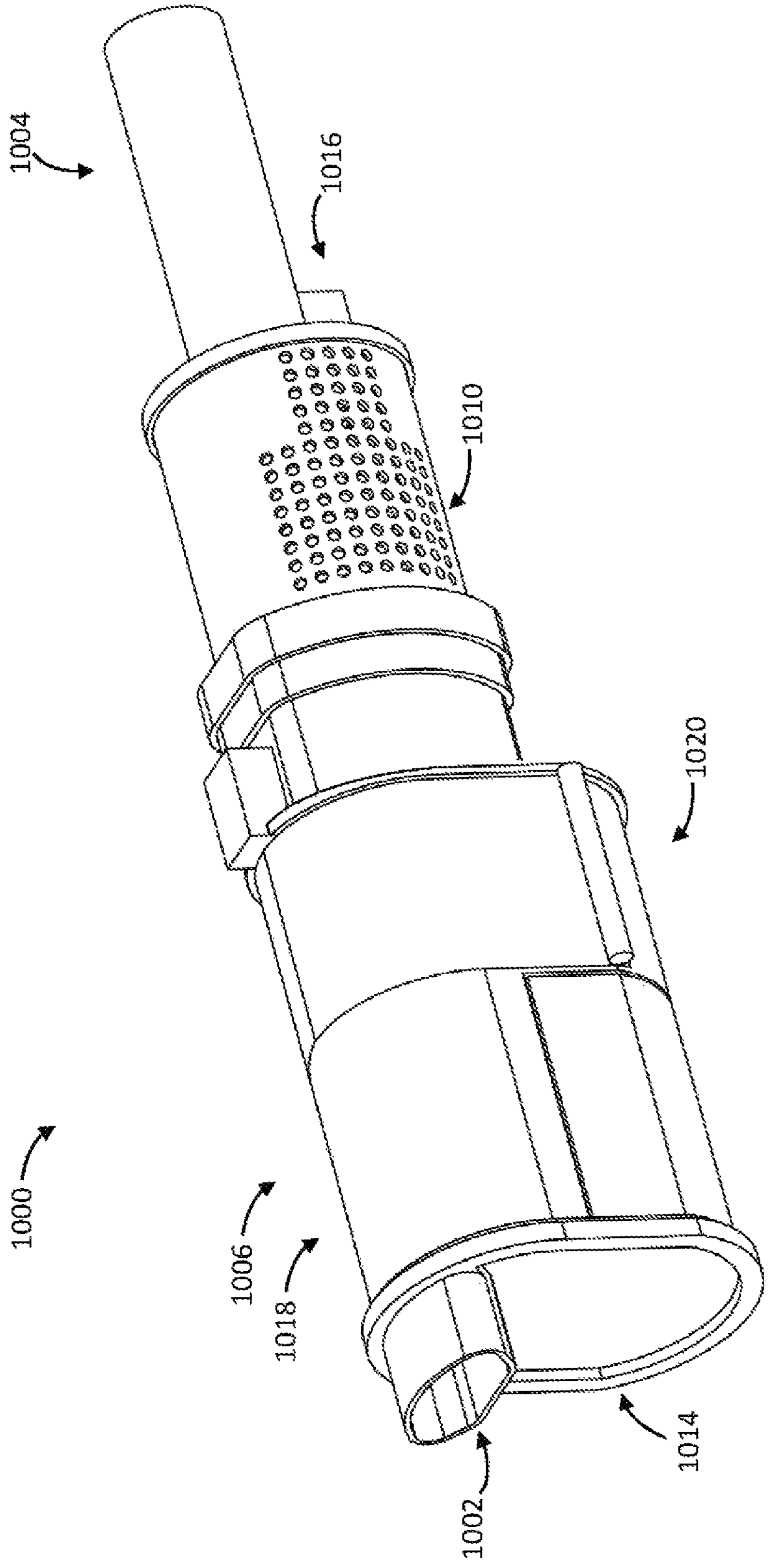
FIG. 3A is a front perspective view of another example of a hand vacuum cleaner, shown with an openable portion in a closed position.
Figure 3B:
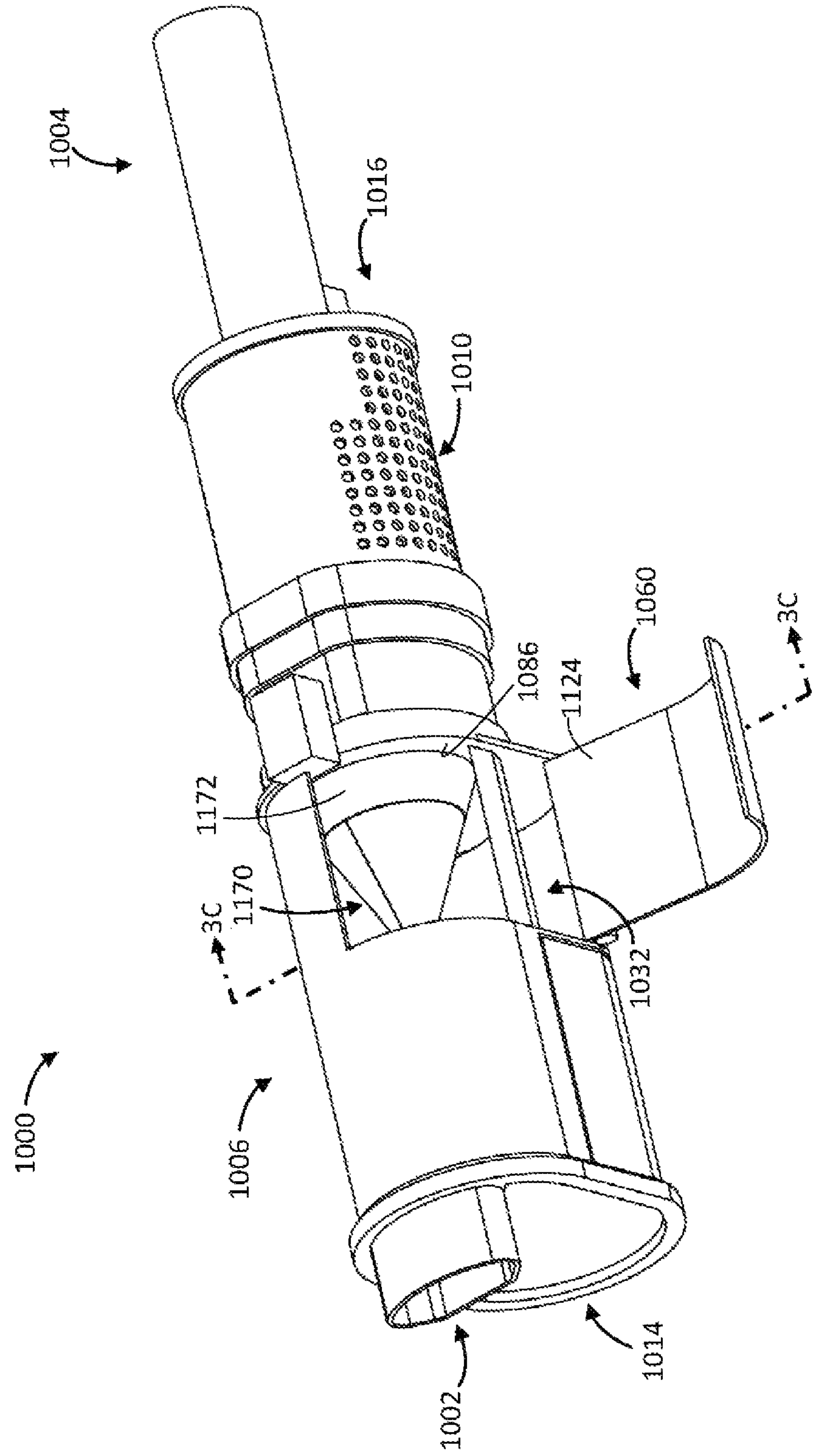
FIG. 3B is a top perspective view of the hand vacuum cleaner of FIG. 3A, shown with the openable portion in an open position.
Figure 3C:
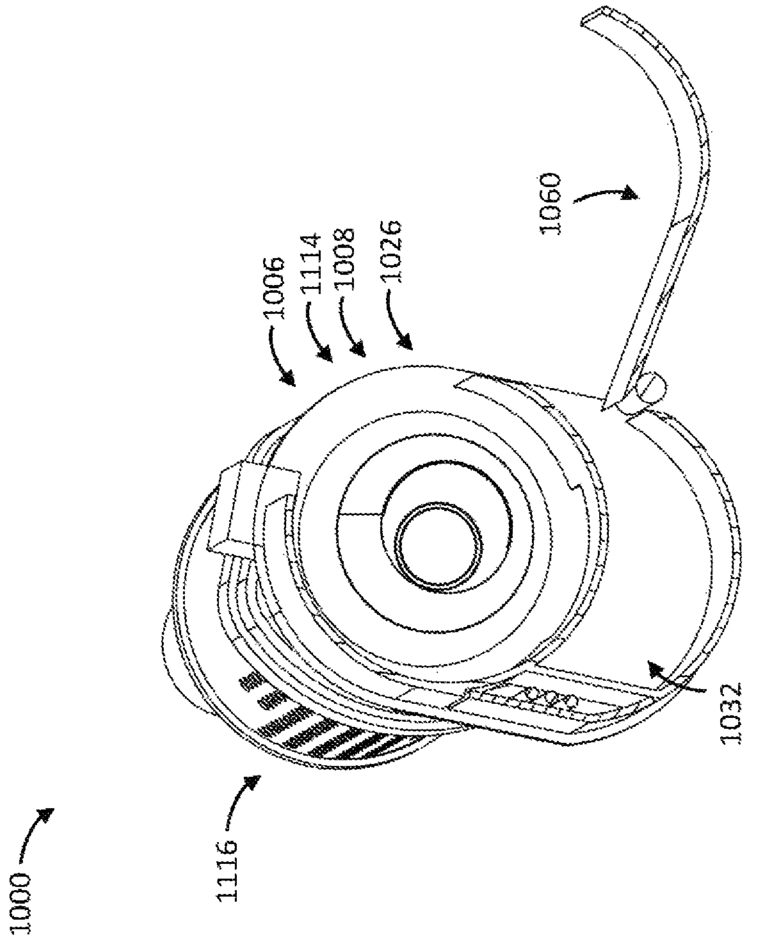
FIG. 3C is a cross-sectional view of the hand vacuum cleaner of FIG. 3B, taken along line 3C-3C.

As shown in FIG. 1F, the energy storage member 1074 may be positioned radially outward from the air treatment chamber 1044. That is, a plane that is transverse to the central axis 1050 of the air treatment chamber 1044 may intersect the air treatment chamber 1044 and the energy storage member 1074.

The energy storage member 1074 may be positioned forward, rearward, and/or laterally beside the dirt collection chamber 1032. In the example illustrated in FIGS. 1D and 1E, the energy storage member 1074 is positioned forward a first portion 1032*a* of the dirt collection chamber 1032 and laterally beside a second portion 1032*b* of the dirt collection chamber 1032.

Accordingly, as exemplified in FIG. 1E, the energy storage member 1074 may be located beside and extend axially with the dirt collection chamber 1032. Further, as discussed subsequently, the energy storage member 1074 may be accessible when the dirt collection chamber 1032. It will be appreciated that two or more energy storage members 1074*a*, 1074*b* may be provided and they be located in separate compartments 1040*a*, 1040*b* (see FIG. 1E) or in a single compartment.

As a second example, as shown in FIG. 8C, the energy storage member 1074 may be positioned rearward of the air treatment member 1008. Optionally, as shown in FIG. 8C, the energy storage member 1074 may be positioned above the pre-motor filter 1066 and/or the motor and fan assembly 1022. That is, the motor and fan assembly 1022 may have an axis of rotation 1138 and a plane that is transverse to the axis of rotation 1138 may intersect the energy storage member 1074 and the motor and fan assembly 1022.

In the example illustrated in FIGS. 22A-22D, an energy storage member 1074 is located rearward of the handle 1004.

Figure 13:
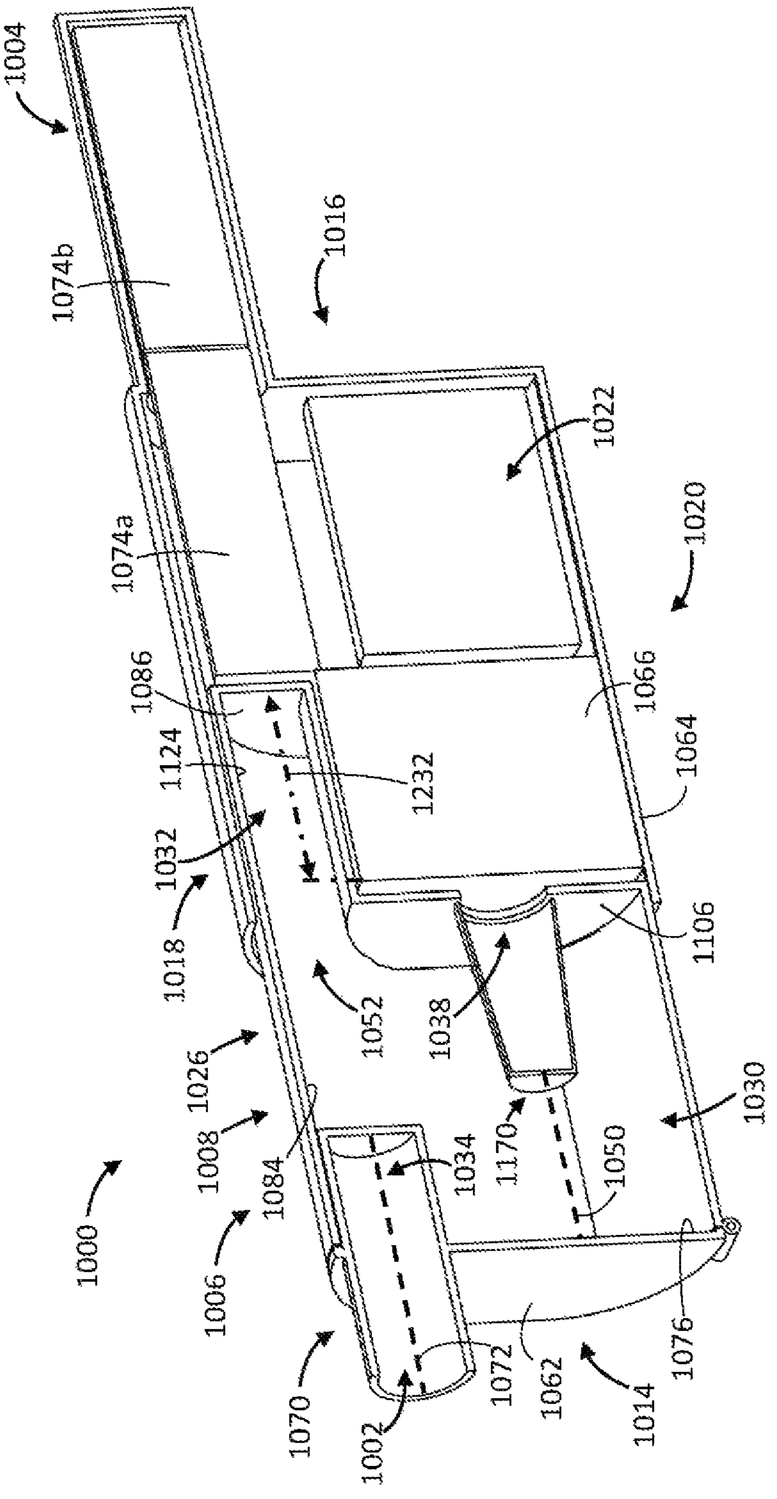
FIG. 13 is a cross-sectional view of another example of a hand vacuum cleaner.

As a third example, the energy storage member 1074 may be positioned in the handle 1004, as is shown in FIG. 13.

Figure 19:
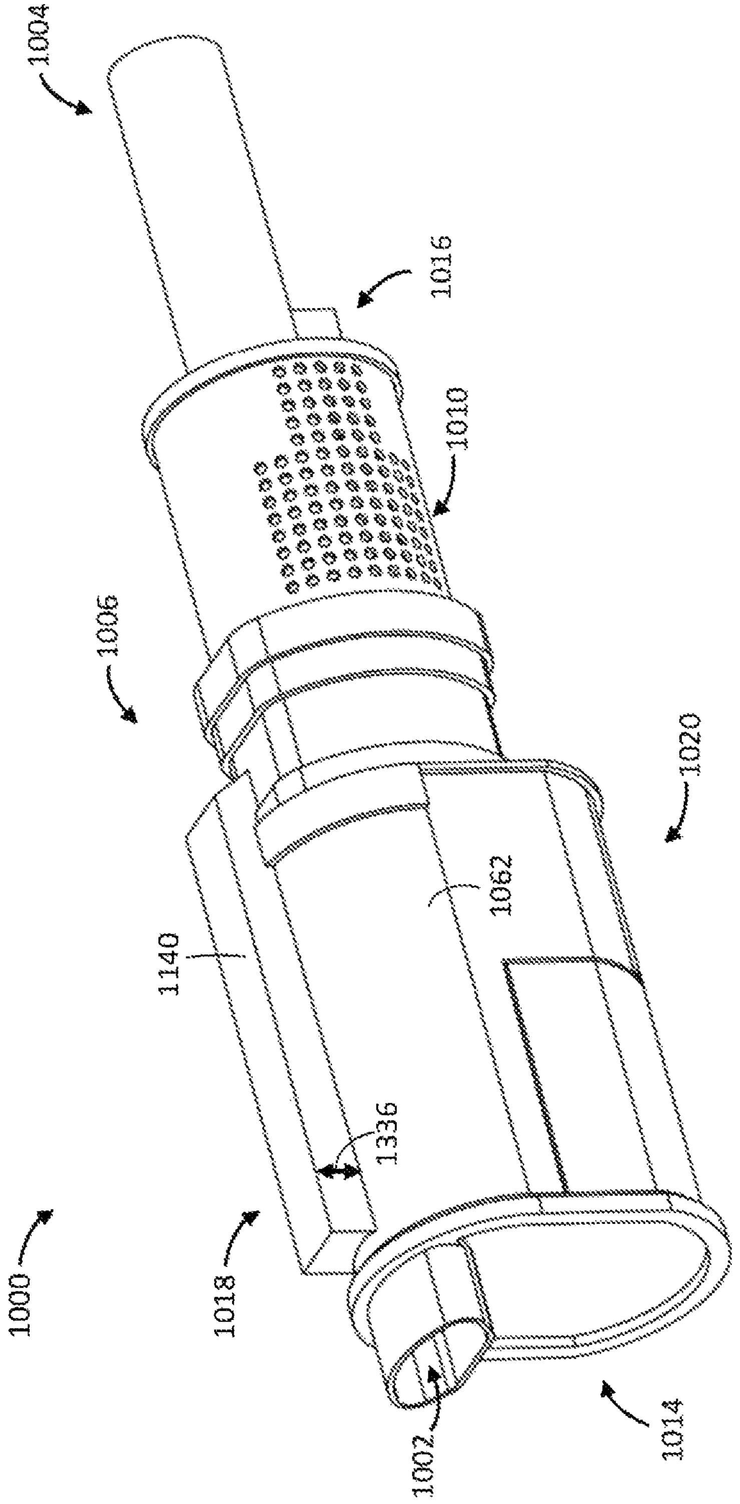
FIG. 19 is a front perspective view of another example of a hand vacuum cleaner.
Figure 20:
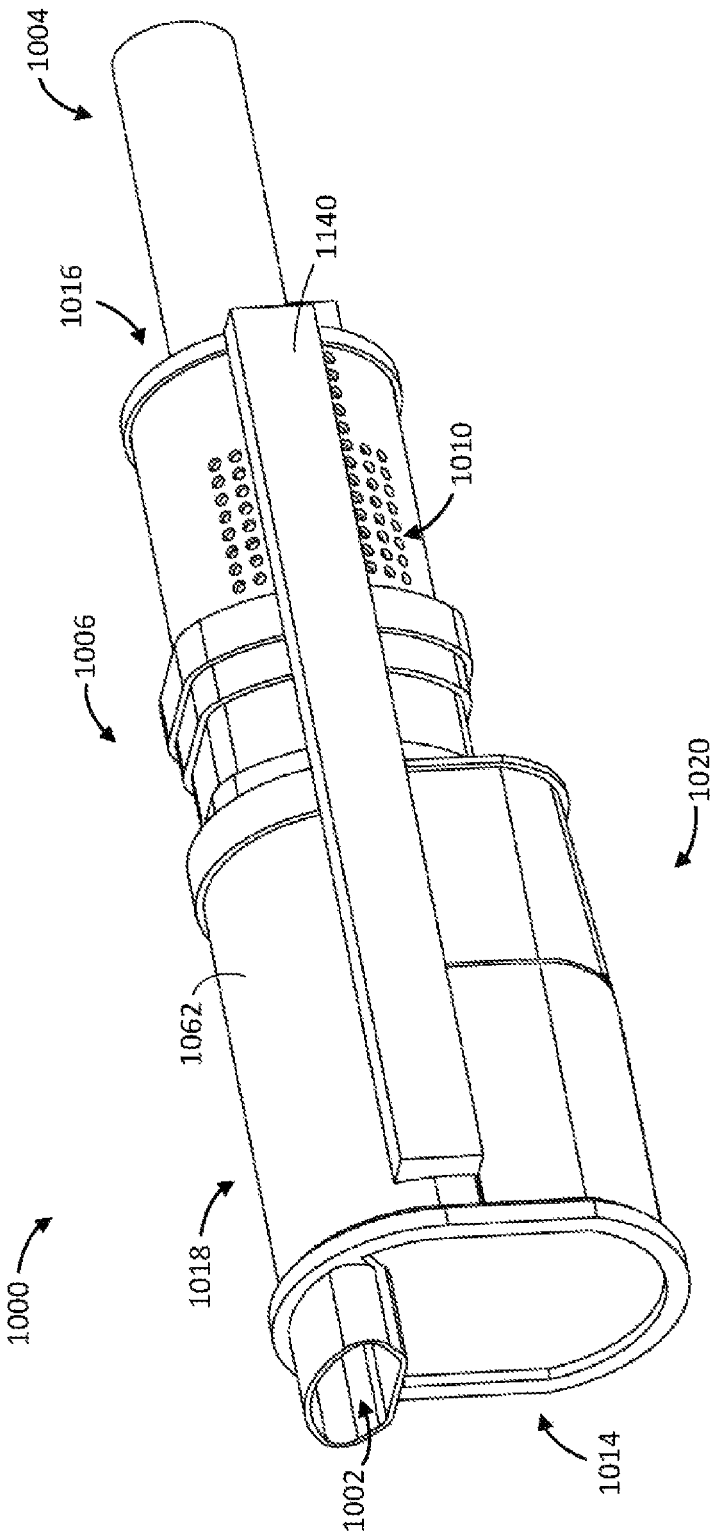
FIG. 20 is a front perspective view of another example of a hand vacuum cleaner.

As a fourth example, the energy storage member 1074 may form part of the exterior surface 1062 of the surface cleaning apparatus, as is shown in FIGS. 19 and 20. When forming a part of the exterior surface 1062 of the surface cleaning apparatus, the energy storage member 1074 may be located on an upper end 1018, lower end 1020, and/or lateral side 1114, 1116 of the surface cleaning apparatus (this includes an upper, lower, and/or lateral side of the handle 1004). While the examples illustrated in FIGS. 19 and 20 show the energy storage chamber 1140 as protruding from the exterior surface 1062 of the hand vacuum cleaner 1000, in some embodiments (see e.g., FIG. 22A), there may be a smooth transition from a portion of the exterior surface 1062 not defined by the energy storage chamber 1140 and a portion of the exterior surface 1062 defined by the energy storage chamber 1140. As exemplified in FIG. 22A, a row of energy storage members 1074*a* may be provided along the top of the air treatment member and a row of energy storage members 1074*b* may be provided along the top of the main body 1006, which may house the suction motor and one or more filters and, optionally an additional energy storage member as exemplified in FIG. 22D. In such an embodiment, the energy storage members extending along to the top the air treatment member 1008 and the main housing 1006 may be pouch or prism cells, which are thin and may be arranged to add, e.g., 10-20 mm to the height of the hand vacuum cleaner. The energy storage members may not extend along the top of handle 1004 and therefore may assist in defining handle 1004 as the top of handle 1004 may be recessed inwardly due to the absence of energy storage members extending along the top thereof.

Figure 22A:
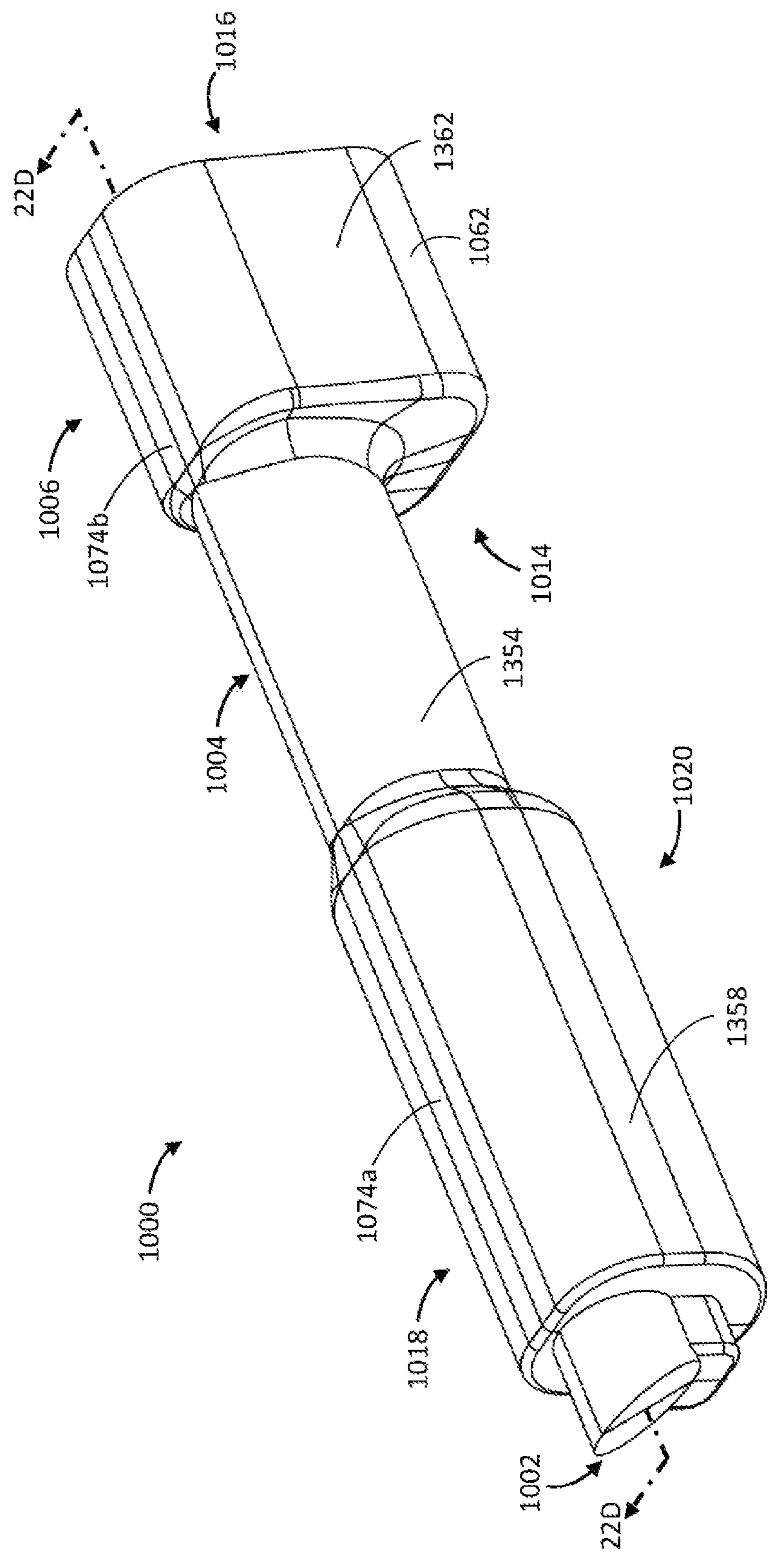
FIG. 22A is a front perspective view of another example of a hand vacuum cleaner.
Figure 22B:
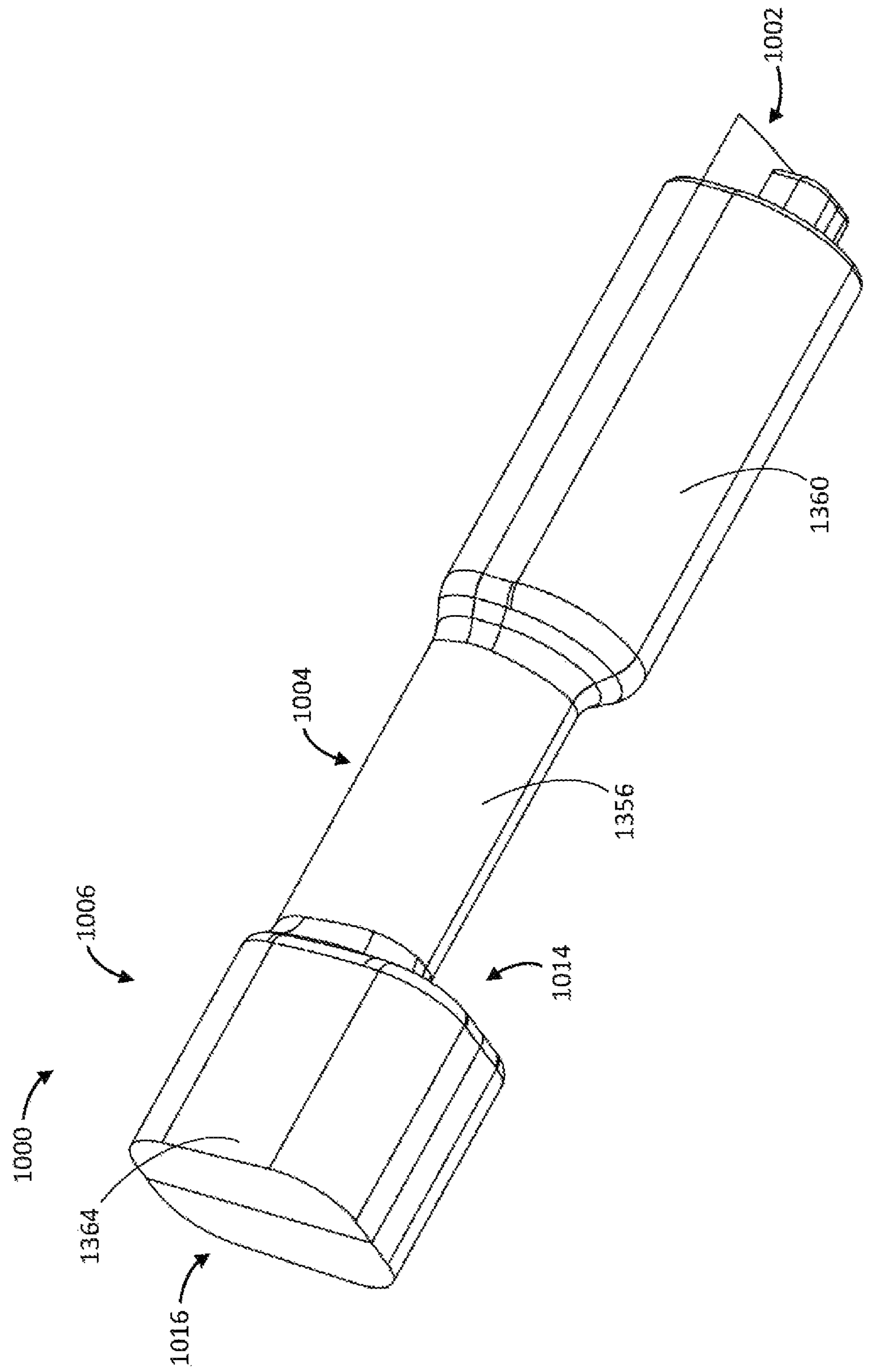
FIG. 22B is a rear perspective view of the hand vacuum cleaner of FIG. 22A.
Figure 22C:
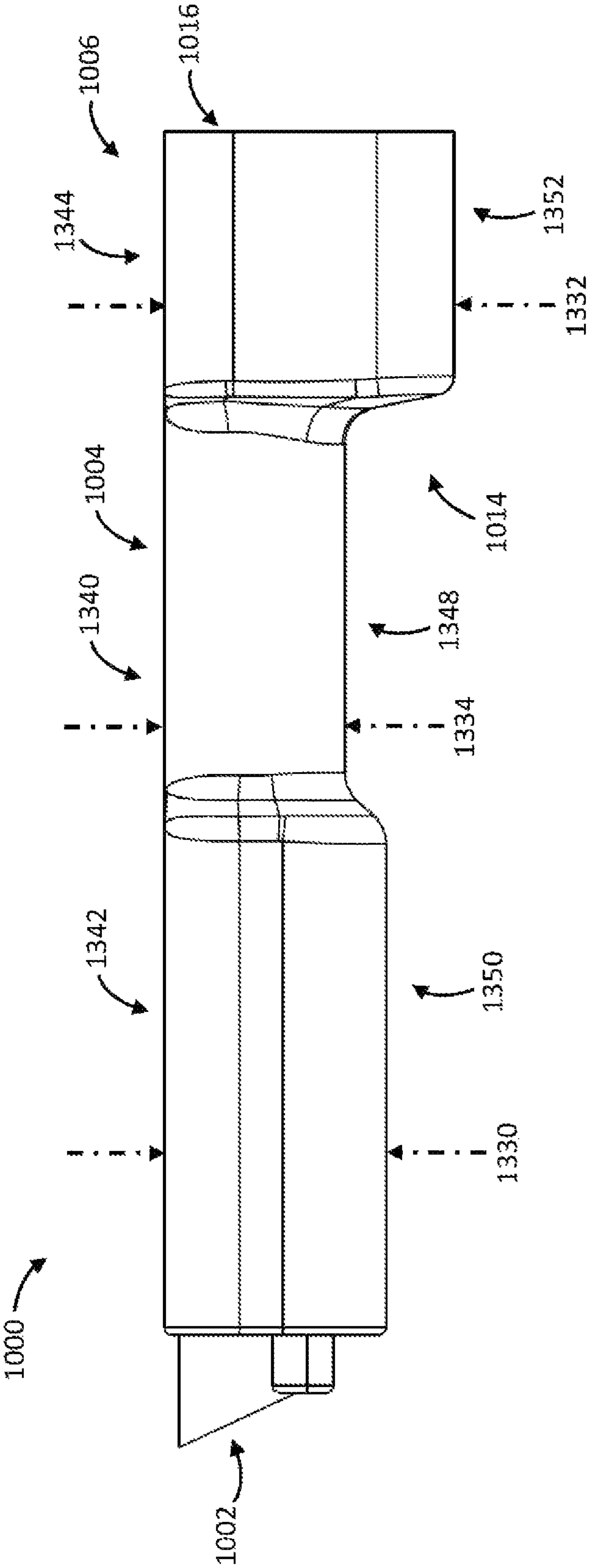
FIG. 22C is a side view of the hand vacuum cleaner of FIG. 22A.

Alternately, for example, the energy storage member 1074 may extend from the front end 1014 of the surface cleaning apparatus to the rear end 1016 of the surface cleaning apparatus, including along the top of handle 1004 in FIG. 22A.

It is to be understood that the positions of the energy storage member 1074 described herein are not mutually exclusive. As exemplified in FIG. 22D, an energy storage member 1074*c* may be positioned radially outwardly from both the air treatment chamber 1044 and the motor and fan assembly 1022 as well as another energy storage member 1074*a*, 1074*b* extending along part of all of the entire length of the surface cleaning apparatus (including within/along the handle 1004).

Optionally, the energy storage chamber 1140 may include portions of other components of the surface cleaning apparatus. For example, as shown in FIG. 1E, a portion of the dirt collection chamber sidewall 1124 and a portion of the cyclone chamber sidewall 1084 each define a sidewall 1142 of the energy storage chamber 1140.

Multiple Energy Storage Members

In accordance with this aspect of this disclosure, which may be used by itself or in combination with one or more other aspects of this disclosure, the energy storage member 1074 may be split between two locations within the surface cleaning apparatus.

Each of the first and second energy storage members 1074*a*, 1074*b* may be used to concurrently power the surface cleaning apparatus. Alternatively, the first and second energy storage members 1074*a*, 1074*b* may independently power the surface cleaning apparatus.

Each of the first and second energy storage members 1074*a*, 1074*b* may be contained within a separate energy storage chamber 1140. As exemplified in FIG. 1E, first and second energy storage members 1074*a*, 1074*b* are positioned in first and second energy storage chambers 1040*a*, 1040*b*.

It will be appreciated that the first and second energy storage chambers 1040*a*, 1040*b* may be located on the same portion on the hand vacuum cleaner and they may be spaced from each other in the lateral direction (e.g., they may extend concurrently). As exemplified in FIG. 1E, the first and second energy storage chambers 1040*a*, 1040*b* extend concurrently with the dirt collection chamber 1032 but on opposed lateral sides thereof. Alternately, the first and second energy storage members 1074*a*, 1074*b* may be located at different positions within the surface cleaning apparatus. For example, the first location may be spaced from the second location in a forward/rearward (axial) direction. Optionally, the first location is spaced from the second location in both a forward/rearward and lateral direction.

For example, referring to FIG. 22A, there may be a first energy storage member that extends forward of the handle 1004 on an exterior surface 1062 of the surface cleaning apparatus and rearward of the handle 1004 on an exterior surface 1062 of the surface cleaning apparatus. Accordingly, the handle 1004 may have an absence of the energy storage member.

Figure 21A:
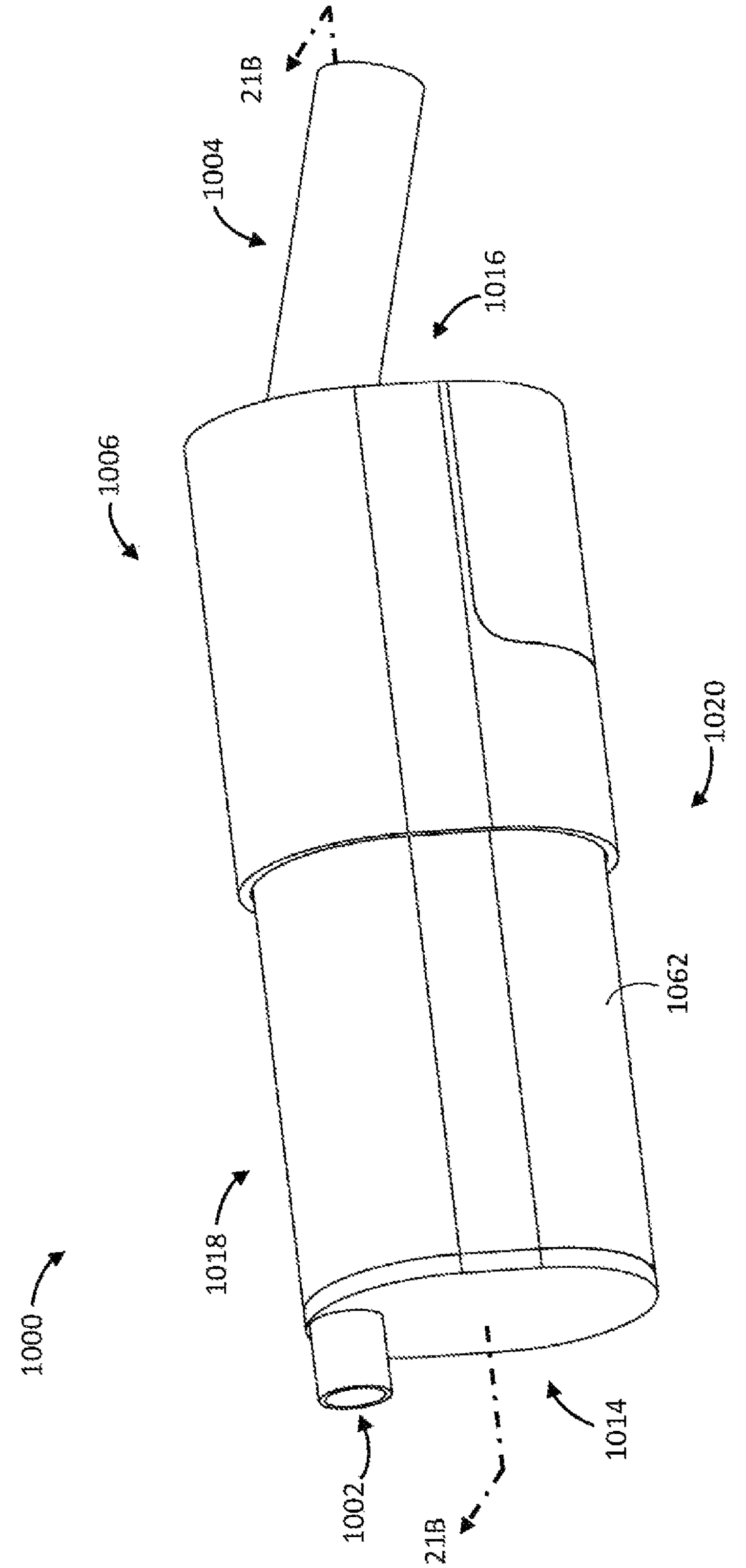
FIG. 21A is a front perspective view of another example of a hand vacuum cleaner.
Figure 21B:
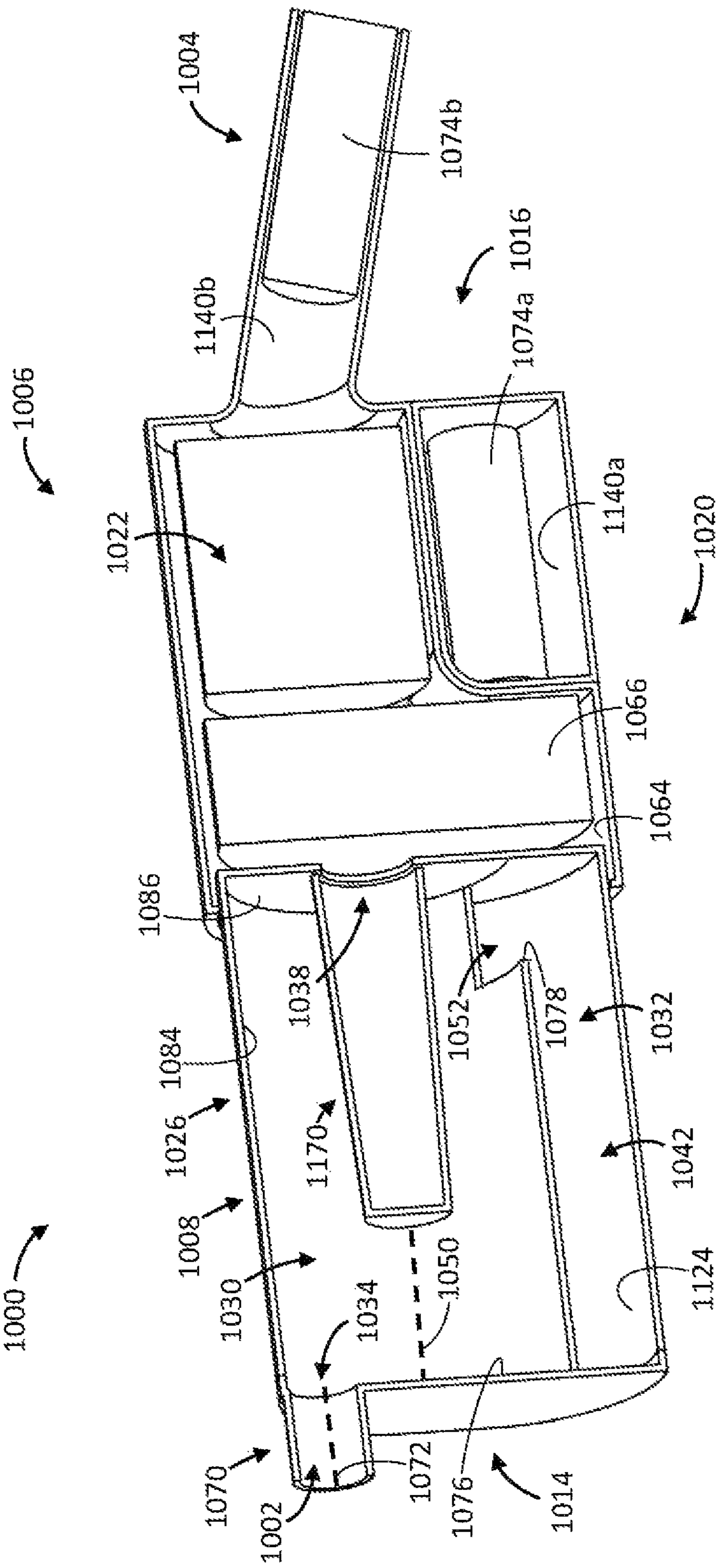
FIG. 21B is a cross-sectional view of the hand vacuum cleaner of FIG. 21A, taken along line 21B-21B.

A second example of a surface cleaning apparatus having a split energy storage member 1074 is shown in FIG. 21B. In the example illustrated in FIG. 21B, the first energy storage member 1074*a* is located in the main body 1006 and the second energy storage member 1074*b* is located in the handle 1004. In the example illustrated, the first energy storage member 1074*a* is positioned axially from the dirt collection chamber 1032 whereby a projection of the energy storage member 1074*a* intersects the dirt collection chamber 1032.

Access to the Energy Storage Member

In accordance with this aspect of this disclosure, which may be used by itself or in combination with one or more other aspects of this disclosure, the energy storage member(s) 1074 may be accessed by any means known in the art. For example, the energy storage member(s) 1074 may be accessed when charging or replacing the energy storage member(s) 1074. The energy storage member(s) 1074 may be chargeable within the surface cleaning apparatus, or the energy storage member(s) 1074 may be removable from surface cleaning apparatus for charging.

The surface cleaning apparatus may include an energy storage chamber door 1144 that is openable to permit access to the energy storage member 1074. Optionally, the energy storage chamber door 1144 may include a portion of the exterior surface 1062 of the surface cleaning apparatus. As shown in FIG. 1F, in the example illustrated, the hand vacuum cleaner 1000 includes a first energy storage chamber door 1144*a* for opening the first energy storage chamber 1140*a* and a second energy storage chamber door 1144*b* for opening the second energy storage chamber 1140*b*. Alternately, the first and second energy storage chambers 1040*a*, 1040*b* may be opened when the dirt collection chamber door is opened (e.g., if front end 1014 in FIG. 1A is a front openable door as shown in FIG. 12C or when the openable portion 1060 in the embodiment of FIG. 11 moves from the closed position to the open position).

As shown in FIG. 12C, opening the openable portion 1060 may alternatively provide access to a power coupling 1148 for supplying power (e.g., charging) to the energy storage member 1074. Any suitable power coupling 1148 may be used, for example, a female coupling configured to receive a male coupling of an electrical cord that is connectable to a source of AC or DC power, such as a household power socket.

The Cyclone Unit

In accordance with this aspect of this disclosure, which may be used by itself or in combination with one or more other aspects of this disclosure, the air treatment member 1008 of the surface cleaning apparatus may be a cyclone assembly 1026.

As exemplified in FIGS. 1A-1H, a cyclone assembly 1026 may include a cyclone chamber 1030 (shown as a uniflow cyclone chamber 1030) and a dirt collection chamber 1032 that is positioned exterior to the cyclone chamber 1030. The dirt collection chamber 1032 may be in communication with the dirt outlet 1052 to receive debris separated from an air flow by the cyclone chamber 1030. In the illustrated example, the cyclone air inlet 1034 and dirt outlet 1052 are positioned toward opposing ends 1036, 1040 of the cyclone chamber 1030, and the cyclone chamber air outlet 1038 is provided toward the same end as the dirt outlet 1052 (the rear end 1040 as illustrated). In this configuration, dirty air can enter at the front end 1036 of the cyclone chamber 1030, while cleaner air and the separated dirt particles both exit the cyclone chamber 1030 at the opposing rear end 1040.

In this embodiment, the cyclone chamber 1030 has a front end wall 1076 and an opposing rear end wall 1086 that is spaced apart from the front end wall 1076 along the cyclone axis 1050 about which air circulates within the cyclone chamber 1030 during operation of the surface cleaning apparatus. The cyclone chamber sidewall 1084 extends between the front and rear end walls 1076, 1086. In the illustrated example, when the hand vacuum cleaner 1000 is oriented with the upper end 1018 above the lower end 1020, the cyclone axis 1050 is generally horizontal, and is closer to horizontal than vertical, e.g., ±20°, ±15°, ±10°, or ±5° from the horizontal. As exemplified, the cyclone axis 1050 may be substantially parallel to, e.g., within ±20°, ±15°, ±10°, or ±5°, and vertically offset below the inlet conduit axis 1072 of the inlet conduit 1070, and the cyclone chamber 1030 and dirt collection chamber 1032 are both below the inlet conduit axis 1072.

In the embodiment shown in FIG. 1D, the height 1056 and width (i.e., diameter in the example illustrated) of the cyclone chamber 1030 is generally constant along its length 1158. That is the height 1056 and width of the cyclone chamber 1030 in a direction transverse to the cyclone axis of rotation 1050 at the front end 1036 is generally equal to the height 1056 and width of the cyclone chamber 1030 in the direction transverse to the cyclone axis of rotation 1050 at the rear end 1040.

Figure 23:
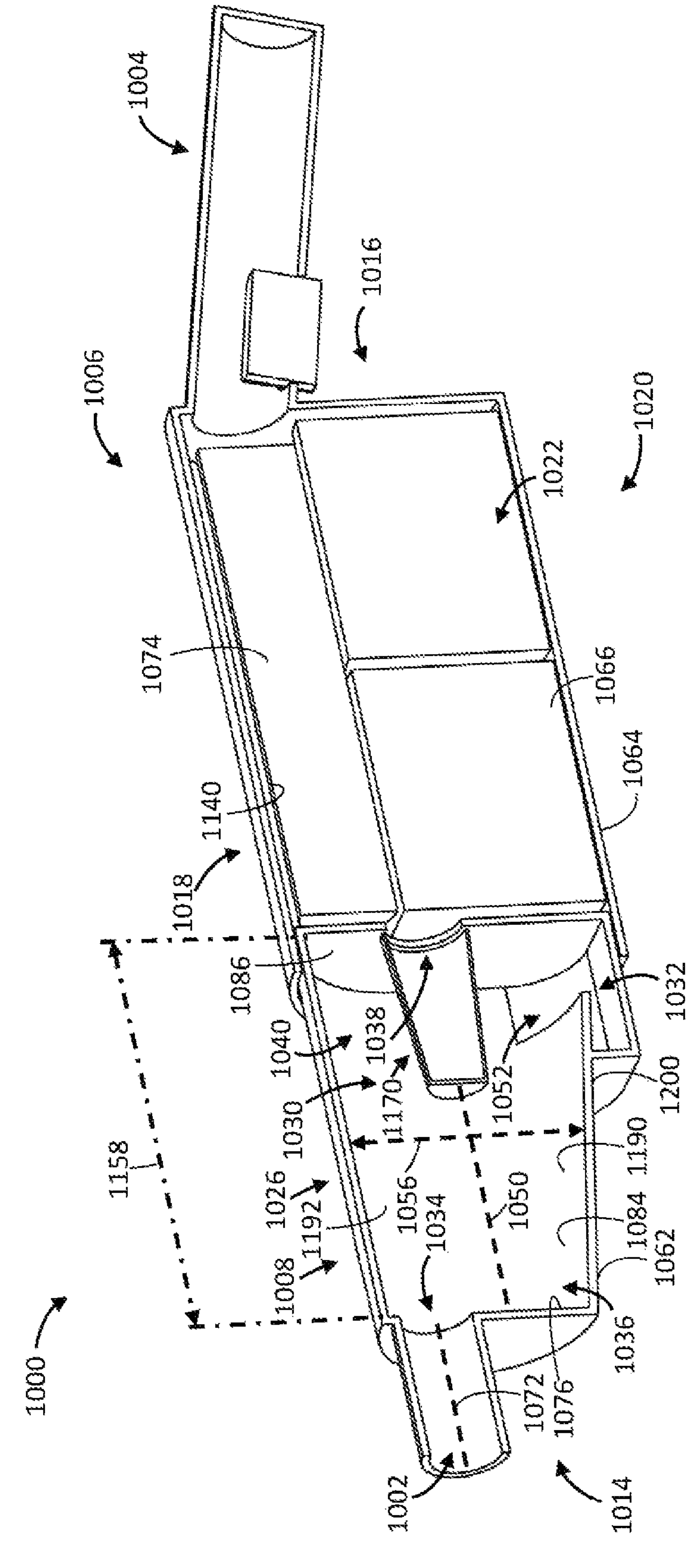
FIG. 23 is a cross-section view of another example of a hand vacuum cleaner.
Figure 24:
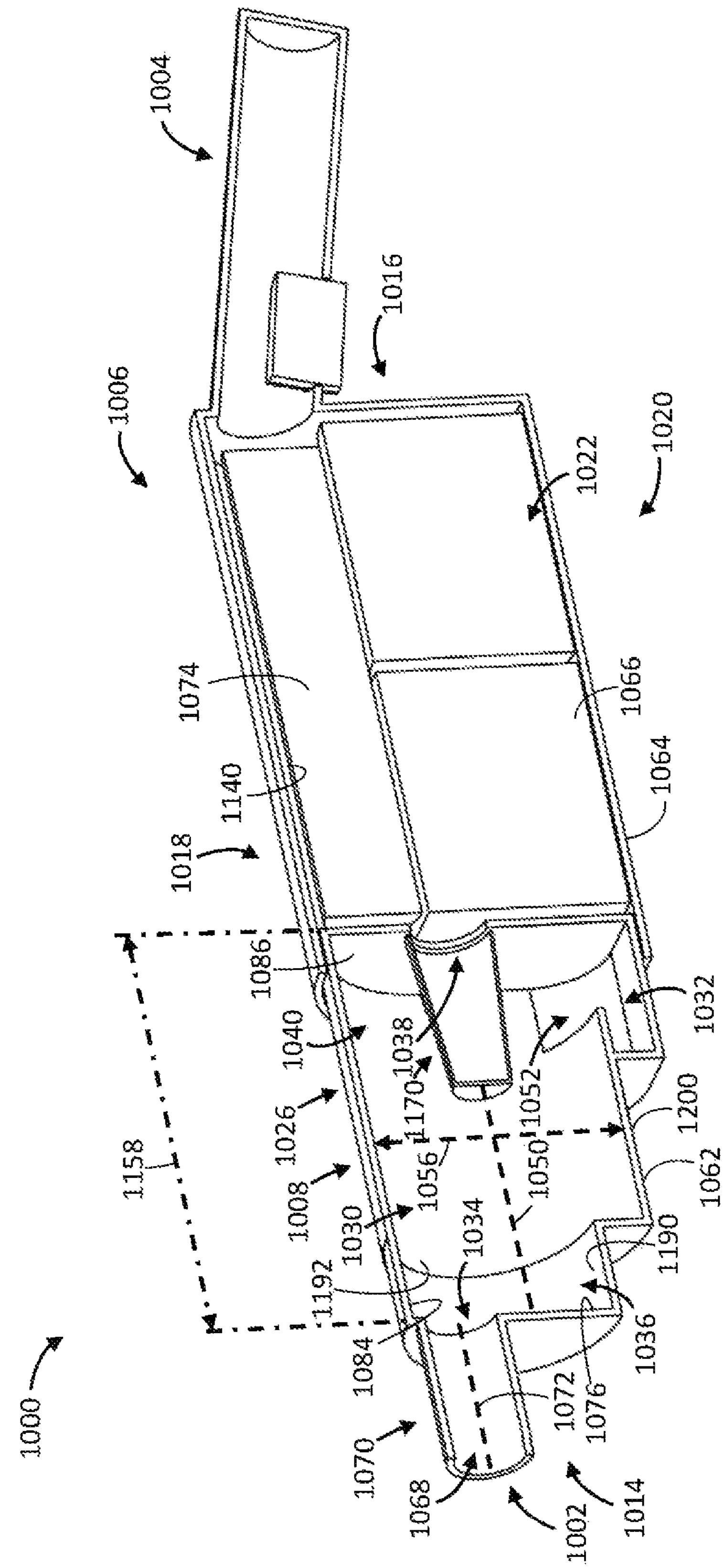
FIG. 24 is a cross-section view of another example of a hand vacuum cleaner.
Figure 25:
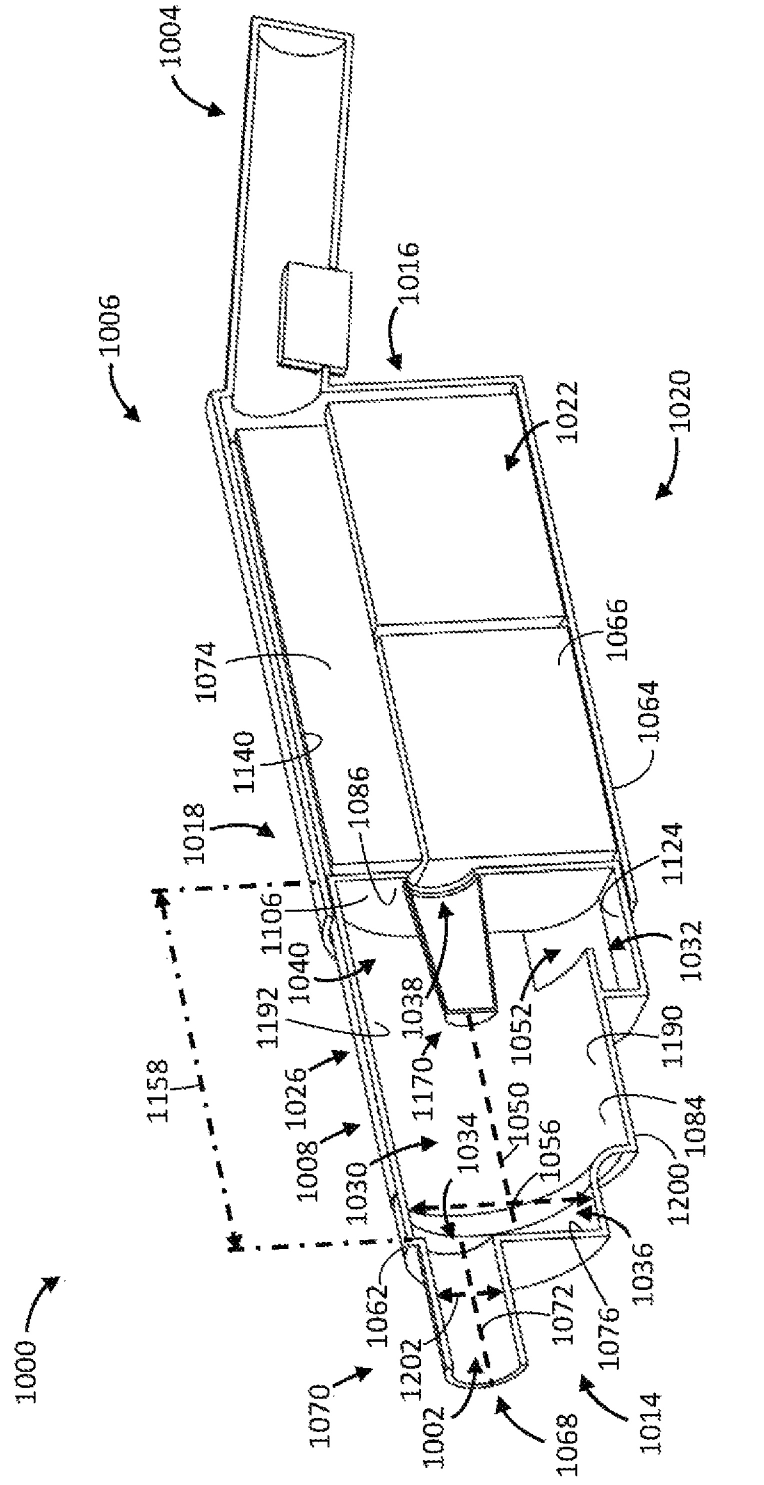
FIG. 25 is a cross-section view of another example of a hand vacuum cleaner.

Optionally, as shown in FIGS. 23-25, the height 1056 and/or width of the cyclone chamber 1030 may increase along its length 1158 (i.e., the cyclone chamber 1030 may have a cyclone chamber sidewall 1084 that is stepped). That is, the height 1056 and/or width of the cyclone chamber 1030 in a direction transverse to the cyclone axis of rotation 1050 at the front end 1036 may be less than the height 1056 and/or width of the cyclone chamber 1030 in the direction transverse to the cyclone axis of rotation 1050 at the rear end 1040. Cyclone chambers having cyclone chamber sidewalls 1084 that are stepped are further discussed below.

Referring back to FIGS. 1A-1H, in this embodiment, the cyclone air inlet 1034 is a tangential air inlet 1160 that, as exemplified, terminates at an outlet end 1162 or port that is formed in the cyclone sidewall 1084, optionally an upper portion of the cyclone sidewall 1084, adjacent the front end wall 1076 (see, e.g., FIG. 1F). Optionally, the cyclone air inlet 1034 may be provided at an alternate location, such as in the front end wall 1076 (see, e.g., FIG. 8C).

The cyclone air inlet 1034 is fluidly connected with the dirty air inlet 1002 via the inlet conduit 1070. The cyclone air inlet 1034 may have any suitable arrangement and/or configuration, and in the example illustrated in FIG. 1D, is configured as a tangential air inlet. Connecting the cyclone air inlet 1034 to the dirty air inlet 1002 as shown in FIG. 1D may reduce or eliminate the need for additional bends or air flow direction changes between the dirty air inlet 1002 and the cyclone chamber 1030. Reducing the conduit length and number of bends may help reduce the backpressure and air flow losses within the air flow path.

Positioning the cyclone air inlet 1034 toward the front end 1036 of the cyclone chamber 1030 may help facilitate a desired air flow configuration within the cyclone chamber 1030. For example, in this configuration the cyclone chamber 1030 itself functions as part of the air flow path that conveys air rearwardly from the front end 1014 of the surface cleaning apparatus, without the need for a separate fluid conduit.

In the illustrated example, the cyclone air inlet 1034 is directly adjacent the front end wall 1076. Alternatively, cyclone air inlet 1034 may be axially spaced from the front end wall 1076, and may be located at another location along the length of the cyclone chamber 1030.

As shown in FIG. 1D, the cyclone chamber air outlet 1038 may be provided in the rear end wall 1086 of the cyclone chamber 1030. The cyclone chamber air outlet 1038 may include an axially extending vortex finder 1170 that may extend from the rear end wall 1086 and may be aligned with the cyclone chamber air outlet 1038.

The vortex finder 1170 may have any shape and configuration known in the art. In the example illustrated in FIG. 1D, the vortex finder 1170 is tapered towards the cyclone air inlet 1034 of the cyclone chamber 1030 and has a circular cross-section.

As shown in FIG. 1D, the vortex finder 1170 may include a conduit portion 1172. The conduit portion 1172 may be of any shape and configuration known in the art and may extend inwardly into the cyclone chamber 1030. For example, the conduit portion 1172 illustrated in FIG. 1D is frusto-coninical, whereas in other examples the conduit portion 1172 may be cylindrical. In some examples, the conduit portion 1172 may be tapered at an angle of up to 25°, optionally from 2° to 15°, from 3° to 9°, or from 4° to 7°. As exemplified, all of the conduit portion 1172 may be solid (i.e., air impermeable or non-porous).

As shown, the conduit portion 1172 may have an inlet end 1174 and an outlet end 1176. The outlet end 1176 of the conduit portion 1172 may be joined (e.g., glued, welded, etc.) to the rear end wall 1086 of the outlet end of the cyclone chamber 1030. Alternatively, the conduit portion 1172 may be an integral component of the rear end wall 1086 of the outlet end of the cyclone chamber 1030 (i.e., in some examples, the rear end wall 1086 of the outlet end and the conduit portion 1172 may be formed from the same work piece).

In the example illustrated in FIG. 1D, the vortex finder 1170 also includes a porous portion 1180 (i.e., screen portion) at a front end thereof. In some examples, as discussed in more detail below, the vortex finder 1170 may consist of or consist essentially of a porous portion 1180 (i.e., it may not include a conduit portion 1172). The porous portion 1180 may have any shape and configuration known in the art. For example, the porous portion 1180 may be tapered as shown in FIG. 1D. As a second example, the porous portion 1180 may be cylindrical (i.e., linear).

The porous portion 1180 may have a length 1182 in the axial direction which is equal to a length 1184 in the axial direction of the cyclone air inlet 1034 (see, e.g., FIG. 5D). Alternatively, the length 1182 of the porous portion 1180 in the axial direction may be from 1 to 10 times, from 1.25 to 8 times, from 1.5 to 6 times, from 1.5 to 4 times, from 2 to 6 times, or from 2 to 4 times the length 1184 of the cyclone air inlet 1034 in the axial direction.

When tapered, the porous portion 1180 may be tapered at an angle of up to 25°, optionally from 2° to 15°, from 3° to 9°, or from 4° to 7°. As shown, the porous portion 1180 may extend inwardly into the cyclone chamber 1030 from the inlet end 1174 of the conduit portion 1172.

Positioning the cyclone chamber air outlet 1038 toward the rear end 1040 (and optionally in the rear end wall 1086) may help facilitate the desired air flow through the cyclone chamber 1030, such that air, while swirling, travels generally axially though the cyclone chamber 1030 from the front end wall 1176 toward the rear end wall 1086.

Positioning the cyclone chamber air outlet 1038 in the rear end wall 1086 of the cyclone chamber 1030 may also help facilitate the air flow connection between the cyclone chamber 1030 and other downstream components in the hand vacuum cleaner 1000, such as the pre-motor filter housing 1064 and suction motor housing 1024. In the illustrated embodiment the cyclone chamber air outlet 1038 is provided in the rear end wall 1086 and is connected to the pre-motor filter housing 1064 by a conduit. This may help simplify the air flow path and construction of the hand vacuum cleaner 1000. Alternatively, the air flow path may include one or more additional conduits connected downstream from the cyclone chamber air outlet 1038.

In this arrangement, air travelling through the hand vacuum cleaner 1000 will travel generally rearwardly along the inlet conduit 1070 (i.e., parallel to the inlet conduit axis 1072 and then enter a tangential air inlet 1160 which essentially changes the direction of the air to travel generally downwardly through the cyclone air inlet 1034 (i.e., generally orthogonal to the cyclone axis 1050). The air can then circulate within the cyclone chamber 1030, and travel generally rearwardly toward the cyclone chamber air outlet 1038, and ultimately exit the cyclone chamber 1030 via the cyclone chamber air outlet 1038 after travelling through the vortex finder 1170 in a rearward direction (i.e., generally parallel to the cyclone axis 1050). In this configuration, the air flow changes direction only once (and by only approximately 90° which may be accomplished by a tangential air inlet 1160), between entering the dirty air inlet 1002 and exiting the cyclone chamber air outlet 1038.

Figure 17:
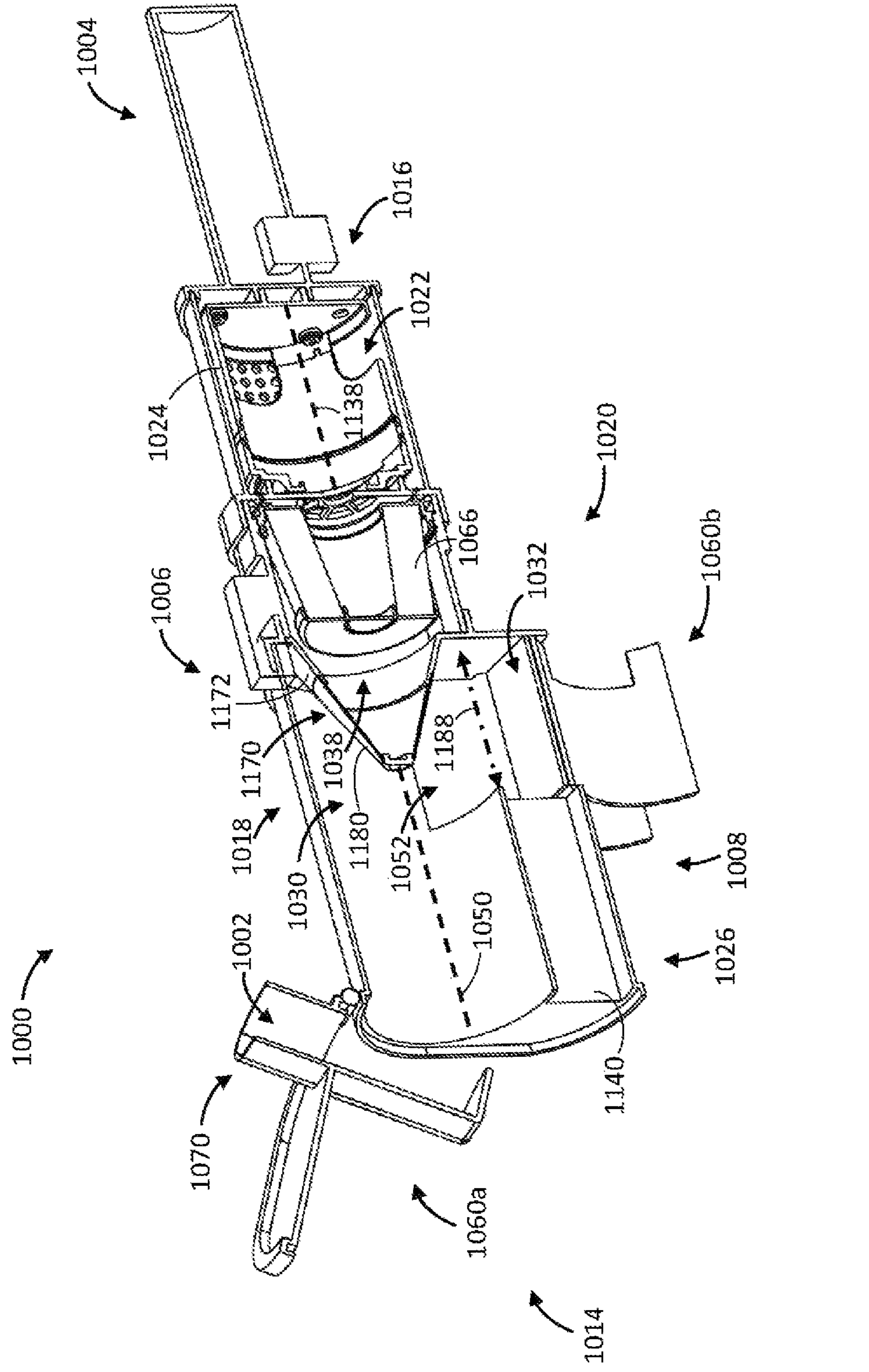
FIG. 17 is a cross-sectional view of another example of a hand vacuum, shown with an openable portion in an open position.

The cyclone dirt outlet 1052 may be of any suitable configuration, and in the illustrated embodiment is an opening that is provided in the cyclone chamber sidewall 1084, toward the rear end wall 1086. The dirt outlet 1052 may extend around at least a portion of the perimeter of the cyclone sidewall 1084, and may have any suitable length 1188 in the axial direction (see e.g., FIG. 17). As exemplified, the dirt outlet 1052 may be provided only in a lower portion of the cyclone sidewall 1084.

While shown directly adjacent the rear end wall 1086, such that the dirt outlet 1052 is partially bounded by the cyclone sidewall 1084 and the rear end wall 1086, the dirt outlet 1052 may be located at another location along the length of the cyclone sidewall 1084 and need not be directly adjacent the rear end wall 1086. Alternatively, the dirt outlet 1052 may be provided toward the mid-point of the cyclone chamber sidewall 1084 or may be provided toward the front end wall 1076. While illustrated with a single dirt outlet 1052, the cyclone chamber 1030 may include two or more dirt outlets 1052 that are in communication with the same dirt collection chamber 1032, or optionally with different dirt collection chambers 1032.

The Cyclone Chamber Having an Angled and/or Stepped Cyclone Chamber Sidewall

In accordance with this aspect of this disclosure, which may be used by itself or in combination with one or more other aspects of this disclosure, cyclone chamber 1030 may have a cyclone chamber sidewall 1084 that is angled and/or stepped.

As exemplified herein, a cyclone chamber sidewall may be a sidewall 1084 that defines a first height 1056 and/or width (e.g., diameter) of the cyclone chamber 1030 at the front end 1036 of the cyclone chamber 1030 and defines a second height 1056 and/or width (e.g., diameter) of the cyclone chamber 1030 at the rear end 1040 of the cyclone chamber 1030, wherein the second height 1056 and/or width is greater than the first height 1056 and/or width.

The cyclone chamber sidewall 1084 may have any shape to provide a cyclone chamber 1030 in which a height 1056 and/or width of the cyclone chamber 1030 at the front end 1036 may be less than a height 1056 and/or width of the cyclone chamber 1030 at the rear end 1040.

As exemplified in FIG. 23, when the hand vacuum cleaner 1000 is positioned with its upper end 1018 above its lower end 1020, at least some of a lower portion 1190 of the cyclone chamber sidewall 1084 may extend downwardly and rearwardly to provide a cyclone chamber 1030 with a smaller height 1056 and/or width at the front end 1036 thereof with respect to the height 1056 and/or width at the rear end 1040 thereof. Alternately, or in addition, the sidewall may be stepped as exemplified in FIGS. 24 and 25, In other examples, alternatively or additionally to the lower portion 1190 of the cyclone chamber sidewall 1084 extending downwardly and rearwardly, an upper portion 1192 of the sidewall 1084 may extend upwardly and rearwardly and/or the lateral portions may extend outwardly and rearwardly.

The non-axially extending portion of the cyclone sidewall 1084 may extend along any path known in the art (i.e., linearly, arcuately, exponentially, stepwise, etc.). In some examples, the cyclone chamber sidewall 1084 may extend at an acute angle from the front end wall 1076 of the cyclone chamber 1030. In the example shown in FIG. 23, the lower portion 1190 of the cyclone chamber sidewall 1084 extends linearly. In the example shown in FIG. 24, the lower portion 1190 of the cyclone chamber sidewall 1084 extends stepwise, with a 90° step. In the example shown in FIG. 25, the lower portion 1190 of the cyclone chamber sidewall 1084 extends stepwise, with an exponentially curved step.

In the example shown in FIG. 23, the lower portion 1190 of the cyclone chamber sidewall 1084 extends at an angle downwardly and rearwardly along the entire length of the cyclone chamber sidewall 1084. In other examples, the lower portion 1190 of the cyclone chamber sidewall 1084 may extend at an angle downwardly and rearwardly along only a portion of the length of the cyclone chamber sidewall 1084.

Optionally, the cyclone chamber sidewall 1084 may form a portion of a lower surface 1200 of the surface cleaning apparatus. This configuration may minimize the height of the front end 1014 of the surface cleaning apparatus allowing for the surface cleaning apparatus to reach into tight spaces. In the example illustrated in FIG. 23-FIG. 25, the cyclone chamber sidewall 1084 includes a portion of the lower surface 1200 of the hand vacuum cleaner 1000.

In some examples, as shown in FIG. 23, the cyclone chamber sidewall 1084 may include a portion of the lower surface 1200 of the surface cleaning apparatus and the external dirt collection chamber 1042 may be positioned below the cyclone chamber sidewall 1084. Alternatively, as shown in FIG. 25, the cyclone chamber sidewall 1084 may include a portion of the lower surface 1200 of the surface cleaning apparatus and the external dirt collection chamber 1042 may be positioned only at a rearward portion of the cyclone chamber 1030.

The height 1056 of the front end 1036 of the cyclone chamber 1030 may be sized relative to the diameter 1202 of the dirty air inlet 1002. In examples where the dirty air inlet 1002 is not circular, the height 1056 of the front end 1036 of the cyclone chamber 1030 may be sized relative to a height 1204 of the dirt air inlet 1002, where the height 1204 of the dirty air inlet 1002 is measured along the same axis as the height 1056 of the cyclone chamber 1030. In some examples, the height 1056 of the front end 1036 of the cyclone chamber 1030 is 1-1.5 times a diameter 1202 of the dirty air inlet 1002, 1-1.25 times a diameter 1202 of the dirty air inlet 1002, or 1-1.1 times a diameter 1202 of the dirty air inlet 1002.

The Dirt Collection Chamber that is Contiguous with the Air Treatment Chamber

In accordance with this aspect of this disclosure, which may be used by itself or in combination with one or more other aspects of this disclosure, the dirt collection chamber 1032 may be contiguous with the air treatment chamber 1044. That is, the dirt collection chamber 1032 may be positioned axially from the front end wall 1076 and the rear end (e.g., rear end wall 1106) of the air treatment chamber 1044 (e.g., the cyclone chamber).

Figure 26A:
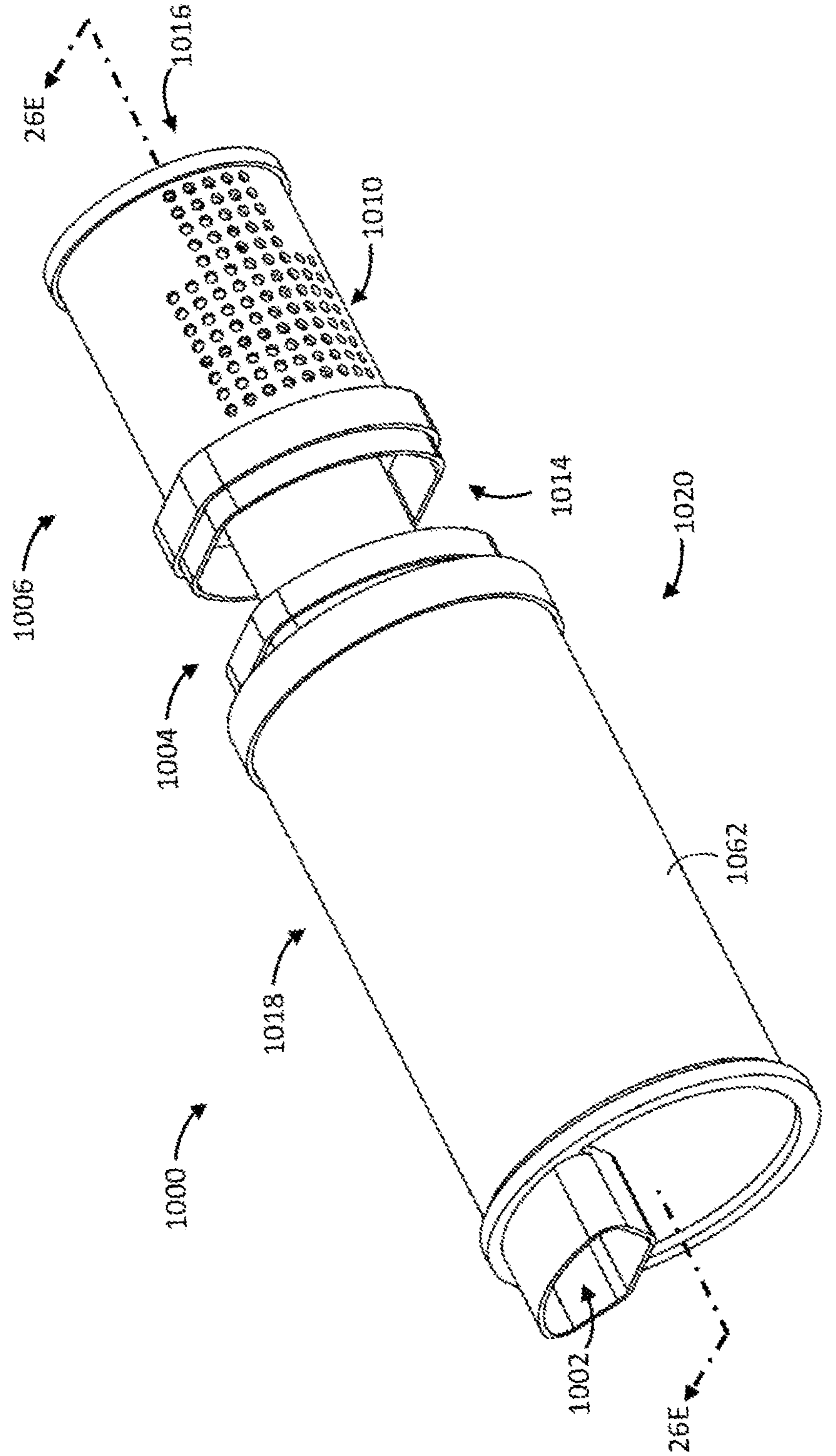
FIG. 26A is a front perspective view of another example of a hand vacuum cleaner.
Figure 26B:
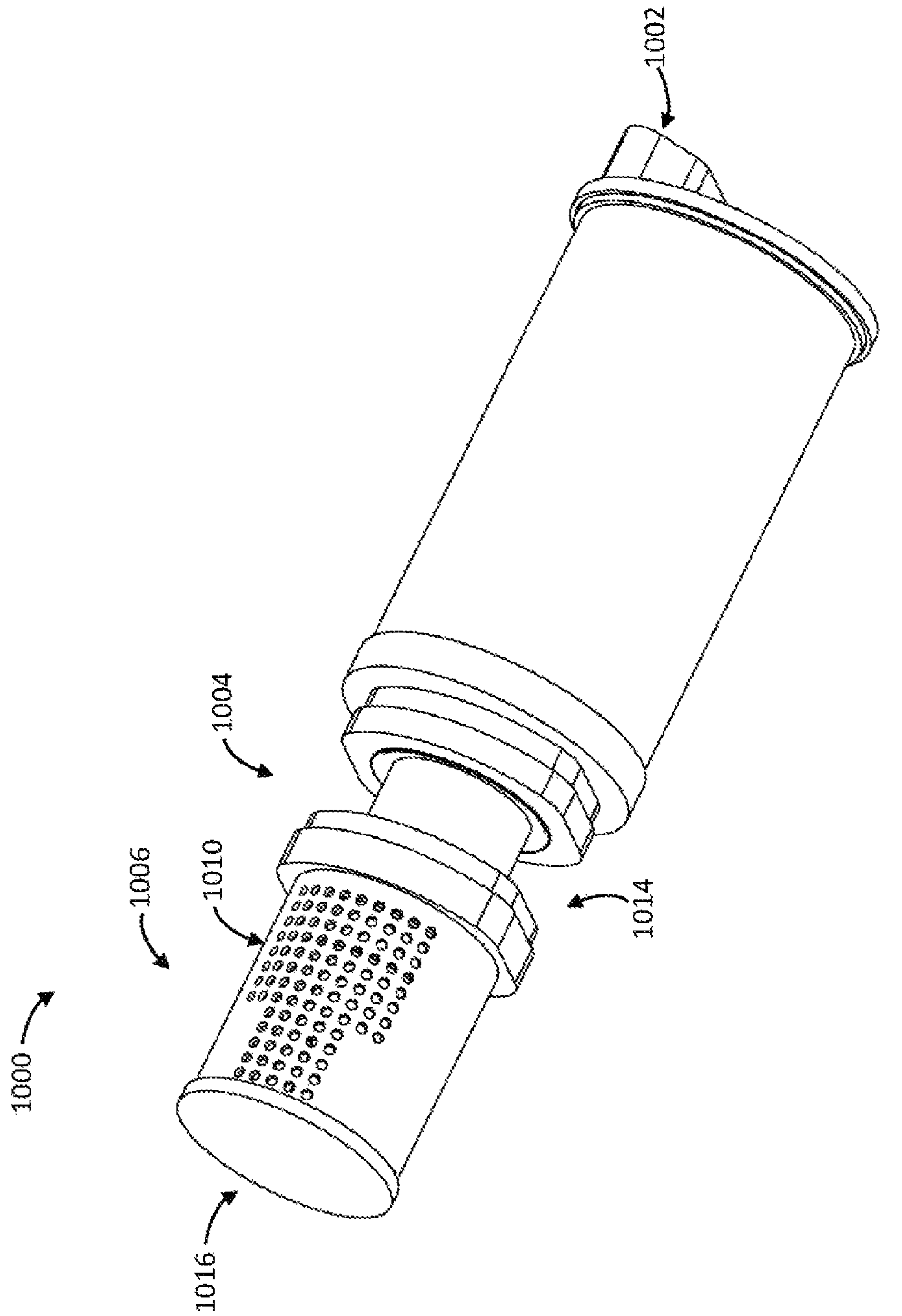
FIG. 26B is a rear perspective view of the hand vacuum cleaner of FIG. 26A.
Figure 26C:
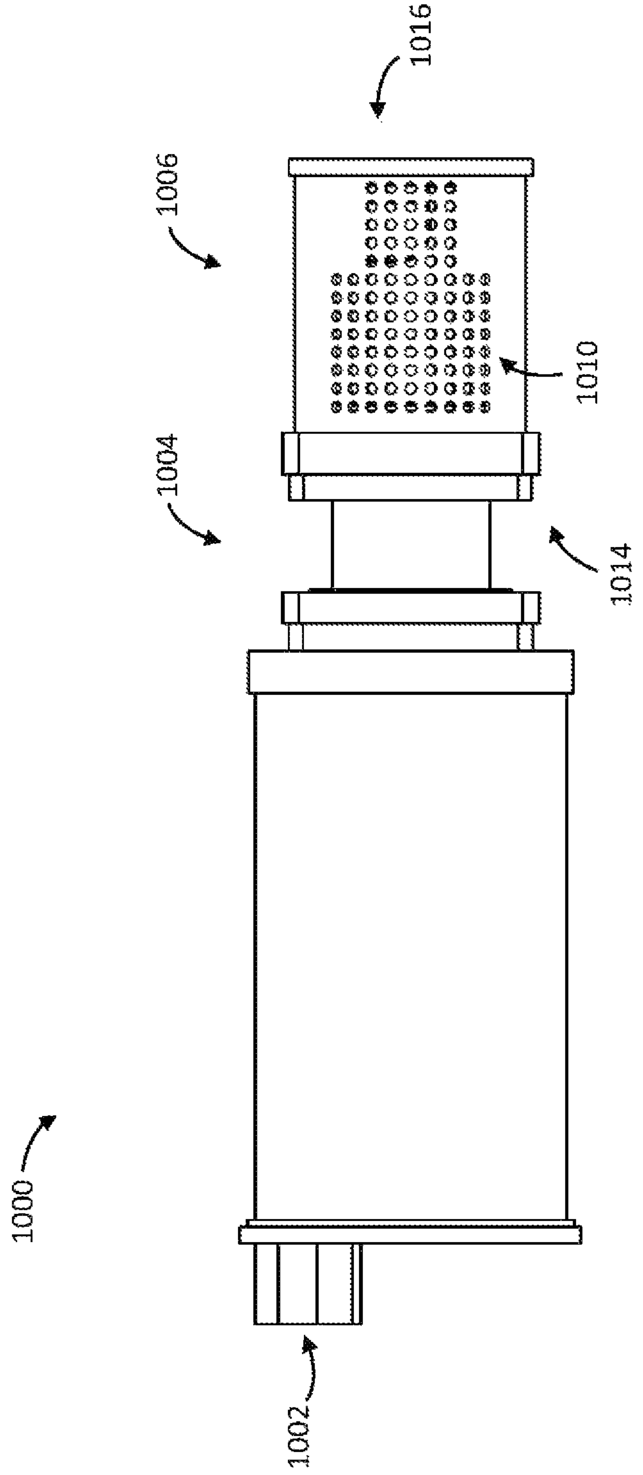
FIG. 26C is a side view of the hand vacuum cleaner of FIG. 26A.
Figure 26D:
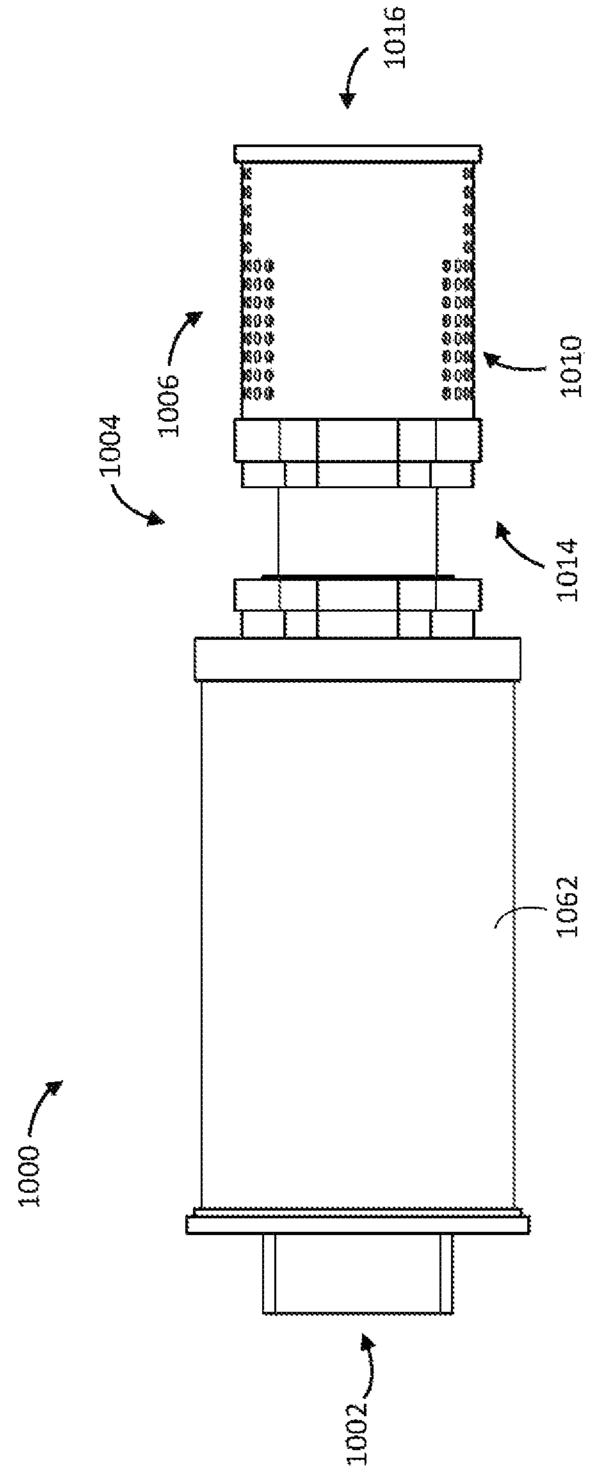
FIG. 26D is a top view of the hand vacuum cleaner of FIG. 26A.
Figure 26E:
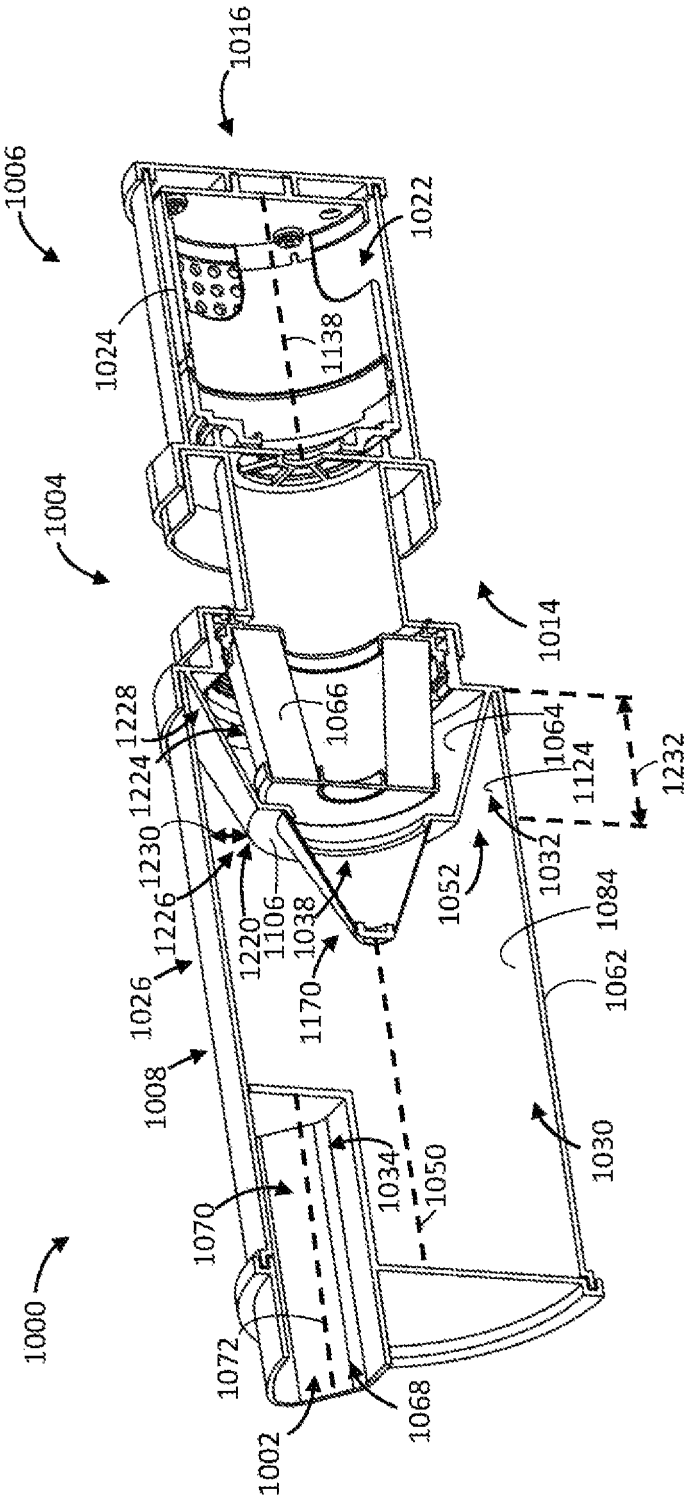
FIG. 26E is a cross-sectional view of the hand vacuum cleaner of FIG. 26A, taken along line 26E-26E.

In the example illustrated in FIG. 26E, there is a dirt collection chamber 1032 that is contiguous with the air treatment chamber 1044 which is positioned axially (rearwardly) from the rear end wall 1106 of the air treatment chamber 1044 and is positioned closer to the rear end wall 1106 than the front end wall 1076. Accordingly, such a dirt collection chamber may be positioned rearward of the cyclone chamber (rearward of rear wall 1106) and forward of the rear end of the air treatment member 1008 (e.g., forward of rear wall 1086).

It is to be understood that an air treatment member 1008 having a dirt collection chamber or region 1032 that is contiguous with the air treatment chamber 1044 may also include an external, radially outwardly positioned, dirt collection chamber 1032.

A surface cleaning apparatus with a dirt collection chamber 1032 that is contiguous with the air treatment chamber 1044 may provide a longer, but slimmer main body 1006 compared to a surface cleaning apparatus having a dirt collection chamber 1032 positioned radially outwardly from the air treatment chamber 1044. A main body 1006 that is slim may be able to reach into tight spaces that may not be accessible by a wider bodied surface cleaning apparatus.

Figure 27:
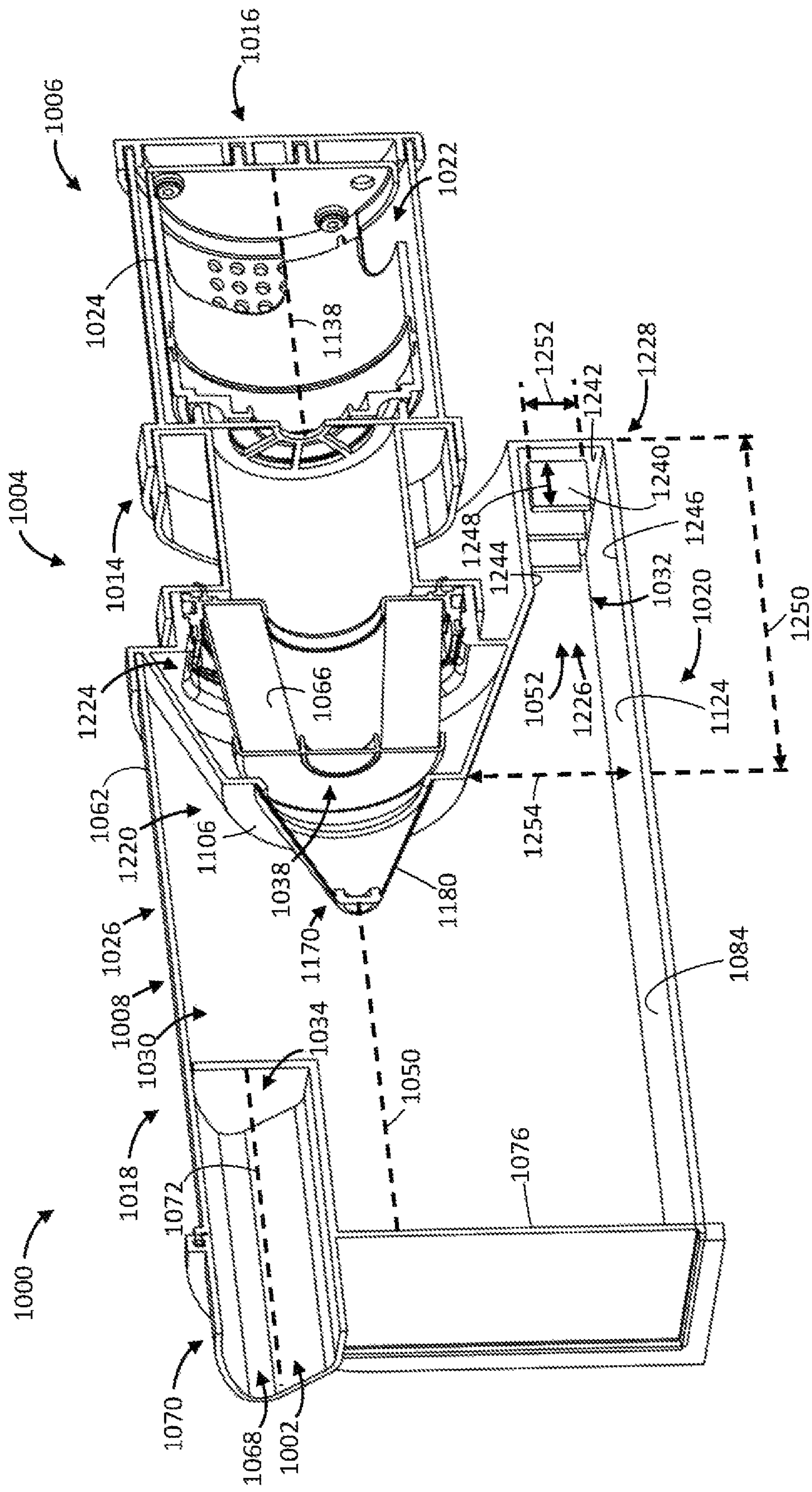
FIG. 27 is a cross-sectional view of another example of a hand vacuum cleaner.

A dirt collection chamber 1032 that is contiguous with the air treatment chamber 1044 may extend about the entire perimeter or only a portion of the perimeter of the air treatment chamber 1044 (i.e., around the cyclone chamber air outlet 1038 in the example shown). For example, the dirt collection chamber 1032 may extend between 15°-360°, 30°-180°, or 45°-120° degrees around the perimeter of the air treatment chamber 1044. Optionally, there may be one or more dirt collection chambers 1032 that are each contiguous with the air treatment chamber 1044 and that are each positioned around the perimeter of the air treatment chamber 1044. Together, the plurality of dirt collection chambers 1032 may extend between 15°-360°, 30°-180°, or 45°-120° degrees around the perimeter of the air treatment chamber 1044. That is, for example, there may be a first dirt collection chamber 1032 that extends angularly part way around the cyclone chamber air outlet 1038 and at least a second dirt collection chamber 1032 that extends angularly part way around the cyclone chamber air outlet 1038 and each of the first and second dirt collection chambers 1032 may be contiguous with the air treatment chamber 1044. Accordingly, a dirt collection chamber 1032 that is contiguous with the air treatment chamber 1044 may surround part or all of the air flow path extending downstream from the air treatment chamber. Optionally, as exemplified in FIG. 27, if the pre-motor filter 1066 is nested part or all of the way forwardly, a dirt collection chamber 1032 that is contiguous with the air treatment chamber 1044 may surround part or all of the pre-motor filter 1066.

As exemplified in FIG. 26E, the cyclone chamber air outlet 1038 extends axially into the air treatment chamber 1044 from the rear end wall 1106. In the example illustrated, the rear end wall 1106 (i.e., the end wall opposite to the cyclone air inlet 1034) of the cyclone chamber 1030 has a radial outer end 1220 that is radially inwards of the sidewall 1084 of cyclone chamber 1030. Accordingly, in the example illustrated, the dirt outlet 1052 connecting the cyclone chamber 1030 to the dirt collection chamber 1032 is defined by the radial space or gap between the radially outer end 1220 of the rear end wall 1106 and the sidewall 1084 of the cyclone chamber 1030.

Optionally, as shown, the rear end wall 1106 may extend radially outwardly from the cyclone chamber air outlet 1038 (i.e., a shelf may extend between the cyclone chamber air outlet 1038 and the dirt outlet 1052). The rear end wall 1086 may extend between, e.g., 1 mm-25 mm, between, 3 mm-20 mm, or between 4 mm-12 mm in the radial direction outwardly from the cyclone chamber air outlet 1038.

Figure 22D:
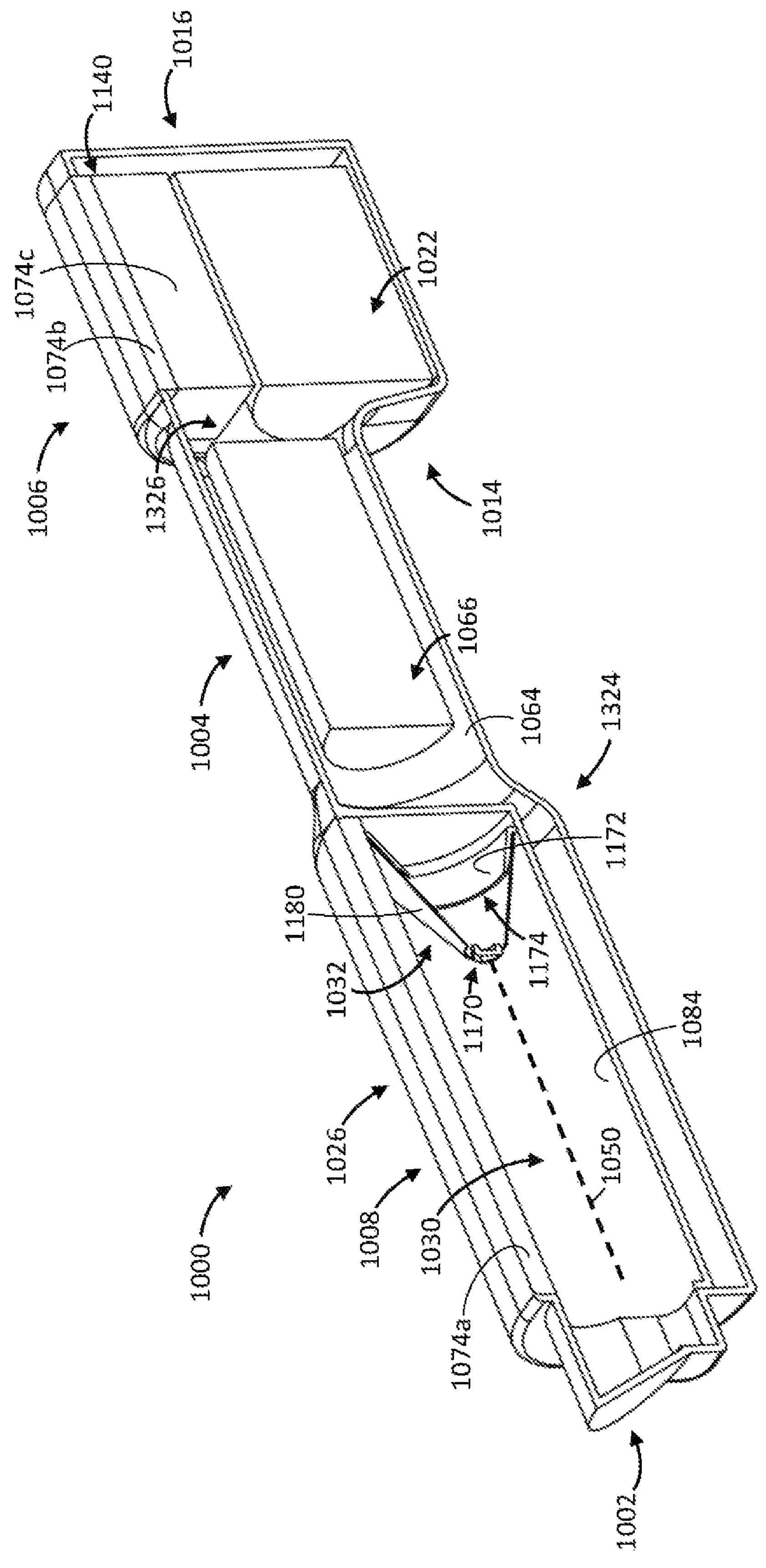
FIG. 22D is a cross-section view of the hand vacuum cleaner of FIG. 22A, taken along line 22D-22D.
Figure 28:
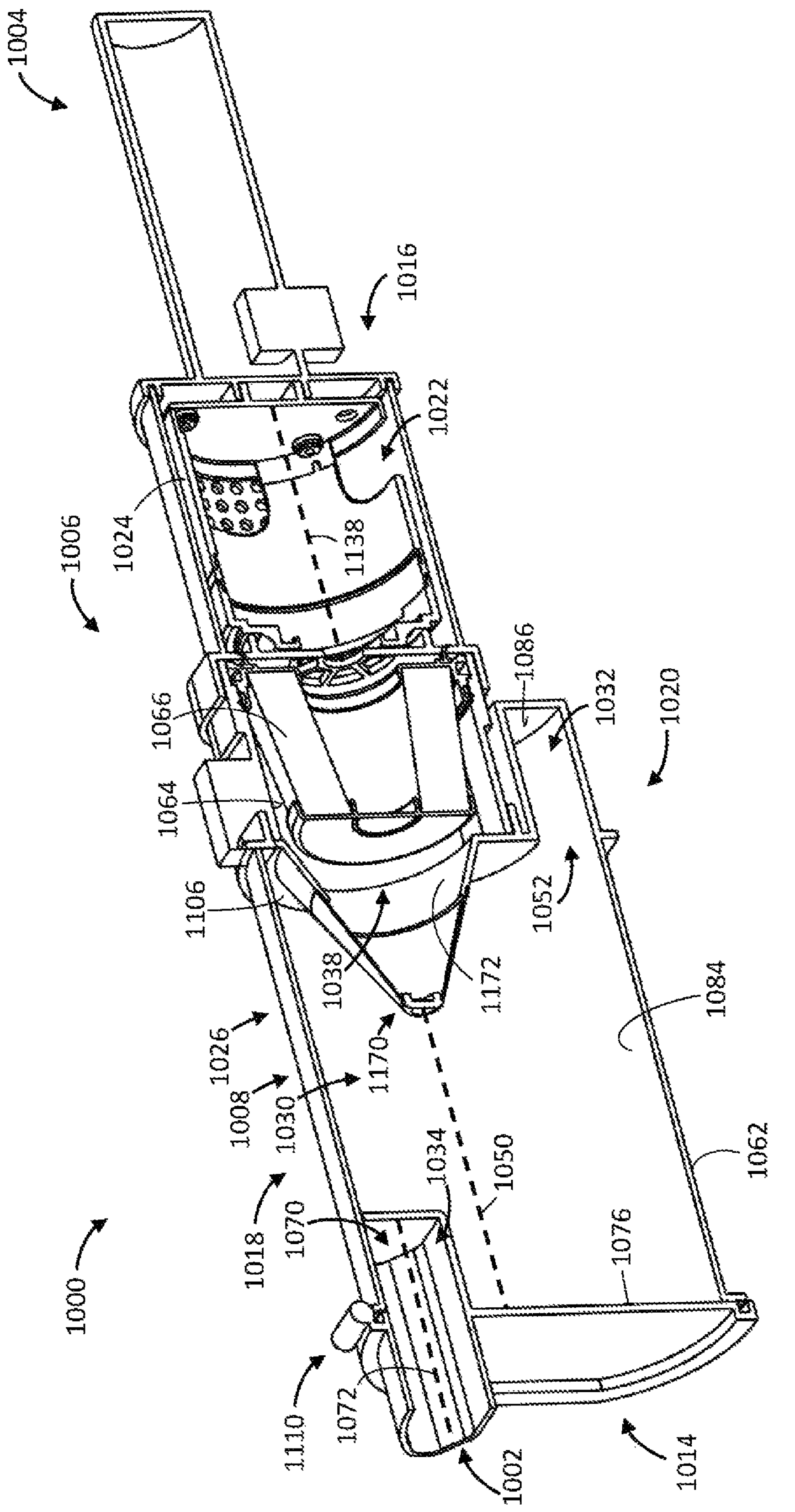
FIG. 28 is a cross-sectional view of another example of a hand vacuum cleaner.
Figure 29A:
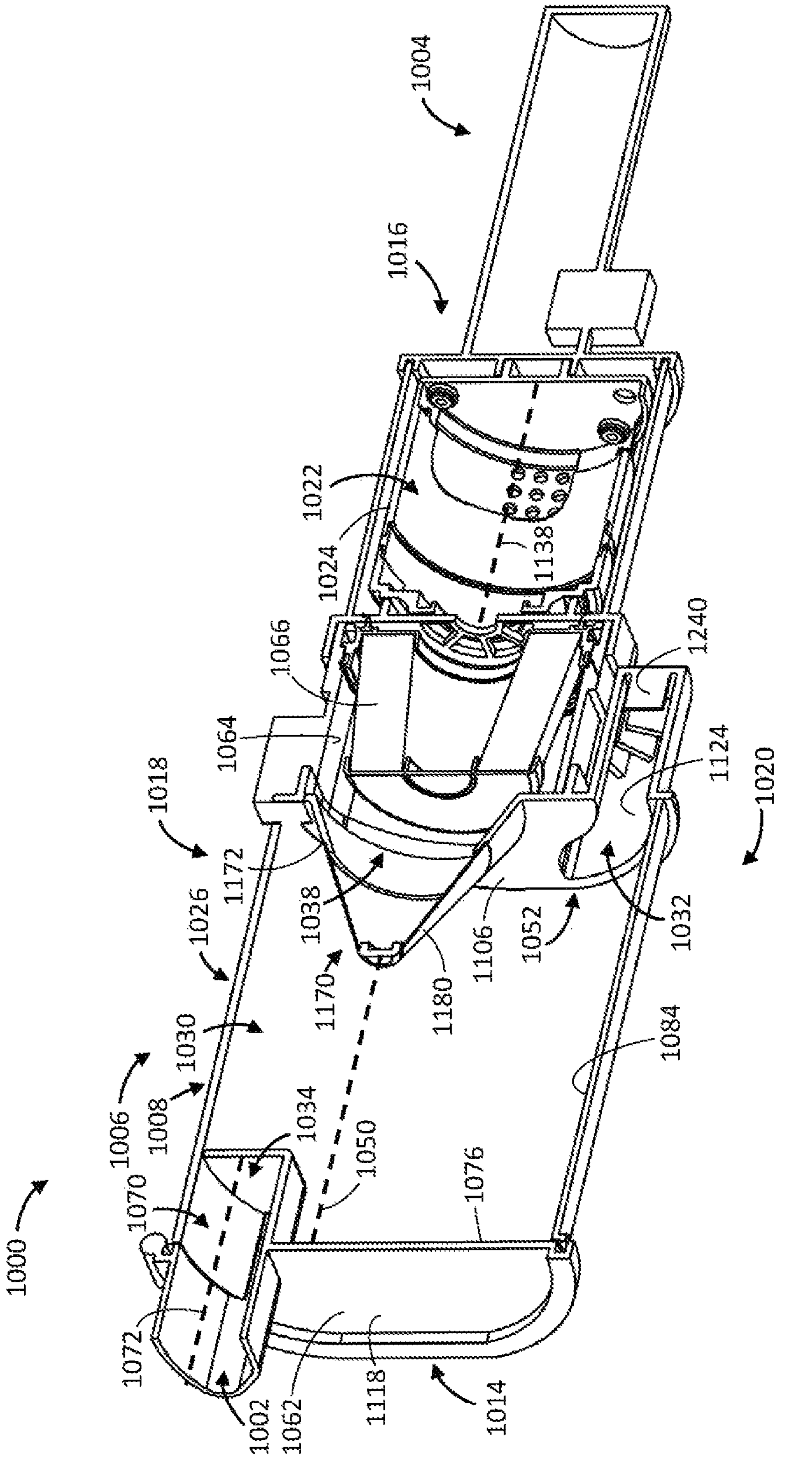
FIG. 29A is a cross-sectional view of another example of a hand vacuum cleaner.
Figure 29B:
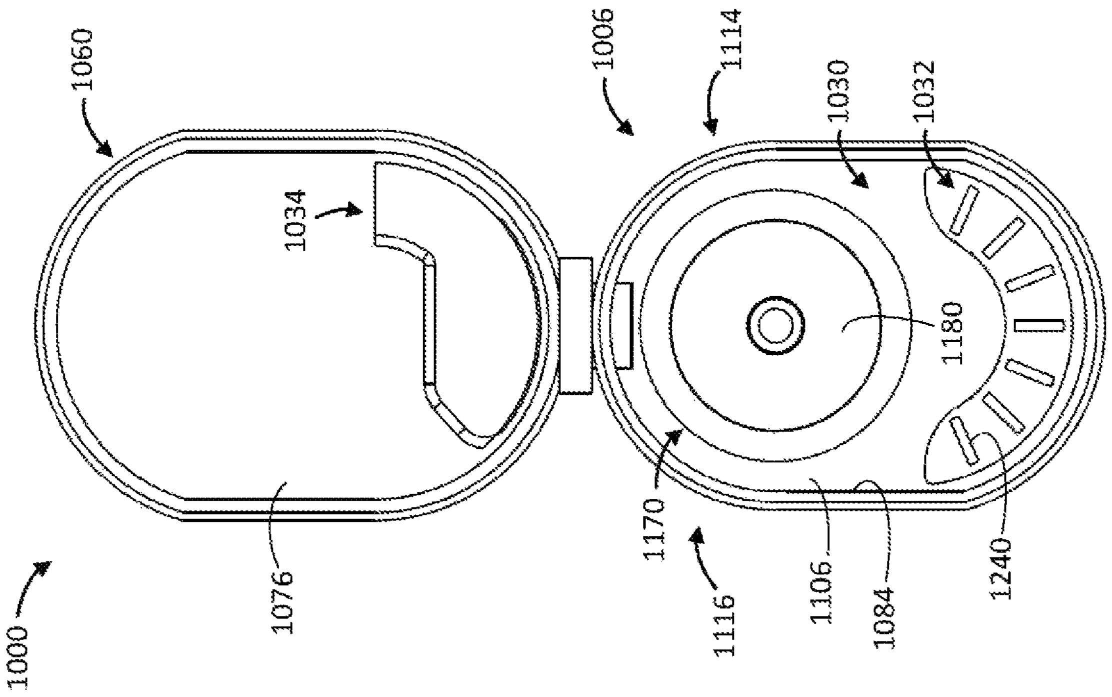
FIG. 29B is a front view of the hand vacuum cleaner of FIG. 29A, shown with an openable portion in an open position.

In other examples, as exemplified in FIG. 28, a rear end wall 1106 may not be provided and the radial inner wall of the contiguous dirt collection chamber 1032 may extend rearwardly from the vortex finder. Accordingly, there may be a smooth transition between the cyclone chamber air outlet 1038 and the dirt collection chamber 1032 (as shown in FIG. 22D).

In some examples, the dirt collection chamber 1032 that is contiguous with the air treatment chamber 1044 may extend about the cyclone chamber air outlet 1038 and may therefore define a radially inward cavity 1224 positioned downstream of the cyclone chamber air outlet 1038. As shown in FIG. 26E, the pre-motor filter 1066 may be positioned within the cavity 1224 defined by the dirt collection chamber 1032. That is, in some examples, some or all of the pre-motor filter 1066 may be located radially inwardly of the dirt collection chamber 1032 and the radial inner wall of the contiguous dirt collection chamber may form a header of the pre-motor filter 1066. Accordingly, a plane that is transverse to the air treatment chamber axis 1050 extends through the first dirt collection region and the pre-motor filter. In other examples, other components, such as, for example, the motor and fan assembly 1022 and/or the energy storage member 1074 may be located radially inwardly of the dirt collection chamber 1032. Optionally a second stage air treatment member 1008 may be located radially inwardly of the dirt collection chamber 1032.

The dirt collection chamber 1032 that is contiguous with the air treatment chamber 1044 may be of any shape known in the art. More specifically, the cross-sectional profile of the dirt collection chamber 1032 may be of any shape known in the art. In the example illustrated in FIG. 26E, the dirt collection chamber 1032 has an open first end 1226 located at the dirt outlet 1052 and an axially spaced apart second end 1228 and the dirt collection chamber 1032 is tapered axially from the first end 1226 to the second end 1228. As a second example, as shown in FIG. 13, the cross-section of the dirt collection chamber 1032 is constant along its length.

Figure 30A:
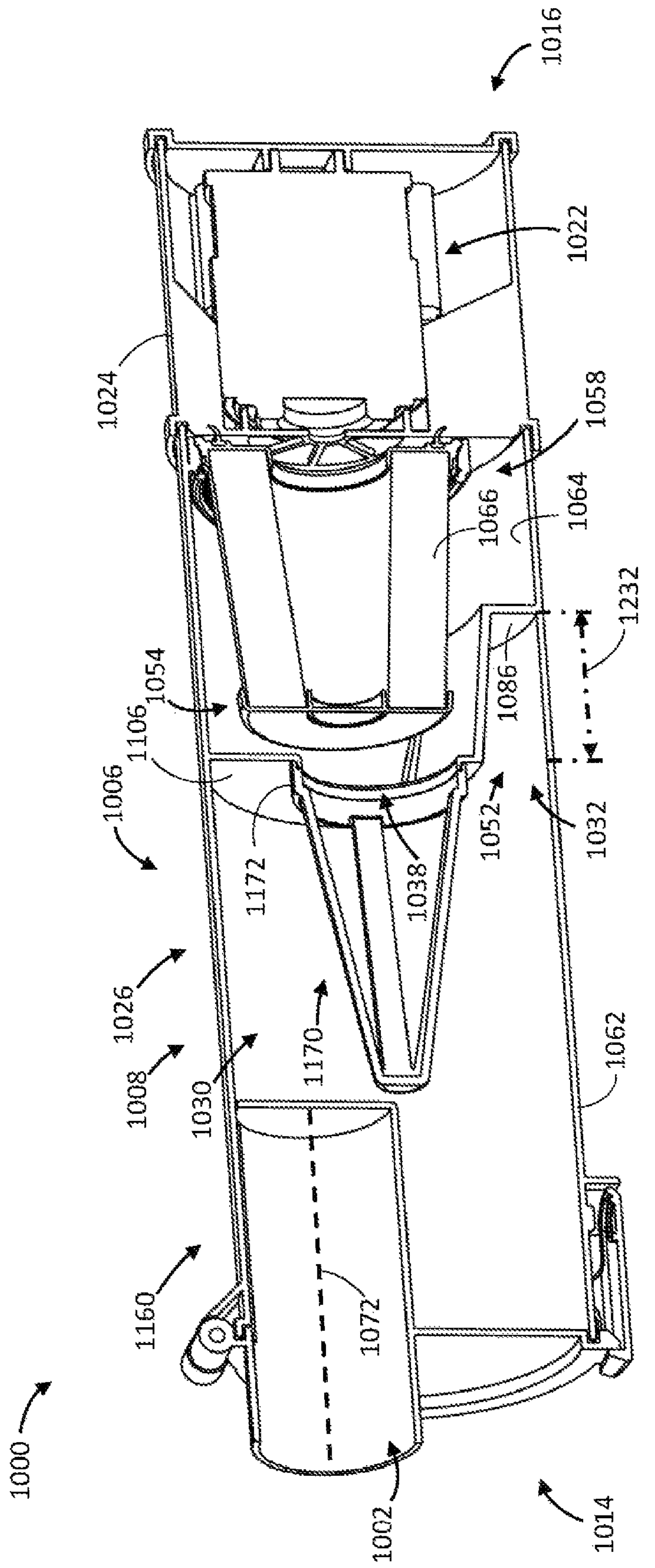
FIG. 30A is a cross-sectional perspective view of another example of a hand vacuum cleaner.
Figure 30B:
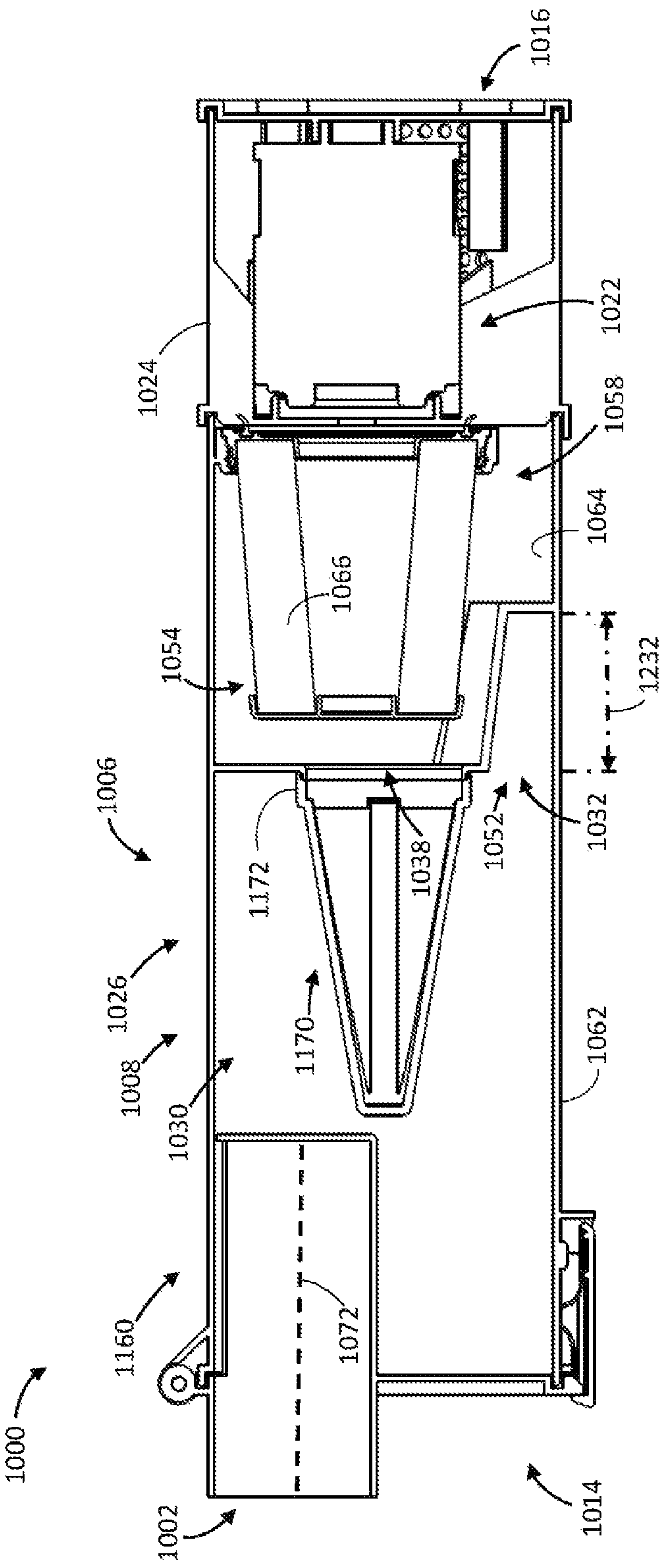
FIG. 30B is a cross-sectional view of the hand vacuum cleaner of FIG. 30A.
Figure 31A:
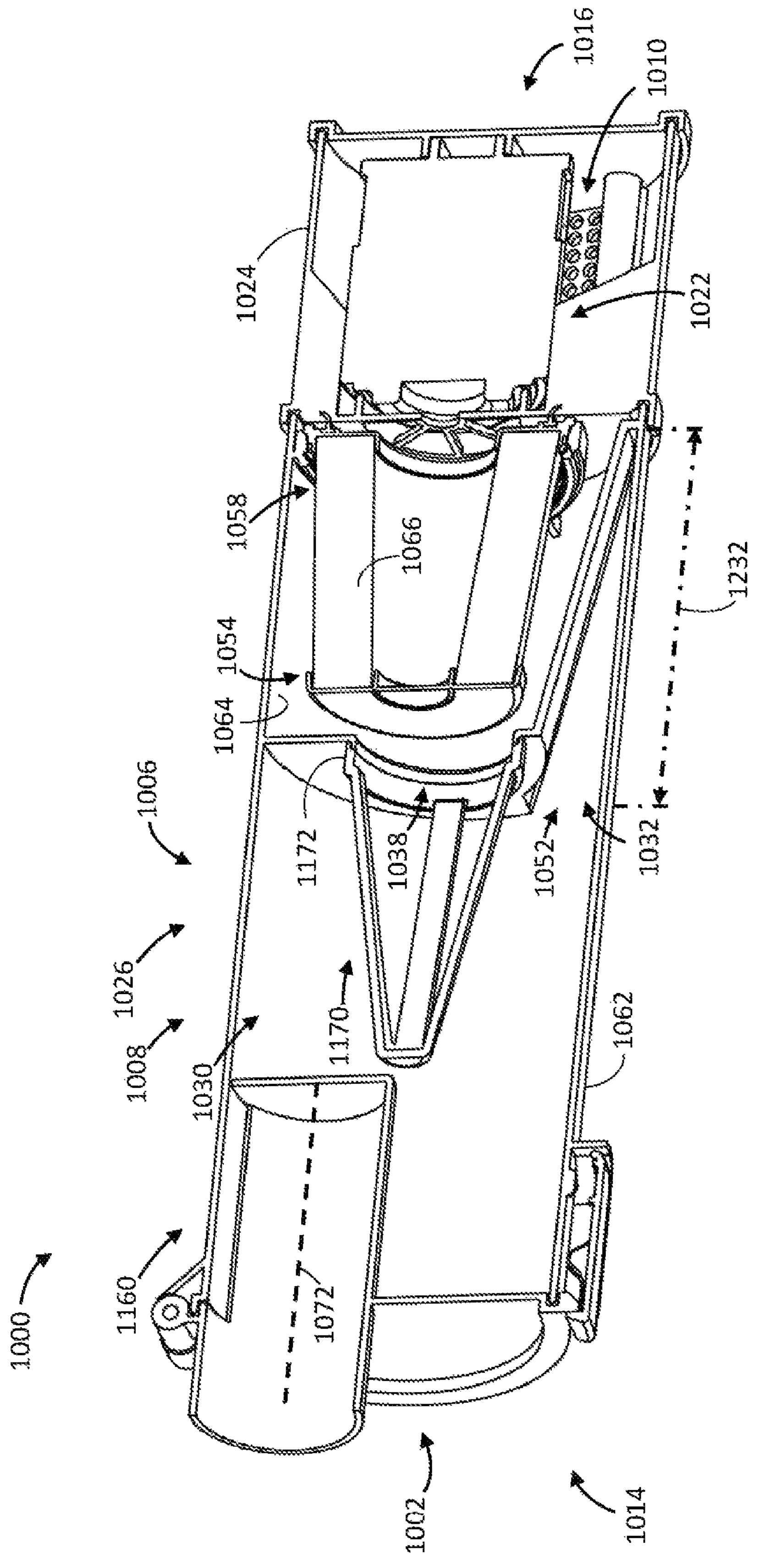
FIG. 31A is a cross-sectional perspective view of another example of a hand vacuum cleaner.
Figure 31B:
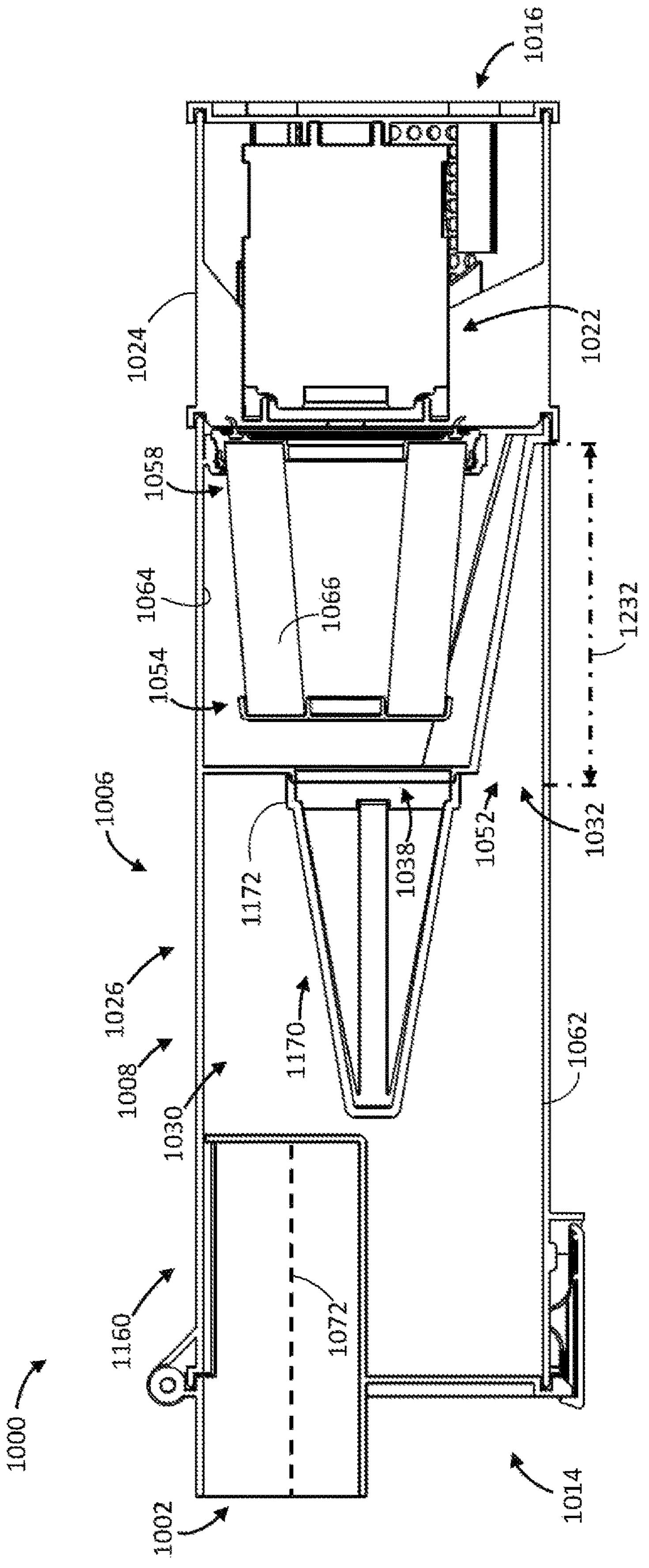
FIG. 31B is a cross-sectional view of the hand vacuum cleaner of FIG. 31A.

The dirt collection chamber 1032 may have any depth 1232. For example, in the examples illustrated in FIG. 13 and FIG. 31B, the depth 1232 of the dirt collection chamber 1032 extends to the rear end 1058 of the pre-motor filter 1066. In the example illustrated in FIG. 30B, the dirt collection chamber 1032 terminates prior to the rear end 1058 of the pre-motor filter 1066.

The dirt collection chamber 1032 may have a radial width 1230 at the dirt outlet 1052 of the air treatment chamber 1044 between 3 mm-50 mm, between 5 mm-30 mm, or between 6 mm-15 mm. The dirt collection chamber 1032 may have a depth 1232 in the axial direction between 2 mm-100 mm, between 5 mm-75 mm, or between 10 mm-44 mm.

Optionally, as discussed in more detail subsequently, the dirt collection chamber 1032 may include a baffle 1240 herein.

The Baffle

In accordance with this aspect of this disclosure, which may be used by itself or in combination with one or more other aspects of this disclosure, the dirt collection chamber 1032 may include one or more baffles 1240.

There may be a baffle 1240 positioned in the dirt collection chamber 1032, in particular a dirt collection chamber 1032 that is contiguous with the air treatment chamber 1044, to promote the retention of debris within the dirt collection chamber 1032. The baffles may assist in reducing the movement of air in the dirt collection chamber 1032.

Figure 35A:
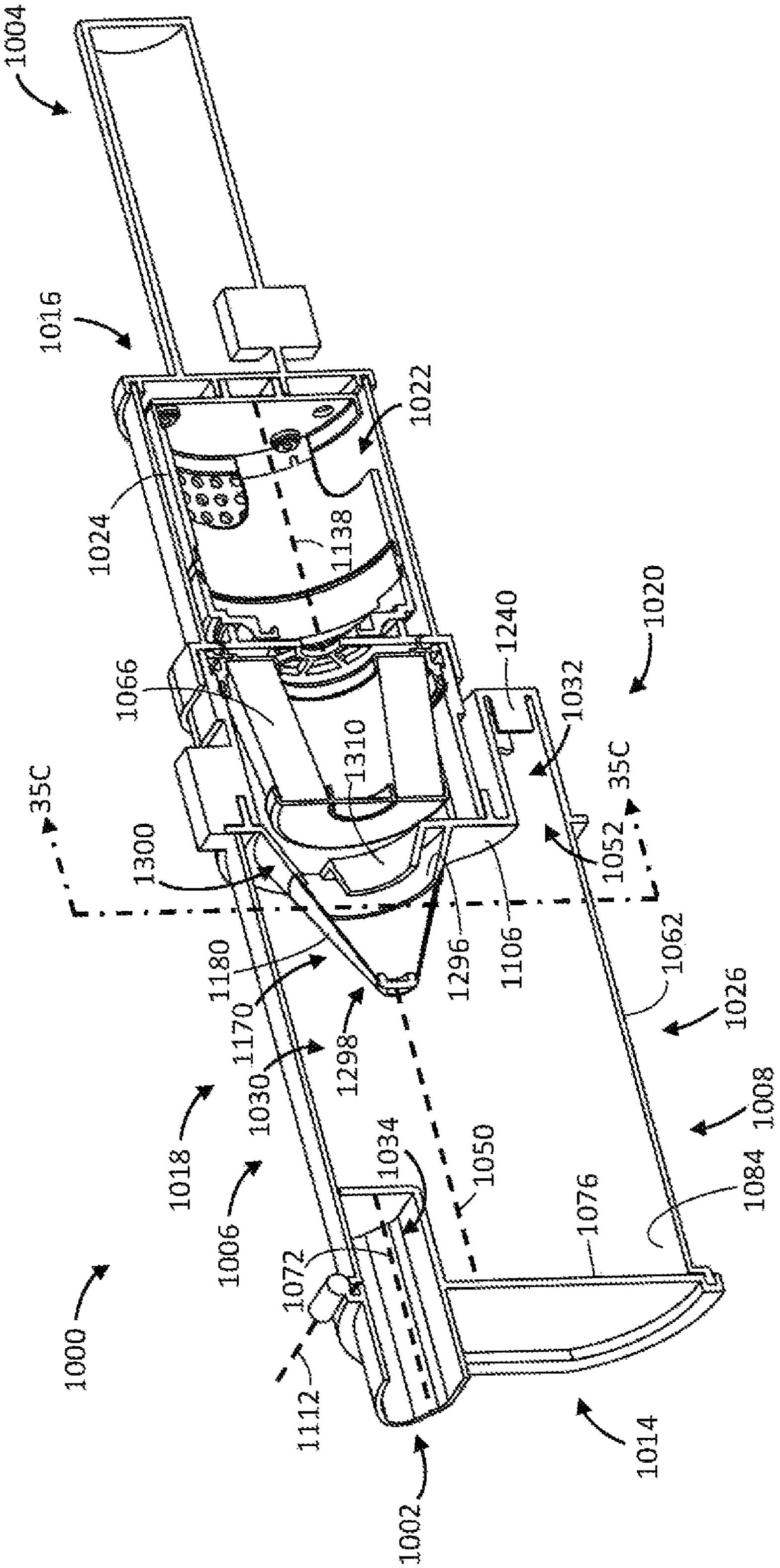
FIG. 35A is a cross-sectional view of another example of a hand vacuum cleaner.
Figure 35B:
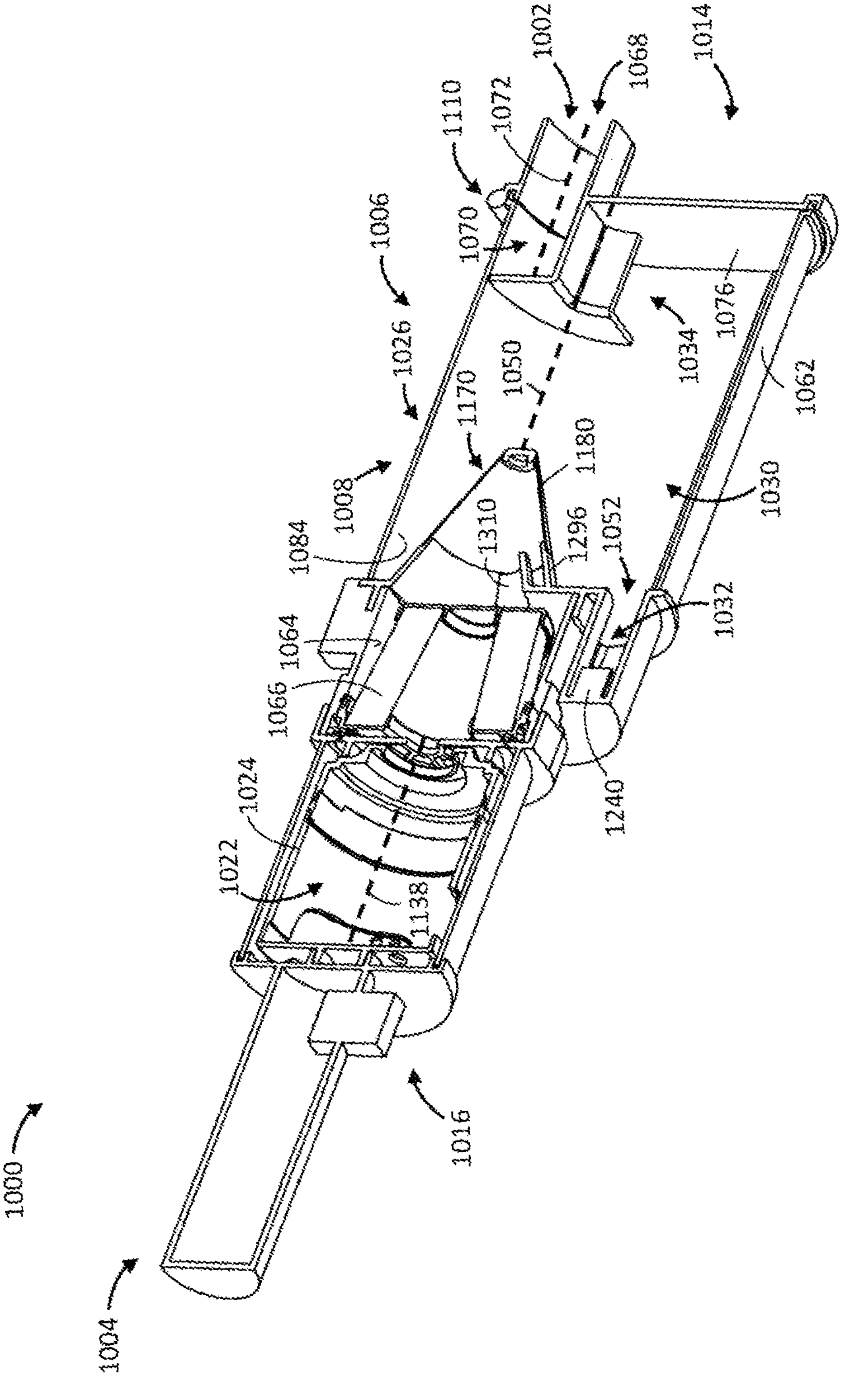
FIG. 35B is a cross-sectional view of the hand vacuum cleaner of FIG. 35A.

Optionally, the baffle 1240 may be positioned within the dirt collection chamber 1032 at an opposite end (e.g., a rear end as exemplified in FIGS. 27 and 35A) to the dirt outlet 1052 to the dirt collection chamber 1032. In the example illustrated in FIG. 27, the dirt collection chamber 1032 has an open first end 1226 located at the cyclone chamber air outlet 1038 and an axially spaced apart second end 1228 that includes a second end wall 1242 (which may also be the rear end wall 1086 of the air treatment member 1008). As shown the baffle 1240 may be provided on the second end wall 1242 and may extend forwardly part or all of the axial length of the contiguous dirt collection chamber 1032. In such a case, the baffles 1240 may be spaced from the radial inner wall 1244 of the dirt collection chamber 1032 and/or from the radial outer wall 1246 of the dirt collection chamber 1032

Alternatively, or in addition, one or more baffles 1240 may be provided (a) on the radial inner wall 1244 and may extend radially outwardly; and/or (b) on the radial outer wall 1246 and may extend radially inwardly. If a baffle is provided on a radial inner or outer wall, then the baffle 1240 may be spaced apart from the second end 1228 of the dirt collection chamber 1032 and/or the open end 1226.

The baffle 1240 may be of any shape known in the art. Further, there may be any number of baffles 1240 positioned with a dirt collection chamber 1032. In the example illustrated in FIG. 27, the baffles 1240 each extend axially towards the open front end 1226 of the dirt collection chamber 1032 and the baffles 1240 are generally transverse to an angular direction. In the example shown, the baffles 1240 have a generally rectangular cross-sectional profile in a direction transverse to the air treatment chamber axis 1050. In other examples, the baffles 1240 may have a circular, triangular, square, etc. cross-sectional profile in the direction transverse to the air treatment chamber axis 1050.

In the example shown, the baffles 1240 have a constant profile along their height 1248. In other examples, the baffles 1240 may be tapered towards the dirt outlet 1052 to the dirt collection chamber 1032. The taper of the baffle 1240 may be between 1°-45°, between 30-200, or between 50-120.

The baffles 1240 may have a height 1248 between 5%-150%, between 10%-125%, or between 25%-100% of the axial depth 1250 of the dirt collection chamber 1032.

The baffles 1240 may have a width 1252 that is between 5%-100%, between 10%-60%, or between 25%-50% of the radial width 1254 of the dirt collection chamber 1032.

The Cyclone Chamber Having a Slot Shaped Dirt Outlet

In accordance with this aspect of this disclosure, which may be used by itself or in combination with one or more other aspects of this disclosure, the cyclone chamber 1030 may have a dirt outlet 1052 that is slot shaped (i.e., a slot shaped dirt outlet 1260).

A slot shaped dirt outlet 1260 may connect the cyclone chamber 1030 to the external dirt collection chamber 1042 so that debris separated from the air flow within the cyclone chamber 1030 can pass to the dirt collection chamber 1032 for storage therein. As described below, a slot shaped dirt outlet 1260 is defined in part by a sidewall 1262 that is common to each of the cyclone chamber 1030 and the dirt collection chamber 1032.

Figure 32A:
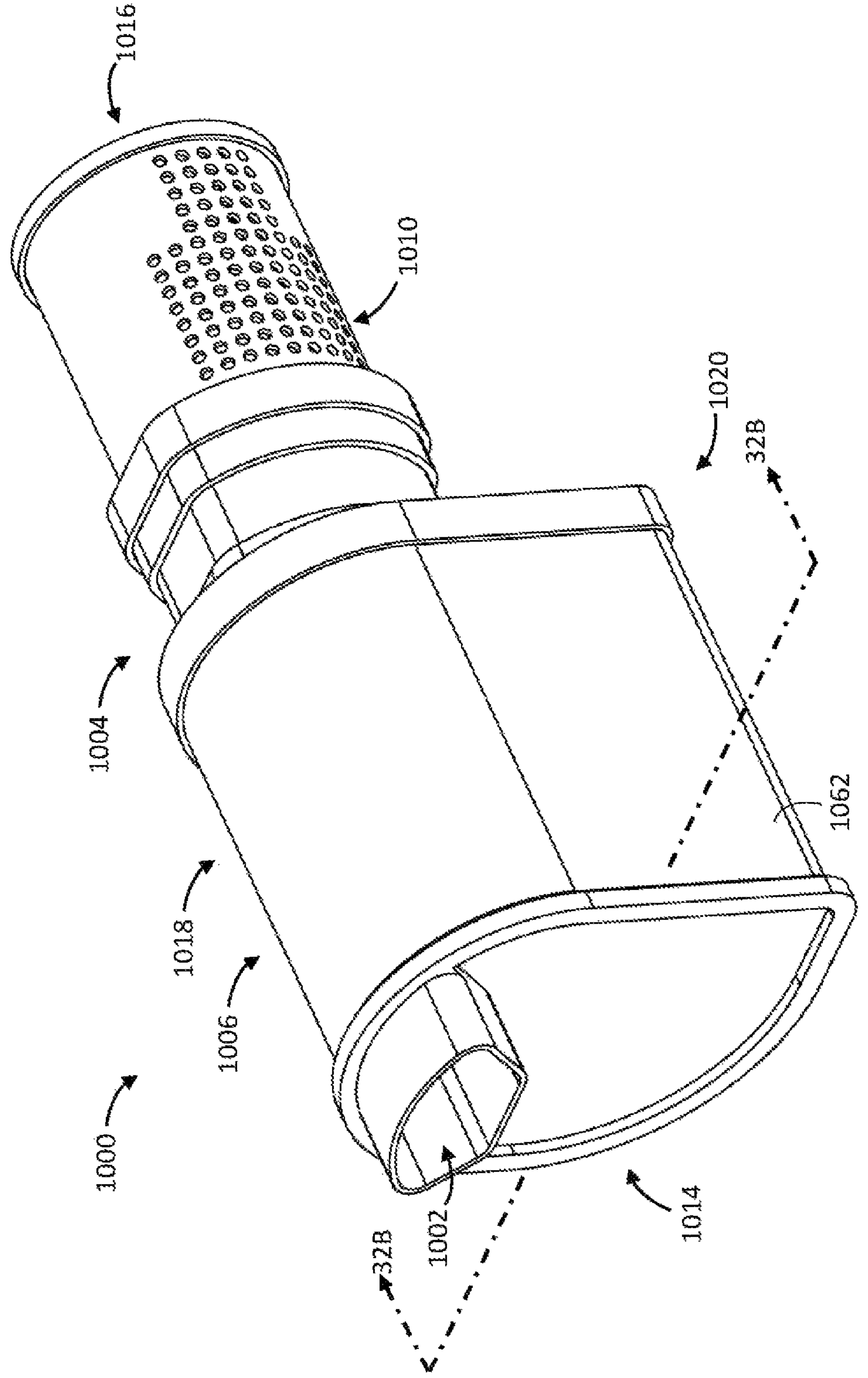
FIG. 32A is a front perspective view of another example of a hand vacuum cleaner.
Figure 32B:
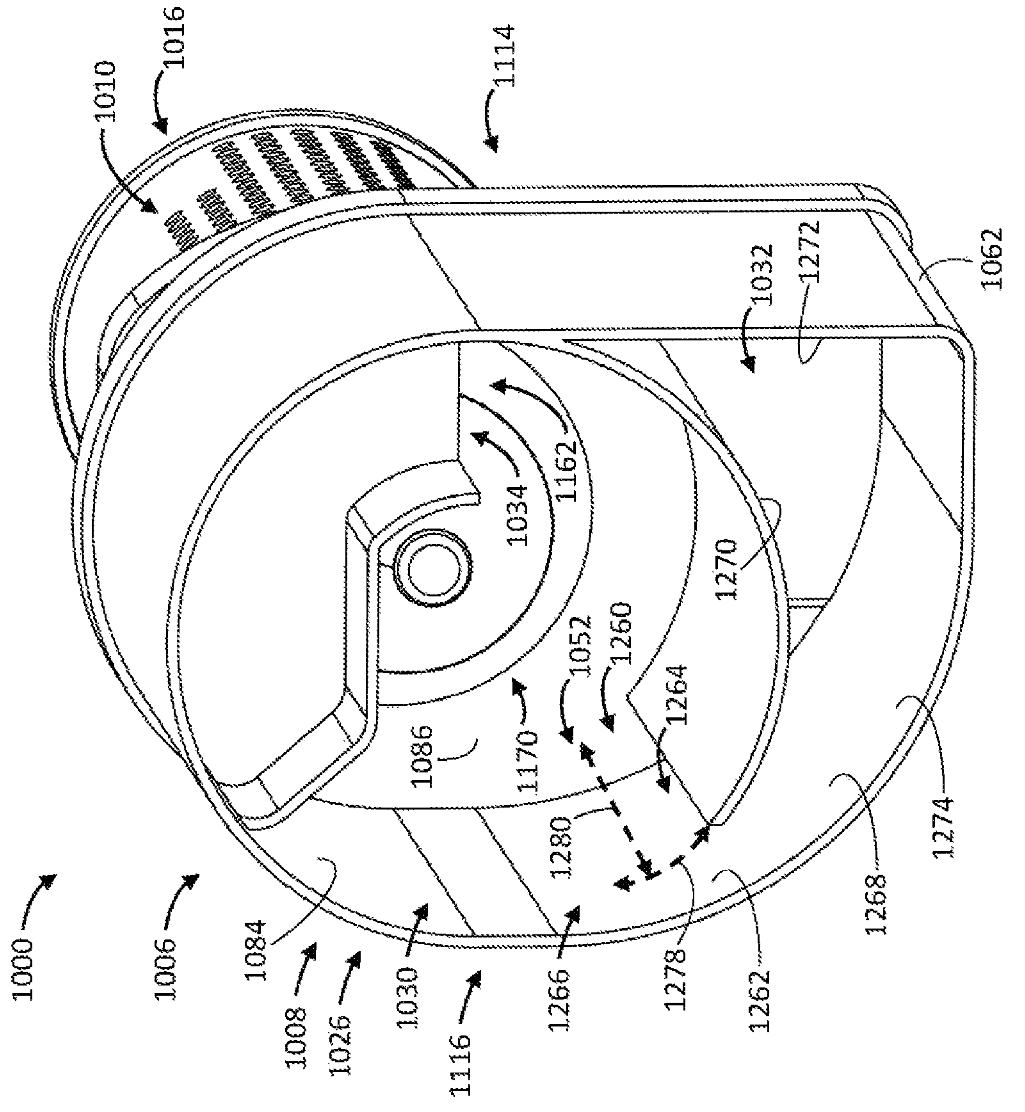
FIG. 32B is a cross-sectional view of the hand vacuum cleaner of FIG. 32A, taken along line 32B-32B.

An example of a slot shaped dirt outlet 1260 is illustrated in FIG. 32B. As shown in the example illustrated, slot shaped dirt outlet 1260 is positioned in the sidewall 1084 of the cyclone chamber 1030. Accordingly, the slot shaped dirt outlet 1260 has an upstream side 1264 in a direction of rotation of air in the cyclone chamber 1030 and a downstream side 1266 in the direction of rotation of air in the cyclone chamber 1030.

External to the cyclone chamber 1030 is the dirt collection chamber 1032. As shown, the dirt collection chamber 1032 may be defined in part by at least first and second opposed walls 1268, 1270. In the example illustrated, the dirt collection chamber 1032 extends only part way around the cyclone chamber and therefore is exemplified with a third wall opposite 1272 to the slot shaped dirt outlet 1260 that extends between the first and second opposed walls 1268, 1270. It will be appreciated that the dirt collection chamber may extend around all of the cyclone chamber.

As shown, the first opposed wall 1268 is an extension of the sidewall 1084 of the cyclone chamber 1030. Specifically, an internal surface 1274 of the first opposed wall 1268 is an extension of an internal surface 1276 of the sidewall 1084 of the cyclone chamber 1030. Put another way, the first opposed wall 1268 extends contiguously from the downstream side 1266 of the slot shaped dirt outlet 1260. Accordingly, the first opposed wall 1268 and the sidewall 1084 of the cyclone chamber 1030 may include a continuous uninterrupted surface.

The slot shaped dirt outlet 1260 may be of any angular length 1278 (i.e., length in the direction of air flow) and axial length 1280. Optionally, the slot shaped dirt outlet 1260 extends at least 50%, 75%, or 90% of an axial length of the cyclone chamber 1030.

As air spirals within the cyclone chamber 1030, the air flow traverses the slot shaped dirt outlet 1260. The cyclone chamber may be circular other than the dirt outlet 1260 and an angular projection of the cyclone chamber sidewall 1084 in the direction of the angular length of the dirt outlet 1260 may, together with the cyclone sidewall 1084, define a circle in a plane transverse to the cyclone axis.

Still referring to FIG. 32B, as the airflow traverses the slot shaped dirt outlet 1260, the airflow continues to swirl about the cyclone chamber 1030. However, entrained debris is heavier and may not traverse the dirt outlet and may therefore travel through the dirt outlet 1260 into the dirt collection chamber. In addition, after traversing the dirt outlet 1260, some of the debris may hit the sidewall 1262, and debris entrained within the air flow may be separated therefrom and may pass through the slot shaped dirt outlet 1260 and be collected in the dirt collection chamber 1032.

Optionally, the first opposed wall 1268 may join the sidewall 1262 tangentially (e.g., the first opposed wall 1268 may be a curved wall) (as shown in FIG. 32B)) so that (a)

the air flow is encouraged to continue to spiral within the cyclone chamber 1030; and (b) the debris separated from the air flow may slide along the sidewall 1262 as it transitions to the first opposed wall 1268 of the dirt collection chamber 1032 without any obstacles to impede its motion.

There may be a screen (not shown) that extends across the slot shaped dirt outlet 1260. The screen may stop larger debris from collecting in the dirt collection chamber 1032 connected to the slot shaped dirt outlet 1260.

It is to be understood that a surface cleaning apparatus may have a slot shaped dirt outlet 1260 connected to a first dirt collection chamber 1032 and any other dirt outlet discussed herein.

The Porous Member Having Axially Extending Dimples

In accordance with this aspect of this disclosure, which may be used by itself or in combination with one or more other aspects of this disclosure, the air treatment chamber air outlet 1048 may include an axially extending porous member 1180 having at least one axially extending dimple 1286.

The axially extending porous member 1180 may act as a screen which allows air to pass therethrough and may stop debris such as hair from entering the pre-motor filter 1066 and/or the motor and fan assembly 1022.

The axially extending porous member 1180 may include at least one axially extending dimple 1286, and the axially extending dimple 1286 may provide rigidity to the axially extending porous member 1180 so that it does not collapse during regular use of the surface cleaning apparatus. Known screens may have a plurality of axially extending support ribs to keep the screen from collapsing during use. These support ribs reduce the total surface area of the screen through with air may pass therethrough. A reduction in the surface area of the screen through with air may pass may increase the back pressure of the surface cleaning apparatus.

The axially extending porous member 1180 with at least one axially extending dimple 1286 may have an absence of axially extending support ribs to maximize surface area through with air may pass through the axially extending porous member 1180. Therefore, the axially extending porous member 1180 may extend uninterrupted 360° around a central longitudinal axis 1288 of the axially extending porous member 1180.

Figure 33:
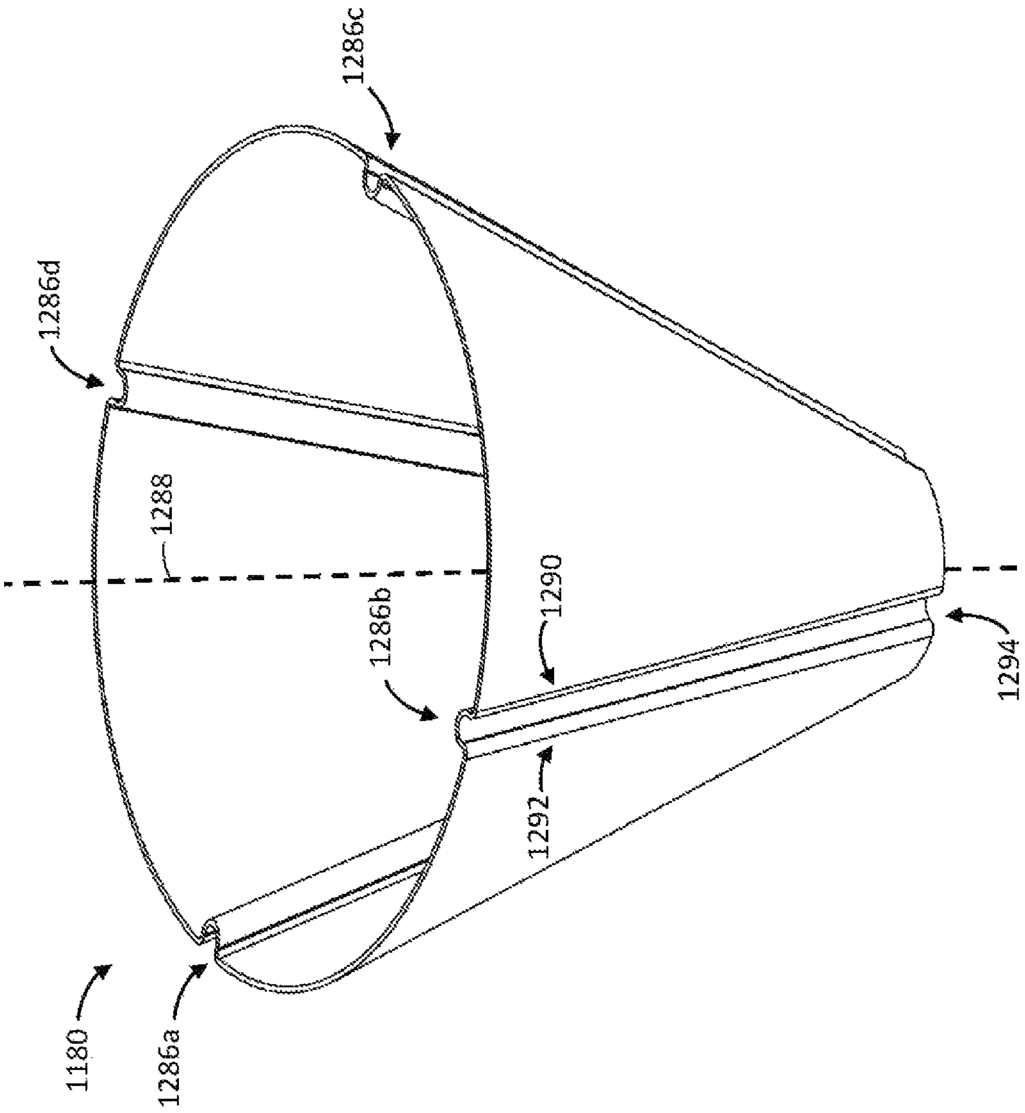
FIG. 33 is a perspective view of a porous member.

Referring now to FIG. 33, an example of an axially extending porous member 1180 having four axially extending dimples **1286*a*, 1286*b*, 1286*c*, 1286*d* is illustrated. The axially extending porous member 1180 may be of any shape known in the art. For example, the axially extending porous member 1180 may be conically shaped, cylindrically shaped, dome shaped, etc. In the example shown, the axially extending porous member 1180** is frusto-conical in shape.

Figure 34:
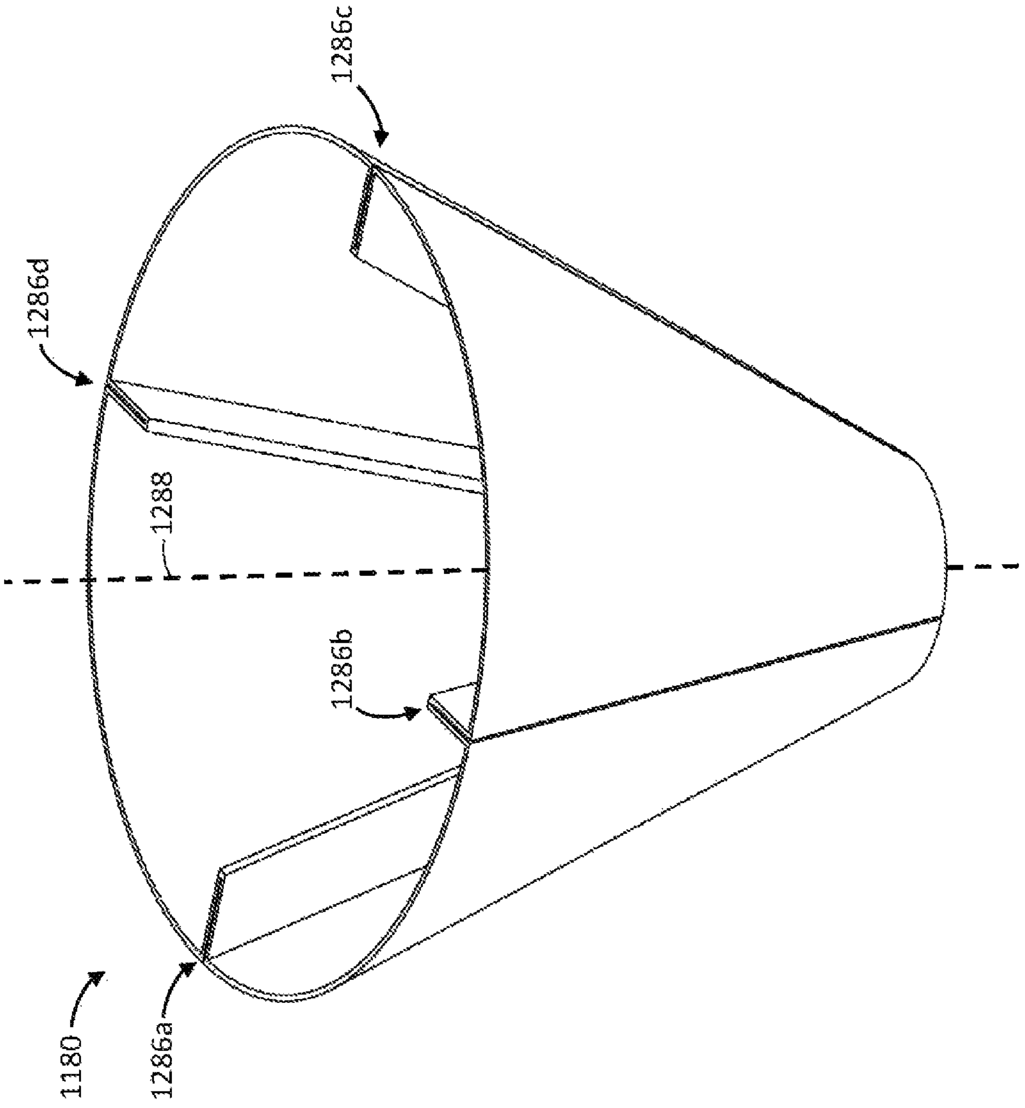
FIG. 34 is a perspective view of another example of a porous member.

As shown in FIG. 33, the axially extending dimples 1286 may each have a first axially extending side 1290 and a second axially extending side 1292, and the first and second axially extending sides 1290, 1292 may be tapered radially inwardly towards each other. That is, the axially extending dimples 1286 may have a generally U-shaped profile or V-shaped profile in a plane transverse to the central longitudinal axis 1288 of the axially extending porous member 1180. The first axially extending side 1290 may be spaced between 0.25 mm-2 mm from the second radially extending side 1292 at a radial outer side 1294 of the axially extending dimple 1286. Alternatively, as shown in FIG. 34, the axially extending dimple(s) 1286 may have first and second axially extending sides 1290, 1292 that abut.

Optionally, the air treatment chamber 1044 may be a cyclone chamber 1030 and the axially extending porous member may include a vortex finder conduit portion 1172.

The Vortex Finder Having Increased Air Permeable Surface Area

In accordance with this aspect of this disclosure, which may be used by itself or in combination with one or more other aspects of this disclosure, the surface area of the porous portion 1180 (i.e., screen portion) of the vortex finder 1170 may be increased without increasing the surface area of the vortex finder 1170 itself by perforating at least a portion of the conduit portion 1172 of the vortex finder 1170.

The surface area of the porous portion 1180 relative to an outlet area of the cyclone air inlet 1034 may have an effect on the performance characteristics of the surface cleaning apparatus. For example, if the surface area of the porous portion 1180 is less than the outlet area of the cyclone air inlet 1034, the cyclone chamber 1030 may produce an undesirable amount of back pressure, when in use. As a result, it may be desirable for the surface area of the porous portion 1180 to be equal to or greater than the outlet area (the outlet port) of the cyclone air inlet 1034. Optionally, the ratio of the surface area of the porous portion 1180 to the outlet area of the cyclone air inlet 1034 may be between 1:1 and 20:1, or between 2:1 and 15:1, or between 3:1 and 8:1, or between 3.5:1 and 5:1.

It is to be understood that if the cyclone air inlet 1034 includes multiple ports (i.e., opening into the cyclone chamber 1030), the outlet area of the cyclone air inlet 1034 is the combined outlet area of each port. Accordingly, it may be desirable for the surface area of the porous portion 1180 to be equal to or greater than the outlet area of the multiple outlet ports, combined.

It may be desirable to increase the surface area of the porous portion 1180 without increasing the surface area of the vortex finder 1170 itself, as a larger vortex finder 1170 may require a larger cyclone chamber 1030; which may be undesirable. In addition, it may be undesirable to decrease the outlet area of the cyclone air inlet 1034 so that the surface area of the porous portion 1180 is less than or equal to the outlet area of the cyclone air inlet 1034 as reducing the outlet area of the cyclone air inlet 1034 will reduce the rate of air flow into the cyclone chamber 1030 without increasing the power input to the suction motor.

Accordingly, it may be desirable to increase the surface area of the porous portion 1180 without increasing the surface area of the vortex finder 1170 as this may allow for the size of the cyclone chamber 1030 to be reduced without giving up performance.

To increase the surface area of the porous portion 1180 without increasing the surface area of the vortex finder 1170, the surface area of at least a portion of the conduit portion 1172 that is generally solid in vortex finders 1170 known in the art may be replaced with a porous section 1296.

The porous section 1296 at the first or rear end 1298 of the vortex finder 1170 (e.g., conduit portion 1172) may be less, more, or equally porous than the porous portion 1180 at the second or front end 1300. In some embodiments, the porous portion 1180 at the second end 1300 may be a screen (e.g., a metal mesh screen) which is more porous than the porous section 1296 at the first end 1298, which may be perforations in a molded plastic tapered wall of the cyclone chamber air outlet 1038.

In some examples, porous section 1296 at the first end 1298 of the vortex finder 1170 and the porous portion 1180 at the second end 1300 of the vortex finder 1170 may be formed of a single monolithic workpiece.

The porosity of the porous section 1296 at the first end 1298 of the vortex finder 1170 may vary about the circumference of the first end 1298 of the vortex finder 1170.

According, a first section of the conduit portion 1172 may be porous and a second section of the conduit portion 1172 that is angularly spaced around the conduit portion 1172 from the first portion of the conduit portion 1172 may be air impermeable. Optionally the conduit portion 172 may comprise two or more porous sections that are angularly spaced around the conduit portion 1172 from each other.

For example, a first section of the conduit portion 1172 that is radially opposed to and faces towards the dirt outlet 1052 (a first portion of the conduit portion 1172) may be porous. Alternately, or in addition, second section of the conduit portion 1172 that is on a radially opposed side of the conduit portion 1172 from the dirt outlet 152 may also be porous. The sections of the conduit portion 1172 between the first and second sections of the conduit portion 1172 that are porous may be air impermeable. In some examples, the opposed second section may be more porous than the porous section 1296 facing the dirt outlet 1052.

Optionally the porous section 1296 of the vortex finder 1170 that faces the dirt outlet 1052 of the cyclone chamber 1030 is less porous than other portions so that air pass is less likely to pass therethrough then the remaining portion of the vortex finder 1170. Debris separated from the air flow may be more likely to pass through the dirt outlet 1052 of cyclone chamber 1030 when the porous section 1296 of the vortex finder 1170 that faces the dirt outlet 1052 is less likely to have air pass therethrough then the remaining portion of the vortex finder 1170.

Alternately, or in addition, in some embodiments, there may be an air impermeable member 1310 positioned interior the cyclone chamber air outlet 1038 which faces the porous section 1296 of the vortex finder 1170 that faces the dirt outlet 1052. Accordingly, in some examples, a plane that is transverse to the cyclone axis of rotation 1050 may intersect the dirt outlet 1052, the porous section 1296, and the air impermeable member 1310.

The air impermeable member 1310 may be of any shape known in the art. In the example shown in FIG. 35A, the air impermeable member 1310 is arcuate. The air impermeable member 1310 may be spaced apart from the porous section 1296 in the radial direction. Alternatively, at least a portion the air impermeable member 1310 may abut the porous section 1296. In the example shown in FIG. 35C, the air impermeable member 1310 is spaced apart from the porous section 1296 in the radial direction. As also shown in FIG. 35C, the air impermeable member 1310 may be radially positioned between the cyclone axis of rotation 1050 and the porous section 1296.

Figure 35C:
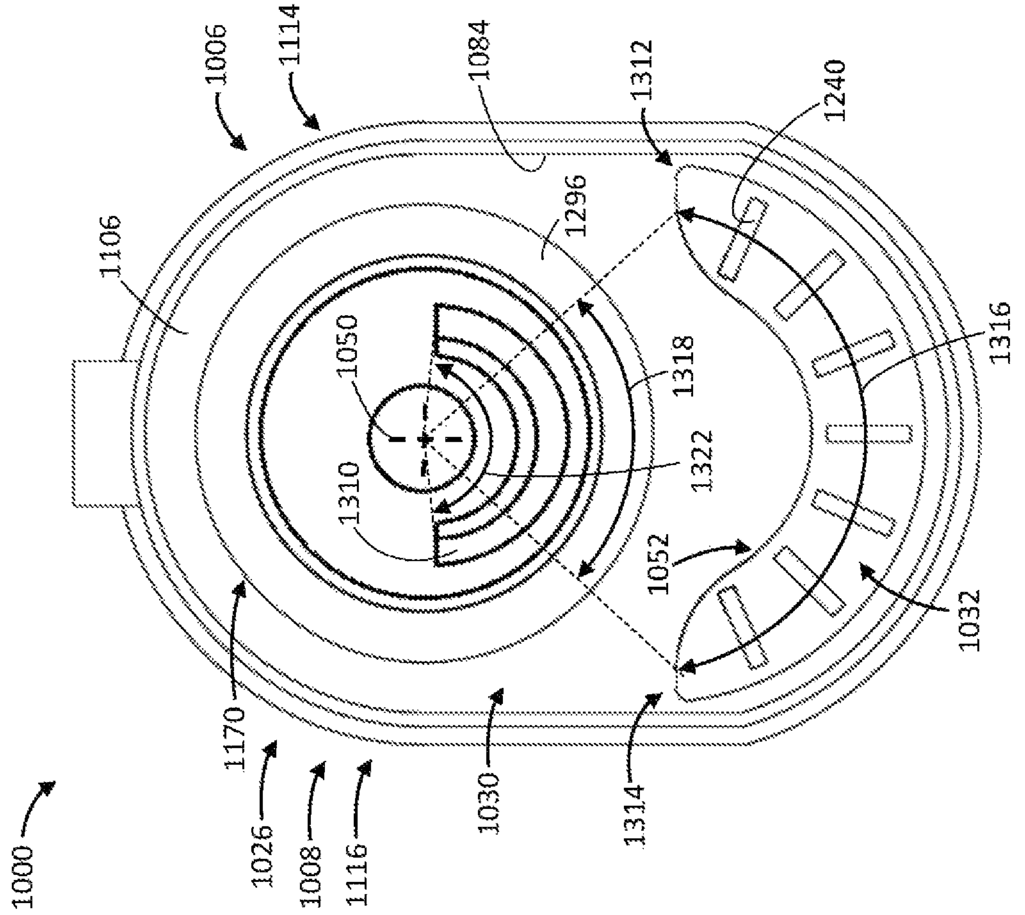
FIG. 35C is a cross-sectional view of the hand vacuum cleaner of FIG. 35A, taken along line 35C-35C.
Figure 36A:
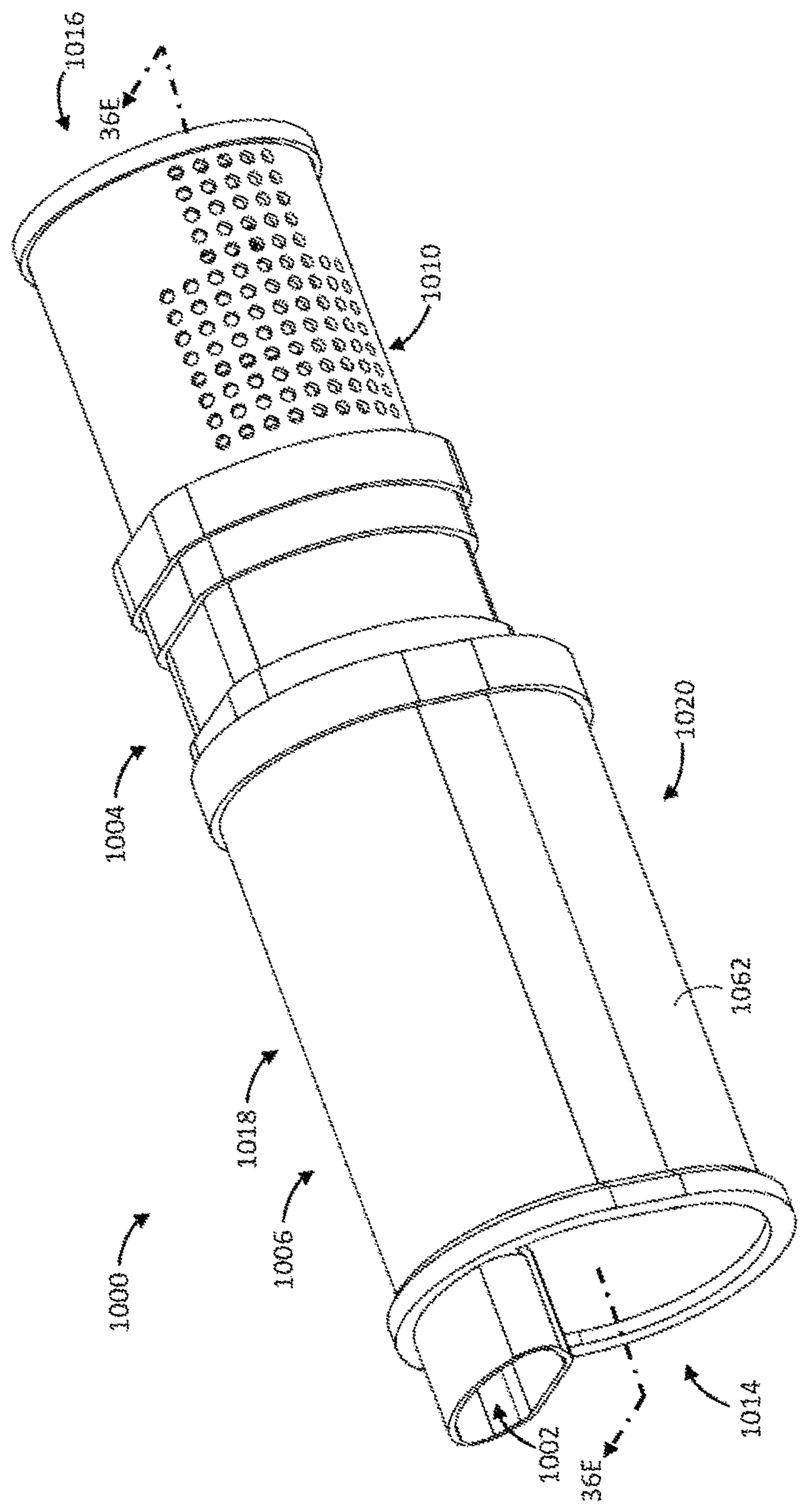
FIG. 36A is a front perspective view of another example of a hand vacuum cleaner.
Figure 36B:
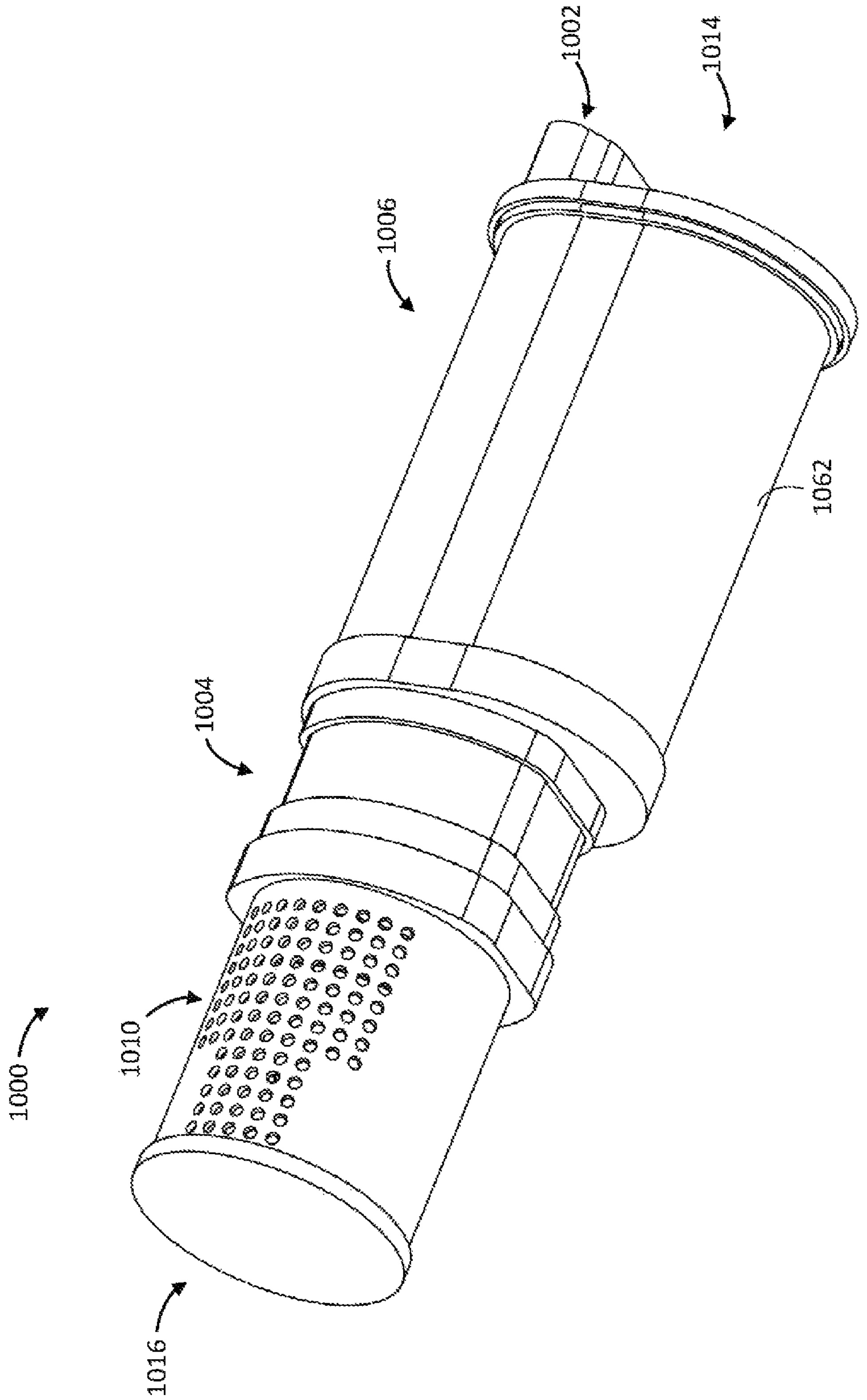
FIG. 36B is a rear perspective view of the hand vacuum cleaner of FIG. 36A.
Figure 36C:
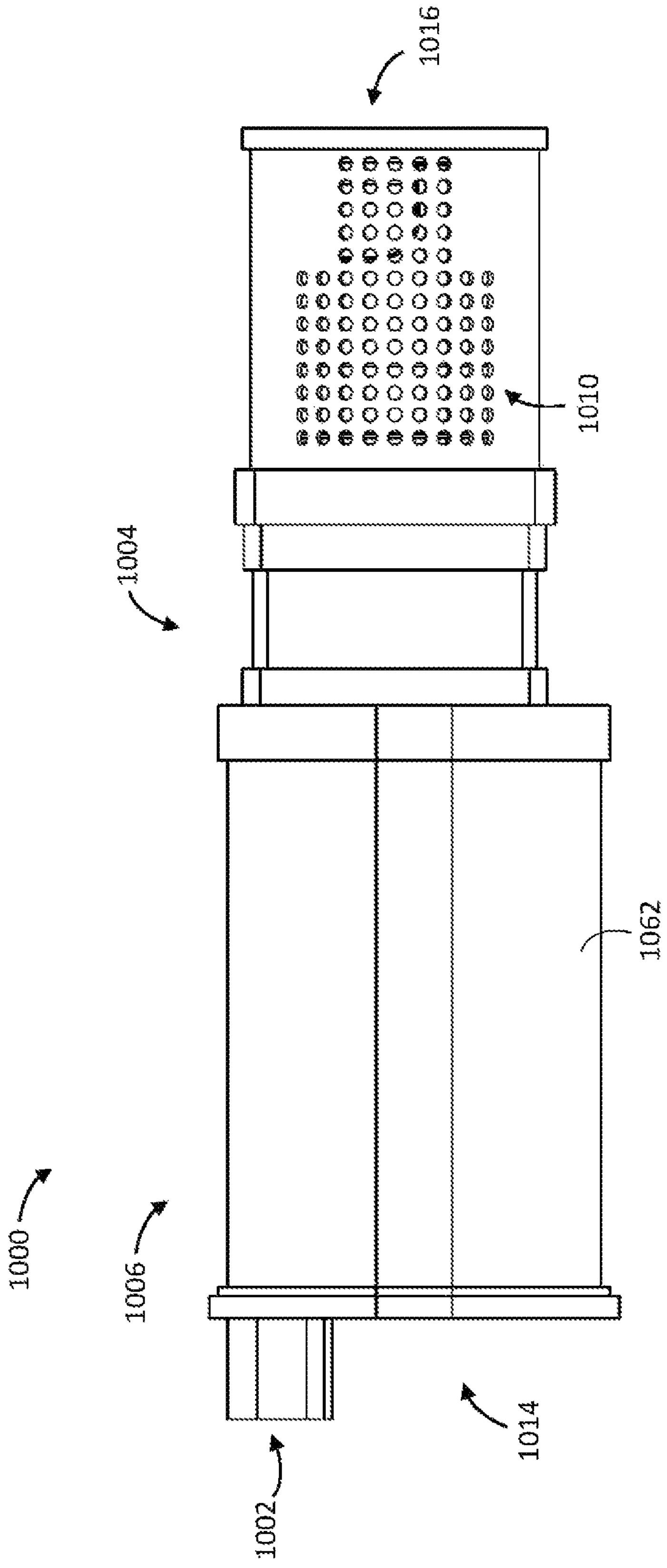
FIG. 36C is a side view of the hand vacuum cleaner of FIG. 36A.
Figure 36D:
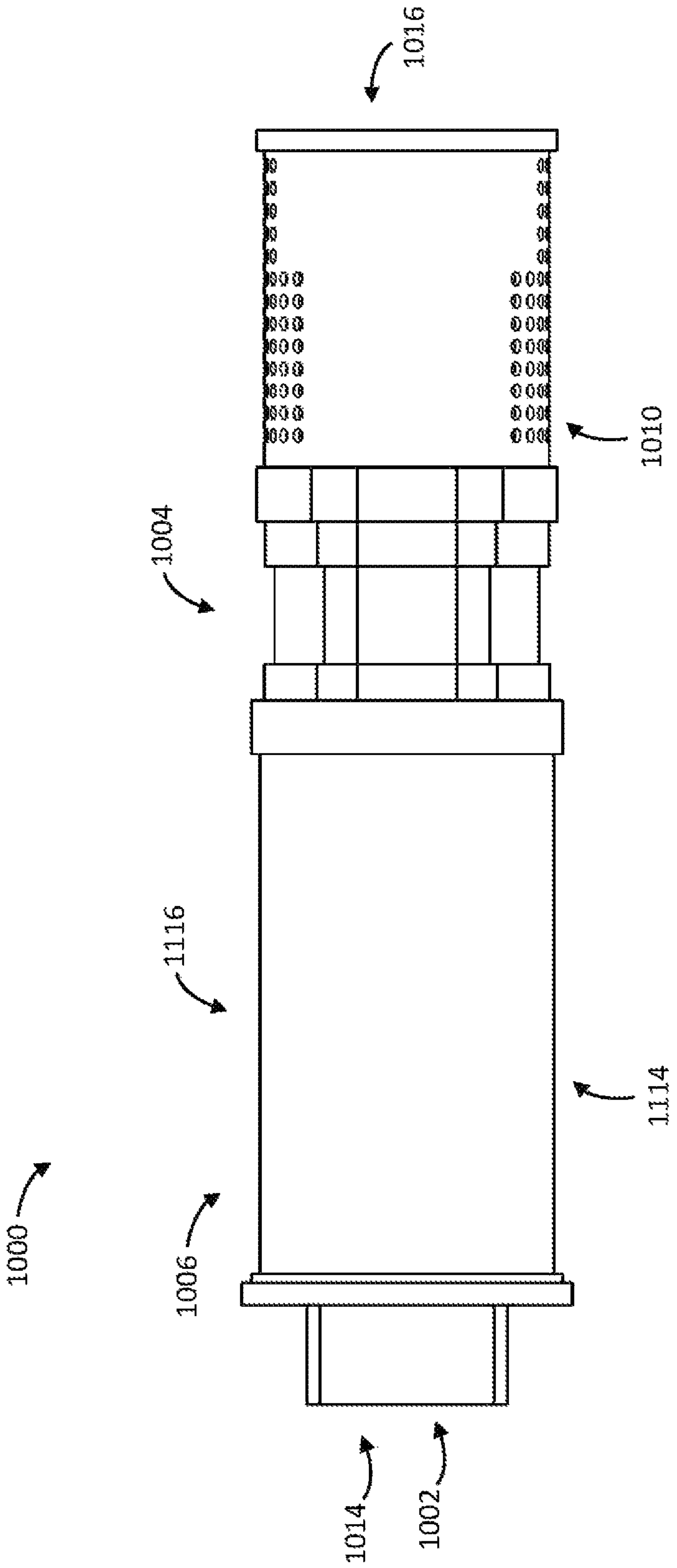
FIG. 36D is a top view of the hand vacuum cleaner of FIG. 36A.
Figure 36E:
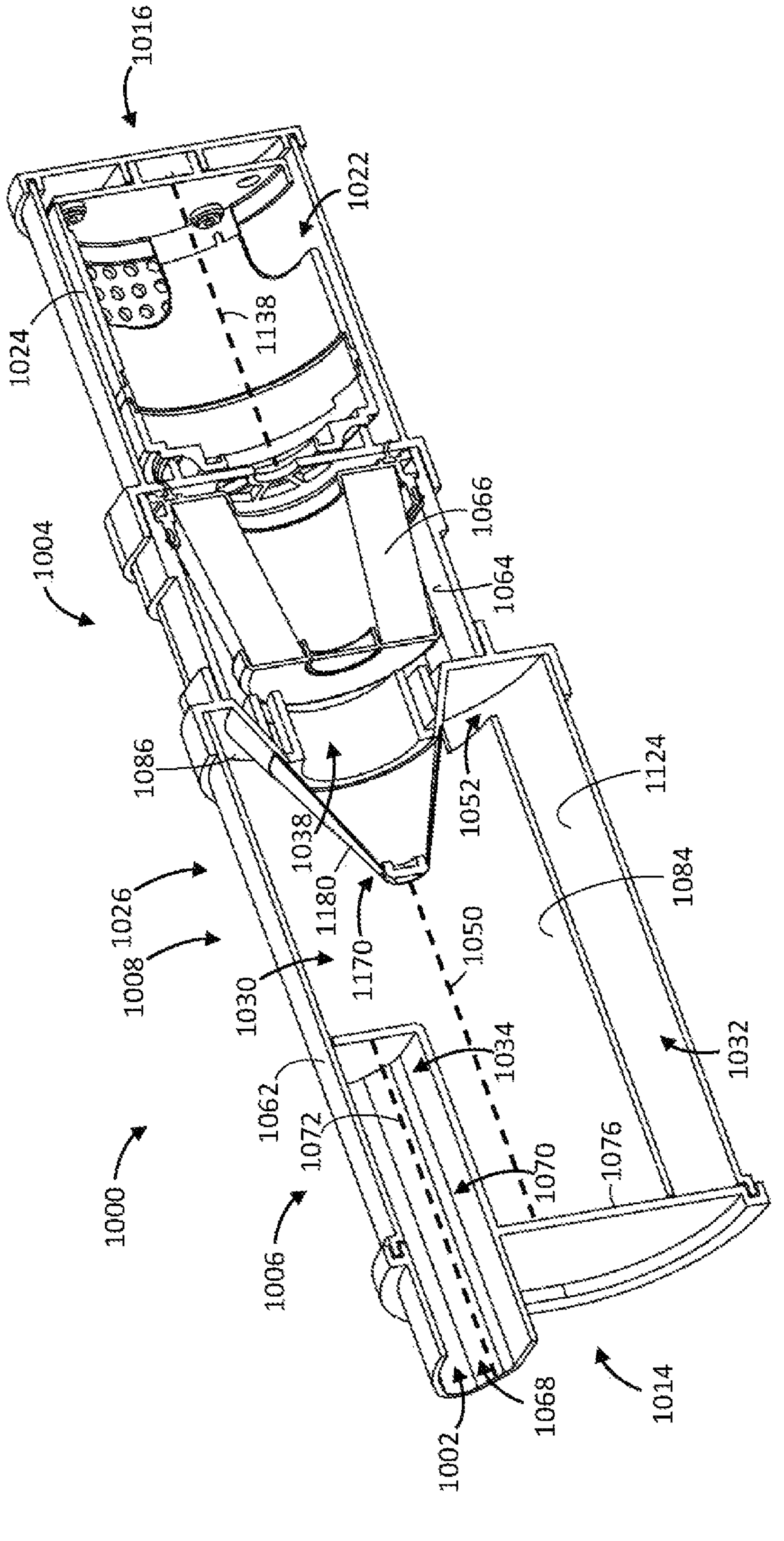
FIG. 36E is a cross-sectional view of the hand vacuum cleaner of FIG. 36A, taken along line 36E-36E.

Referring now to FIG. 35C, in the example illustrated, the dirt outlet 1052 extends from a first end 1312 angularly around the cyclone sidewall to a second end 1314. Accordingly, as shown, the dirt outlet 1052 has an arc length 1316 defining a section of the cyclone chamber 1030 and a dirt outlet sector angle 1318. In some examples, the dirt outlet sector angle 1318 can be from 30° to 90°, or from 45° to 75°.

Optionally, the porous section 1296 may have a porous section sector angle that is equal to or greater than the dirt outlet sector angle 1318 (in the example illustrated the porous section sector angle is 360°). For example, the porous section 1296 may have a porous section sector angle that is 10°, 20°, 30°, 40°, 50° or 60° greater than the dirt outlet sector angle 1318. Accordingly for example, the porous section 1296 may extend angularly around the conduit portion 172 5°, 10°, 15°, 20°, 25° or 30° in one direction from one angular end of the dirt outlet and 5°, 10°, 15°, 20°, 25° or 30° in the other direction from the other angular end of the dirt outlet.

Likewise, the air impermeable member 1310 may have an air impermeable sector angle 1322 that is equal to or greater than the dirt outlet sector angle 1318 and/or the porous section sector angle. Accordingly, the air impermeable member 1310 may have a sector angle that is 10°, 20°, 30°, 40°, 50° or 60° greater than the sector angle of the porous section 1296. Accordingly for example, the air impermeable member 1310 may extend angularly around the conduit portion 172 5°, 10°, 15°, 20°, 25° or 30° in one direction from one angular end of the porous section 1296 and 5°, 10°, 15°, 20°, 25° or 30° in the other direction from the other angular end of the porous section 1296.

Similarly, a section of the conduit portion 1172 that is on a radially opposed side of the conduit portion 1172 from the dirt outlet 152 (i.e., the upper portion in FIG. 35C, may be porous and may have the same or similar sector angle to sector angle 1318.

The cyclone chamber 1030 may have more than one dirt outlet 1052. If the cyclone chamber 1030 includes more than one dirt outlet 1052, a porous section 1296 with an aligned impermeable member 1310 positioned interior the cyclone air chamber air outlet 1038 may face each of the dirt outlets 1052.

The Handle

In accordance with this aspect of this disclosure, which may be used by itself or in combination with one or more other aspects of this disclosure, the surface cleaning apparatus may include a handle 1004.

A handle 1004 is designed to be gripped by a user so that the user may comfortably hold the surface cleaning apparatus in an operating position. The handle 1004 may also be gripped by a user when emptying debris from the dirt collection chamber 1032. In theory, while any portion of a surface cleaning apparatus may be gripped, a handle 1004 is generally a distinctive region of the surface cleaning apparatus. The handle 1004 may have any shape known in the art and may be positioned at any location on the surface cleaning apparatus. Optionally, the handle 1004 may be a pistol grip.

As shown in FIG. 1A, the handle 1004 may extend axially (or generally axially as exemplified in FIG. 8A) from the rear end 1016 of the main body 1006 of the surface cleaning apparatus. As shown, in FIG. 1D, the handle 1004 may extend generally parallel with the cyclone axis of rotation 1050. Alternatively, the handle 1004 may extend at an angle to the cyclone axis of rotation 1050 as illustrated in FIG. 8A.

Referring now to FIG. 22A, the handle 1004 may be positioned between the distal ends 1320, 1322 of the surface cleaning apparatus. When the handle 1004 is position between distal ends 1320, 1322 of the surface cleaning apparatus, there may be components of the surface cleaning apparatus on either side of the handle 1004. It may be desirable to balance the weight of the components on the one side of the handle 1004 to the components on the other side of the handle 1004 for ergonomic purposes.

As shown in FIG. 22D, the handle 1004 may be longitudinally positioned between the air treatment bin assembly (i.e., air treatment member 1008), which includes the air treatment chamber 1044, and the main body 1006, which includes the motor and fan assembly 1022. More specifically, in the example illustrated, the air treatment bin assembly 1008 has a rear end 1324 having the air treatment chamber air outlet 1048, the main body 1006 has a front end 1014 having an air inlet 1326 and the handle 1004 extends between the rear end 1324 of the air treatment bin assembly 1008 and the front end 1014 of the main body 1006.

Accordingly, the handle 1004 may include a portion of the air flow path therein to fluidically connect the air treatment chamber air outlet 1048 of the air treatment bin assembly 1008 to the air inlet 1326 to the main body 1006. Optionally, the portion of the air flow path within the handle 1004 may include the pre-motor filter 1066.

Still referring to the example illustrated in FIGS. 22A-22D, each of the air treatment bin assembly 1008 and the main body 1006 has a height 1330, 1332 in a direction transverse to the central longitudinal axis 1052 of the hand vacuum cleaner 1000. As shown, the handle 1004 also has a height 1334 in the transverse direction that is less than the height 1330, 1332 of the air treatment bin assembly 1008 and the main body 1006.

As discussed previously, there may be an energy storage member 1074 optionally housed in an energy storage chamber 1140 that extends along at least a portion of the exterior surface 1062 of the surface cleaning apparatus illustrated in FIGS. 22A-22D. In such an example, the height 1330 of the air treatment bin assembly 1008, the height 1334 of the handle 1004, and/or the height 1332 of the main body 1006 may include a height 1336 of the energy storage member 1074 (and optionally the energy storage chamber 1140).

As shown, the height 1334 of the handle 1004 may be less than the height 1330, 1332 of the air treatment bin assembly 1008 and/or the main body 1006 (with or without an energy storage member 1074 optionally housed in an energy storage chamber 1140). The handle 1004 may be positioned at any vertical location with respect to the air treatment bin assembly 1008 and the main body 1006. That is, in some examples, (a) an upper longitudinally extending side 1340 of the handle 1004 may be flush with at least one of an upper longitudinally extending side 1342 of the air treatment bin assembly 1008 and an upper longitudinally extending side 1344 of the main body 1006 (as is shown in FIG. 22A); (b) an lower longitudinally extending side 1348 of the handle 1004 may be flush with at least one of a lower longitudinally extending side 1350 of the air treatment bin assembly 1008 and a lower longitudinally extending side 1352 of the main body 1006; or (c) the upper longitudinally extending side 1340 and the lower longitudinally extending side 1348 of the handle 1004 may be recessed inwardly compared to the corresponding sides 1342, 1344, 1350, 1352 of the air treatment bin assembly 1008 and the main body 1006 (as is shown in FIG. 26C).

Similarly, first and second laterally opposed longitudinally extending sides 1354, 1356 of the handle 1004 may be flush or positioned radially inwardly compared to corresponding sides 1358, 1360, 1362, 1364 of the air treatment bin assembly 1008 and the main body 1006. In the example illustrated in FIG. 22A, the first and second laterally opposed longitudinally extending sides 1354, 1356 of the handle 1004 are positioned radially inwardly compared to corresponding sides 1358, 1360, 1362, 1364 of the air treatment bin assembly 1008 and the main body 1006.

Optionally, energy storage members 1074*a*, 1074*b* may be provided along a surface (e.g., an upper surface in the orientation of FIGS. 22A-22D) of the air treatment member 1008 and the main body 1006, but not the handle 1004, such that the upper longitudinally extending side 1340 is recessed inwardly. Optionally, the lower longitudinally extending side 1348 of the handle 1004 may be recessed inwardly.

Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

CLAUSES

Clause Set 1

1. A hand vacuum cleaner comprising:
   (a) an air flow path extending from a dirty air inlet to a clean air outlet;
   (b) a cyclone chamber having a cyclone axis of rotation, a first end, an axially spaced apart second end, a cyclone chamber sidewall extending between the first end and the second end, a cyclone air inlet, a cyclone air outlet, and an openable portion wherein the cyclone axis of rotation intersects the first end and the second end and wherein the openable portion is rotatably mounted about an opening axis that is parallel to the cyclone axis of rotation; and,
   (c) a motor and fan assembly provided in the air flow path.
2. The hand vacuum cleaner of clause 1 further comprising a dirt collection chamber that is external to the cyclone chamber and a dirt outlet connecting the cyclone chamber with the dirt collection chamber wherein the dirt collection chamber is opened concurrently with the cyclone chamber.
3. The hand vacuum cleaner of clause 2 wherein the dirt collection chamber has a dirt collection chamber sidewall that is spaced from the cyclone chamber sidewall whereby at least a portion of the dirt collection chamber is positioned between the cyclone chamber sidewall and the dirt collection chamber sidewall, and the openable portion comprises at least a portion of the dirt collection chamber sidewall and a portion of the cyclone chamber sidewall.
4. The hand vacuum cleaner of clause 3 wherein the dirt outlet comprises an opening in the portion of the cyclone chamber sidewall, the dirt outlet has a perimeter and the portion of the cyclone chamber sidewall comprises only part of the perimeter of the dirt outlet.
5. The hand vacuum cleaner of clause 1 wherein the openable portion comprises a portion of the exterior surface of the hand vacuum cleaner.
6. The hand vacuum cleaner of clause 1 wherein the dirty air inlet is provided at an upper end of the hand vacuum cleaner and the hand vacuum cleaner has a lower end which comprises at least a portion of the openable portion.
7. The hand vacuum cleaner of clause 1 wherein the dirty air inlet is provided at the front end of the hand vacuum cleaner, the first end is a front end of the cyclone chamber, the second end is a rear end of the cyclone chamber, the cyclone air inlet is provided at the front end of the cyclone chamber and the cyclone air outlet is provided at the rear end.
8. The hand vacuum cleaner of clause 1 wherein the hand vacuum cleaner has a front end having the dirty air inlet, a rear end and first and second laterally opposed sides extending in a forward/rearward direction and the opening axis is located on one of the laterally opposed sides.
9. The hand vacuum cleaner of clause 1 wherein the hand vacuum cleaner has a front end having the dirty air inlet, a rear end, first and second laterally opposed sides extending in a forward/rearward direction and a central plane extending in the forward/rearward direction and located between the laterally opposed sides and the opening axis extends in the central plane.

10. The hand vacuum cleaner of clause 1 further comprising an energy storage member and the energy storage member is positioned radially outward of the cyclone chamber.

11. The hand vacuum cleaner of clause 10 further comprising a dirt collection chamber that is external to the cyclone chamber, wherein the dirty air inlet is provided at front end of the hand vacuum cleaner and wherein the energy storage member is positioned forward of the dirt collection chamber.

12. The hand vacuum cleaner of clause 10 further comprising a dirt collection chamber that is external to the cyclone chamber, wherein the hand vacuum cleaner has a front end having the dirty air inlet, a rear end, first and second laterally opposed sides extending in a forward/rearward direction, and wherein the energy storage member is positioned laterally beside the dirt collection chamber.

13. A vacuum cleaner comprising:
   (a) an air flow path extending from a dirty air inlet to a clean air outlet;
   (b) an air treatment chamber having a first end, an axial spaced apart second end, an air treatment chamber sidewall extending between the first end and the second end, an air treatment chamber air inlet, an air treatment chamber air outlet provided at the second end of the air treatment chamber, an air treatment chamber axis intersecting the first end of the air treatment chamber and the second end of the air treatment chamber and defining an axial direction, and an openable portion that is rotatably mounted about an opening axis that is parallel to the air treatment chamber axis; and,
   (c) a motor and fan assembly provided in the air flow path.

14. The hand vacuum cleaner of clause 13 further comprising a dirt collection chamber that is external to the air treatment chamber and a dirt outlet connecting the air treatment chamber in communication with the dirt collection chamber wherein the dirt collection chamber is opened concurrently with the air treatment chamber.

15. The vacuum cleaner of clause 14 wherein the dirt collection chamber has a dirt collection chamber sidewall that is spaced from the air treatment chamber sidewall whereby at least a portion of the dirt collection chamber is positioned between the air treatment chamber sidewall and the dirt collection chamber sidewall, and the openable portion comprises at least a portion of the dirt collection chamber sidewall and a portion of the air treatment chamber sidewall.

16. The vacuum cleaner of clause 15 wherein the dirt outlet comprises an opening in the portion of the air treatment chamber sidewall, the dirt outlet has a perimeter and the portion of the air treatment chamber sidewall comprises only part of the perimeter of the dirt outlet.

17. The vacuum cleaner of clause 13 wherein the openable portion comprises a portion of the exterior surface of the vacuum cleaner.

18. The vacuum cleaner of clause 13 wherein the vacuum cleaner has first and second laterally opposed sides extending in the axial direction and the opening axis is located on one of the laterally opposed sides.

19. The vacuum cleaner of clause 13 further comprising an energy storage member and the energy storage member is positioned radially outward of the air treatment chamber.

20. The vacuum cleaner of clause 19 further comprising a dirt collection chamber that is external to the air treatment chamber, wherein the energy storage member is positioned axially from the dirt collection chamber whereby a projection of the energy storage member intersects the dirt collection chamber.

Clause Set 2

1. A hand vacuum cleaner comprising:
   (a) an air flow path extending from a dirty air inlet to a clean air outlet;
   (b) a cyclone chamber having a cyclone axis of rotation, an openable first end, an axially spaced apart second end, a cyclone chamber sidewall extending between the first end and the second end, a cyclone air inlet and a cyclone air outlet, wherein the cyclone axis of rotation intersects the openable first end and the second end;
   (c) an energy storage member in an energy storage chamber wherein the energy storage chamber is positioned radially outward of the cyclone chamber; and,
   (d) a motor and fan assembly provided in the air flow path, wherein, when the openable first end is opened, the energy storage chamber is concurrently opened.

2. The hand vacuum cleaner of clause 1 further comprising a dirt collection chamber that is positioned radially outward of the cyclone chamber wherein, when the openable first end is opened, the dirt collection chamber is concurrently opened.

3. The hand vacuum cleaner of clause 2 wherein the cyclone chamber has first and second axially extending laterally opposed sides and the energy storage chamber is laterally positioned beside the dirt collection chamber.

4. The hand vacuum cleaner of clause 3 wherein a horizontal plane intersects the first and second laterally opposed sides, the cyclone axis of rotation is located in the horizontal plane and each of the energy storage chamber and the dirt collection chamber are spaced from the cyclone axis of rotation in a direction transverse to the horizontal plane.

5. The hand vacuum cleaner of clause 1 wherein the openable first end is pivotally mounted to the hand vacuum cleaner.

6. The hand vacuum cleaner of clause 1 wherein the openable first end is translatably mounted to the hand vacuum cleaner.

7. The hand vacuum cleaner of clause 1 wherein the cyclone chamber sidewall defines a portion of the energy storage member chamber.

8. The hand vacuum cleaner of clause 2 wherein the cyclone chamber sidewall defines a portion of the dirt collection chamber and the energy storage member chamber.

9. A vacuum cleaner comprising:
   (a) an air flow path extending from a dirty air inlet to a clean air outlet;
   (b) an air treatment chamber having an openable first end, an axial spaced apart second end, an air treatment chamber sidewall extending between the first end and the second end, an air treatment chamber air inlet, an air treatment chamber air outlet provided at the second end of the air treatment chamber and an air treatment chamber axis intersecting the first end of the air treatment chamber and the second end of the air treatment chamber and defining an axial direction;

(c) an energy storage member in an energy storage chamber wherein the energy storage chamber is positioned outward of the air treatment chamber whereby a plane that is transverse to the air treatment chamber axis intersects the air treatment chamber and the energy storage chamber; and, (d) a motor and fan assembly provided in the air flow path, wherein, when the openable first end is opened, the energy storage chamber is concurrently opened.

10. The vacuum cleaner of clause 9 further comprising a dirt collection chamber that is positioned outward of the air treatment chamber whereby the plane intersects the dirt collection chamber wherein, when the openable first end is opened, the dirt collection chamber is concurrently opened.

11. The vacuum cleaner of clause 10 wherein the air treatment chamber has first and second axially extending laterally opposed sides, the plane intersects the laterally opposed sides and the energy storage chamber is laterally positioned beside the dirt collection chamber.

12. The vacuum cleaner of clause 9 wherein the openable first end is pivotally mounted to the vacuum cleaner.

13. The vacuum cleaner of clause 9 wherein the openable first end is translatably mounted to the vacuum cleaner.

14. The vacuum cleaner of clause 9 wherein the air treatment chamber sidewall defines a portion of the energy storage member chamber.

15. The vacuum cleaner of clause 10 wherein the air treatment chamber sidewall defines a portion of the dirt collection chamber and the energy storage member chamber.

16. A vacuum cleaner comprising:

(a) an air flow path extending from a dirty air inlet to a clean air outlet, (b) an air treatment chamber having an openable first end, an axial spaced apart second end, an air treatment chamber sidewall extending between the first end and the second end, an air treatment chamber air inlet, an air treatment chamber air outlet provided at the second end of the air treatment chamber and an air treatment chamber axis intersecting the first end of the air treatment chamber and the second end of the air treatment chamber and defining an axial direction;

(c) an energy storage member in an energy storage chamber;

and, (d) a motor and fan assembly provided in the air flow path, wherein, when the openable first end is opened, the energy storage chamber is concurrently opened.

17. The vacuum cleaner of clause 16 further comprising a dirt collection chamber that is positioned outward of the air treatment chamber whereby a plane that is transverse to the air treatment chamber axis intersects the dirt collection chamber wherein, when the openable first end is opened, the dirt collection chamber is concurrently opened.

18. The vacuum cleaner of clause 17 wherein the air treatment chamber has first and second axially extending laterally opposed sides, the plane intersects the laterally opposed sides and the energy storage chamber is laterally positioned beside the dirt collection chamber.

Clause Set 3

1. A hand vacuum cleaner comprising:

(a) an air flow path extending from a dirty air inlet to a clean air outlet;

(b) a motor and fan assembly provided in the air flow path;

(c) a main body comprising a handle and the suction motor; and, (d) a cyclone bin assembly comprising a cyclone chamber positioned in the air flow path and a dirt collection chamber, the cyclone chamber has a cyclone air inlet, a cyclone air outlet, a dirt outlet, a cyclone chamber front end having a cyclone chamber front end wall, a cyclone chamber rear end having a cyclone chamber rear end wall and cyclone axis of rotation that intersects the cyclone chamber front end wall and the cyclone chamber rear end wall, the dirt collection chamber having a dirt collection chamber front end having a dirt collection chamber front end wall and an axially spaced apart dirt collection chamber rear end having a dirt collection chamber rear end wall, a portion of the dirt collection chamber is spaced from the cyclone chamber in a direction transverse to the cyclone axis of rotation whereby the portion is separated from the cyclone chamber by a sidewall, wherein the rear end of the cyclone bin assembly is rotationally mounted between a closed position and an open position in which the front end of the cyclone chamber and the front end of the dirt collection chamber are opened and, wherein the dirt outlet comprises an opening that has a perimeter, the perimeter having a first portion and a second portion and only the first portion of the perimeter is moved when the rear end of the cyclone bin assembly is moved to the open position.

2. The hand vacuum cleaner of clause 1 wherein the dirt outlet is provided in the sidewall.

3. The hand vacuum cleaner of clause 2 wherein the opening extends axially inwardly into the cyclone chamber from the cyclone chamber rear end wall whereby the second portion of the perimeter comprises a portion of the rear end wall.

4. The hand vacuum cleaner of clause 3 wherein the first portion of the perimeter is located in the sidewall.

5. The hand vacuum cleaner of clause 4 wherein the first portion of the perimeter is generally U-shaped and a rearward end of the first portion of the perimeter abuts the cyclone chamber rear end wall when the rear end of the cyclone bin assembly is in the closed position and the cyclone chamber rear end wall comprises the second portion.

6. The hand vacuum cleaner of clause 1 wherein the cyclone air inlet is provided at the cyclone chamber front end and the cyclone air outlet is provided at the cyclone chamber rear end.

7. The hand vacuum cleaner of clause 6 wherein the dirt outlet is provided in the sidewall.

8. The hand vacuum cleaner of clause 7 wherein the opening extends axially inwardly into the cyclone chamber from the cyclone chamber rear end wall whereby the second portion of the perimeter comprises a portion of the rear end wall.

9. The hand vacuum cleaner of clause 8 wherein the first portion of the perimeter is located in the sidewall.
10. The hand vacuum cleaner of clause 9 wherein the first portion of the perimeter is generally U-shaped and a rearward end of the first portion of the perimeter abuts the cyclone chamber rear end wall when the rear end of the cyclone bin assembly is in the closed position and the cyclone chamber rear end wall comprises the second portion.
11. The hand vacuum cleaner of clause 1 wherein the rear end of the cyclone bin assembly is rotationally mounted to the main body.
12. The hand vacuum cleaner of clause 1 further comprising an inlet conduit extending from the dirty air inlet to the cyclone air inlet, the inlet conduit is at an upper end of the hand vacuum cleaner and at least a portion of the dirt collection chamber is positioned below the cyclone chamber.
53. The hand vacuum cleaner of clause 12 wherein the rear end of the dirt collection chamber is rotationally mounted to the main body.

Clause Set 4

1. A hand vacuum cleaner comprising:
   (a) an air flow path extending from a dirty air inlet to a clean air outlet;
   (b) a motor and fan assembly provided in the air flow path; and,
   (c) a cyclone bin assembly comprising a cyclone chamber positioned in the air flow path and a dirt collection chamber, the cyclone chamber has a cyclone air inlet, a cyclone air outlet, a dirt outlet, a cyclone chamber first end having a cyclone chamber first end wall, a cyclone chamber second end having a cyclone chamber second end wall, a cyclone chamber sidewall extending between the first and second end walls of the cyclone chamber and a cyclone axis of rotation that intersects the cyclone chamber first end wall and the cyclone chamber second end wall, the dirt collection chamber having a dirt collection chamber first end having a dirt collection chamber first end wall, an axially spaced apart dirt collection chamber second end having a dirt collection chamber second end wall and a dirt collection chamber sidewall extending between the first and second end walls of the dirt collection chamber, a portion of the dirt collection chamber is spaced from the cyclone chamber in a direction transverse to the cyclone axis of rotation whereby the portion is separated from the cyclone chamber by the cyclone chamber sidewall, wherein the cyclone bin assembly has a first openable portion comprising the first end wall of the dirt collection chamber that is moveably mounted to the hand vacuum cleaner at a first location and a moveable portion that is moveably mounted to the hand vacuum cleaner at a second location, wherein the moveable portion comprises a portion of at least one of the cyclone chamber sidewall and the dirt collection chamber sidewall.
2. The hand vacuum cleaner of clause 1 wherein the moveable portion comprises a portion of the cyclone chamber sidewall and the dirt outlet comprises an opening that has a perimeter, the perimeter having a first portion and a second portion and the first portion of the perimeter is moved with respect to the second portion of the perimeter when the moveable portion is opened.
3. The hand vacuum cleaner of clause 2 wherein the portion of the dirt collection chamber sidewall remains in position when the second openable portion is opened.
4. The hand vacuum cleaner of clause 3 wherein when the first openable portion is opened, the cyclone chamber and the dirt collection chamber are each opened.
5. The hand vacuum cleaner of clause 5 further comprising an actuator that is operatively connected to the moveable portion and the moveable portion is operatively connected to the first openable portion wherein when the actuator is moved to an open position, the moveable portion is opened and opening the moveable portion opens the first openable portion.
6. The hand vacuum cleaner of clause 4 further comprising an actuator that is operatively connected to the first openable portion and the moveable portion wherein, when the actuator is moved to an open position, the first openable portion is opened and the moveable portion is opened.
7. The hand vacuum cleaner of clause 1 wherein the moveable portion comprises a portion of the dirt collection chamber sidewall whereby, the moveable portion comprises a second openable portion and, when the moveable portion is moved to the open position, the dirt collection chamber is opened.
8. The hand vacuum cleaner of clause 1 wherein the moveable portion comprises a portion of the cyclone chamber sidewall and a portion of the dirt collection chamber sidewall whereby, the moveable portion comprises a second openable portion and, when the moveable portion is moved to the open position, the cyclone chamber and the dirt collection chamber are opened.
9. The hand vacuum cleaner of clause 7 wherein the dirty air inlet is provided at an upper end of a front end of the hand vacuum cleaner, the portion of the dirt collection chamber is positioned at a lower end of the hand vacuum cleaner, the first end of the cyclone chamber is at a front end of the cyclone chamber, when the first openable portion is opened, the front end of the cyclone chamber is opened and when the moveable portion is opened, a lower end of the cyclone assembly is opened whereby the dirt collection chamber is opened.
10. The hand vacuum cleaner of clause 9 wherein when, the upper end of the hand vacuum cleaner is positioned above the lower end of the hand vacuum cleaner, the first location is positioned above the second location and the second location is rearward of the first location.
11. The hand vacuum cleaner of clause 7 wherein when the first openable portion is opened, the cyclone chamber and the dirt collection chamber are opened concurrently.
12. The hand vacuum cleaner of clause 7 wherein when the moveable portion is opened, the cyclone chamber and the dirt collection chamber are opened concurrently.
13. The hand vacuum cleaner of clause 1 wherein the first location is spaced from the second location in a direction that is transverse to the cyclone axis of rotation.
14. The hand vacuum cleaner of clause 13 wherein the first location is axially spaced from the second location.
15. The hand vacuum cleaner of clause 7 wherein the first location is at a front end of the cyclone bin assembly and the second location is at a rear end of the cyclone bin assembly and the first openable portion is pivotally mounted to the hand vacuum cleaner by a first pivot and the moveable portion is pivotally mounted to the hand vacuum cleaner by a second pivot.

16. The hand vacuum cleaner of clause 1 wherein the first openable portion moves in a first direction when the first openable portion is opened and the moveable openable portion is opened.

17. The hand vacuum cleaner of clause 7 wherein the front openable portion opens upwardly and the moveable portion is a lower portion of the cyclone bin assembly and the moveable portion opens downwardly.

18. The hand vacuum cleaner of clause 1 further comprising an actuator that is operatively connected to the moveable portion and the moveable portion is operatively connected to the first openable portion wherein, when the actuator is moved to an open position, the moveable portion is opened and opening the moveable portion opens the first openable portion.

19. The hand vacuum cleaner of clause 1 further comprising an actuator that is operatively connected to the first openable portion and the moveable portion wherein, when the actuator is moved to an open position, the first openable portion is opened and the moveable portion is opened.

20. A vacuum cleaner comprising:
 (a) an air flow path extending from a dirty air inlet to a clean air outlet;
 (b) a motor and fan assembly provided in the air flow path; and,
 (c) an air treatment bin assembly comprising an air treatment chamber positioned in the air flow path and a dirt collection chamber, the air treatment chamber has an air treatment air inlet, an air treatment air outlet, a dirt outlet, an air treatment chamber first end having an air treatment chamber first end wall, an air treatment chamber second end having an air treatment chamber second end wall, an air treatment chamber sidewall extending between the first and second end walls of the air treatment chamber and a central air treatment axis that intersects the air treatment chamber first end wall and the air treatment chamber second end wall, the dirt collection chamber having a dirt collection chamber first end having a dirt collection chamber first end wall, an axially spaced apart dirt collection chamber second end having a dirt collection chamber second end wall and a dirt collection chamber sidewall extending between the first and second end walls of the dirt collection chamber, a portion of the dirt collection chamber is spaced from the air treatment chamber in a direction transverse to the central air treatment axis whereby the portion is separated from the air treatment chamber by the air treatment chamber sidewall, wherein the air treatment bin assembly has a first openable portion comprising the first end wall of the dirt collection chamber that is moveably mounted to the vacuum cleaner at a first location and a moveable portion that is moveably mounted to the vacuum cleaner at a second location, wherein the moveable portion comprises a portion of at least one of the air treatment chamber sidewall and the dirt collection chamber sidewall.

Clause Set 5

1. A hand vacuum cleaner comprising:
 (a) an air flow path extending from a dirty air inlet provided at an upper portion of a front end of the hand vacuum cleaner to a clean air outlet;
 (b) a motor and fan assembly provided in the air flow path; and,
 (c) a cyclone bin assembly comprising a cyclone chamber positioned in the air flow path, the cyclone chamber has a cyclone air inlet, a cyclone air outlet, a cyclone chamber front end, a cyclone chamber rear end, a cyclone chamber sidewall extending between the front and rear ends of the cyclone chamber and a cyclone axis of rotation that extends in a forward/rearwards direction, wherein the front end of the cyclone chamber has a front height in a direction transverse to the cyclone axis of rotation that is less than a rear height of the cyclone chamber in the direction transverse to the cyclone axis of rotation.

2. The hand vacuum cleaner of clause 1 wherein the cyclone chamber sidewall has a lower portion which comprises a portion of a lower surface of the hand vacuum cleaner.

3. The hand vacuum cleaner of clause 2 wherein, when the hand vacuum cleaner is positioned with the upper end of the hand vacuum cleaner above the lower surface of the hand vacuum cleaner, at least some of the lower portion of the cyclone chamber sidewall extends at an angle downwardly and rearwardly.

4. The hand vacuum cleaner of clause 3 wherein the lower portion of the cyclone chamber sidewall extends at an acute angle from the front end of the cyclone chamber to the rear end of the cyclone chamber.

5. The hand vacuum cleaner of clause 3 wherein the lower portion of the cyclone chamber sidewall extends linearly from the front end of the cyclone chamber to the rear end of the cyclone chamber.

6. The hand vacuum cleaner of clause 2 wherein the lower portion of the cyclone chamber sidewall is stepped downwardly.

7. The hand vacuum cleaner of clause 6 wherein the lower portion of the cyclone chamber sidewall is stepped downwardly at an angle of 90°.

8. The hand vacuum cleaner of clause 2 wherein the lower portion of the cyclone chamber sidewall is arcuate.

9. The hand vacuum cleaner of clause 1 wherein the cyclone bin assembly further comprises a dirt collection chamber exterior to the cyclone chamber and the dirt collection chamber is located only at a rearward portion of the cyclone chamber.

10. The hand vacuum cleaner of clause 9 wherein, when the hand vacuum cleaner is positioned with the cyclone axis of rotation extending horizontally and the dirty air inlet is provided at the upper portion of the hand vacuum cleaner, the dirt collection chamber is positioned below the cyclone chamber.

11. The hand vacuum cleaner of clause 2 wherein the cyclone bin assembly further comprises a dirt collection chamber exterior to the cyclone chamber and wherein, when the hand vacuum cleaner is positioned with the upper end of the hand vacuum cleaner above the lower surface of the hand vacuum cleaner, the dirt collection chamber is positioned below the cyclone chamber.

12. The hand vacuum cleaner of clause 1 wherein the cyclone bin assembly has a lower portion that is openable.

13. The hand vacuum cleaner of clause 1 further comprising an inlet nozzle wherein the inlet nozzle is provided at an upper end of the cyclone chamber front end.

14. The hand vacuum cleaner of clause 13 wherein the front height is 1-1.5 times a diameter to the inlet nozzle.
15. The hand vacuum cleaner of clause 13 wherein the front height is 1-1.25 times a diameter to the inlet nozzle.
16. The hand vacuum cleaner of clause 13 wherein the front height is 1-1.1 times a diameter to the inlet nozzle.

Clause Set 6

1. A hand vacuum cleaner comprising:
   (a) an air flow path extending from a dirty air inlet provided at a front end of the hand vacuum cleaner to a clean air outlet;
   (b) an air treatment bin assembly comprising an air treatment chamber positioned in the air flow path,
   (c) a main body housing a motor and fan assembly, which is provided in the air flow path;
   (d) a handle;
   (e) a first energy storage pack provided at a first location in the hand vacuum cleaner; and,
   (f) a second energy storage pack provided at a second location in the hand vacuum cleaner which is different to the first location.
2. The hand vacuum cleaner of clause 1 wherein the first energy storage pack is removably mounted.
3. The hand vacuum cleaner of clause 2 wherein the second energy storage pack is removably mounted.
4. The hand vacuum cleaner of clause 1 wherein both the first and second energy storage packs are used to concurrently power the motor and fan assembly.
5. The hand vacuum cleaner of clause 1 wherein the first location is in the main body and the second location is in the handle.
6. The hand vacuum cleaner of clause 3 wherein the first energy storage pack is removably mounted.
7. The hand vacuum cleaner of clause 3 wherein the second energy storage pack is removably mounted.
8. The hand vacuum cleaner of clause 1 wherein the second location is spaced from the first location in a forward/rearward direction.
9. The hand vacuum cleaner of clause 1 wherein the motor and fan assembly has an axis of rotation and a plane that is transverse to the axis of rotation intersects the first energy storage pack and the motor and fan assembly.
10. The hand vacuum cleaner of clause 9 wherein the second location is in the handle.
11. The hand vacuum cleaner of clause 10 wherein the handle is positioned rearward of the motor and fan assembly.
12. A hand vacuum cleaner comprising:
   (a) an air flow path extending from a dirty air inlet provided at a front end of the hand vacuum cleaner to a clean air outlet;
   (b) an air treatment bin assembly comprising an air treatment chamber positioned in the air flow path,
   (c) a main body housing a motor and fan assembly, which is provided in the air flow path;
   (d) a handle;
   (e) a first removable energy storage pack; and,
   (f) a second removable energy storage pack wherein the first and second removable energy storage packs are separately removable.
13. The hand vacuum cleaner of clause 12 wherein both the first and second energy storage packs are used to concurrently power the motor and fan assembly.
14. The hand vacuum cleaner of clause 12 wherein the first removable energy storage pack is in the main body and the second removable energy storage pack is in the handle.
15. The hand vacuum cleaner of clause 12 wherein the second removable energy storage pack is spaced from the first removable energy storage pack in a forward/rearward direction.
16. The hand vacuum cleaner of clause 12 wherein the motor and fan assembly has an axis of rotation and a plane that is transverse to the axis of rotation intersects the first energy storage pack and the motor and fan assembly.
17. The hand vacuum cleaner of clause 16 wherein the second removable energy storage pack is in the handle.
18. The hand vacuum cleaner of clause 17 wherein the handle is positioned rearward of the motor and fan assembly.

Clause Set 7

1. A hand vacuum cleaner having a front end, a longitudinally spaced apart rear end, an upper end extending between the front and rear ends and a lower end extending between the front and rear ends, the hand vacuum cleaner comprising:
   (a) an air flow path extending from a dirty air inlet to a clean air outlet;
   (b) an air treatment bin assembly comprising an air treatment chamber positioned in the air flow path,
   (c) a main body housing a motor and fan assembly, which is provided in the air flow path;
   (d) a handle; and,
   (e) a plurality of energy storage members wherein the energy storage members comprise a plurality of prismatic or pouch cells and the plurality of prismatic or pouch cells or a housing for the plurality of prismatic or pouch cells form part of the exterior surface of the hand vacuum cleaner.
2. The hand vacuum cleaner of clause 1 wherein the plurality of prismatic or pouch cells are arranged in a longitudinally extending row.
3. The hand vacuum cleaner of clause 2 wherein the row of prismatic or pouch cells comprises a plurality of layers of prismatic or pouch cells whereby a radial line that extends outwardly from a central longitudinal axis of the hand vacuum cleaner intersects a plurality of prismatic or pouch cells, the row of prismatic or pouch cells has first and second laterally opposed longitudinally extending sides and an electronics unit is positioned adjacent first and second laterally opposed longitudinally extending sides.
4. The hand vacuum cleaner of clause 1 wherein the plurality of prismatic or pouch cells are arranged in a longitudinally extending row provided along a portion of at least one of the upper end or the lower end of the hand vacuum cleaner.
5. The hand vacuum cleaner of clause 1 wherein the plurality of prismatic or pouch cells are arranged in a single layer whereby a radial line that extends outwardly from a central longitudinal axis intersects only a single prismatic or pouch cell.
6. The hand vacuum cleaner of clause 1 wherein the plurality of prismatic or pouch cells are provided on at least one of an upper end or a lower end of the air treatment bin assembly.

7. The hand vacuum cleaner of clause 1 wherein the plurality of prismatic or pouch cells are provided on at least one of an upper end or a lower end of the main body.
8. The hand vacuum cleaner of clause 1 wherein the plurality of prismatic or pouch cells are provided on at least one of an upper end or a lower end of the handle.
9. The hand vacuum cleaner of clause 1 wherein the plurality of prismatic or pouch cells are provided on at least one of an upper end or a lower end of the air treatment bin assembly and an upper end or a lower end of the main body, each of the air treatment bin assembly and the main body has a height in a direction transverse to a central longitudinal axis of the hand vacuum cleaner and the handle has a height in the transverse direction that is less than the height of the air treatment bin assembly and the main body.
10. The hand vacuum cleaner of clause 9 wherein the handle has an absence of prismatic or pouch cells provided on an upper or lower surface thereof.
11. The hand vacuum cleaner of clause 10 wherein the handle is positioned between the air treatment bin assembly and the main body.
12. The hand vacuum cleaner of clause 1 wherein the main body is positioned rearward of the air treatment bin assembly, the handle is positioned rearward of the main body and a filter is provided in the handle.
13. The hand vacuum cleaner of clause 12 wherein the filter is positioned downstream from the motor and fan assembly.
14. The hand vacuum cleaner of clause 1 wherein the energy storage members comprise lithium polymer cells.
15. The hand vacuum cleaner of clause 1 wherein the prismatic or pouch cells, or a housing of the prismatic or pouch cells, comprise a portion of an outer surface of the hand vacuum cleaner.
16. A hand vacuum cleaner having a front end, a longitudinally spaced apart rear end, a central longitudinal axis, an upper end extending between the front and rear ends and a lower end extending between the front and rear ends, the hand vacuum cleaner comprising:
   (a) an air flow path extending from a dirty air inlet to a clean air outlet,
   (b) an air treatment bin assembly comprising an air treatment chamber positioned in the air flow path,
   (c) a motor and fan assembly, which is provided in the air flow path; and,
   (d) a plurality of energy storage members wherein the energy storage members comprise prismatic or pouch cells.
17. The hand vacuum cleaner of clause 16 wherein the prismatic or pouch cells are positioned radially outwardly from at least one of the air treatment bin assembly and the motor and fan assembly.
18. The hand vacuum cleaner of clause 17 wherein the prismatic or pouch cells are positioned radially outwardly from the air treatment bin assembly and the motor and fan assembly.
19. The hand vacuum cleaner of clause 16 wherein the prismatic or pouch cells, or a housing of the prismatic or pouch cells, comprise a portion of an outer surface of the hand vacuum cleaner.

Clause Set 8

1. A hand vacuum cleaner having a front end, a longitudinally spaced apart rear end, a central longitudinal axis, an upper end extending between the front and rear ends and a lower end extending between the front and rear ends, the hand vacuum cleaner comprising:
   (a) an air flow path extending from a dirty air inlet to a clean air outlet;
   (b) an air treatment bin assembly comprising an air treatment chamber positioned in the air flow path,
   (c) a main body housing a motor and fan assembly, which is provided in the air flow path; and,
   (d) a handle wherein the handle is longitudinally positioned between the air treatment bin assembly and the main body.
2. The hand vacuum cleaner of clause 1 wherein the air treatment bin assembly has a rear end having an air outlet of the air treatment bin assembly, the main body has a front end having an air inlet and the handle extends between the rear end of the air treatment bin assembly and the front end of the main body.
3. The hand vacuum cleaner of clause 2 wherein the handle has an air flow path therein which fluidically connects the air outlet of the air treatment bin assembly and the air inlet of the main body.
4. The hand vacuum cleaner of clause 3 further comprising a pre-motor filter provided in the air flow path in the handle.
5. The hand vacuum cleaner of clause 3 wherein each of the air treatment bin assembly and the main body has a height in a direction transverse to the central longitudinal axis of the hand vacuum cleaner and the handle has a height in the transverse direction that is less than the height of the air treatment bin assembly and the main body.
6. The hand vacuum cleaner of clause 5 further comprising a plurality of energy storage members and the energy storage members, or a housing of the energy storage members, comprise a portion of an outer surface of the hand vacuum cleaner.
7. The hand vacuum cleaner of clause 6 wherein the energy storage members, or a housing of the energy storage members, comprise a portion of an outer surface of at least one of the air treatment bin assembly and the main body.
8. The hand vacuum cleaner of clause 7 wherein the energy storage members, or a housing of the energy storage members, comprise a portion of an outer surface of the air treatment bin assembly and the main body.
9. The hand vacuum cleaner of clause 6 wherein the plurality of energy storage members comprise a plurality of prismatic or pouch cells.
10. The hand vacuum cleaner of clause 1 wherein the handle has an upper longitudinally extending side, a lower longitudinally extending side and first and second laterally opposed longitudinally extending sides and one of the sides is recessed radially inwardly compared to a corresponding side of the air treatment bin assembly and the main body.
11. The hand vacuum cleaner of clause 1 wherein the dirty air inlet is provided at an upper end of the hand vacuum cleaner and the lower surface of the handle is recessed radially inwardly compared to a lower surface of the air treatment bin assembly and a lower surface of the main body.
12. The hand vacuum cleaner of clause 1 further comprising a plurality of energy storage members and the energy storage members, or a housing of the energy storage members, comprise a portion of an outer surface of the hand vacuum cleaner.

13. The hand vacuum cleaner of clause 12 wherein the energy storage members, or a housing of the energy storage members, comprise a portion of an outer surface of at least one of the air treatment bin assembly and the main body.
14. The hand vacuum cleaner of clause 13 wherein the energy storage members, or a housing of the energy storage members, comprise a portion of an outer surface of the air treatment bin assembly and the main body.
15. The hand vacuum cleaner of clause 12 wherein the plurality of energy storage members comprise a plurality of prismatic or pouch cells.

Clause Set 9

1. A surface cleaning apparatus comprising:
   (a) an air flow path extending from a dirty air inlet to a clean air outlet;
   (b) an air treatment chamber positioned in the air flow path, the air treatment chamber having a first end comprising a first end wall, an axially spaced apart second end comprising a second end wall, a central longitudinal axis extending between the first and second and walls, a sidewall extending between the first and second end walls, an air treatment chamber air inlet and an air treatment chamber air outlet provided at the second end and extending inwardly from the second end wall, the air outlet comprising an axially extending porous member wherein the axially extending porous member has at least one axially extending dimple; and,
   (c) a motor and fan assembly, which is provided in the air flow path.
2. The surface cleaning apparatus of clause 1 wherein the axially extending porous member has a plurality of axially extending dimples.
3. The surface cleaning apparatus of clause 1 wherein the air treatment chamber comprises a cyclone chamber and the axially extending porous member comprises a vortex finder.
4. The surface cleaning apparatus of clause 1 wherein the axially extending porous member is conical.
5. The surface cleaning apparatus of clause 1 wherein the axially extending porous member is frusto-conical.
6. The surface cleaning apparatus of clause 1 wherein the axially extending dimple has first and second axially extending sides and the axially extending sides abut.
7. The surface cleaning apparatus of clause 1 wherein the axially extending dimple has first and second axially extending sides that are tapered radially inwardly towards each other.
8. The surface cleaning apparatus of clause 7 wherein the axially extending dimple is generally V-shaped in a plane transverse to the central longitudinal axis.
9. The surface cleaning apparatus of clause 1 wherein the axially extending dimple has first and second axially extending sides, the axially extending sides have a radial outer side and the radial outer sides are spaced apart by 0.25-2 mm.
10. The surface cleaning apparatus of clause 1 wherein the axially extending porous member has an absence of axially extending support ribs.
11. The surface cleaning apparatus of clause 1 wherein the axially extending porous member extends uninterrupted 360° around the central longitudinal axis.

Clause Set 10

1. A surface cleaning apparatus comprising:
   (a) an air flow path extending from a dirty air inlet to a clean air outlet;
   (b) a cyclone chamber positioned in the air flow path, the cyclone chamber having a cyclone axis of rotation, an axially extending sidewall, a cyclone chamber air inlet, a cyclone chamber air outlet and a dirt outlet, the dirt outlet comprising an axially extending slot in the sidewall;
   (c) a dirt collection chamber exterior to the cyclone chamber, the dirt collection chamber having first and second opposed walls wherein the first opposed wall is an extension of the sidewall; and,
   (d) a motor and fan assembly, which is provided in the air flow path.
2. The surface cleaning apparatus of clause 1 wherein the first opposed wall and the sidewall comprise a continuous uninterrupted surface.
3. The surface cleaning apparatus of clause 2 wherein the first opposed wall joins the sidewall tangentially.
4. The surface cleaning apparatus of clause 1 wherein the dirt chamber is positioned radially outwardly of the sidewall.
5. The surface cleaning apparatus of clause 1 wherein the axially extending slot in the sidewall extends axially along at least 50% of an axial length of the cyclone chamber.
6. The surface cleaning apparatus of clause 1 further comprising a screen extending across the axially extending slot.
7. A surface cleaning apparatus comprising:
   (a) an air flow path extending from a dirty air inlet to a clean air outlet;
   (b) a cyclone chamber positioned in the air flow path, the cyclone chamber having a first end comprising a first end wall, an axially spaced apart second end comprising a second end wall, a cyclone axis of rotation extending between the first and second and walls, a sidewall extending between the first and second end walls, a cyclone chamber air inlet and a cyclone chamber air outlet provided at the second end and extending inwardly from the second end wall;
   (c) a dirt collection chamber exterior to the cyclone chamber and in communication with the cyclone chamber via a dirt outlet; and,
   (d) a motor and fan assembly, which is provided in the air flow path, wherein the dirt outlet comprises an opening in the sidewall, the dirt outlet has an upstream side in a direction of rotation of air in the cyclone chamber and a downstream side in the direction of rotation, and wherein the dirt collection chamber comprises a curved wall that extends from the downstream side of the dirt outlet.
8. The surface cleaning apparatus of clause 7 wherein the curved wall comprises an extension of the sidewall.
9. The surface cleaning apparatus of clause 7 wherein the curved wall and the sidewall comprise a continuous uninterrupted surface.
10. The surface cleaning apparatus of clause 8 wherein the curved wall joins the sidewall tangentially.
11. The surface cleaning apparatus of clause 7 wherein the dirt chamber is positioned radially outwardly of the sidewall.

12. The surface cleaning apparatus of clause 7 wherein the cyclone air inlet is located at the first end and the dirt outlet is provided at the second end.
13. The surface cleaning apparatus of clause 7 wherein the opening in the sidewall extends axially along at least 50% of an axial length of the cyclone chamber.
14. The surface cleaning apparatus of clause 13 wherein the opening in the sidewall extends axially along at least 75% of an axial length of the cyclone chamber.
15. The surface cleaning apparatus of clause 7 wherein the opening in the sidewall extends axially along at least 90% of an axial length of the cyclone chamber.
16. The surface cleaning apparatus of clause 7 wherein one of the first and second ends is openable whereby the cyclone chamber and the dirt collection chamber are concurrently openable.
17. The surface cleaning apparatus of clause 7 wherein the dirt outlet further comprising a screen extending across the opening.

Clause Set 11

1. A surface cleaning apparatus comprising:
   (a) an air flow path extending from a dirty air inlet to a clean air outlet;
   (b) a cyclone chamber positioned in the air flow path, the cyclone chamber having a first end comprising a first end wall, an axially spaced apart second end comprising a second end wall, a cyclone axis of rotation extending between the first and second and walls, a sidewall extending between the first and second end walls, a cyclone chamber air inlet and a cyclone chamber air outlet provided at the second end and extending inwardly from the second end wall;
   (c) a dirt collection chamber exterior to the cyclone chamber and in communication with the cyclone chamber via a dirt outlet; and,
   (d) a motor and fan assembly, which is provided in the air flow path,
   wherein the dirt outlet comprises an opening positioned radially outwardly and facing a portion of the cyclone chamber air outlet, and
   wherein the portion of the cyclone chamber air outlet comprises a porous section and,
   wherein an air impermeable member is positioned interior the cyclone air chamber air outlet and the air impermeable member faces the porous section whereby a plane that is transverse to the cyclone axis of rotation intersects the dirt outlet, the porous section and the air impermeable member.
2. The surface cleaning apparatus of clause 1 wherein the dirt outlet comprises an opening in the sidewall.
3. The surface cleaning apparatus of clause 1 wherein the cyclone chamber air outlet comprises a screen and the porous section is less porous than the screen.
4. The surface cleaning apparatus of clause 1 wherein the porous section is provided in a tapered wall of the cyclone chamber air outlet.
5. The surface cleaning apparatus of clause 4 wherein the cyclone chamber air outlet is conical or frusto-conical.
6. The surface cleaning apparatus of clause 1 wherein the air impermeable member is arcuate.
7. The surface cleaning apparatus of clause 6 wherein the air impermeable member is radially positioned between the cyclone axis of rotation and the porous section.
8. The surface cleaning apparatus of clause 1 wherein the air impermeable member is radially positioned between the cyclone axis of rotation and the porous section.
9. The surface cleaning apparatus of clause 1 wherein an opposed section of the cyclone chamber air outlet that is radially opposed to and faces the porous section is also porous.
10. The surface cleaning apparatus of clause 9 wherein the porous section is less porous than the opposed section.
11. The surface cleaning apparatus of clause 1 wherein the cyclone chamber air inlet is provided at the first end.
12. A surface cleaning apparatus comprising:
   (a) an air flow path extending from a dirty air inlet to a clean air outlet;
   (b) a cyclone chamber positioned in the air flow path, the cyclone chamber having a cyclone axis of rotation, a cyclone chamber air inlet, a cyclone chamber air outlet and a dirt outlet;
   (c) a dirt collection chamber; and,
   (d) a motor and fan assembly, which is provided in the air flow path,
   wherein a plane that is transverse to the cyclone axis of rotation intersects the dirt collection chamber, the dirt outlet, a porous section of the cyclone chamber air outlet that faces the dirt outlet and an air impermeable member that is positioned interior the cyclone air chamber air outlet.
13. The surface cleaning apparatus of clause 12 wherein the cyclone chamber air outlet comprises a screen and the porous section is less porous than the screen.
14. The surface cleaning apparatus of clause 12 wherein the porous section is provided in a tapered wall of the cyclone chamber air outlet.
15. The surface cleaning apparatus of clause 12 wherein the air impermeable member is arcuate.
16. The surface cleaning apparatus of clause 15 wherein the air impermeable member is radially positioned between the cyclone axis of rotation and the porous section.
17. The surface cleaning apparatus of clause 12 wherein the air impermeable member is radially positioned between the cyclone axis of rotation and the porous section.
18. The surface cleaning apparatus of clause 12 wherein the plane also intersects an opposed section of the cyclone chamber air outlet that is radially opposed to the porous section and the opposed section is also porous.
19. The surface cleaning apparatus of clause 18 wherein the porous section is less porous than the opposed section.

The invention claimed is:

1. A hand vacuum cleaner comprising:
(a) an air flow passage extending from a dirty air inlet to a clean air outlet;
(b) a cyclone chamber having a cyclone axis of rotation, a first end, an axially spaced apart second end, a cyclone chamber sidewall extending between the first end and the second end, a cyclone air inlet, a cyclone air outlet, and an openable portion having first and second axially extending sides, the openable portion is moveable between a closed position and an open position wherein the cyclone axis of rotation intersects the first end and the second end and wherein the openable portion is rotatably mounted about an opening axis that is parallel to the cyclone axis of rotation and that is located at the first axially extending side whereby, when the openable portion is in the open position, an axially extending opening is provided; and, (c) a motor and fan assembly provided in the air flow passage.

2. The hand vacuum cleaner of claim 1 further comprising a dirt collection chamber that is external to the cyclone chamber and a dirt outlet connecting the cyclone chamber in communication with the dirt collection chamber wherein the dirt collection chamber is opened concurrently with the cyclone chamber.

3. The hand vacuum cleaner of claim 2 wherein the dirt collection chamber has a dirt collection chamber sidewall that is spaced from the cyclone chamber sidewall whereby at least a portion of the dirt collection chamber is positioned between the cyclone chamber sidewall and the dirt collection chamber sidewall, and the openable portion comprises at least a portion of the dirt collection chamber sidewall and a portion of the cyclone chamber sidewall.

4. The hand vacuum cleaner of claim 3 wherein the dirt outlet comprises an opening in the portion of the cyclone chamber sidewall, the dirt outlet as a perimeter and the portion of the cyclone chamber sidewall comprises only part of the perimeter of the dirt outlet.

5. The hand vacuum cleaner of claim 1 wherein the openable portion comprises a portion of the exterior surface of the hand vacuum cleaner.

6. The hand vacuum cleaner of claim 1 wherein the dirty air inlet is provided at an upper end of the hand vacuum cleaner and the hand vacuum cleaner has a lower end which comprises at least a portion of the openable portion.

7. The hand vacuum cleaner of claim 1 wherein the dirty air inlet is provided at the front end of the hand vacuum cleaner, the first end is a front end of the cyclone chamber, the second end is a rear end of the cyclone chamber, the cyclone air inlet is provided at the front end of the cyclone chamber and the cyclone air outlet is provided at the rear end.

8. The hand vacuum cleaner of claim 1 wherein the hand vacuum cleaner has a front end having the dirty air inlet, a rear end and first and second laterally opposed sides extending in a forward/rearward direction and the opening axis is located on one of the laterally opposed sides.

9. The hand vacuum cleaner of claim 1 wherein the hand vacuum cleaner has a front end having the dirty air inlet, a rear end, first and second laterally opposed sides extending in a forward/rearward direction and a central plane extending in the forward/rearward direction and located between the laterally opposed sides and the opening axis extends in the central plane.

10. The hand vacuum cleaner of claim 1 further comprising an energy storage member and the energy storage member is positioned radially outward of the cyclone chamber.

11. The hand vacuum cleaner of claim 10 further comprising a dirt collection chamber that is external to the cyclone chamber, wherein the dirty air inlet is provided at front end of the hand vacuum cleaner and wherein the energy storage member is positioned forward of the dirt collection chamber.

12. The hand vacuum cleaner of claim 10 further comprising a dirt collection chamber that is external to the cyclone chamber, wherein the hand vacuum cleaner has a front end having the dirty air inlet, a rear end, first and second laterally opposed sides extending in a forward/rearward direction, and wherein the energy storage member is positioned laterally beside the dirt collection chamber.

13. A vacuum cleaner comprising:

(a) an air flow passage extending from a dirty air inlet to a clean air outlet;

(b) an air treatment chamber having a first end, an axial spaced apart second end, an air treatment chamber sidewall extending between the first end and the second end, an air treatment chamber air inlet, an air treatment chamber air outlet provided at the second end of the air treatment chamber, an air treatment chamber axis intersecting the first end of the air treatment chamber and the second end of the air treatment chamber and defining an axial direction, and an openable portion having first and second axially extending sides, the openable portion is rotatably mounted between a closed position and an open position about an opening axis that is parallel to the air treatment chamber axis wherein, in the open position an axially extending opening is provided; and, (c) a motor and fan assembly provided in the air flow passage.

14. The hand vacuum cleaner of claim 13 further comprising a dirt collection chamber that is external to the air treatment chamber and a dirt outlet connecting the air treatment chamber in communication with the dirt collection chamber wherein the dirt collection chamber is opened concurrently with the air treatment chamber.

15. The vacuum cleaner of claim 14 wherein the dirt collection chamber has a dirt collection chamber sidewall that is spaced from the air treatment chamber sidewall whereby at least a portion of the dirt collection chamber is positioned between the air treatment chamber sidewall and the dirt collection chamber sidewall, and the openable portion comprises at least a portion of the dirt collection chamber sidewall and a portion of the air treatment chamber sidewall.

16. The vacuum cleaner of claim 15 wherein the dirt outlet comprises an opening in the portion of the air treatment chamber sidewall, the dirt outlet as a perimeter and the portion of the air treatment chamber sidewall comprises only part of the perimeter of the dirt outlet.

17. The vacuum cleaner of claim 13 wherein the openable portion comprises a portion of the exterior surface of the vacuum cleaner.

18. The vacuum cleaner of claim 13 wherein the vacuum cleaner has first and second laterally opposed sides extending in the axial direction and the opening axis is located on one of the laterally opposed sides.

19. The vacuum cleaner of claim 13 further comprising an energy storage member and the energy storage member is positioned radially outward of the air treatment chamber.

20. The vacuum cleaner of claim 19 further comprising a dirt collection chamber that is external to the air treatment chamber, wherein the energy storage member is positioned axially from the dirt collection chamber whereby a projection of the energy storage member intersects the dirt collection chamber.

* * * * *